United States Patent [19]

Watanabe et al.

[11] Patent Number: 6,151,019
[45] Date of Patent: *Nov. 21, 2000

[54] METHOD AND APPARATUS FOR CONTROLLING ACCESS OF STORED DATA IN A SYSTEM HAVING A PLURALITY OF INFORMATION PROCESSING APPARATUSES CONNECTED TO A NETWORK

[75] Inventors: Satoshi Watanabe, Tokyo; Masaki Sagoh; Yasufumi Takada, both of Yokohama; Yosato Hitaka, Tokyo; Hajime Satow, Tokyo; Yoshiro Hikida, Tokyo; Naohiro Yoshikawa, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/045,359

[22] Filed: Apr. 13, 1993

[30] Foreign Application Priority Data

| Apr. 15, 1992 | [JP] | Japan | 4-121171 |
| Apr. 15, 1992 | [JP] | Japan | 4-121172 |
| May 22, 1992 | [JP] | Japan | 4-131137 |
| Feb. 17, 1993 | [JP] | Japan | 5-027997 |

[51] Int. Cl.$^7$ .................................................. G06F 13/00

[52] U.S. Cl. .......................................... 345/329; 345/332

[58] Field of Search ....................................... 395/155, 161, 395/159, 156, 157, 158, 160, 329, 330, 331, 332, 680, 200.04, 200.34; 345/329, 330, 331, 332

[56] References Cited

U.S. PATENT DOCUMENTS

| 4,658,351 | 4/1987 | Teng ........................................ 709/103 |
| 4,939,507 | 7/1990 | Beard et al. ............................. 345/156 |
| 5,107,443 | 4/1992 | Smith et al. ............................. 345/331 |
| 5,140,677 | 8/1992 | Fleming et al. ......................... 345/348 |

(List continued on next page.)

FOREIGN PATENT DOCUMENTS

| 0323025 | 11/1988 | European Pat. Off. . |
| 0435804 | 11/1990 | European Pat. Off. . |
| 0458720 | 4/1991 | European Pat. Off. . |
| 0466626 | 5/1991 | European Pat. Off. . |
| 0480859 | 9/1991 | European Pat. Off. . |

OTHER PUBLICATIONS

IBM Technical Disclosure Bulletin, vol. 33, No. 1B, Jun. 1990, New York US, pp. 86–87, "Dynamic Object Pair Validation".

Research Disclosure No. 33255, No. 332, Dec. 1991, Havant GB p. 948, line 23–line 26.

IBM Technical Disclosure Bulletin, vol. 34, No. 9, Feb. 1992, New York, US, pp. 192–193, "Self–Destructible Documents".

Patent Abstracts of Japan, vol. 10, No. 26, JP60–176157 (Oct. 9, 1985).

Patent Abstracts of Japan, vol. 10, No. 278, JP61–097756 (May 16, 1986).

Patent Abstracts of Japan, vol. 15, No. 67, JP2–289078 (Nov. 29, 1990).

Patent Abstracts of Japan, vol. 13, No. 112, JP63–288344 (Nov. 25, 1988).

Patent Abstracts of Japan, vol. 16, No. 308, JP4–085636 (Mar. 18, 1992).

(List continued on next page.)

*Primary Examiner*—Crescelle N. dela Torre
*Attorney, Agent, or Firm*—Fitzpatrick, Cella, Harper & Scinto

[57] ABSTRACT

An information network is disclosed in which information to be made available to each of several information processing apparatuses is stored together with associated periods of accessibility; and the accessibility of the stored information to the information processing apparatuses is controlled according to the stored associated periods of accessability.

21 Claims, 93 Drawing Sheets

U.S. PATENT DOCUMENTS

| | | | |
|---|---|---|---|
| 5,195,086 | 3/1993 | Baumgartner et al. | 370/264 |
| 5,214,756 | 5/1993 | Franklin et al. | 345/348 |
| 5,220,657 | 6/1993 | Bly et al. | 711/152 |
| 5,353,398 | 10/1994 | Kitahara et al. | 345/332 |
| 5,363,507 | 11/1994 | Nakayama et al. | 345/331 |
| 5,384,911 | 1/1995 | Bloomfield | 345/333 |
| 5,392,400 | 2/1995 | Berkowitz et al. | 609/203 |
| 5,428,734 | 6/1995 | Haynes et al. | 345/349 |
| 5,461,710 | 10/1995 | Bloomfield et al. | 345/349 |
| 5,479,599 | 12/1995 | Rockwell et al. | 345/349 |
| 5,488,686 | 1/1996 | Murphy et al. | 345/330 |
| 5,491,783 | 2/1996 | Douglas et al. | 345/335 |
| 5,491,784 | 2/1996 | Douglas et al. | 345/352 |
| 5,546,527 | 8/1996 | Fitzpatrick et al. | 345/348 |
| 5,550,968 | 8/1996 | Miller et al. | 345/332 |

OTHER PUBLICATIONS

Research Disclosure No. 26717, Havant GB, "Retention Management Program" p. 386 (Jul. 1986).

Research Disclosure No. 30603, Havant GB, "Assigning Access to Documents in a Folder of a Host Library", p. 706 (Oct. 1989).

"Integrating Query, Thesaurus, and Documents Through a Common Visual Representation", Foeler H. R., et al., Preceedings of 14th Annual Int'l Conference on Research and Development in Information Retrieval, (Oct. 1991).

PC Magazine, vol. 8, "Battling Babel: Word Processing Format Conversion", Poor, A. (Apr. 25, 1989).

| FORMAT ID | EXTENDER | ICON-FILE NAME | LIBRARY ID |
|---|---|---|---|
| 012 | .etx | Eztext | 020 |
| 013 | .etb | Eztable | |
| 212 | .slk | Silk | |

FIG.15

| APPLICA-TION ID ⁶¹ | EXECUTION-MODULE NAME ⁶² | APPLICA-TION NAME ⁶³ | ICON-FILE NAME ⁶⁴ | PROCESSING LIST ⁶⁵ ||| NECESSITY OF PROCESSING DATA ⁶⁷ |
|---|---|---|---|---|---|---|---|
| | | | | FORMAT ID | PROCESSING CODE | PROCESSING NAME | |
| 012 | ezps | DOCUMENT EDITION | Ezps | 012 | e | EDITION | |
| | | | | 012 | p | PRINTING | ○ |
| | | | | ⋮ | c | CONVERSION | ○ |
| | | | | | s | FORMAT FORMATION | |
| 013 | eztab | TABLE CALCULA-TION | Eztab | 013 | c | TABLE FORMATION CONVERSION | ○ |
| | | | | 212 | c | CONVERSION | ○ |
| | | | | 013 | e | EDITION | |
| | | | | | p | PRINTING | ○ |
| | | | | | g | GRAPH FORMATION | ○ |
| | | | | 212 | c | CONVERSION | ○ |

| LIBRARY ID ⁷¹ | LIBRARY-BINDER NAME ⁷² | LIBRARY NAME ⁷³ | FREQUENCY OF DISCLOSURE ⁷⁴ |
|---|---|---|---|
| 020 | /usr/lib/form | FORM | 0 |

| USER ID | USER INFORMATION | DIRECTORY OF USER'S ROOM | LIBRARY UPDATING MODE |
|---|---|---|---|
| 1001 | WATANABE | /usr/users/watanabe | PRESENT |
| 1002 | SATO | /usr/users/sato | ABSENT |
| 1003 | TAKADA | /usr/users/takada | ABSENT |

FIG.18

| OFFICE ID | HOST NAME | OFFICE NAME | DOMAIN | LIBRARY UPDATA MODE |
|---|---|---|---|---|
| 10001 | local | LOCAL | 68k | ABSENT |
| 10002 | kaisya | COMPANY | 68k | ABSENT |

FIG.19

| GROUP ID | USER ID |
|---|---|
| 100001 | 1001,1002,1003 |
| 100002 | 1001 |

FIG.20

| | OBJECT TYPE | DATA | DATA |
|---|---|---|---|
| | FILE NAME | bunsho.etx | form.etx |
| | FORMAT ID | 012 | 012 |
| | CREATOR ID | 012 | 012 |
| | NAME IN JAPANESE | 文書 | フォーム |
| | SIZE | 2012 | 1208 |
| | DATE OF REGISTRATION | 91/01/21 09:12:08 | 91/03/03 13:00:04 |
| | DATE OF LAST UPDATING | 91/03/30 11:52:50 | 91/03/03 13:00:04 |
| | DATE OF LAST REFERENCE | 91/04/02 15:55:24 | 91/04/02 16:01:18 |
| | OWNER'S USER ID | 1001 | 1001 |
| | OWNER'S GROUP ID | 100001 | 100001 |
| | USER ID OF LAST REFERENCE | 1001 | 1002 |
| | USER ID OF LAST UPDATING | 1001 | 1001 |
| ACCESS LEVEL | REFERENCE OWNER | OK | OK |
| | REFERENCE GROUP | OK | OK |
| | REFERENCE OTHER USER | OK | NG |
| | UPDATING OWNER | OK | OK |
| | UPDATING GROUP | OK | NG |
| | UPDATING OTHER USER | OK | NG |
| | DOMAIN | 68k | 68k |
| | USER ID OF USER FOR WHICH DATA IS TO BE DISCLOSED | ABSENT | ABSENT |
| | GROUP ID OF GROUP FOR WHICH DATA IS TO BE DISCLOSED | ABSENT | ABSENT |
| | LIMITATION OF OPEN COPY | 0 | ABSENT |
| | DEADLINE OF DISCLOSURE | 91/04/30 00:00:00 | ABSENT |
| | DEADLINE OF DATA DISPOSAL | 91/04/30 23:59:59 | ABSENT |
| | OBJECT INDICATED BY TAG | ABSENT | ABSENT |

FIG.21

| FILE NAME | USER ID | ACCESS LEBEL | DATE |
|---|---|---|---|
| /tanaka/bunsho | 1001 | REFERENCE | 91/04/02 15:55:24 |

| RETRIEVAL ORDER 1 | RETRIEVAL ORDER 2 |
|---|---|
| USER ID :1001 | OFFICE ID :100001 |

150

FIG.41
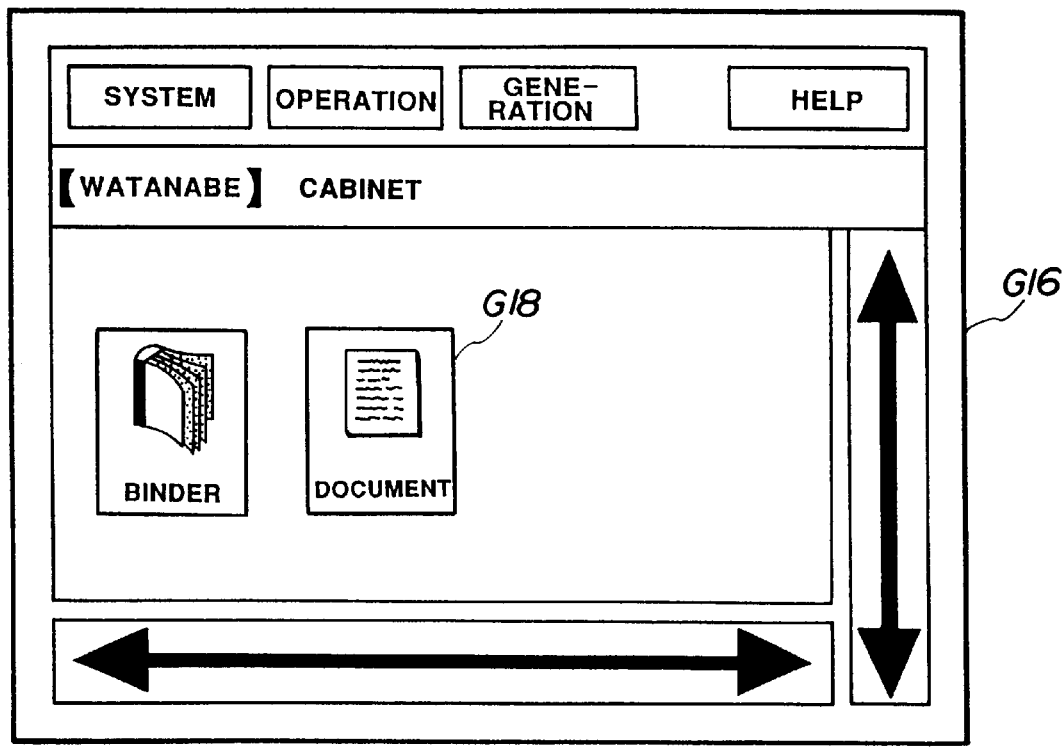
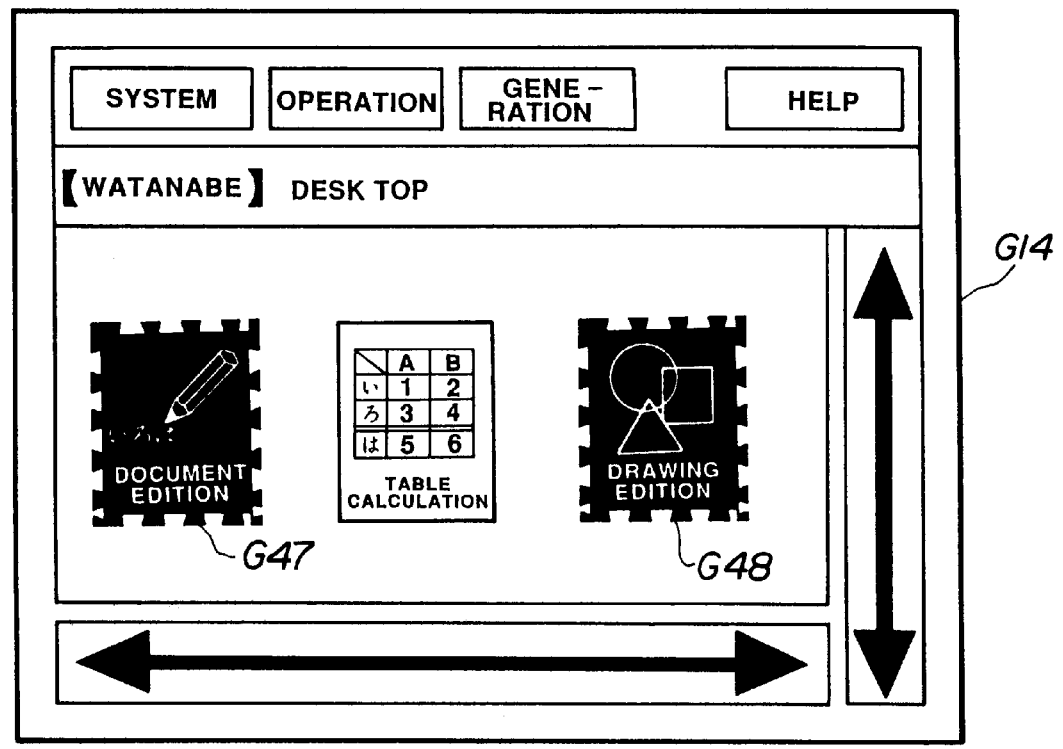

| | | |
|---|---|---|
| 161 — FILE NAME | cut_buffer | — 160 |
| 162 — FORMAT ID | 012 | |
| 163 — SIZE | 2012 | |
| 164 — OWNER'S USER ID | 1001 | |
| 165 — OWNER'S GROUP ID | 100001 | |

FIG.71

[WATANABE] DETAILS OF RESULT OF RETRIEVAL

| NAME | KIND | DATE OF FORMATION | DATE OF UPDATING | COMMENT |
|---|---|---|---|---|
| BINDER | BINDER | 91.1.1 | 91.12.1 | OKUBO'S DATA |
| BINDER | BINDER | 91.2.1 | 91.12.2 | SAIGO'S DATA |

SYSTEM  OPERATION  GENERATION  HELP

| NAME | METHOD OF DETECTION | CONVERTER |
|---|---|---|
| MS-DOS | msdos_check | msdos_conv |
| WP | wp_check | wp_conv |

| FILE TYPE | | DATA | DATA |
|---|---|---|---|
| FILE NAME | | bunsho.tst | form.dat |
| NAME IN JAPANESE | | 文書 | フォーム |
| SIZE | | 2012 | 1208 |
| DATE OF REGISTRATION | | 91/01/21 09:12:08 | 91/03/03 13:00:04 |
| DATE OF UPDATING | | 91/03/30 11:52:50 | 90/03/03 13:00:04 |
| ACCESS LEVEL | OWNER | OK | OK |
| | GROUP | OK | OK |
| | OTHER USER | OK | NG |

| | OBJECT TYPE | DATA | DATA |
|---|---|---|---|
| 112 | FILE NAME | bunsho.etx | form.etx |
| 113 | FORMAT ID | 012 | 012 |
| 114 | CREATOR ID | 012 | 012 |
| 115 | NAME IN JAPANESE | 文書 | フォーム |
| 117 | SIZE | 2012 | 1208 |
| 118 | DATE OF REGISTRATION | 91/01/21 09:12:08 | 91/03/03 13:00:04 |
| 119 | DATE OF LAST UPDATING | 91/03/30 11:52:50 | 91/03/03 13:00:04 |
| 120 | DATE OF LAST REFERENCE | 91/04/02 15:55:24 | 91/04/02 16:01:18 |
| 121 | OWNER'S USER ID | 1001 | 1001 |
| 122 | OWNER'S GROUP ID | 100001 | 100001 |
| 123 | USER ID OF LAST REFERENCE | 1001 | 1002 |
| 124 | USER ID OF LAST UPDATING | 1001 | 1001 |
| ACCESS LEVEL | REFERENCE OWNER | OK | OK |
| | REFERENCE GROUP | OK | OK |
| | REFERENCE OTHER USER | OK | NG |
| | UPDATING OWNER | OK | OK |
| | UPDATING GROUP | OK | NG |
| | UPDATING OTHER USER | OK | NG |
| 125 | DOMAIN | 68k | 68k |
| 126 | USER ID OF USER FOR WHICH DATA IS TO BE DISCLOSED | ABSENT | ABSENT |
| 127 | GROUP ID OF GROUP FOR WHICH DATA IS TO BE DISCLOSED | ABSENT | ABSENT |
| 128 | LIMITATION OF OPEN COPY | 0 | ABSENT |
| 129 | DEADLINE OF DISCLOSURE | 91/04/30 00:00:00 | ABSENT |
| 1300 CONTROL OF DISPOSAL | CONDITIONS | (REFERENCE DATA) =91/04/02 | ABSENT |
| | TIME OF COMPLETION OF DISPOSAL | 0/0/4 0:0 | ABSENT |
| | TIME OF CONTINUATION OF CONDITIONS | 0/0/2 10:2 | 0 |

FIG.103

| OBJECT TYPE | DATA | DATA |
|---|---|---|
| FILE NAME | bunsho.etx | form.etx |
| FORMAT ID | 012 | 012 |
| CREATOR ID | 012 | 012 |
| NAME IN JAPANESE | 文書 | フォーム |
| SIZE | 2012 | 1208 |
| DATE OF REGISTRATION | 91/01/21　09:12:08 | 91/03/03　13:00:04 |
| DATE OF LAST UPDATING | 91/03/30　11:52:50 | 91/03/03　13:00:04 |
| DATE OF LAST REFERENCE | 91/04/02　15:55:24 | 91/04/02　16:01:18 |
| OWNER'S USER ID | 1001 | 1001 |
| OWNER'S GROUP ID | 100001 | 100001 |
| USER ID OF LAST REFERENCE | 1001 | 1002 |
| USER ID OF LAST UPDATING | 1001 | 1001 |
| ACCESS LEVEL — REFERENCE — OWNER | OK | OK |
| ACCESS LEVEL — REFERENCE — GROUP | OK | OK |
| ACCESS LEVEL — REFERENCE — OTHER USER | OK | NG |
| ACCESS LEVEL — UPDATING — OWNER | OK | OK |
| ACCESS LEVEL — UPDATING — GROUP | OK | NG |
| ACCESS LEVEL — UPDATING — OTHER USER | OK | NG |
| DOMAIN | 68k | 68k |
| USER ID OF USER FOR WHICH DATA IS TO BE DISCLOSED | ABSENT | ABSENT |
| GROUP ID OF GROUP FOR WHICH DATA IS TO BE DISCLOSED | ABSENT | ABSENT |
| LIMITATION OF OPEN COPY | 0 | ABSENT |
| DEADLINE OF DISCLOSURE | 91/04/30　00:00:00 | ABSENT |
| DEADLINE OF DATA DISPOSAL | 91/04/30　23:59:59 | ABSENT |
| SIZE OF DATA TO BE DISPOSED | 50K | 50K |

METHOD AND APPARATUS FOR CONTROLLING ACCESS OF STORED DATA IN A SYSTEM HAVING A PLURALITY OF INFORMATION PROCESSING APPARATUSES CONNECTED TO A NETWORK

BACKGROUND OF THE INVENTION

1. Field of the Invention

This invention relates to a data processing apparatus in which, for example, the user can operate desired data preserved in a plurality of data processing apparatuses having a plurality of users.

2. Description of the Related Art

In a conventional data processing apparatus having a plurality of users, data used by the users are preserved in a predetermined portion of the apparatus, such as a memory or the like, determined by the data processing apparatus. When one of the users intends to operate with data which agrees with specific conditions, the data can be operated with according to a procedure peculiar to the data processing apparatus. For example, when the user intends to operate with the data of an application program, the data can be operated with according to a procedure peculiar to the application program. If the data is present in another data processing apparatus connected to the apparatus by some means, the data can be operated with according to a predetermined procedure, such as by assigning the data processing apparatus in which the data is present, or the like.

In a conventional data processing apparatus utilized by a plurality of users, data used by the respective users are stored in predetermined storage portions. If a user intends to operate with data which agrees with desired conditions, the data can be operated with according to a procedure peculiar to the data processing apparatus, such as assigning a portion and conditions of storage, or the like.

In the above-described conventional approach, however, the user must have specialized knowledge peculiar to each data processing apparatus, and must learn complicated operations for each computer system. Furthermore, when operating with data present in other data processing apparatuses, the user must know in which processing apparatus the data is present. For example, when operating with data of an application, the user must, in advance, have specialized knowledge, such as executable processing for each application program, and must know, for example, the kinds of data which can be referred to or updated, or in which portions the data are stored. The user also must know the kinds of application programs and processing which can be referred to or updated for each data.

In a plurality of conventional computer systems utilized by a plurality of users, data used by the respective users are generated, for example, in various kinds of formats, that is, data forms, for the respective computer systems, and are preserved, for example, in floppy disks, optical disks, magneto-optical disks or hard disks. Accordingly, if, for example, one of the users intends to obtain data of a different application in other computer system, copy and utilize the obtained data, the user must perform the operation of converting the form of the data so that the data can be adapted to his own application.

In the above-described conventional computer system, however, when obtaining data of a different application, copying and utilizing the obtained data, the user must perform the operation of converting the form of the data, causing an inferior efficiency of the operation.

In one or a plurality of conventional computer systems utilized by a plurality of users, data which can be disposed by one of the users are preserved in a predetermined portion of the computer system so that the data can be physically disposed by a procedure peculiar to the computer, or by the process of starting the computer system. The region where the data have been disposed can be utilized by the operation of the user who has been permitted to physically dispose the data, or the operation of starting again the computer system.

In the above-described conventional computer system, however, since data which can be disposed are preserved in a predetermined portion of the computer system and are physically disposed by a procedure peculiar to the computer, or the processing of starting the computer system, data regions cannot be efficiently utilized.

SUMMARY OF THE INVENTION

The present invention has been made in consideration of the above-described problems.

It is an object of the present invention to provide a data processing apparatus in which the user can operate with desired data without being aware of where the data is stored.

It is a further object of the present invention to provide a data processing apparatus in which the user need not be aware of the correspondence between data and an application program which can process the data.

It is a still further object of the present invention to provide a data processing apparatus in which the user can obtain and copy data of a different application with a simple operation.

It is still another object of the present invention to provide a data processing apparatus in which the user can efficiently utilize data regions.

According to one aspect, the present invention which achieves these objectives relates to a data processing apparatus comprising first storage means for storing the data form of data to be processed by an application program, second storage means for storing the data forms of data, means for representing processing by the application program and the data to be processed with respective peculiar icons, and display means for displaying the correspondence between the icon of the application program and the icon of the data to be processed by the application program based on the first and second storage means.

According to another aspect, the present invention which achieves these objectives relates to a data processing apparatus for controlling data under a hierarchical structure, comprising retrieval-condition setting means for setting retrieval conditions for retrieval, retrieval means for further retrieving hierarchies lower than a hierarchy which satisfies the conditions set by the retrieval-condition setting means, and presentation means for presenting a result of the retrieval by the retrieval means.

According to still another aspect, the present invention which achieve these objectives relates to a data processing apparatus for controlling data under a hierarchical structure, comprising retrieval-condition setting means for setting conditions for retrieving data, retrieval means for retrieving data by the conditions set by the retrieval-condition setting means, and display means for displaying data obtained by the retrieval so that the form of display for data of low hierarchies differs from the form of display for other data.

According to still another aspect, the present invention which achieves these objectives relates to a data processing apparatus comprising control means for controlling access information representing accessibility of data, retrieval-condition setting means for setting conditions for retrieving data, retrieval means for retrieving data by the conditions set by the retrieval-condition setting means, and retrieval-execution control means for controlling the execution of the retrieval by the retrieval means based on the access information.

According to still another aspect, the present invention which achieves these objectives relates to a data processing apparatus comprising control means for controlling access information representing accessibility of data, retrieval-condition setting means for setting conditions for retrieving data, retrieval means for retrieving data by the conditions set by the retrieval-condition setting means, and display means for separately displaying accessible data and nonaccessible data as a result of the retrieval processing by the retrieval means based on the access information.

According to still another aspect, the present invention which achieves these objectives relates to a data processing apparatus comprising a plurality of data storage means for storing respective data utilized by a plurality of applications, determination means for determining the forms of data generated or edited by the plurality of applications, and conversion means for converting the data form of a first application determined by the determination means into a data form suitable for processing a second application when data generated or edited by the first application is copied to data storage means for the second application.

According to still another aspect, the present invention which achieves these objectives relates to a data processing apparatus comprising data control means for controlling data, disposal control means for controlling data to be disposed, disposal means for disposing data controlled by the disposal control means, and setting means for setting a time. Data controlled by the disposal control means is disposed by the disposal means based on the time set by the setting means.

According to still another aspect, the present invention which achieves these objectives relates to a data processing apparatus comprising data control means for controlling data, disposal control means for controlling data to be disposed, disposal means for disposing data controlled by the disposal control means, and setting means for setting conditions. When the set conditions are satisfied, data controlled by the disposal control means is disposed by the disposal means.

According to still another aspect, the present invention which achieves these objectives relates to a data processing apparatus comprising data control means for controlling data, disposal control means for controlling data to be disposed, disposal means for disposing data controlled by the disposal control means, and setting means for setting the size of data. When the size of data equals at least the size set by the setting means, the data controlled by the disposal control means is disposed by the disposal means.

According to still another aspect, the present invention which achieves these objectives relates to a data processing apparatus further comprising changing means for changing the set time, conditions or size.

BRIEF DESCRIPTION OF THE DRAWINGS

FIG. 15 is a diagram showing an example of application information;

FIG. 16 is a diagram showing an example of library information;

FIG. 17 is a diagram showing an example of user information;

FIG. 18 is a diagram showing an example of office information;

FIG. 19 is a diagram showing an example of group information;

FIG. 20 is a diagram showing an example of object control information;

FIG. 21 is a diagram showing an example of open-object control information;

FIG. 22 is a diagram showing an example of library-retrieval-order information;

FIG. 41 is a diagram showing an example of highlight display of the relationship between an application object and a data object;

FIG. 71 is a diagram showing an example of display of the details of a result of retrieval;

FIG. 90 is a diagram illustrating floppy-disk control information;

FIG. 91 is a diagram illustrating data control information of a floppy disk;

FIG. 99 is a diagram illustrating data control information in a second embodiment of the present invention;

FIG. 103 is a diagram illustrating data control information in a third embodiment of the present invention;

DESCRIPTION OF THE PREFERRED EMBODIMENTS

Description of the Apparatus

Figure 1:
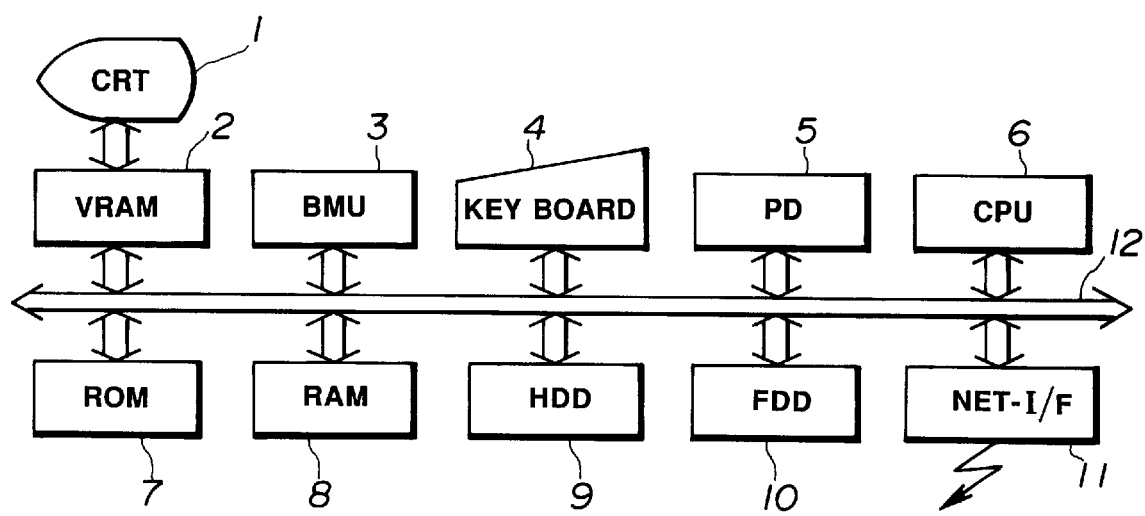
FIG. 1 is a block diagram of a data processing apparatus according to a first embodiment of the present invention.

FIG. 1 is a block diagram of a data processing apparatus according to a first embodiment of the present invention. In FIG. 1, CRT (cathtode-ray tube) 1 displays information of data being processed by an application program, various kinds of message menus, or the like. Video RAM (random access memory)(hereinafter termed a VRAM) 2 develops an image displayed on the picture surface of CRT 1. Bit manipulating unit (hereinafter termed a BMU) 3 controls data transfer between memories or between a memory and each device. Keyboard 4 includes various kinds of keys for performing processing, such as document editing and the like. Pointing device (hereinafter termed a PD) 5 is used for indicating an icon or the like on an image. CPU (central processing unit) 6 controls the entire apparatus. ROM (readonly memory) 7 stores, for example, programs for executing processing procedures of CPU 6. ROM 7 also stores application programs relating to data processing, error processing programs, and programs relating to flowcharts shown, for example, in FIG. 26. RAM 8 is used as work areas when CPU 5 executes various kinds of programs, temporary refuge areas during error processing, and the like. There are also shown hard-disk drive (hereinafter termed an HD) 9, and floppy-disk drive (hereinafter termed an FDD) 10. Each disk is used for preserving application programs (to be described later), data, libraries or the like. Network interface (hereinafter termed a Net-I/F) 11 performs the control and diagnosis of data on a network in order to perform data transfer with other data processing apparatuses via the network. I/O (input/output) bus (comprising an address bus, a data bus, and a control bus) 12 connects the above-described respective units.

Concept of the Desktop Control System

Figure 3:
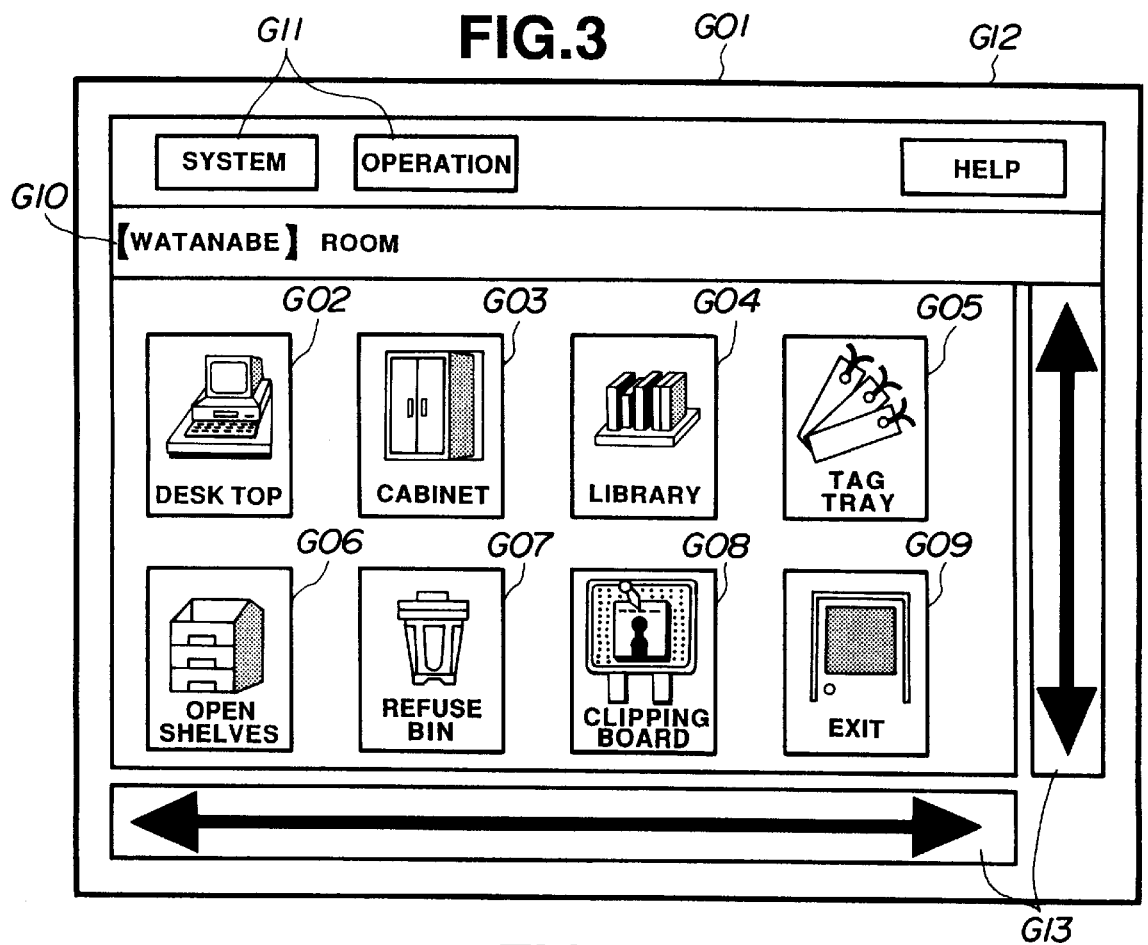
FIG. 3 is a diagram showing an example of display of a room window of a user.

In the present embodiment, the entirety of application programs for processing data, and programs which perform the processing of controlling data processed by the application programs, providing the user with an environment for operating with the data, executing the application programs, and providing the executed application programs with data is termed a "desktop control system". An example of display of an actual desktop control system comprises a plurality of windows on a window system, as shown in FIG. 3. In FIG. 3, data is operated with by an input from keyboard 4, pointing device 5 or the like.

Next, a description will be provided of various kinds of concepts in the desktop control system.

Figure 2:
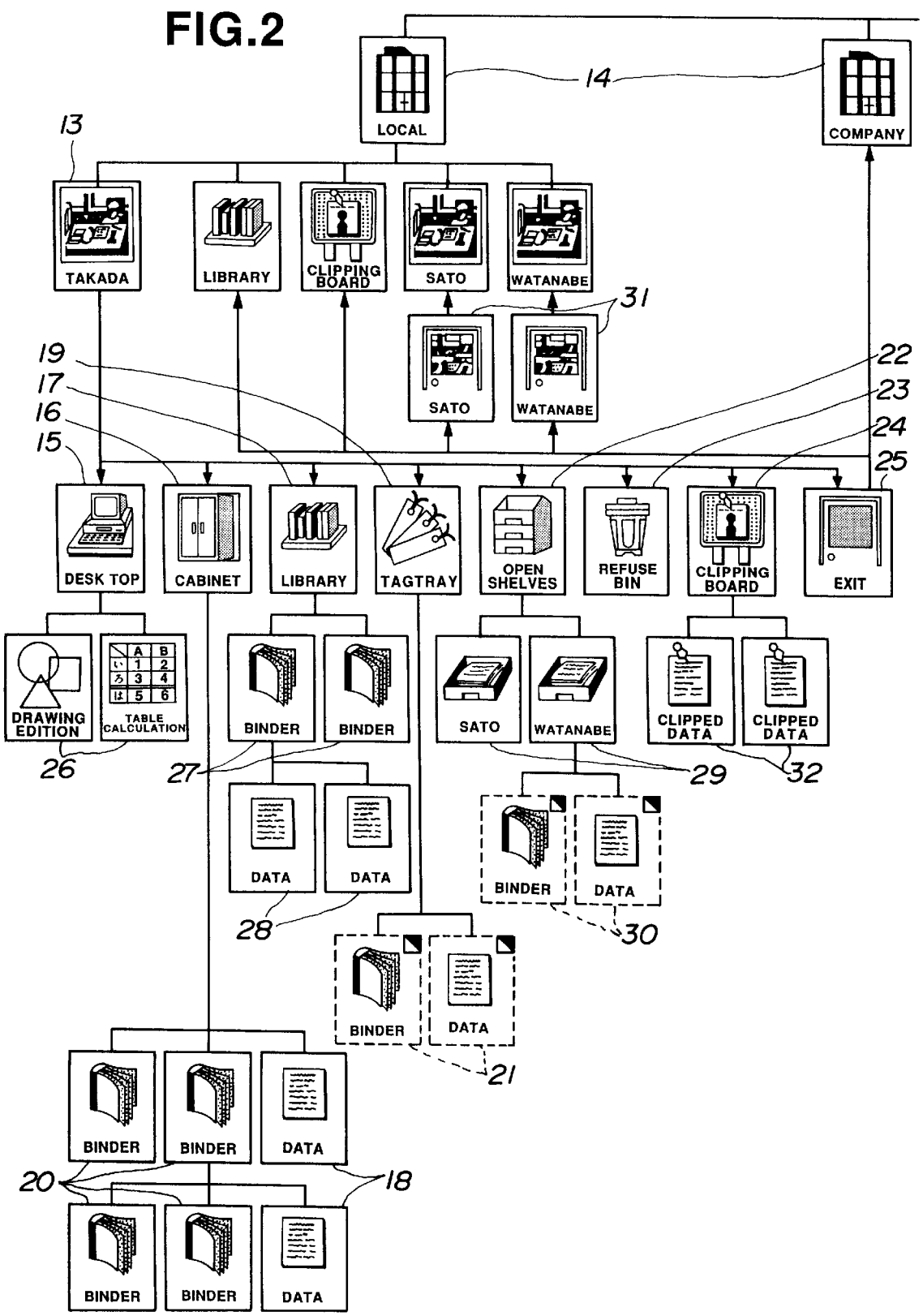
FIG. 2 is a diagram illustrating rooms and offices in a desktop control system.

FIG. 2 represents rooms 13 and offices 14 as concepts of a user's operational environment in a desktop control system. Room 13 is a concept indicating a space of environment possessed by a user. Office 14 is a concept indicating a space comprising a group of rooms 13 included therein. Office 14 represents an office in the actual society, and room 13 represents a room which serves as an operational environment of each operator working in the office.

For example, a computer's physical filing system is defined as office 14. A plurality of rooms 13 are present in each of offices 14 dispersed with a plurality of computers connected by a network. The function of providing an operational environment included in room 13 will be described with respect to the description of an operational object (to be described later). A user has his own room 13 in an appropriate office 14, receives services of the desktop control system in the room 13, and can start an application program or perform processing of data by operating an operational object. The user also can access rooms 13 of other users in the same office 14 or rooms 13 in other offices 14, and can perform the same operation as in his own room 13 within a permitted range. Furthermore, the user can also perform the processing of moving and copying data between a plurality of rooms 13.

The operational object (object) indicates data and a set of data represented on a window as an icon, and the function provided by the desktop control system in order to provide means of access to the desktop control system by the user.

Next, a description will be provided of operational objects provided through the user interface with reference to respective drawings shown in FIG. 2. In FIG. 2, while various kinds of objects belong to room "Takada", the situation is the same for room "Sato" and room "Watanabe".

FIG. 3 illustrates room window G01 which represents room 13 of a user realized on a window system. Objects present within room window G01 will be described with reference to FIGS. 2 and 3.

Desktop 15 indicated by desktop object G02 is an object indicating the function of controlling an application program which is one of the functions of the desktop control system. By performing an opening operation of desktop object G02, a window including objects within desktop (to be described later) is displayed.

Cabinet 16 indicated by cabinet object G03 is an object indicating the top-level entry of the function of controlling data formed by an application program in a hierarchical structure. By performing an opening operation of cabinet object G03, a window including objects within a cabinet (to be described later) is displayed.

Library 17 indicated by library object G04 is an object indicating the entry of the portion where a library, serving as (common) auxiliary data to be referred to when an application program processes data, is stored. By performing an opening operation of library object G04, a window including objects within a library is displayed.

Tag tray 19 indicated by tag-tray object G05 is an object which represents a virtual entry for accessing binder 20 or data 18 (to be described later) without following the hierarchical structure of the cabinet. Tag 21 represents an object to be stored. By performing an opening operation of tag-tray object G05, a window including objects within a tag tray (to be described later) is displayed.

Open shelves 21 indicated by open-shelf object G06 correspond to an object which realizes an operation for permitting other users to refer to or update data 18 or binders 20 in cabinet 16 within the user's own room 13 (hereinafter termed a disclosure operation), and preserves information for that operation. By performing an opening operation of open-shelf object G06, a window including objects within open shelves (to be described later) is displayed.

Refuse bin 23 indicated by refuse-bin object G07 is an object which controls disposal of data. Clipping board 24 indicated by clipping-board object G08 is an object which provides a function for exchanging data 18 or a part thereof to be processed by applications 26, between different applications 26.

Exit 25 indicated by exit object G09 is an object representing a means of accessing another user's room 13 or office 14. By performing an opening operation of exit object G09, a window including objects within an exit (to be described later) is displayed.

Although not operational objects, G10 represents a title which displays the user's name and the name of the displayed window, G11 represents an operational button for instructing an operation within the window, G12 represents a help button for displaying the contents of a help menu of an operation, and G13 represents scrolling bars for scrolling an icon present outside the window to display the icon.

Figure 4:
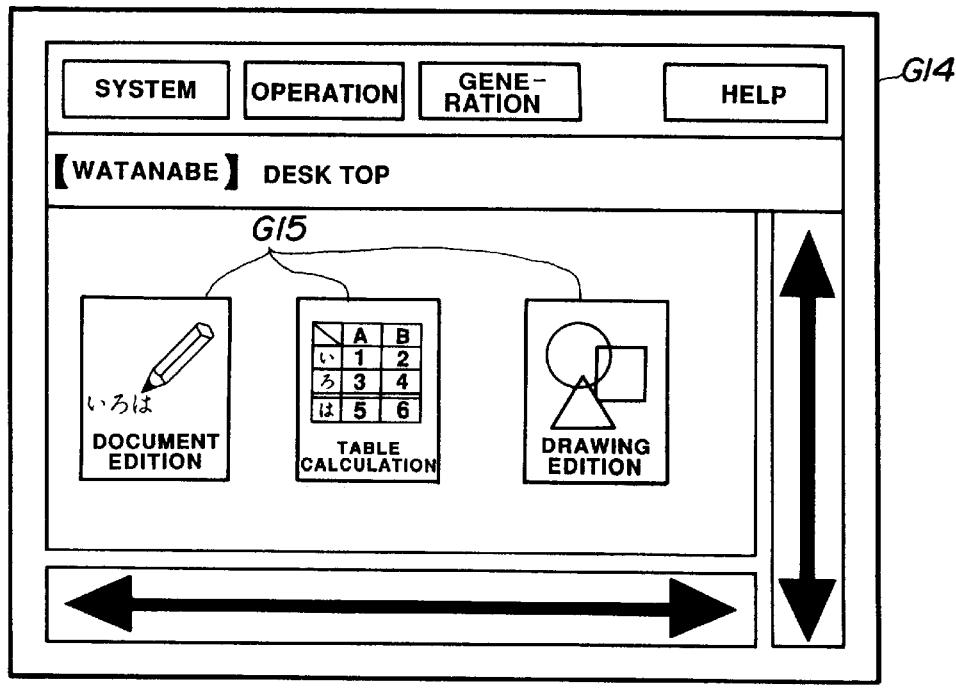
FIG. 4 is a diagram showing an example of display of a desktop window.

FIG. 4 illustrates desktop window G14 in a state in which desktop G02 is opened. A description will be provided of operational objects within desktop window G14 with reference to FIG. 4.

Application 26 indicated by application object G15 is an object for operating (starting) an application program. The operation of application object G15 will be described later.

Figure 5:
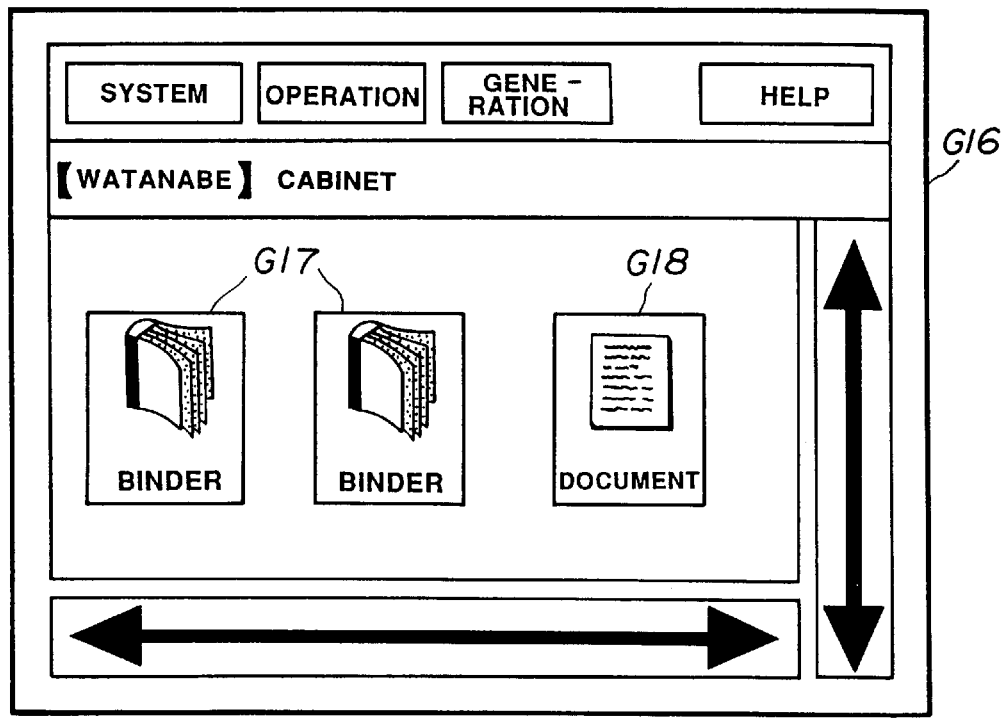
FIG. 5 is a diagram showing an example of display of a cabinet window.

FIG. 5 illustrates cabinet window G16 in a state in which cabinet object G03 is opened. A description will be provided of operational objects within cabinet window G16 with reference to FIG. 5.

Binder 20 indicated by binder object G17 is an object indicating a node under cabinet 16 which controls data in the hierarchical structure. Binder 20 can be arbitrarily formed under cabinet 16 or binder 20. By performing an opening operation of binder object G17, a window including binders 20 and data 18 within the corresponding binder 20 is displayed.

Data 18 indicated by data object G18 is an object which represents data 18 formed by application 26, and is used for operating data 18 or starting an application program for processing the data 18. The operation of data object G18 as well as objects within binder 20 will be described later.

Figure 6:
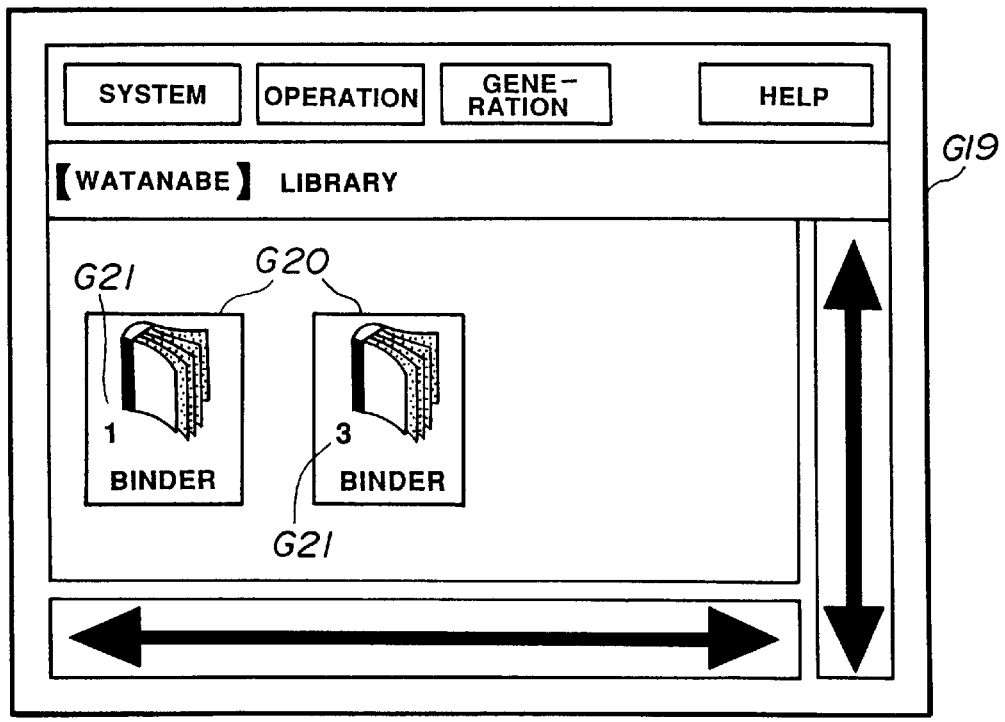
FIG. 6 is a diagram showing an example of display of a library window.

FIG. 6 illustrates library window G19 in a state in which library object G04 is opened. A description will be provided of operational objects within library window G19 with reference to FIG. 6.

Library binder 27 indicated by library-binder object G20 is an object for storing the entire library data 28 of the same kind controlled as libraries (to be described later). G21 represents the current frequency of reference of library data 28 under library binder 27 by the application program. By performing an opening operation of library-binder object G20, a window including data 28 within the opened library binder 27 is displayed.

Figure 7:
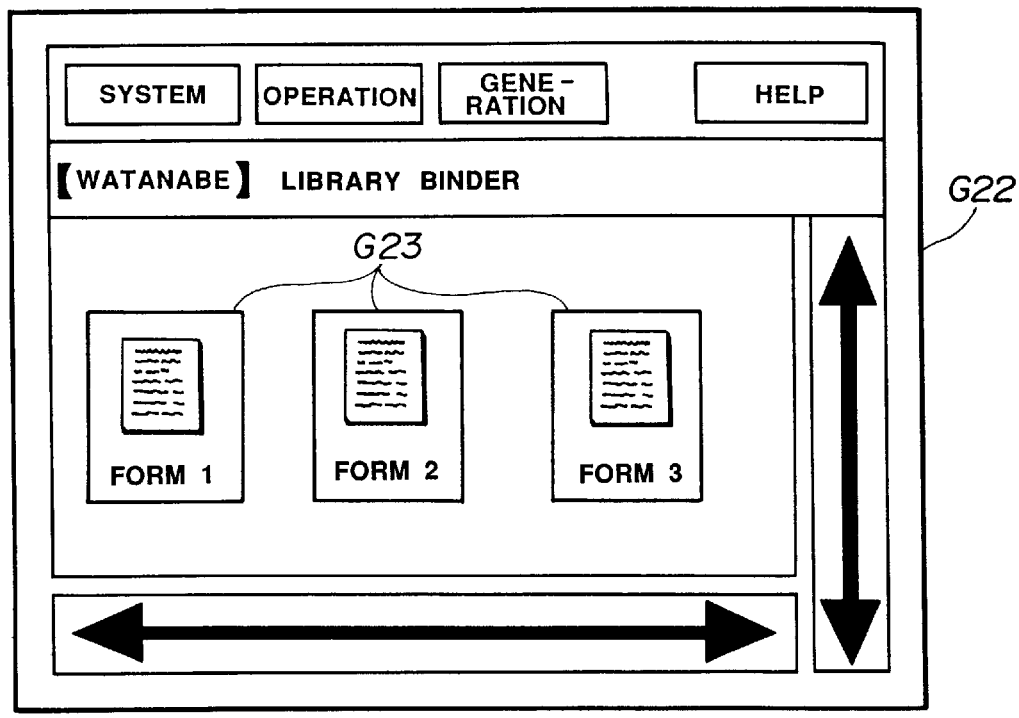
FIG. 7 is a diagram showing an example of display of a library-binder window.

FIG. 7 illustrates library-binder window G22 in a state in which library binder object G20 is opened. A description will be provided of operational objects within library binder window G22 with reference to FIG. 7.

Library data 28 indicated by library data object G23 is an object indicating data controlled as the above-described library among data 18 formed by the application. Library data 28 having the same data form are stored in the same library binder 27.

Figure 8:
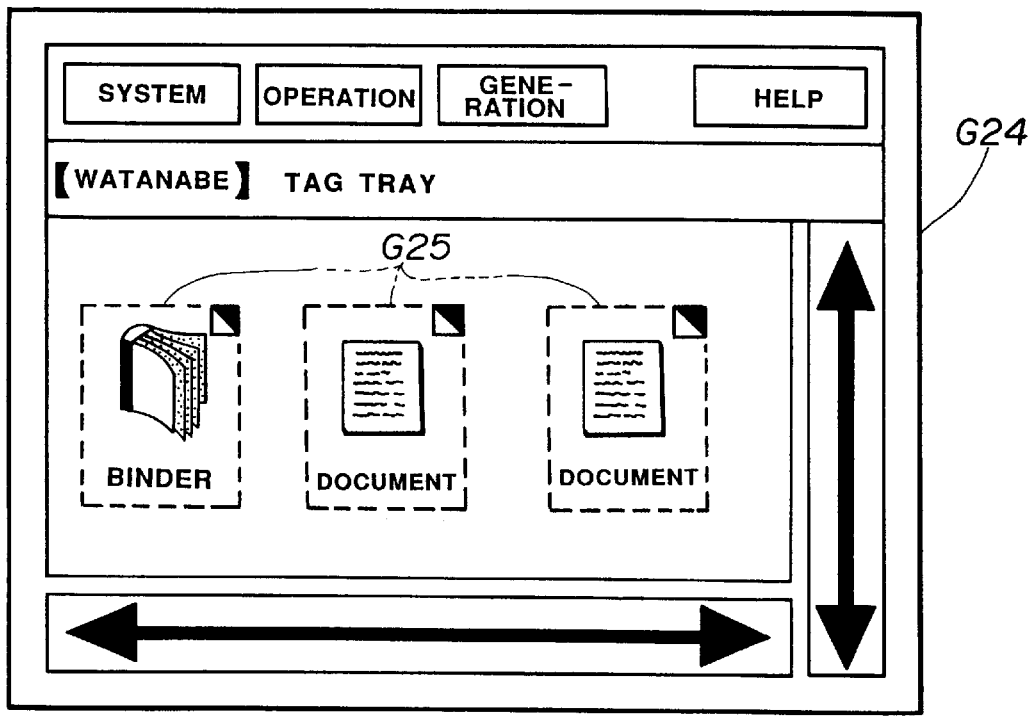
FIG. 8 is a diagram showing an example of display of a tag-tray window.

FIG. 8 illustrates tag-tray window G24 in a state in which tag-tray object G05 is opened. A description will be provided of operational objects within tag-tray window G24 with reference to FIG. 8.

Tag 21 indicated by tag object G25 is an object which is virtually displayed in order to access an object, comprising binder 20 or data 18, within the cabinet without following the hierarchical structure of the cabinet. For tag 21, the same operation as for the object, comprising binder 20 or data 18, indicated by the tag 21 can be performed.

Figure 9:
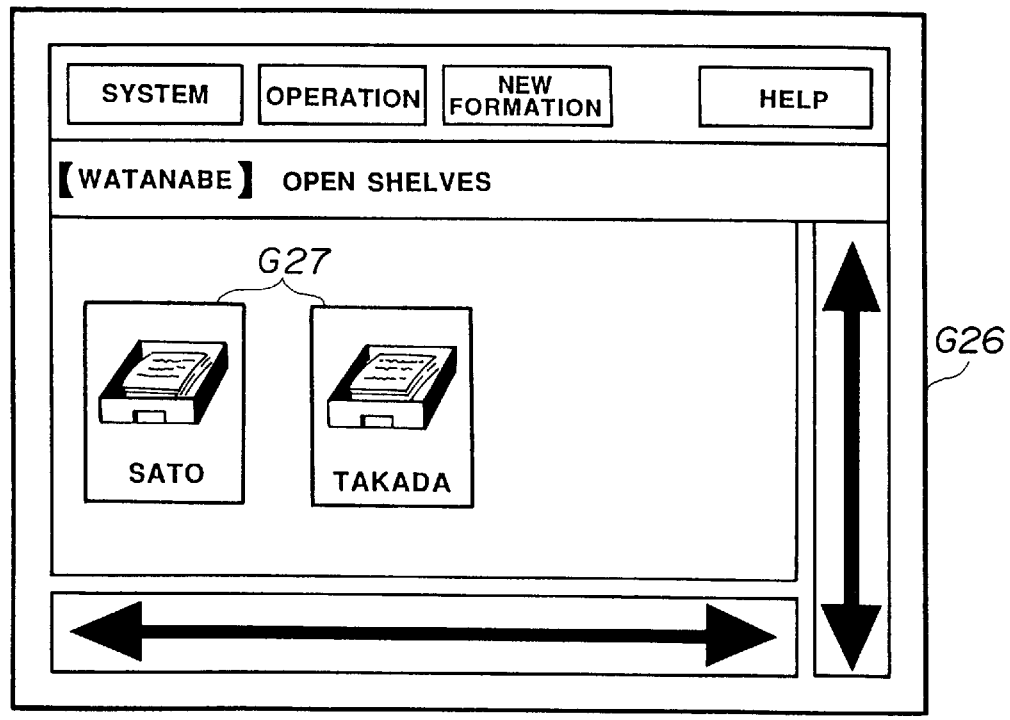
FIG. 9 is a diagram showing an example of display of an open-shelf window.

FIG. 9 illustrates open-shelf window G26 in a state in which open-shelf object G06 is opened. A description will be provided of operational objects within open-shelf window G26 with reference to FIG. 9.

Open tray 29 indicated by open-tray object G27 is an object which is formed for another user or for a set of other users (hereinafter termed a user group) for which data are to be disclosed when the user performs a disclosure operation. By an opening operation of open-tray object G27, a window including open objects 30 is displayed.

Figure 10:
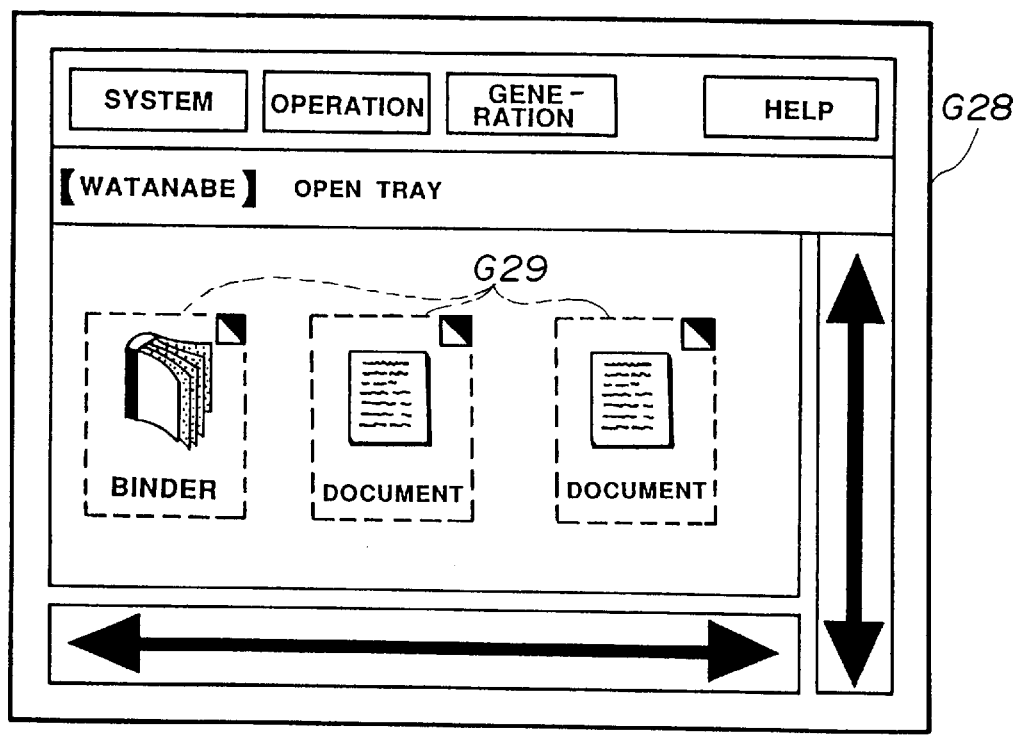
FIG. 10 is a diagram showing an example of display of an open-tray window.

FIG. 10 illustrates open-tray window G28 in a state in which open-tray object G27 is opened. A description will be provided of operational objects within open-tray window G28 with reference to FIG. 10. Open object G29 virtually displays an object, comprising cabinet 16, binder 20 or data 18, of the user for whom a disclosure operation has been performed. Users or user groups to whom the open object G29 is to be disclosed are determined by the attribute of open tray 29 in which the open object G29 is present.

Figure 61:
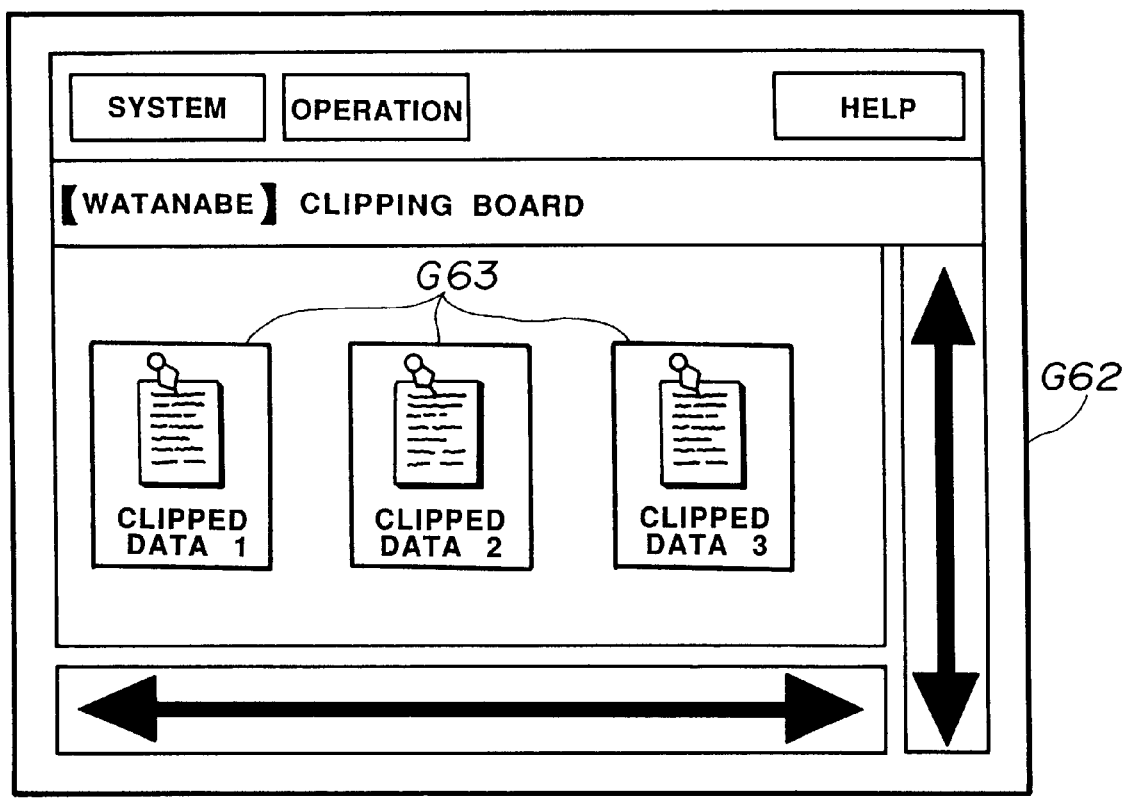
FIG. 61 is a diagram showing an example of display of a clipping-board window.

FIG. 61 illustrates clipping-board window G62 in a state in which clipping-board object G28 is opened. Clipping-board window G62 includes clipped-data objects G63, serving as operational objects indicating clipped data 32. Clipped data 32 is data comprising data 18 formed by application 26 or a part thereof and its format ID. Clipped data 32 generated by application 26 is stored in clipping board 24 within room 13 of the user, and is displayed as Clipped-data object G63 within clipping-board window G62. The operation of clipping board 24 will be described later.

Figure 11:
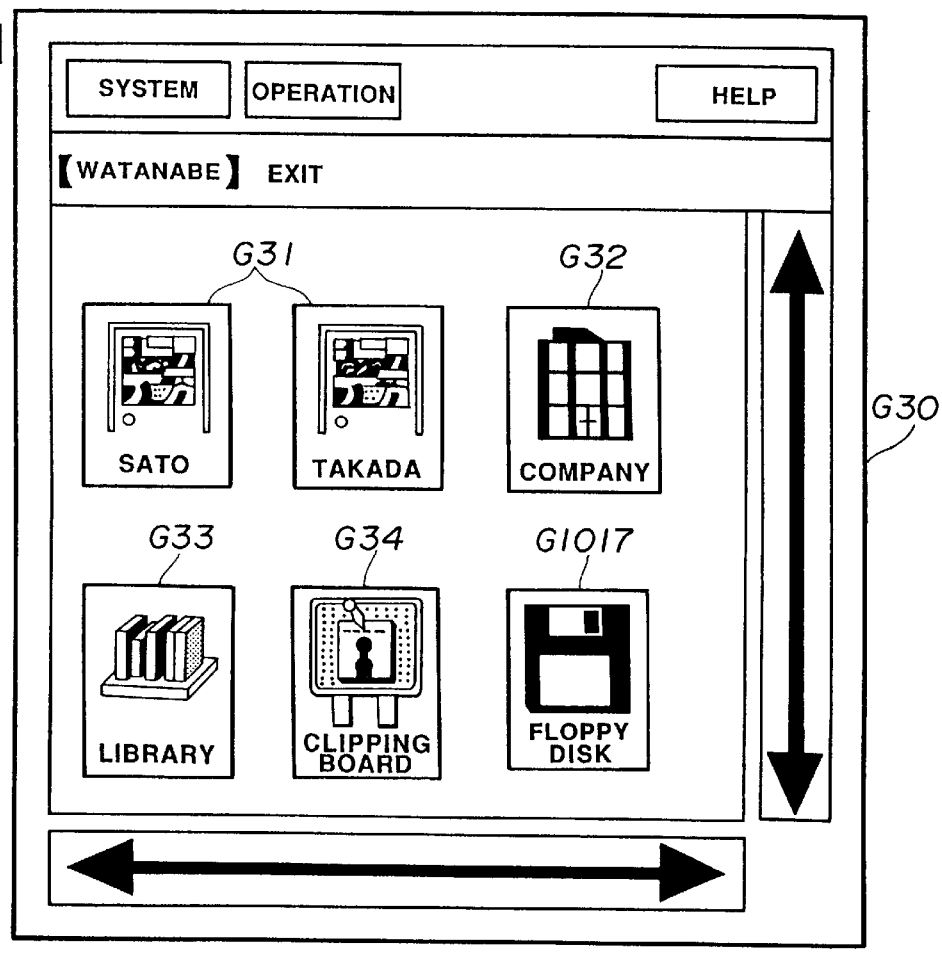
FIG. 11 is a diagram showing an example of display of an exit window.
Figure 12:
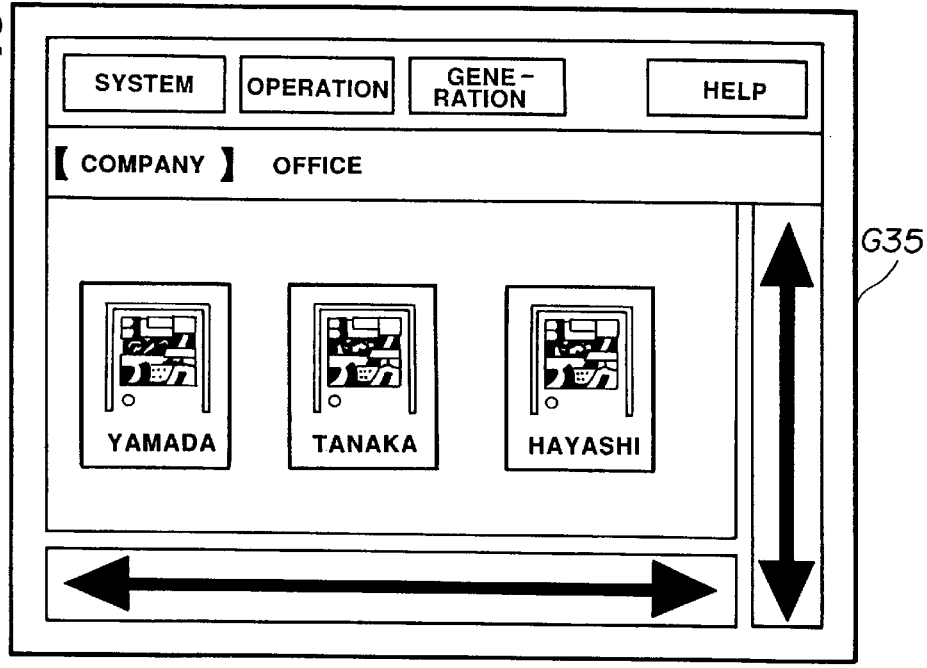
FIG. 12 is a diagram showing an example of display of exits included in an office.

FIG. 11 illustrates exit window G30 in a state in which exit object G09 is opened. A description will be provided of operational objects within exit window G30 with reference to FIG. 11. Door object G31 is an object representing an entrance to other user's room present in the office to which the user belongs. The user's name is displayed in door object G31 indicating door 31. By performing an opening operation of door object G31, the window of room 13 of the user indicated by the door 31 is displayed, and objects indicating cabinets 16, binders 20 and data 18 subjected to a disclosure operation of the user of the room 13 for a user or a user group including the user are displayed. By operating the opened object, the user can access data of the user for whom the disclosure operation has been performed.

Figure 89:
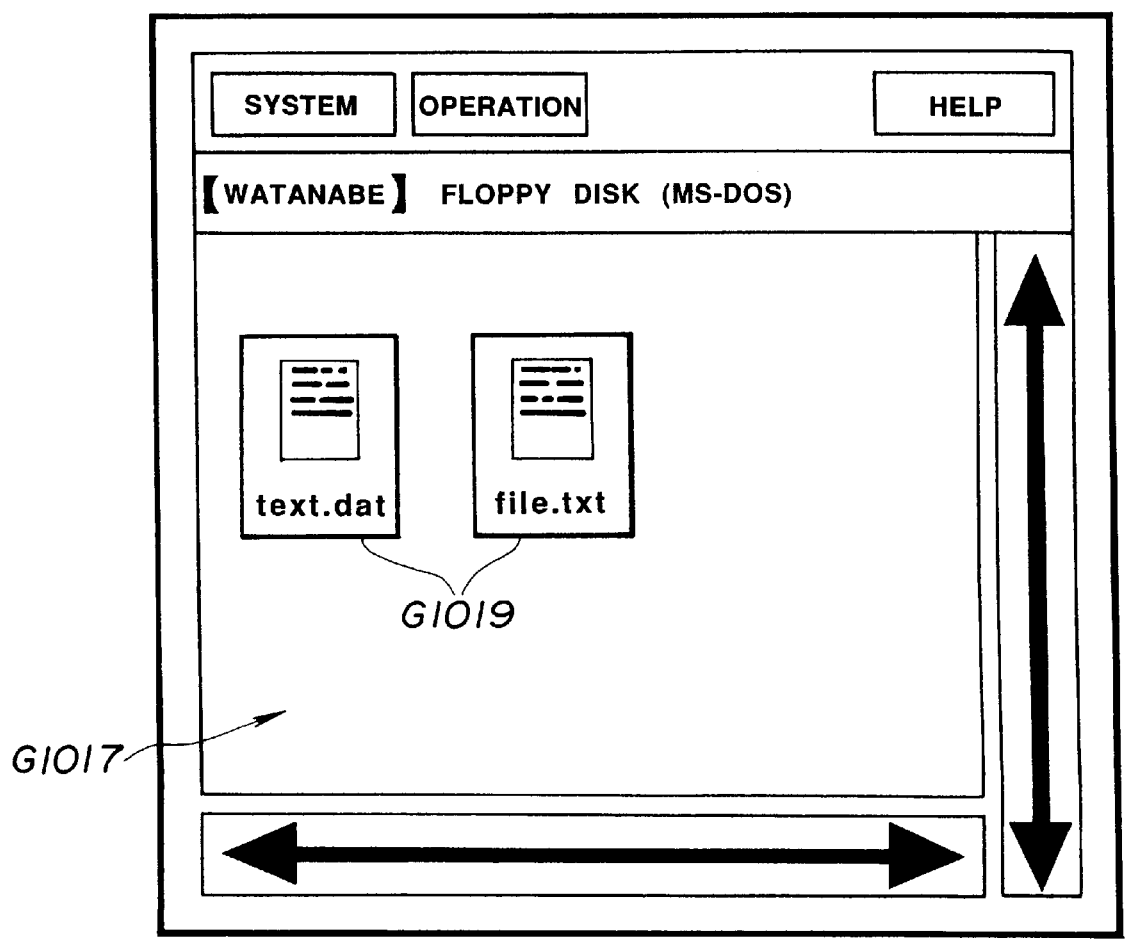
FIG. 89 is a diagram illustrating a picture frame indicating the floppy disk within the exit shown in FIG. 11.

Office object G32 is an object which represents an entrance to another office. The office name is displayed on office object G32. By performing an opening operation of office object G32, door-31 objects representing entries to rooms included in that office are displayed. The operation for door 31 is the same as in the above-described operation for door 31. Library object G33 indicates a library controlled by the office to which the user belongs. The operation and the contents of this library are the same as those described with reference to FIG. 6. Clipping-board object G34 indicates a cipping board controlled by the office to which the user belongs. The operation and the contents of this clipping board are the same as those described with reference to FIG. 61. Floppy disk G1017 shown in FIG. 11 is an object which controls a floppy disk. As shown in FIG. 89, by an opening operation of this floppy disk G1017, objects G1019 included in the floppy disk G1017 are displayed.

Information for the Desktop Control System

A description will now be provided of control information required for operating the desktop control system.

Figures 13, 14:
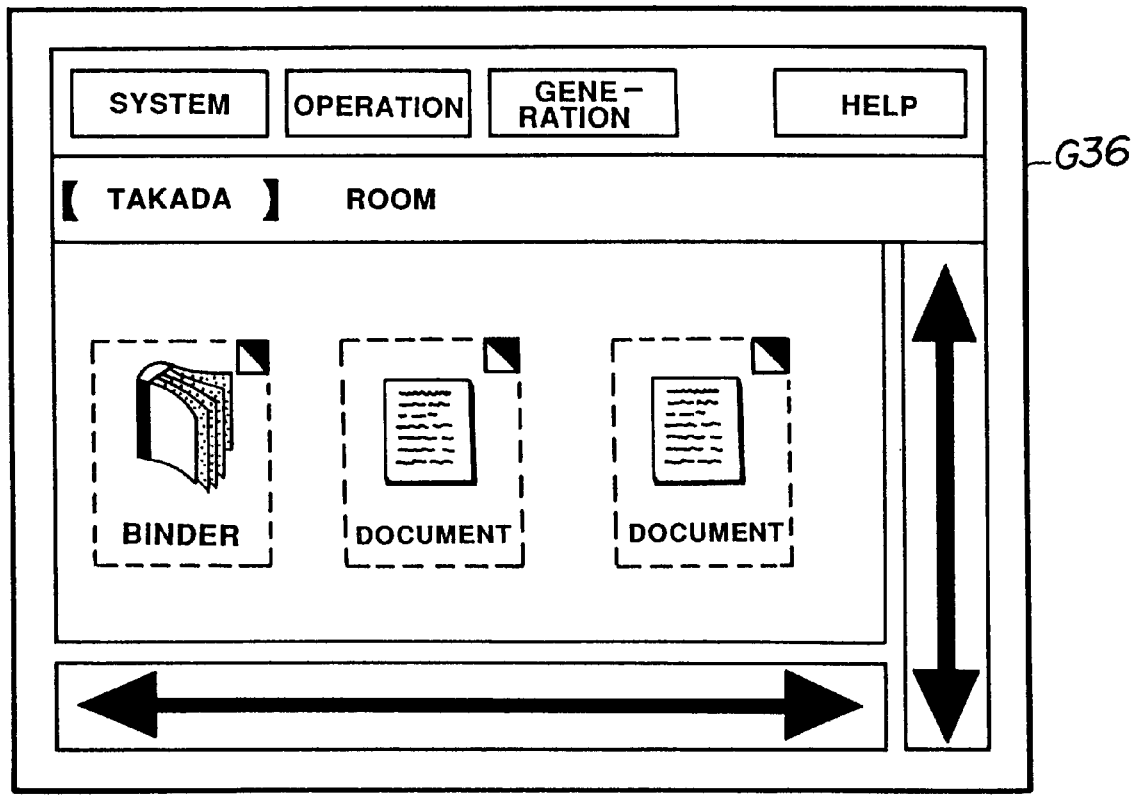
FIG. 13 is a diagram showing an example of display of exits included in a room.
FIG. 14 is a diagram showing an example of data information.

FIG. 14 is a diagram illustrating the table of data information 50. Data information 50 is information for registering and controlling the form and the kind of data 18 formed by application program 26 controlled by desktop 15, and includes the following items for each data form. Data-format ID 51 is a number peculiar to each data format. Extender 52 comprises characters provided at the end of the file name when the file of data 18 of that data format is formed. Icon-file name 53 is the name of the file where the icon used when displaying data 18 within binder 20 is stored. Library ID 54 (to be described later) is the ID of library data when data of the data format can be controlled as the library data. It is possible to register a plurality of library ID's.

FIG. 15 is a diagram illustrating the table of application information 60. Application information 60 is information on application 26 controlled by desktop 15. According to this information, an object of application 26 is displayed within the window of desktop 15 (to be described later). The following information is included for every registered application 26. Application ID 61 is a peculiar number provided for each application program. Execution-module name 62 is the name of a program used when executing application 26. Application name 63 is displayed as the name of the object of application 26. Icon-file name 64 is the name of the file in which data of the icon used when performing icon display of application 26 is stored. Processing list 65 shows the correspondence among the format ID 51 indicating the data format of data 18 which the application program can process, the processing code, and the name for displaying the processing. Reference numeral 66 represents the leading entry of processing list 65 for each format ID 51. This represents default processing of application 26, and shows processing when application 26 is started without assigning data 18 to be processed. Leading entry 66 comprises format ID 51 and its processing list. Column 67 indicates whether or not data 18 to be processed is necessary for performing processing shown in the processing list. Mark "o" indicates that the corresponding data is necessary, mark "x" indicates that the corresponding data is unnecessary, and a blank indicates that the corresponding data may be provided or may not be provided.

FIG. 16 is a diagram illustrating the table of library information 70. Library information 70 is information on library data 28 controlled by the desktop control system. According to this information, library binders 27 are displayed within the window of library 17 (to be described later). The following information is included for each registered library binder 27. Library ID 71 is a peculiar number provided for each library binder 27. Library-binder name 72 indicates the location (directory) of library binder 27 within the file system of the hierarchical structure in which library data 28 is preserved. Reference numeral 73 represents the name of a library comprising a set of data of the same data form. Reference numeral 74 represents the current frequency of data disclosure for library data 28 under library binder 27.

FIG. 17 is a diagram illustrating the table of user information 80. User information 80 is information for controlling users of a system in which the desktop control system operates. The following information is included for each user. User ID 81 is a peculiar number provided for each user. Reference numeral 82 represents arbitrary information on the user, such as the user's name or the like. Reference numeral 83 represents the location (directory) of room 13 of the user. Reference numeral 84 represents an updating mode of library data 28 within room 13 of the user. The library updating mode will be described later.

FIG. 18 is a diagram illustrating the table of office information 90. Office information 90 is information for controlling office 14 in which another desktop control system connected by a network or the like operates. The following information is included for each office 14. Office ID 91 is a peculiar number provided for each office 14. Reference numeral 92 represents the host name of a location where office 14 is present. Office name 93 represents the name of office 14 present within each host location. Domain 94 represents a domain of the host location to which office 14 belongs. Reference numeral 95 represents an updating mode of library data 28 within the office. The term "domain" indicates a set of computers having the same architecture. Data formed by an application program can be transferred between desktop control systems operated by computers which belong to the same domain without performing any particular conversion processing.

FIG. 19 is a diagram illustrating the table of group information 100. Group information 100 is information for controlling a group, comprising a plurality of users, in order to indicate the range of users for limiting reference and updating of data 18. The following information is included for each group. Group ID 101 is a peculiar number provided for each group. Reference numeral 102 represents the user ID of a user who belongs to each group.

Information for Cabinet Control

FIG. 20 is a diagram illustrating the table of object control information 110. Object control information 110 is a file for controlling information of respective objects included within binder 20, and is present for each cabinet 16 (including library 17 and refuse bin 23) and each binder 20 under cabinet 16. Object control information 110 is present for each office 14 in order to control library data 28 of office 14. Data control information 110 includes the following items for each data. Reference numeral 111 represents the kind of an object (binder 20, data 18, open shelves 22, open tray 29, tag tray 19, tag 21, library binder 27 and library data 28). Reference numeral 112 represents the file name or the directory name, serving as the contents of the object. Reference numeral 113 represents the format ID of data when the object comprises the data or library data, or the library ID of a library binder when the object comprises the library binder within library 17. Reference numeral 114 represents the application ID of application 26 which has formed data when the object comprises the data. Such an application ID is particularly termed a creater ID. Reference numeral 115 represents the name of the object in Japanese. Reference numeral 116 represents the size of data in units of a byte when the object comprises the data. When the data comprise a plurality of files (fragments (to be described later)), size 116 represents the size of the total files. Date of registration 117 represents the date when the object has been newly formed. Date of updating 118 represents the date of the final updating operation of the object. Reference numeral 119 represents the date of the last reference of the object.

Reference numeral 120 represents the user ID of the owner of the object. Reference numeral 121 represents the group ID of the owner of the object. Reference numeral 122 represents the user ID of the last user who has referred to the object. Reference numeral 123 represents the user ID of the last user who has updated the object. Access level 124 is set with classifying the party for which reference and updating for the object can be permitted or cannot be permitted into three kinds, i.e., the owner of the data having user ID 120, the user of group 121 to which the owner of the data belongs, and other user.

Reference numeral 125 represents the domain of office 14 in which data has been formed/updated when the object comprises the data. Reference numeral 126 represents the user ID of a user for whom open tray 29 is to be opened when the object comprises the open tray 29 to be opened to other users. Reference numeral 127 represents the group ID of a group for whom open tray 29 is to be opened when the object comprises the open tray 29 to be opened to other groups. Reference numeral 128 represents limitation of open copying operation of the object for a user for whom open object 30 is to be opened when the object comprises open object 30. Reference numeral 129 represents the deadline of disclosure within which the disclosure operation of open object 30 is effective when the object comprises open object 30. Reference numeral 130 represents the deadline of data disposal at which data must be automatically disposed in refuse bin 23 when the object comprises the data present within refuse bin 23. Reference numeral 131 represents the location where the operational object indicated by tag 21 is present when the object comprises tag 21.

FIG. 21 is a diagram illustrating the table of open-object control information 140. Open-object control information 140 is information for controlling the state of the currently opened binders 20 and data 18 within room 13 of each user, and is present for each room 13.

Open-object control information 140 includes the following items for each object. Reference numeral 141 is the file name of the object. Reference numeral 142 is the user ID of the user who has opened the object. Reference numeral 143 represents a flag which indicates whether the object is opened in the state of "reference" or "updating" of access level 124. Reference numeral 144 represents the date when the object has been opened.

FIG. 22 is a diagram illustrating library retrieval order information 150. Library retrieval order information 150 is information relating to the order of library 17 when retrieving library data 28 and is present in each room 13.

Control of Floppy Disks

FIG. 90 illustrates floppy-disk control information. The floppy-disk control information is included within the floppy-disk registration file, and comprises the following information 1101–1103 for each floppy disk. Reference numeral 1101 represents the name of a floppy disk. For example, name 1104 indicates floppy-disk information relating to the MS-DOS of the Microsoft Company, and name 1105 indicates floppy-disk information of a word processor.

Method of detection 1102 indicates, for example, the name of a process or a function for determining the corresponding floppy disk. Data converter 1103 indicates, for example, the name of a process or a function for converting the data form of the corresponding floppy disk into the data form under cabinet 16, or vice versa. To which direction conversion must be performed is provided by a parameter.

FIG. 91 illustrates data control information of a floppy disk, and comprises the following information 1106–1112 for binder 20 of each floppy disk. File type 1106 indicates the kind of data, and file name 1107 indicates the contents of the data. As in data control information 110 shown in FIG. 20, reference numeral 1108 represents the name of the data in Japanese, and reference numeral 1109 represents the size of the data in units of a byte.

Date of registration 1110 is the date when the data has been newly formed, and date of updating 1111 is the date of the last updating operation of the data. In access level 1112, whether or not reference to data and an updating operation of data are permitted is indicated for the user ID 81 and the group ID of the owner of the data, and other users.

Opening Operation of a Binder

Figure 23:
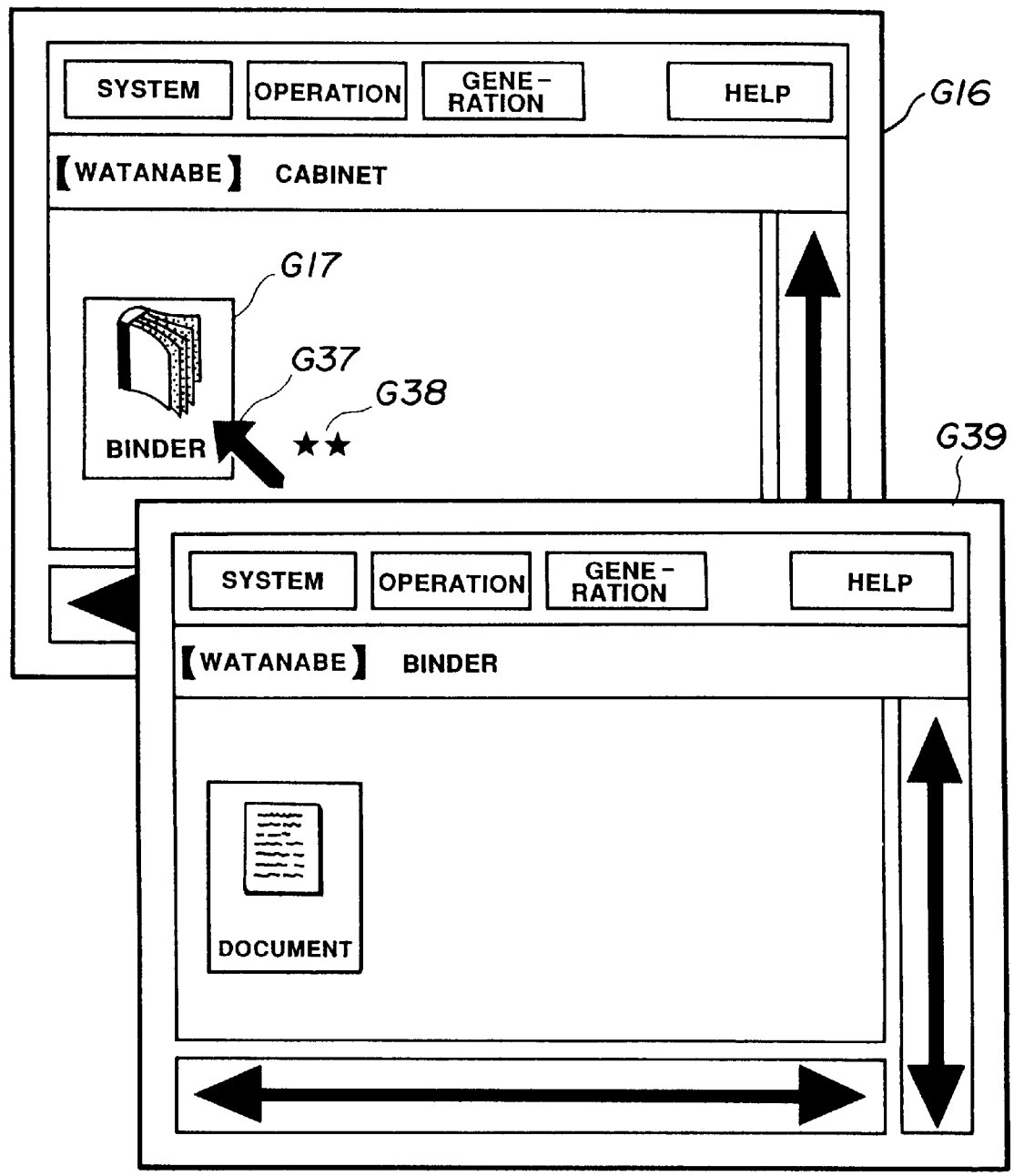
FIG. 23 is a diagram showing an example of the operation of opening a binder within a cabinet.

FIG. 23 is a diagram showing the operation of opening binder 20 within cabinet 16. In FIG. 23, G37 represents a cursor indicating the position of pointing device 5 on the picture frame, and G38 represents a mark indicating the button operation of pointing device 5 for explaining the operation. Mark "★" represents a 1-click operation of the button, mark "★★" represents a two-click operation of the button, mark "☆" represents depression of the button, and mark "☆☆" represents release of the button. These marks are used throughout the description of the operation. In an opening operation of binder 20, cursor G37 is moved to the icon of binder object G17 within cabinet window G16, and the button is subjected to a two-click operation, whereby binder window G39 displaying the contents of binder 20 appears. This opening operation is common for all operational objects.

Figure 24:
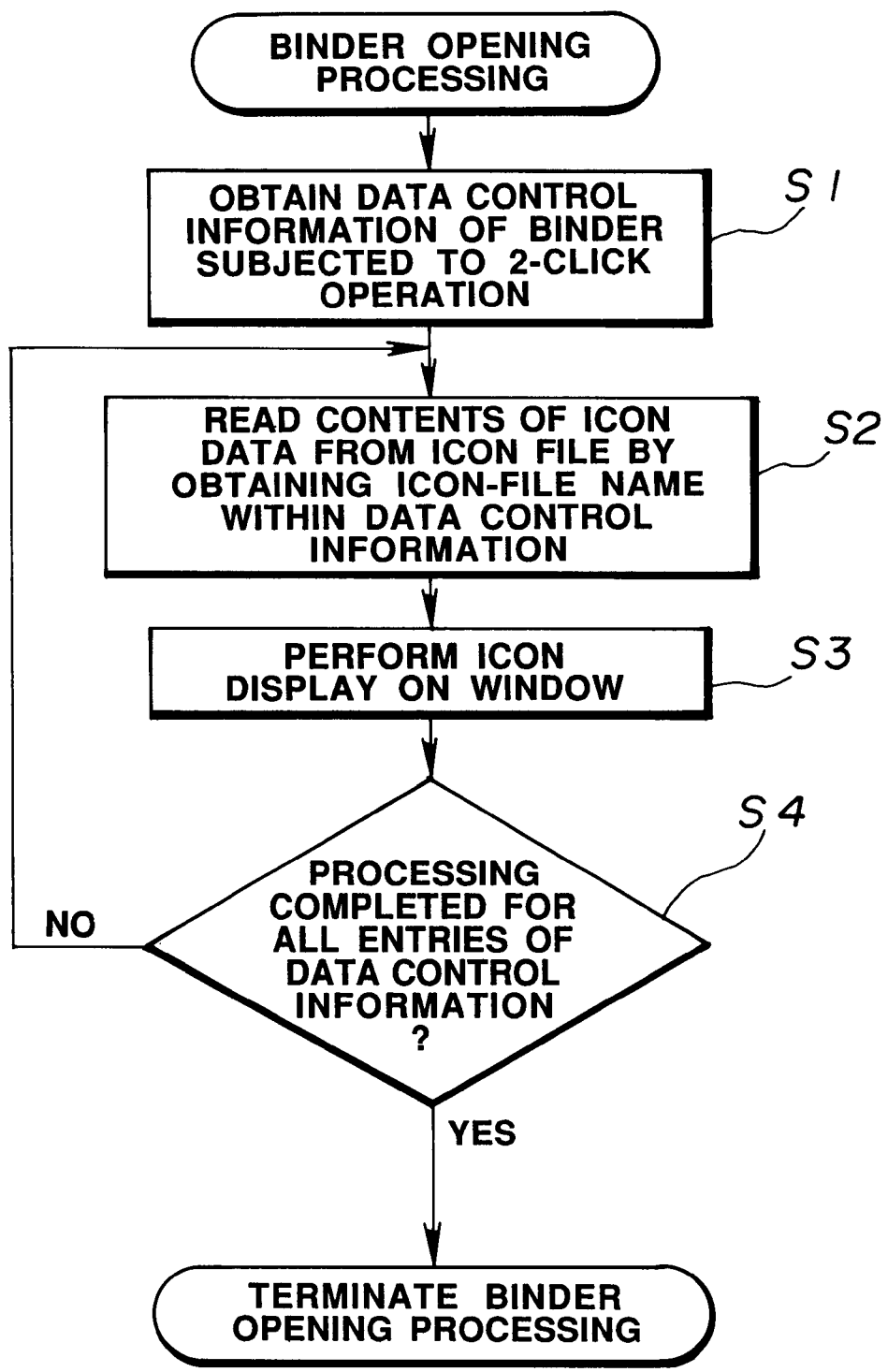
FIG. 24 is a flowchart of the processing of opening a binder.

The processing for opening binder 20 will be described with reference to the flowchart of FIG. 24. In step S1, object control information 110 of binder 20 indicated by binder object G17 subjected to a two-click operation is obtained. In step S2, the corresponding icon file is read using file format ID 113 within the obtained object control information 110 and data information 50. In step S3, icon display is performed on the generated binder window G39. In step S4, the above-described processing is performed for all entries of object control information 110, and the process is terminated. This processing is common for cabinet 16, open shelves 22, tag tray 19 and library binder 27. Processing of opening desktop 15, exit 25 and library 17 will be described later.

Copying Operation of Data

Figure 25:
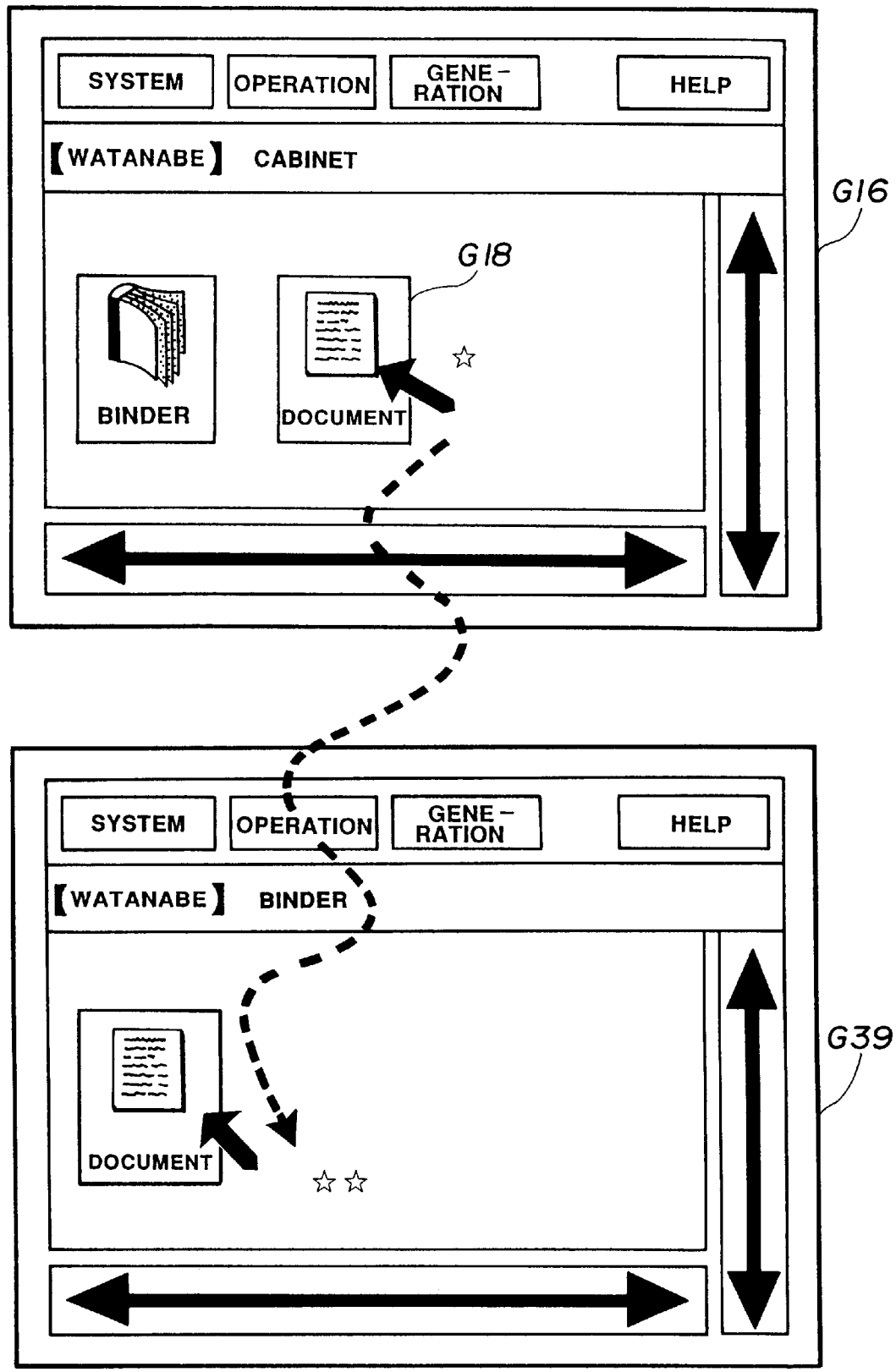
FIG. 25 is a diagram showing an example of the operation of copying data between a cabinet and a binder.

FIG. 25 is a diagram illustrating the operation of copying data 18 between cabinets 16 or binders 20. In a copying operation of data 18, cursor G37 is first moved to the icon of data object G18 of the desired copy source, and is then moved to cabinet window G16 or binder window G39 of the desired copy receiver while depressing the button. The copying operation is completed by releasing the button (a dragging/dropping operation).

Figure 26:
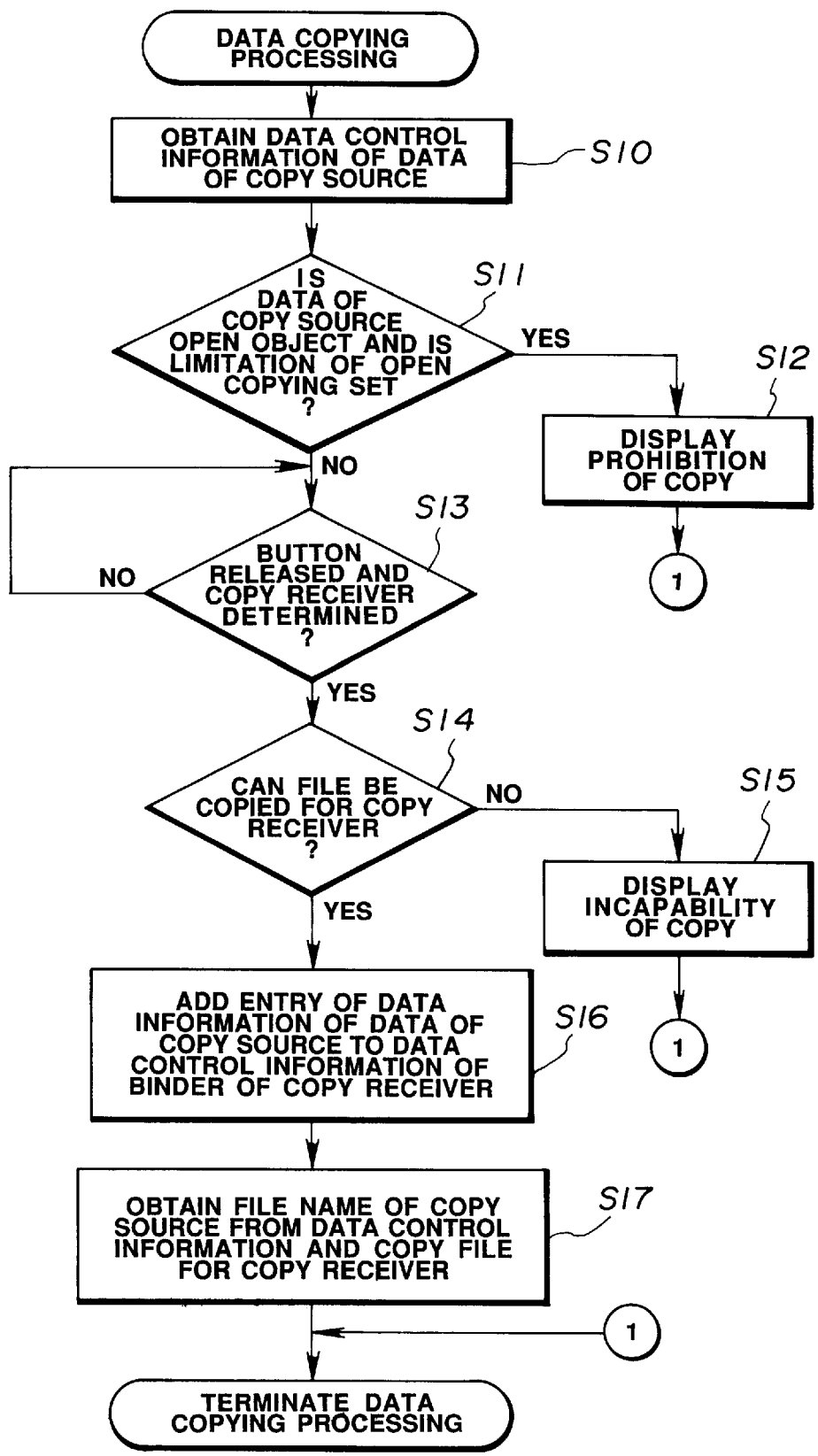
FIG. 26 is a flowchart of data copying processing between a cabinet and a binder.

The method of copying data 18 in the cabinet will be described with reference to the flowchart of FIG. 26. In step S10, object control information 110 of data 18 is obtained from binder 20 where data 18 of the copy source is present, when the icon of the copy source is depressed. If, in step S11, the obtained object control information 110 indicates that data 18 of the copy source is open object 30 and limitation of open copy 128 is set, a display indicating that a copying operation is prohibited is performed in step S12, and the process is interrupted. After the button has been released at the copy receiver in step S13, in step S14, it is checked whether or not the file can be copied, taking into consideration the capacity of the disk and the like. If the result of the check is negative, error display is performed in step S15, and the process is interrupted. In step S16, the entry of the previously obtained object control information 110 is added to object control information 110 of binder 20 of the copy receiver. In step S17, the file corresponding to the contents of data 18 is copied, and the process is terminated.

Opening Operation of a Floppy Disk

Figure 92:
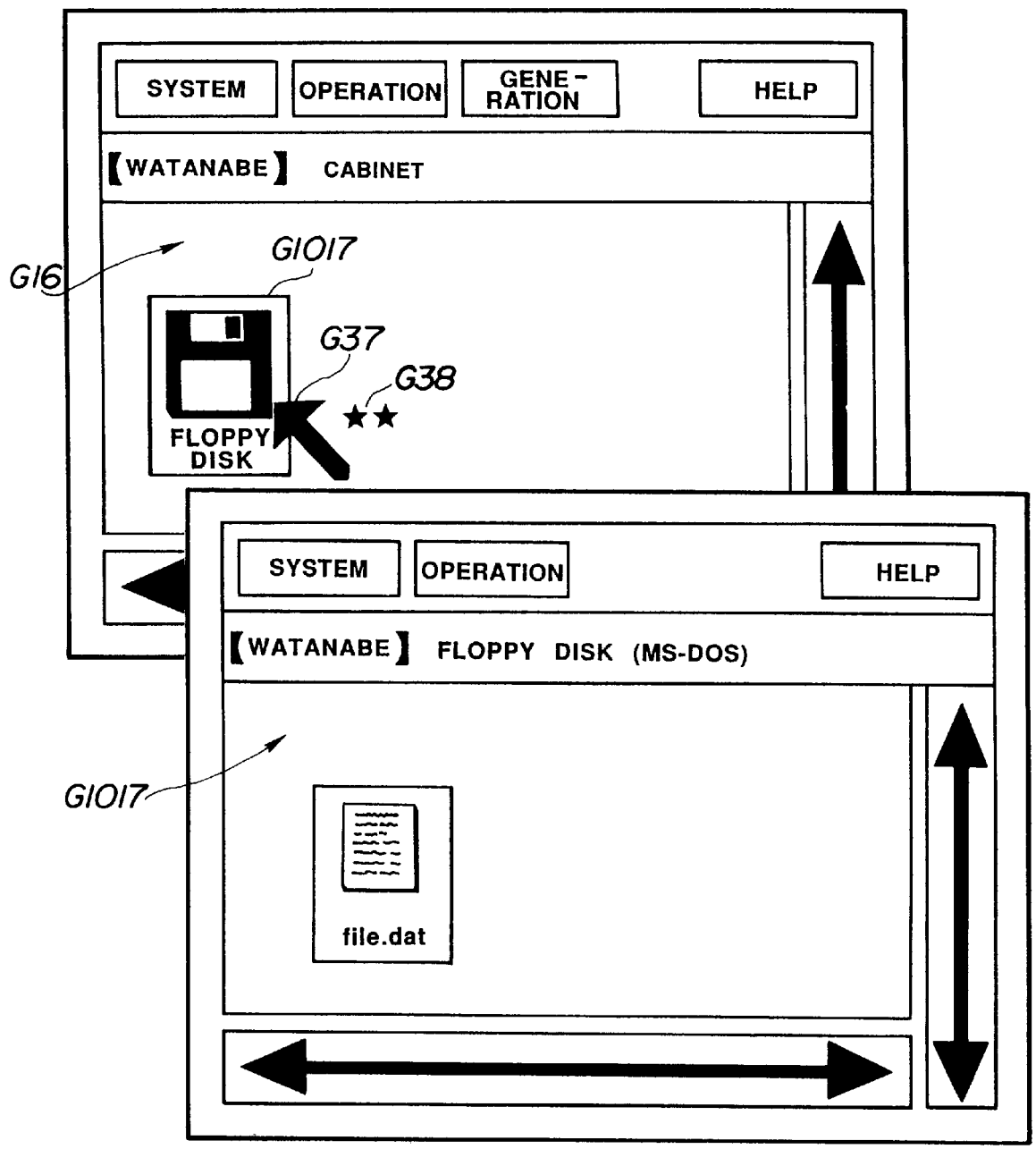
FIG. 92 is a diagram illustrating an operational picture frame when opening a floppy disk.
Figure 93:
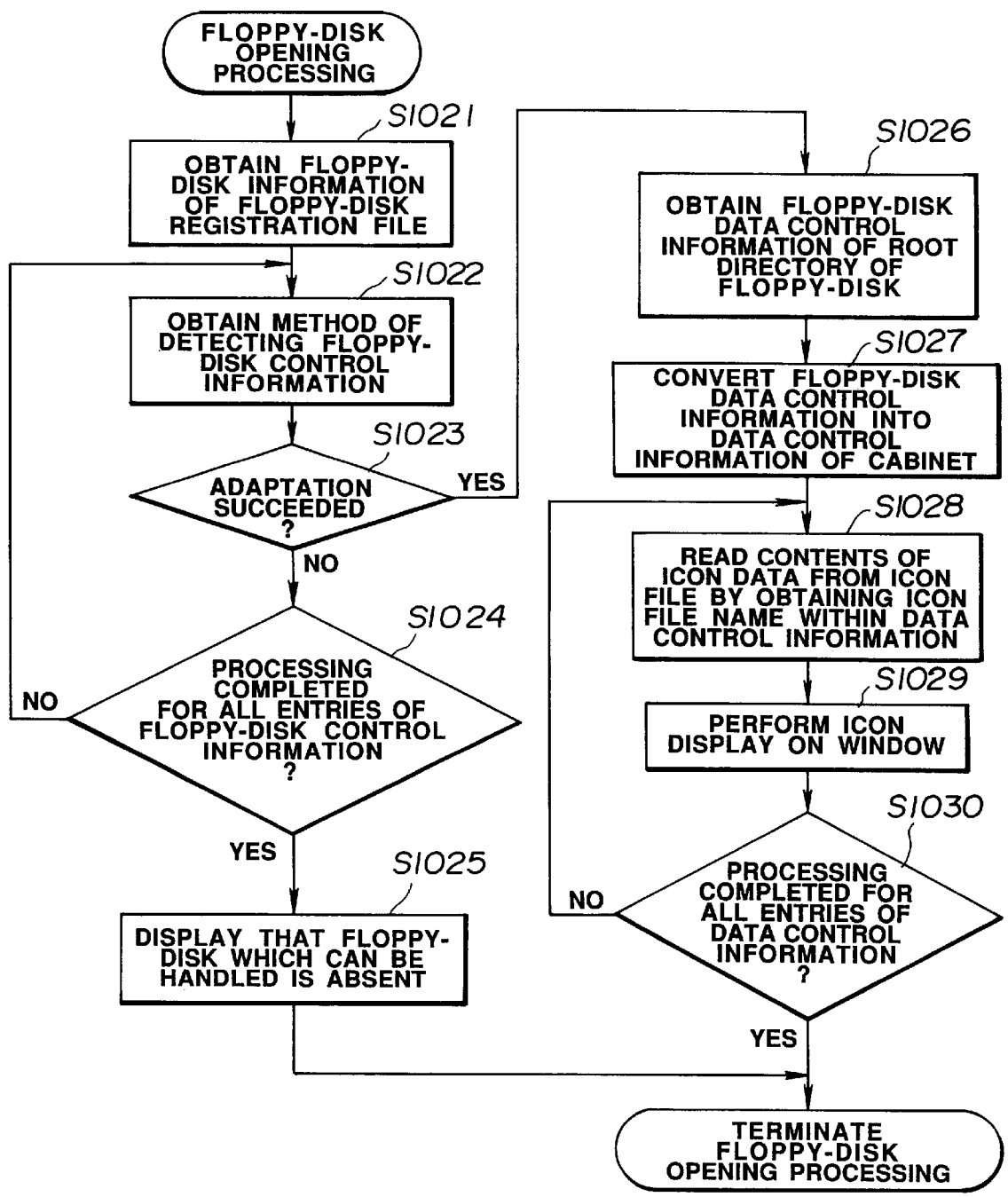
FIG. 93 is a flowchart illustrating opening processing on the operational picture frame shown in FIG. 92.

FIG. 92 illustrates an operational picture frame for opening floppy disk G1017 within cabinet 16. This is substantially the same as the above-described operational picture frame for opening binder 20 within cabinet 16 (shown in FIG. 23). FIG. 93 illustrates the process of opening floppy disk G1017. In step S1021, the registration file of floppy disk G1017 subjected to a 2-click operation of the button is read to obtain floppy-disk control information as shown in FIG. 90. In step S1022, one detection method 1102 of floppy-disk control information is obtained.

If the adaptation of this detection method 1102 to the data form of the floppy disk within FDD 10 has succeeded in step S1023, the process proceeds to step S1026. If the adaptation has not succeeded, the process proceeds to step S1024. In steps S1022 through S1024, each detection method 1102 is checked for all entries of the floppy-disk control information. If the adaptation has not succeeded for all detection methods 1102, a display indicating that a floppy disk which can be handled is absent is performed (step S1025), and the opening processing is terminated.

In step S1026, data control information of the root directory of floppy disk G1017 (see FIG. 91) is obtained. In the next step S1027, this data control information is converted into data control information 110 of cabinet 16 as shown in FIG. 20. In step S1028, the corresponding icon file is read using the format ID 51 of the obtained data control information 110 and data information 50. In step S1029, a window is formed and icon display is performed. This processing is performed for all entries of data control information 110 in the loop of steps S1028–S1030, and the process is terminated. The processing of opening binder 20 of floppy disk G1017 is the same as the processing in steps S1026–S1030.

Copying Operation of a Floppy Disk

Figure 94:
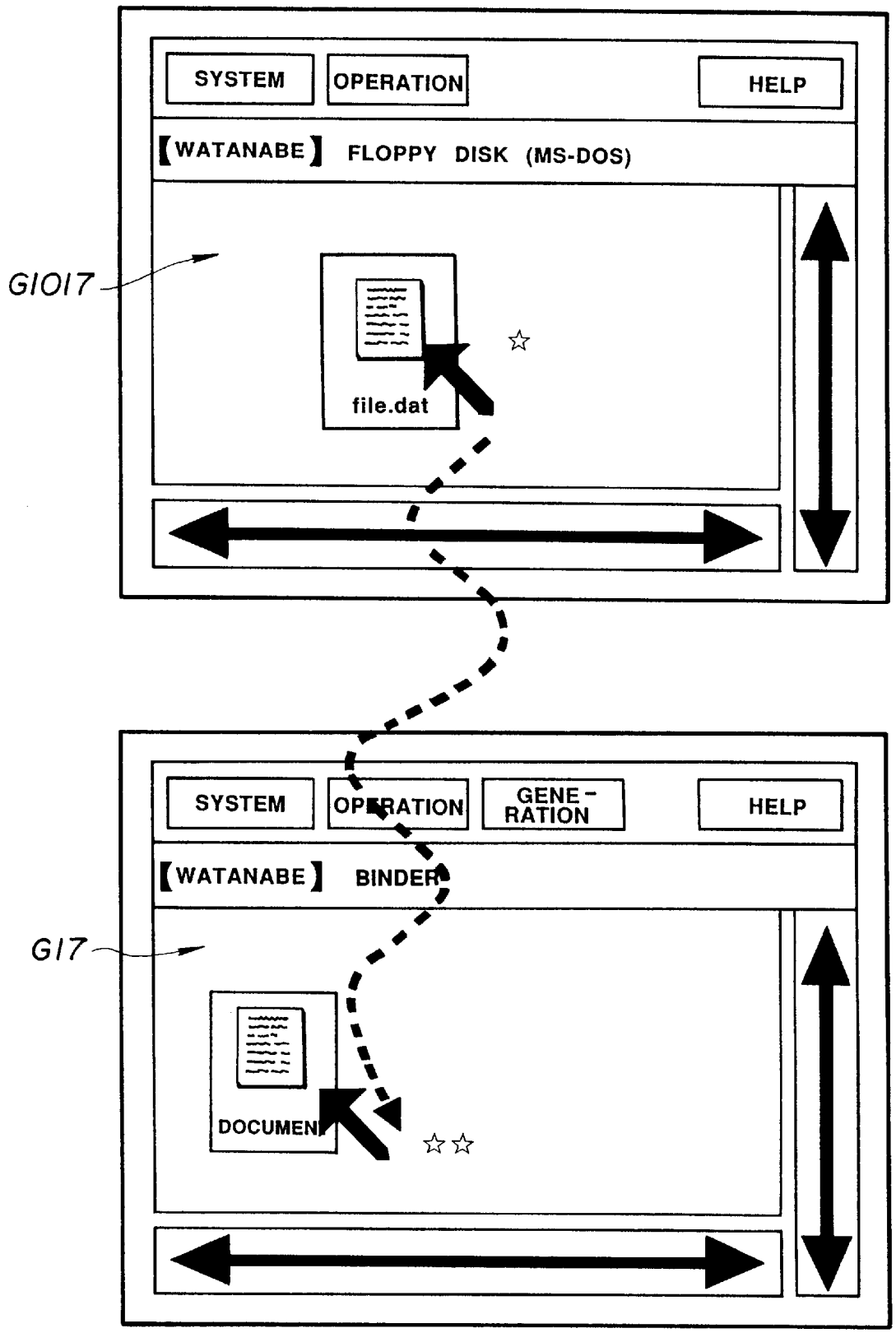
FIG. 94 is a diagram illustrating an operational picture frame when copying data on a floppy disk to a binder.
Figure 95:
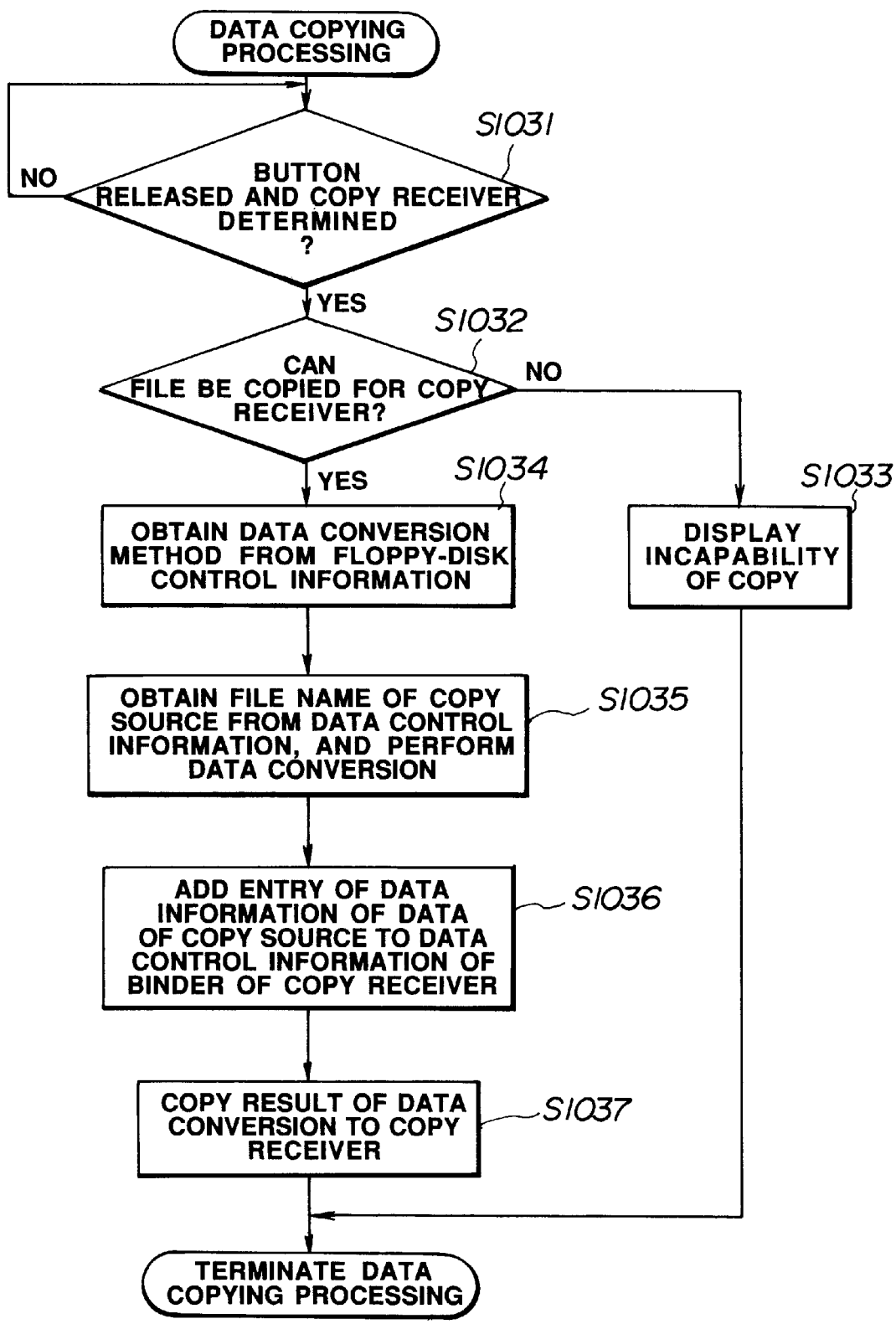
FIG. 95 is a flowchart illustrating copying processing on the operational picture frame shown in FIG. 94.

FIG. 94 illustrates the operational picture frame when data of floppy disk G1017 is copied to binder 20. This is substantially the same as the above-described picture frame (shown in FIG. 25). FIG. 95 illustrates the copying operation. When the button has been released in the copy receiver to determine the copy receiver in step S1031, in step S1032, it is determined whether or not a copying operation can be performed by checking the capacity of the disk and the like. If the result of the check is negative, a display indicating that a copying operation is impossible is performed in step S1033, and the copying processing is terminated.

If the result of the check in step S1032 is affirmative, in step S1034, the data conversion method (converter 1103) is obtained from floppy-disk control information. In the next step S1035, the file name of the copy source is obtained from the floppy-disk control information, and the data is subjected to data conversion. In step S1036, the entry of the previously obtained data control information 110 is added to data control information 110 of binder 20 of the copy receiver. In step S1037, the converted data is copied, and the process is terminated. When copying data under cabinet 16 to a floppy disk, substantially the same processing is performed.

Starting Operation of an Application

An application is started by operating an object indicated by application 26 or data 18 controlled by the desktop control system by the user. The operation of starting an application is executed by adding execution-module name 62 of the application followed by file name 112 and format ID 51 of data 18 to be processed, and a character string indicating the method of processing in processing list 65 (for example, /usr/local/bin/ezps/ezps-f 012-me).

In FIG. 3, when desktop object G02 within room window G01 has been subjected to a 2-click operation, desktop window G14 is opened as shown in FIG. 4, and application objects G15 indicating already registered applications 26 are displayed. The processing of opening desktop 15 is terminated by reading the corresponding icon file by obtaining application information 60, and performing icon display on the window.

When data 18 has been opened by the application, the entry of the opened data 18 is added to open object control information 140 of the room where data 18 is present. When data 18 has been closed by the application, the above-described entry of the opened data 18 of open object control information 14 is deleted.

Next, a description will be provided of the processing of starting an application in the desktop control system with respect to each of the user's operations with reference to the drawings.

(1) Start by an opening operation of an application object

Figure 27:
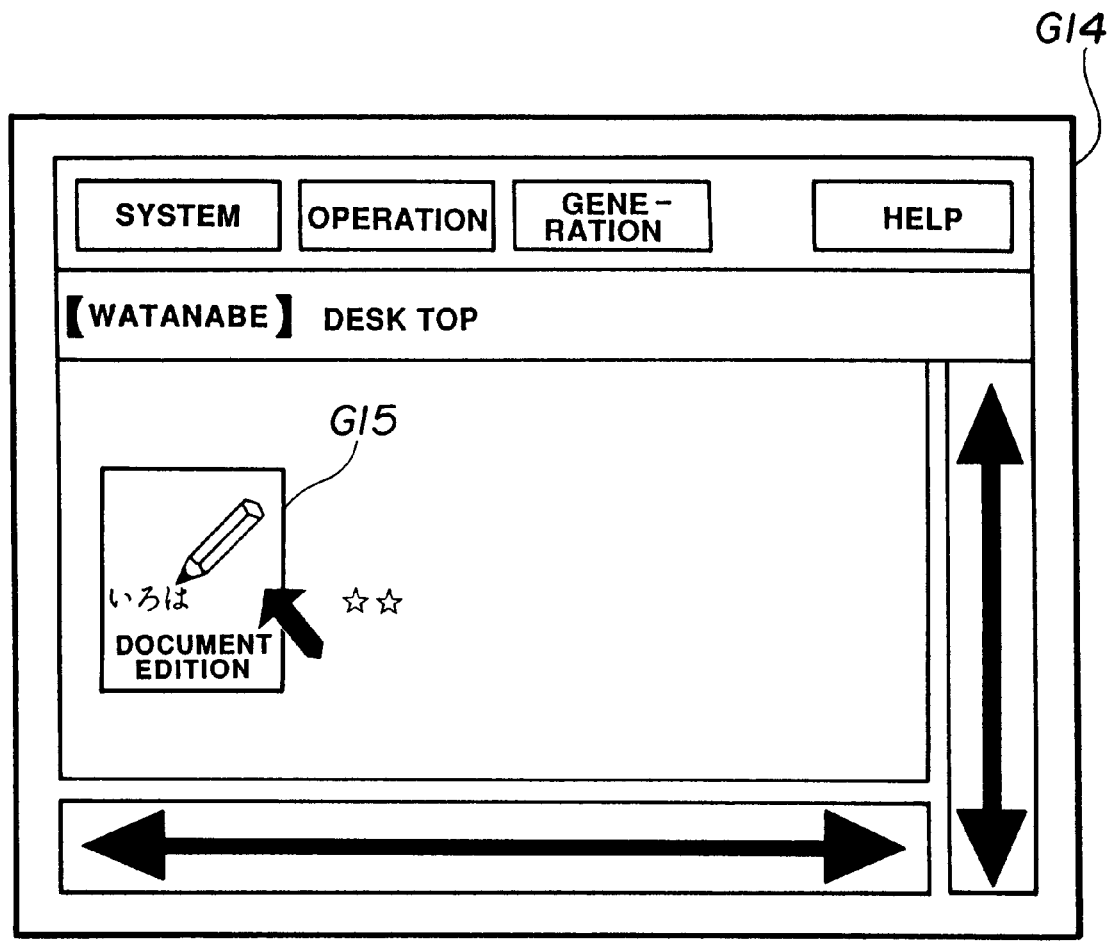
FIG. 27 is a diagram showing an example of the operation of opening an application object.

In FIG. 27, application object G15 within desktop window G14 is subjected to a 2-click operation.

Figure 28:
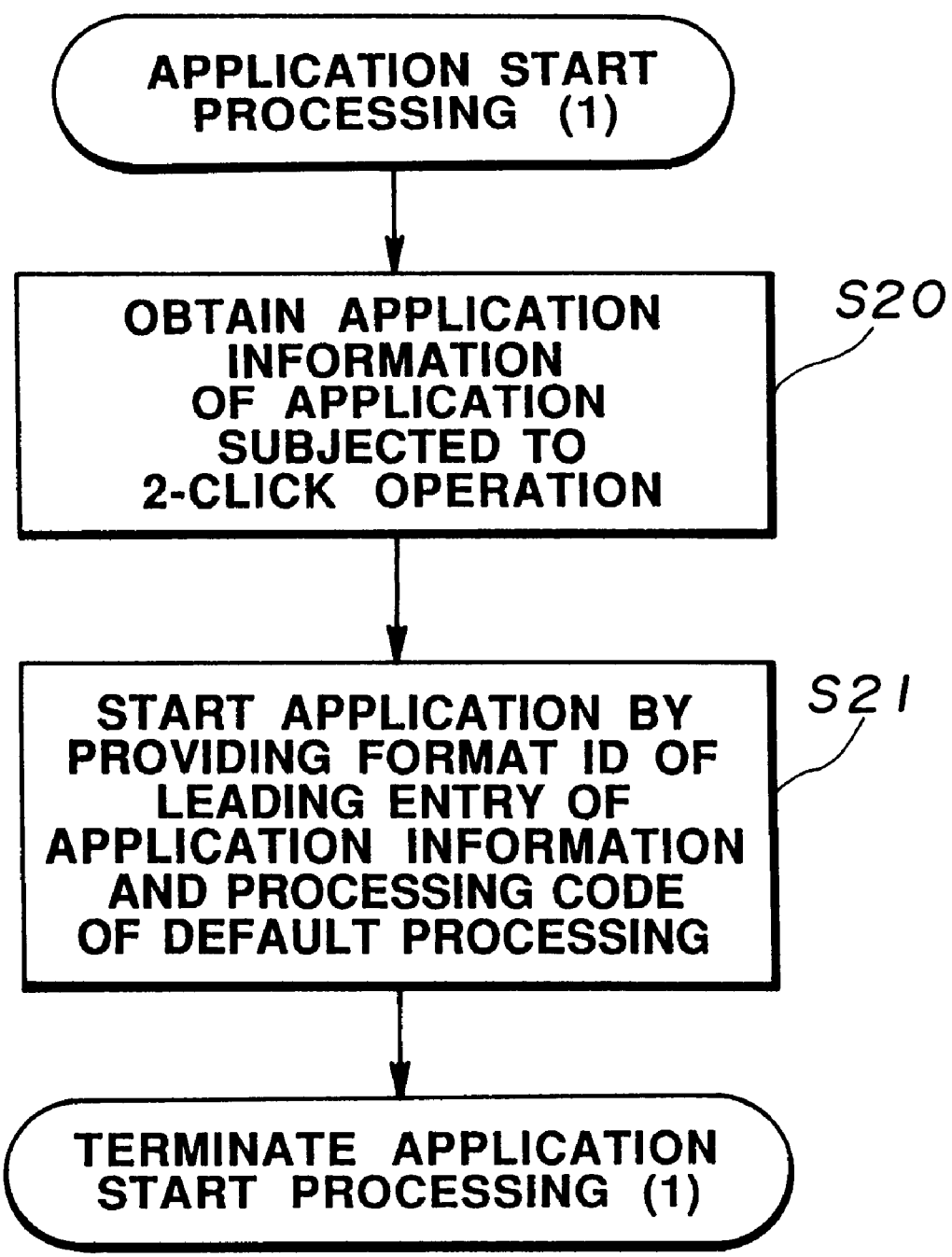
FIG. 28 is a flowchart of the processing of starting an application program.

Referring to the flowchart of FIG. 28, in step S20, application information 60 of application 26 indicated by the application object subjected to 2-click operation in step S20 is obtained. In step S21, the application program is started by providing the format ID of the leading entry of processing list 65 and the processing code of default processing 66 for the application.

(2) Start by an opening processing of an application object

Figure 29:
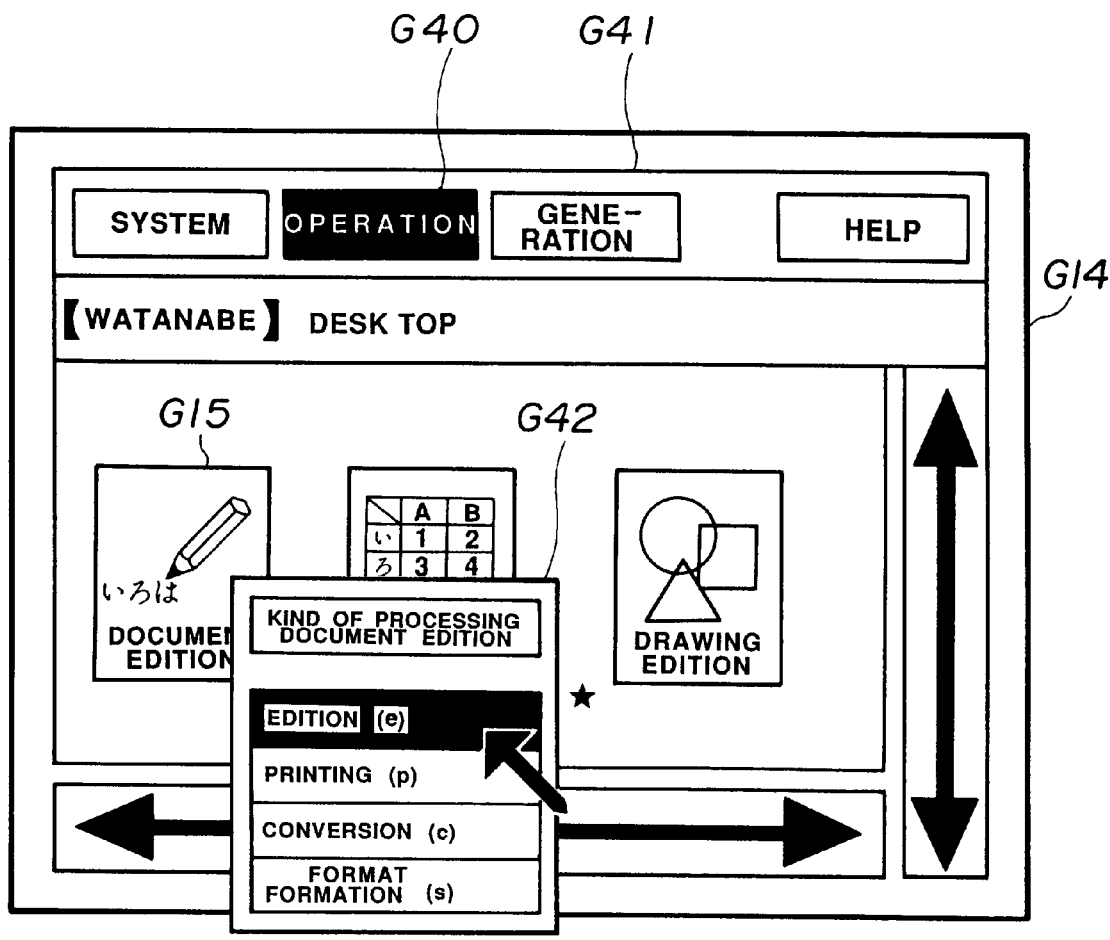
FIG. 29 is a diagram showing an example of the operation of opening an application object.

In FIG. 29, when application object G15 within desktop window G14 has been selected by a 1-click operation of the button of the mouse, the appearance of the selected application object G15 changes such that, for example, the frame of the icon is thickened, so that the selection of application object G15 can be acknowledged. When "operation" button G40 has been selected from menu list G41 in this state by a 1-click operation of the button, "operation" menu G42 is displayed. The processing to be executed in application 26 indicated by the selected application object G15 is selected from the displayed "operation" menu G42.

Figure 30:
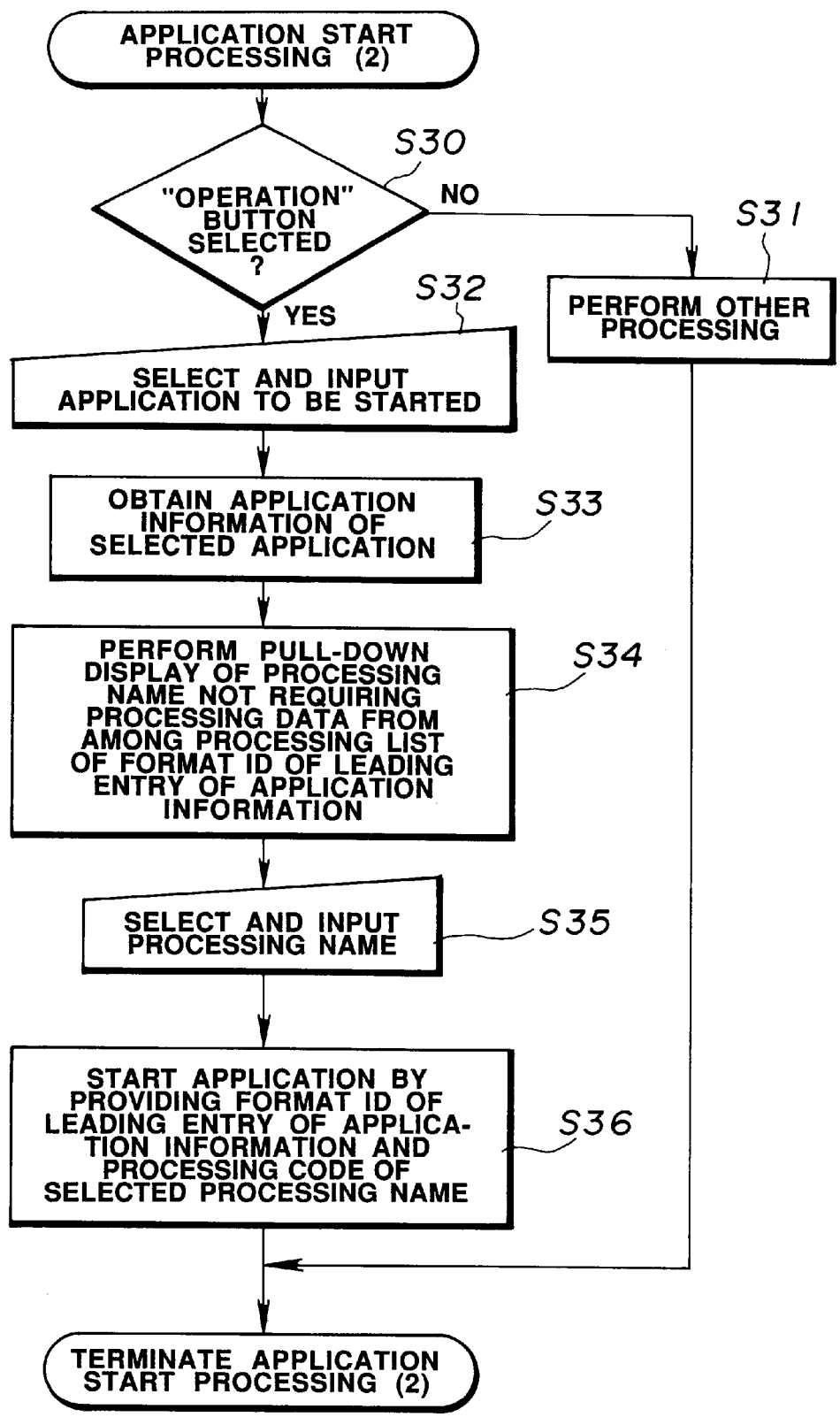
FIG. 30 is a flowchart of the processing of starting an application program.

Referring to the flowchart of FIG. 30, when "operation" button G40 has not been selected in step S30, other processing is performed in step S31. When "operation" button G40 has been selected in step S30, after selecting application object G15 in step S32, application information 60 of the selected application 26 is obtained in step S33. In step S34, the format ID at the leading entry of processing list 65 of the obtained application information 60 is selected as default, and the processing name of processing list 65 having the above-described format ID is displayed on "operation" menu G42. On "operation" menu G42, functions which require already formed data, such as a printing function and the like, are checked by the necessity of data to be processed 67 in application information 60 and are not displayed. When one item of "operation" menu G42 has been selected in step S35, in step S36, the application program indicated by the already selected application object G15 is started by providing the format ID which has already been selected as default and the processing code corresponding to the selected item.

(3) Start of an application object by a dragging/dropping operation

Figure 31:
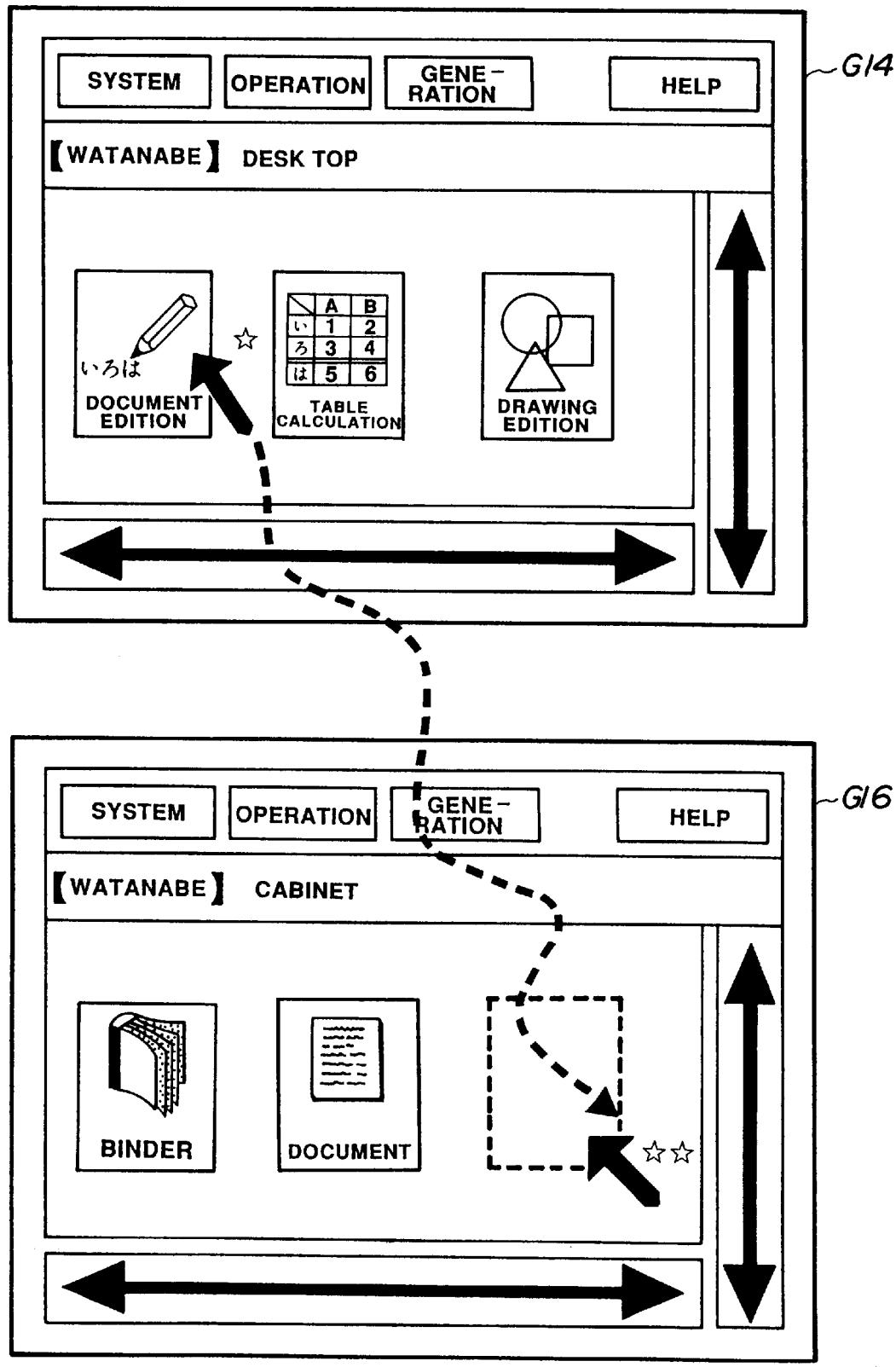
FIG. 31 is a diagram showing an example of the operation of opening an application object.

In FIG. 31, application object G15 within desktop window G14 is dragged, and is dropped within cabinet (binder) window G16. As in case (1), application information 60 of application 26 indicated by the dragged/dropped application object G15 is obtained, and the application program is started by providing the format ID at the leading entry of processing list 65 of application information 60 and the processing code of default processing 66.

(4) Start by an opening operation of a data object

Figure 32:
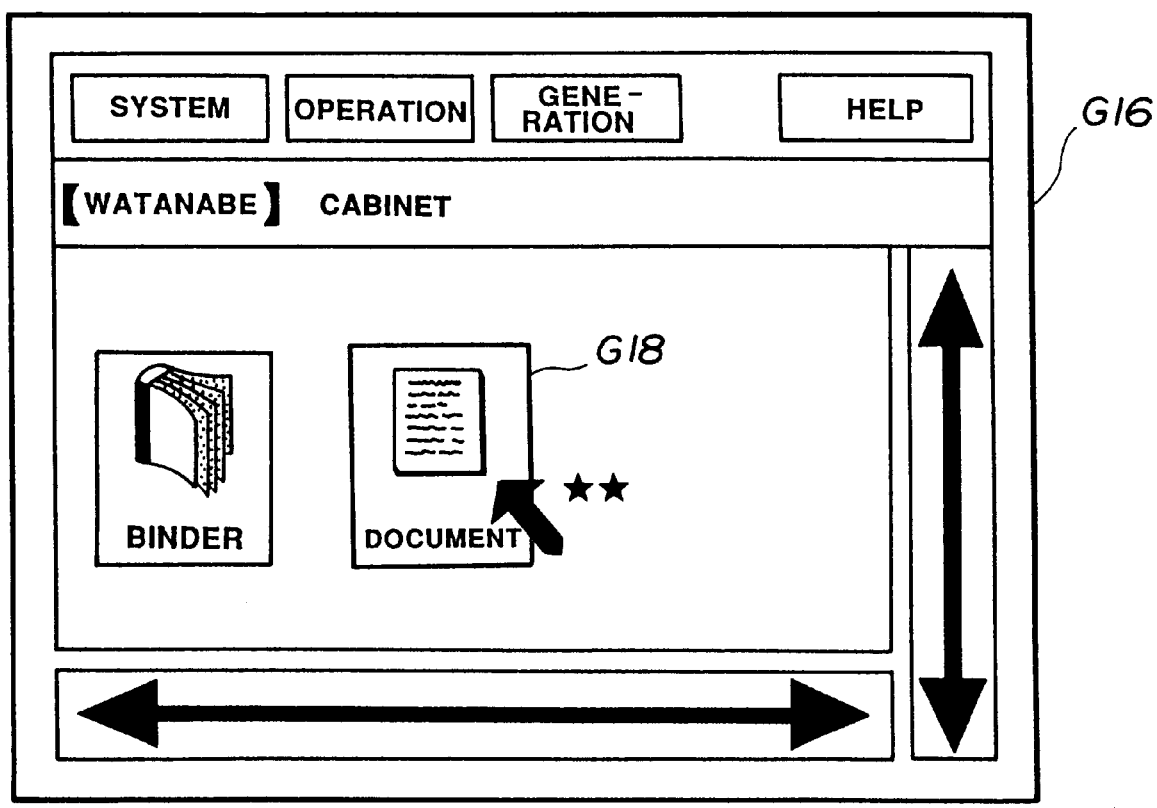
FIG. 32 is a diagram showing an example of the operation of opening a data object.
Figure 33:
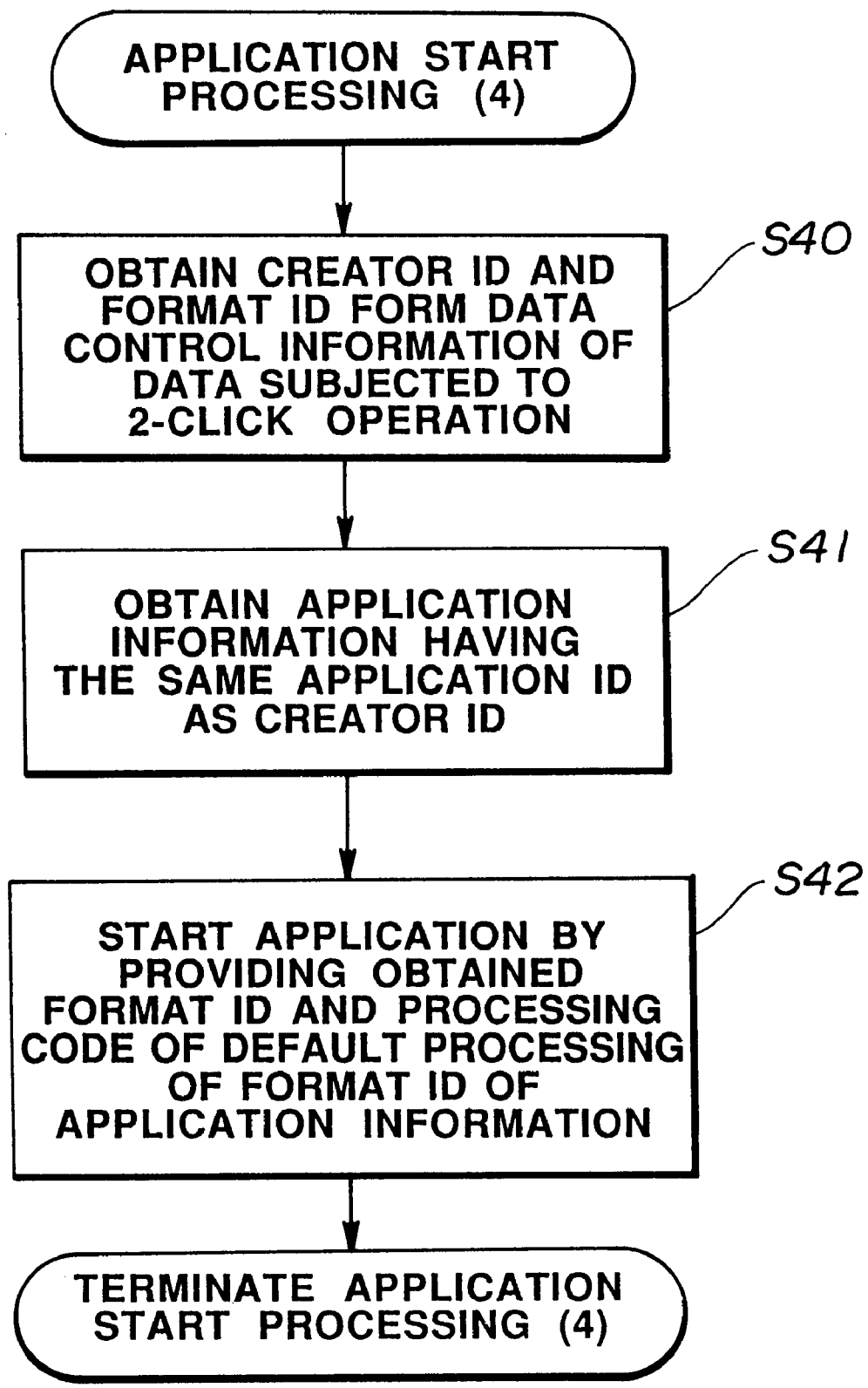
FIG. 33 is a flowchart of the processing of starting an application processing.

In FIG. 32, data object G18 within cabinet (binder) window G16 is subjected to a 2-click operation. Referring to the flowchart of FIG. 33, in step S40, creator ID 114 and format ID 113 of the data are obtained from object control information 110 of data 18 indicated by the data object G18 subjected to the 2-click operation.

In step S41, the entry of application information 60 having the same application ID 61 as the obtained creator ID 114 is obtained. In step S42, the application program is started by providing the processing code of default processing 66 of the obtained format ID at the entry of application information 60, and file name 112 of the data.

(5) Start by an opening operation of a data object

Figure 34:
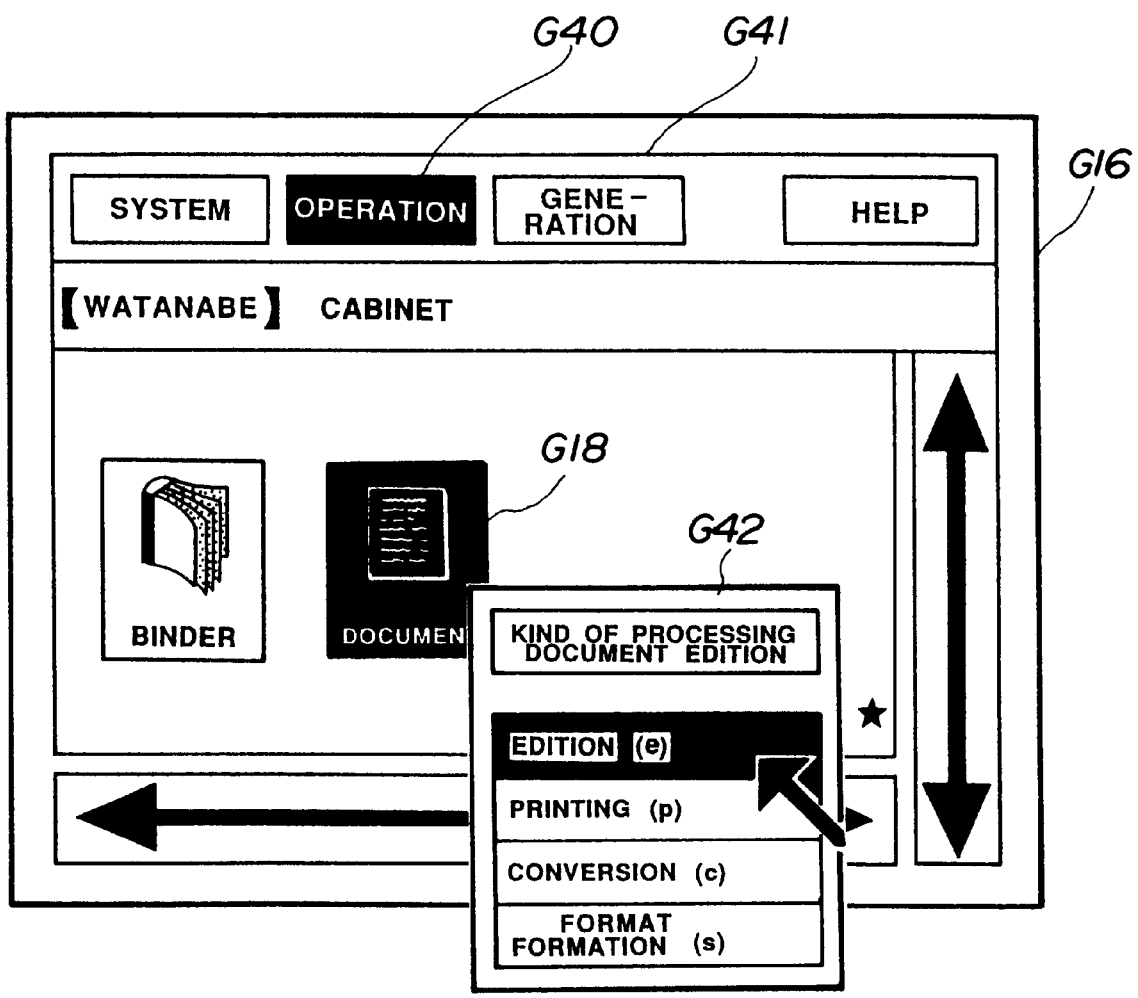
FIG. 34 is a diagram showing an example of the operation of opening a data object.

In FIG. 34, when data object G18 within cabinet (binder) window G16 has been selected by a 1-click operation of the button, the appearance of data object G18 changes such that, for example, the icon is subjected to reversal display so that the selection of data object G18 can be acknowledged. When "operation" button G40 has been selected from menu list G41 by a 1-click operation of the button in this state, "operation" menu G42 is displayed. The processing to be executed is selected for data 18 indicated by data object G18 selected from the displayed "operation" menu G42.

Figure 35:
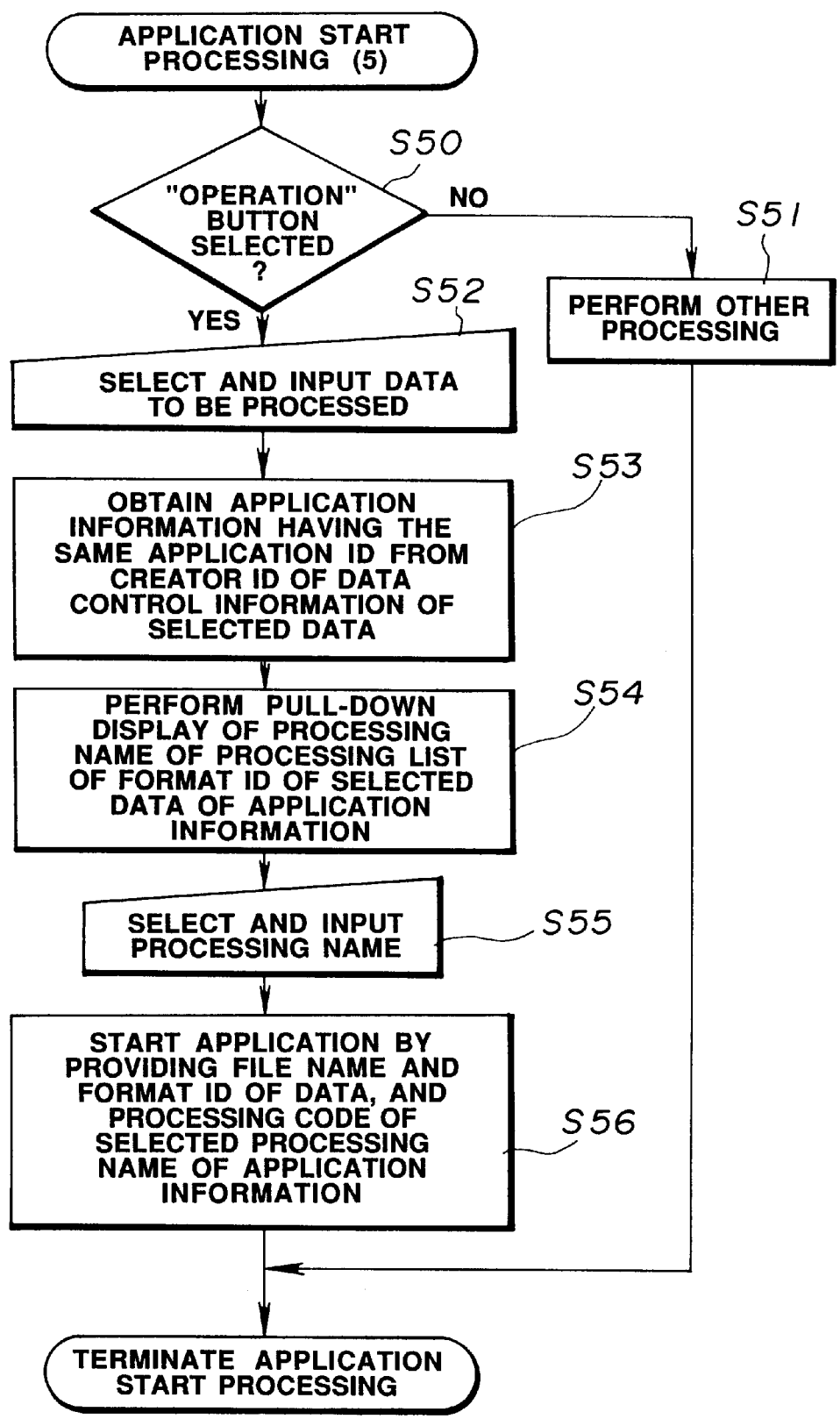
FIG. 35 is a flowchart of the processing of starting an application program.

Referring to the flowchart of FIG. 35, when "operation" button G40 on the window has not been selected in step S50, other processing is performed in step S50. When "operation" button G40 has been selected in step S51, in step S52, data object G18 is selected, format ID 113 and creator ID 114 of the data 18 indicated by the selected data object G18 are obtained, and the entry having the same application ID 61 as creator ID 114 is obtained from application information 60. In step S54, the processing name of processing list 65 corresponding to the obtained format ID 113 is obtained from the obtained entry of application information 60, and is displayed as "operation" menu G42. When one item of "operation" menu G42 has been selected in step S55, in step S56, the application program is started with the obtained execution-module name 62 of application information 60 by providing the file name 112 of data 18, the already obtained format ID 113, and the processing code corresponding to the item selected from "operation" menu G42.

(6) Start by dragging/dropping a data object on an application object

Figure 36:
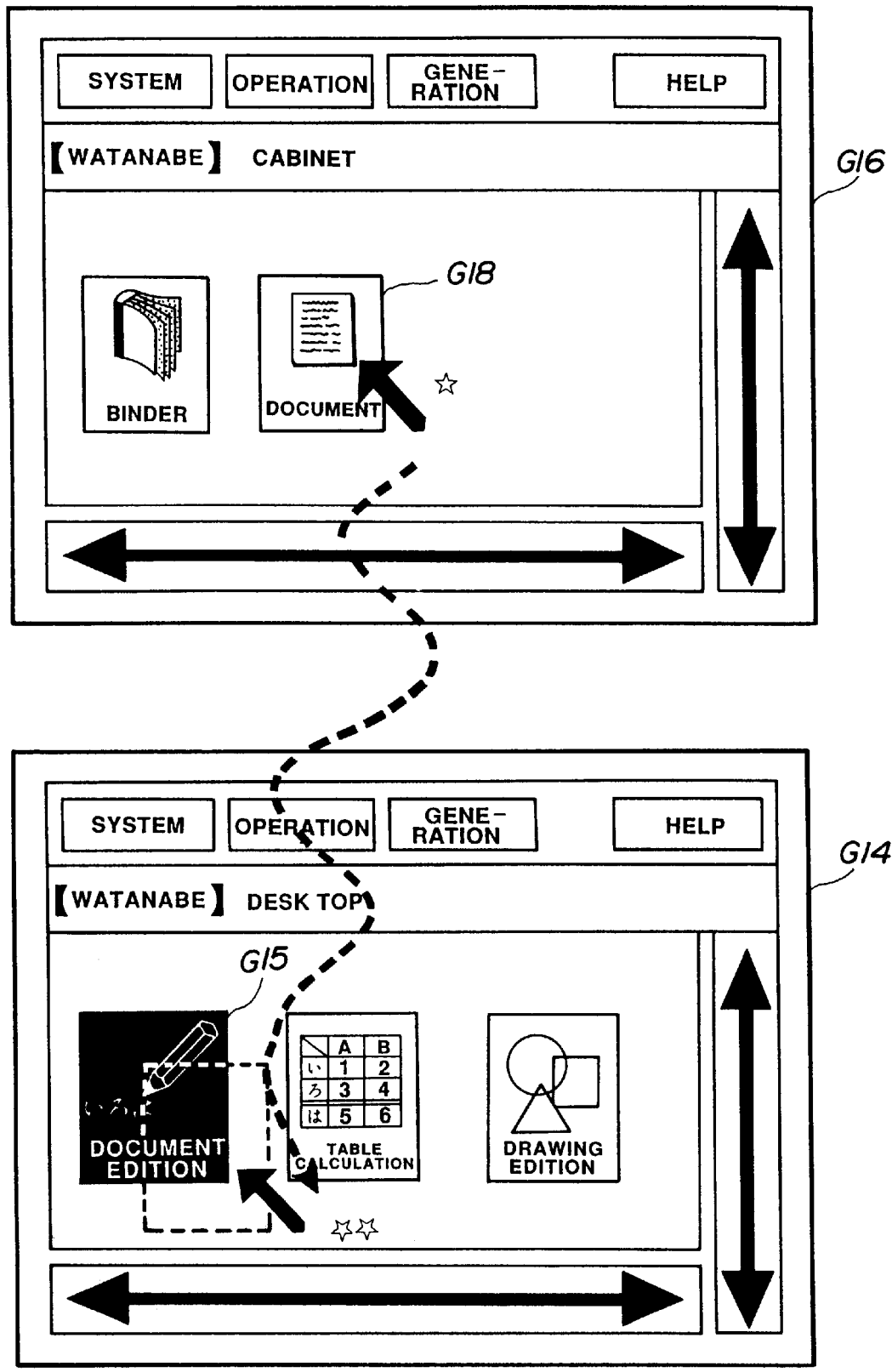
FIG. 36 is a diagram showing an example of the operation of copying an application object between a cabinet and desktop.

In FIG. 36, one data object G18 within cabinet (binder) window G16 is dragged, and is dropped on application object G15 within desktop window G14.

Figure 37:
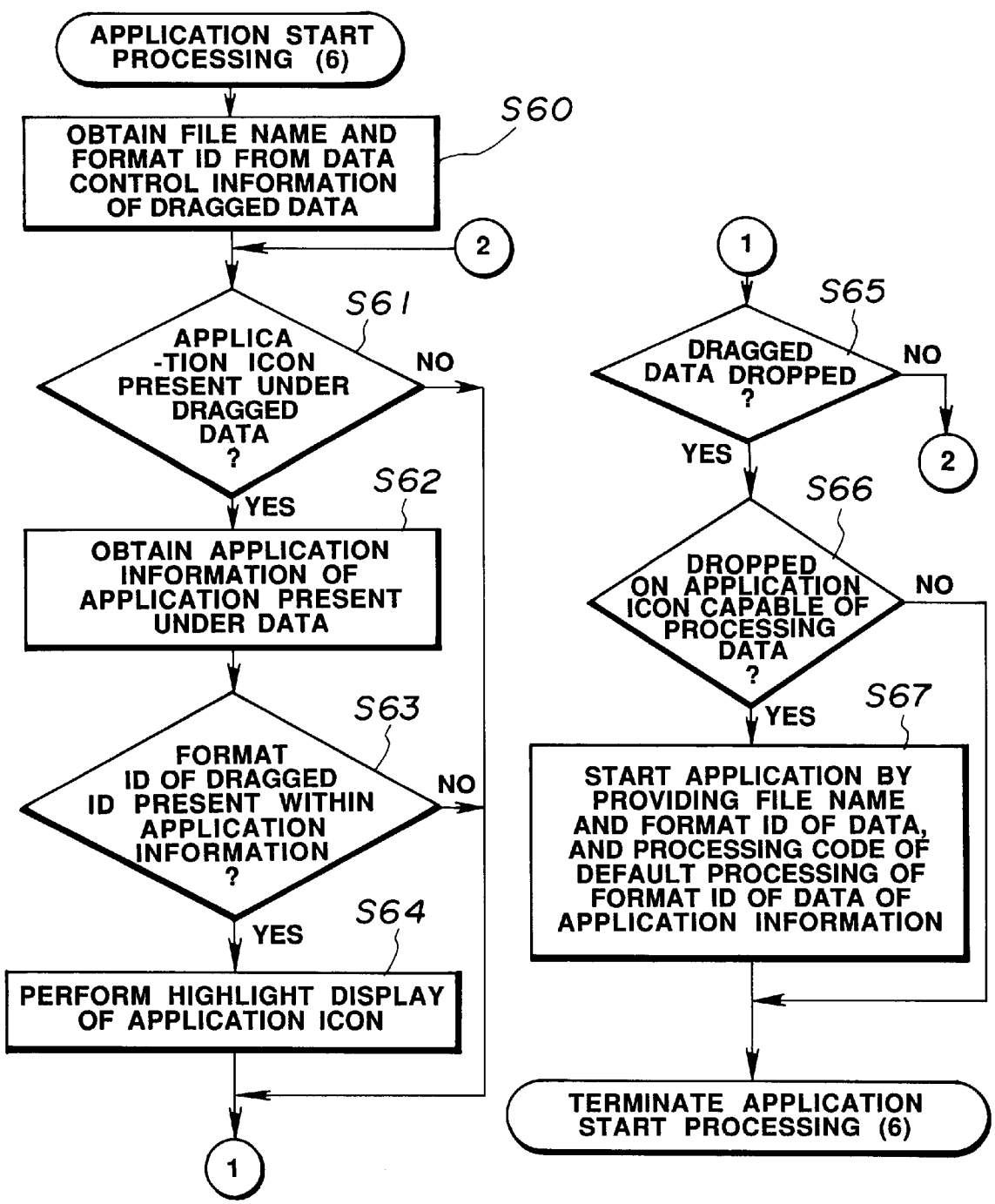
FIG. 37 is a flowchart of the processing of moving an application object.

Referring to the flowchart of FIG. 37, when data object G18 has been dragged, in step S60, the file name 112 and the format ID 113 of the data 18 indicated by the selected data object G18 are obtained from object control information 110. When the dragged data object G18 has been placed on application object G15 on desktop window G14 in step S61, the application information 60 of the placed application 26 is obtained in step S62. If the format ID of the data 18 indicated by data object G18 dragged on application 26 can be processed in the determination of step S63, in step S64, the method of display of the icon of the above-described application object G15 is changed such that, for example, the icon is subjected to reversal display in order to notify the user that data 18 indicated by data object G18 dragged on application 26 can be processed. When the dragged data object G18 has been dropped in step S65, in step S66, it is checked whether or not the above-described data 18 has been dropped on application object G15 of application 26 in which data 18 can be processed. In step S67, the processing code of default processing 66 of the format ID corresponding to application ID 61 is obtained from the obtained application information 60, and the application program is started by providing application 26 indicated by execution-module name 62 with the format ID 113, the processing code and the file name 112 of the data 18.

As described with reference to FIG. 15, in this desktop control system, when data 18 of one data form can be processed by a plurality of applications 26, and when one application 26 can process data 18 of a plurality of data forms, the relationship between data 18 and applications 26 which can process the data 18 is controlled. Accordingly, it is useful to notify the user performing the operation to which application object G15 the selected or dragged data object G18 can be dropped, that is, which application 26 can process the data 18. The following guidance function is provided as a means for realizing the above-described notification.

(6.1) Guidance by connection with lines

Figure 39:
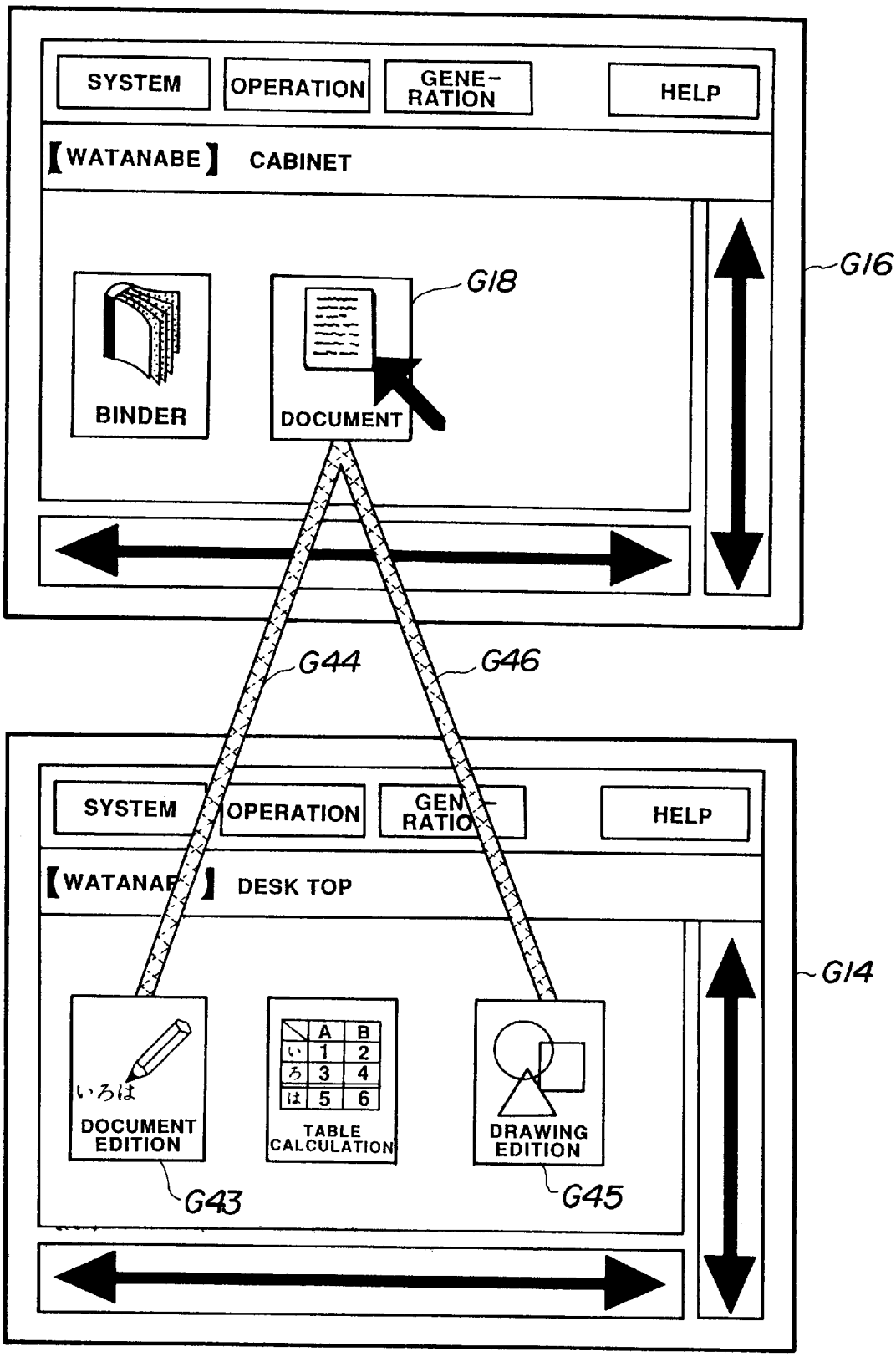
FIG. 39 is a diagram showing an example of display by connecting an application object to a data object.

In FIG. 39, when one data object G18 within cabinet window G16 or binder window G39 has been grabbed (by adjusting the pointing cursor to the object), the grabbed data object G18 is presented by being connected to application objects G15 within desktop window G14 which can process the corresponding data with lines.

Figure 40:
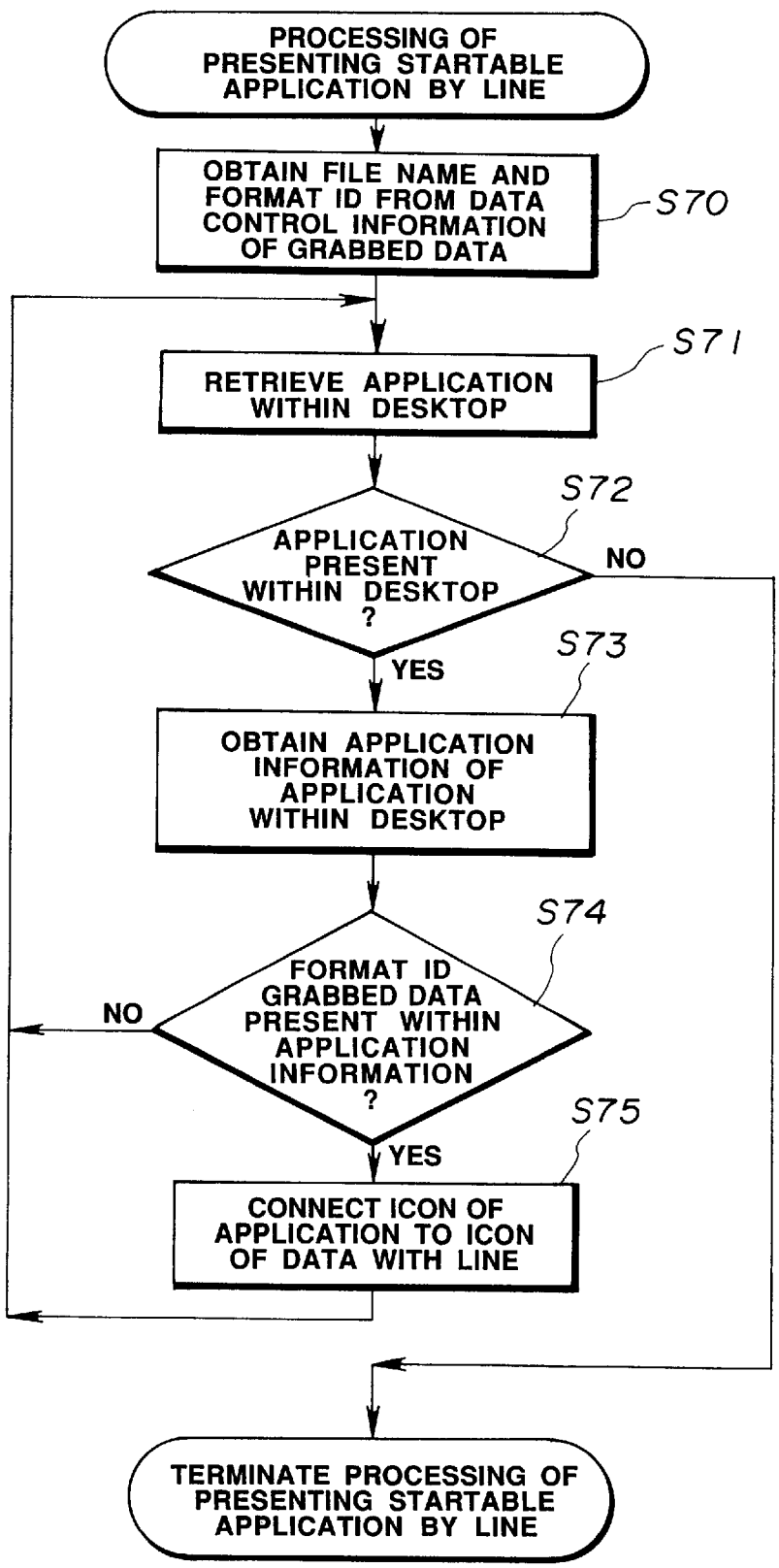
FIG. 40 is a flowchart of the processing of performing display by connecting an application object to a data object.

This processing will be described with reference to the flowchart of FIG. 40. When one data object G18 has been grabbed, in step S70, the file name 112 and the format ID 113 of the data 18 corresponding to the grabbed data object G18 are obtained from data control information 110. In step S71, applications 26 within desktop 15 are retrieved. If it is determined in step S72 that no application 26 other than the already checked application is present, presentation of applications which can process the data is terminated. If any application is present in the determination of step S72, application information 60 on that application 26 is obtained in step S73. In step S74, it is determined whether or not the format ID of the data 18 indicated by the grabbed data object G18 is present. If the result of the determination is affirmative, the grabbed data object can be processed by the application found in step S71.

If application object G43 on desktop window G14 can process data object G18, in step S75, data object G18 is connected to application object G43 with line G44, as shown in FIG. 39, to notify the user that application 26 indicated by application object G43 can process the data 18 indicated by the grabbed data object G18. When the presenting processing of step S75 has been completed for one application 26 retrieved in step S71, the process returns to step S71. If any unchecked application 26 is present in step S72, the processing of steps S73–S75 is repeated for applications 26 within desktop 15. When the processing has been terminated according to the determination of step S72, for example, as shown in FIG. 39, the data object G18 grabbed within cabinet window G16 is connected to application objects G43 and G45 of applications 26 which can process the data corresponding to the grabbed data object G18 with lines G44 and G46.

(6.2) Guidance by connection with highlight display

Figure 42:
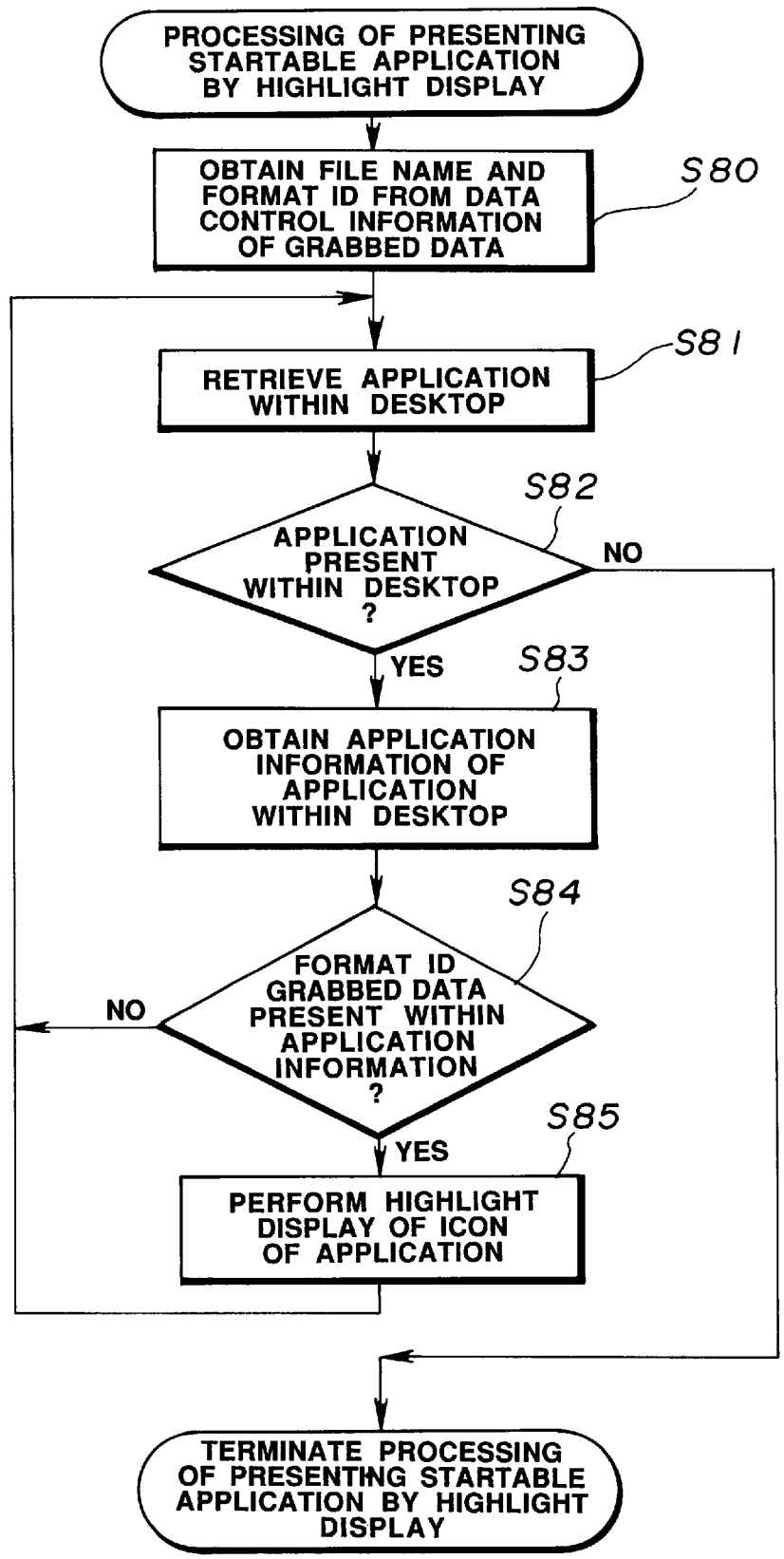
FIG. 42 is a flowchart of the processing of performing highlight display of the relationship between an application object and a data object.

In FIG. 41, when one data object G18 within cabinet window G16 or binder window G39 has been grabbed, application objects G15 within desktop window G14 which can process the grabbed data object G18 are presented by changing the state of display, such as performing highlight display or the like. This processing will be described with reference to FIG. 41 and the flowchart of FIG. 42.

When one data object G18 has been grabbed, the file name 112 and the format ID 113 of the data 18 corresponding to the grabbed data object G18 are obtained in step S80. In step S81, applications 26 within desktop 15 are retrieved. If it is determined that no application 26 is present other than the already retrieved application in step S82, the presentation of applications which can process the data corresponding to the grabbed data object G18 has been terminated. If any application is present in the determination in step S82, application information 60 on that application 26 is obtained in step S83. In step S84, it is determined whether or not the format ID of the data 18 indicated by the grabbed data object G18 is present within that application information 60. If the result of the determination is affirmative, the grabbed object can be processed by the application found in step S81. If, for example, application object G47 within desktop window G14 can process the grabbed data object G18, in step S85, as shown in FIG. 41, the display of the corresponding application object G47 is subjected to highlight display to notify the user that the application 26 indicated by that application object G47 can process the data 18 indicated by the dragged data object G18. When the presentation processing of step S85 for one application 26 retrieved in step S81 has been completed, the process returns to step S81. If any unchecked application 26 is present in the determination of step S82, the processing of steps S83–S85 is repeated for applications 26 within desktop 15. When the process has been terminated according to the determination of step S82, for example, as shown in FIG. 41, application objects G47 and G48 of applications 26 which can process the data corresponding to the data object G18 grabbed within cabinet window G16 are subjected to highlight display.

(6.3) Guidance by attraction

Figure 43:
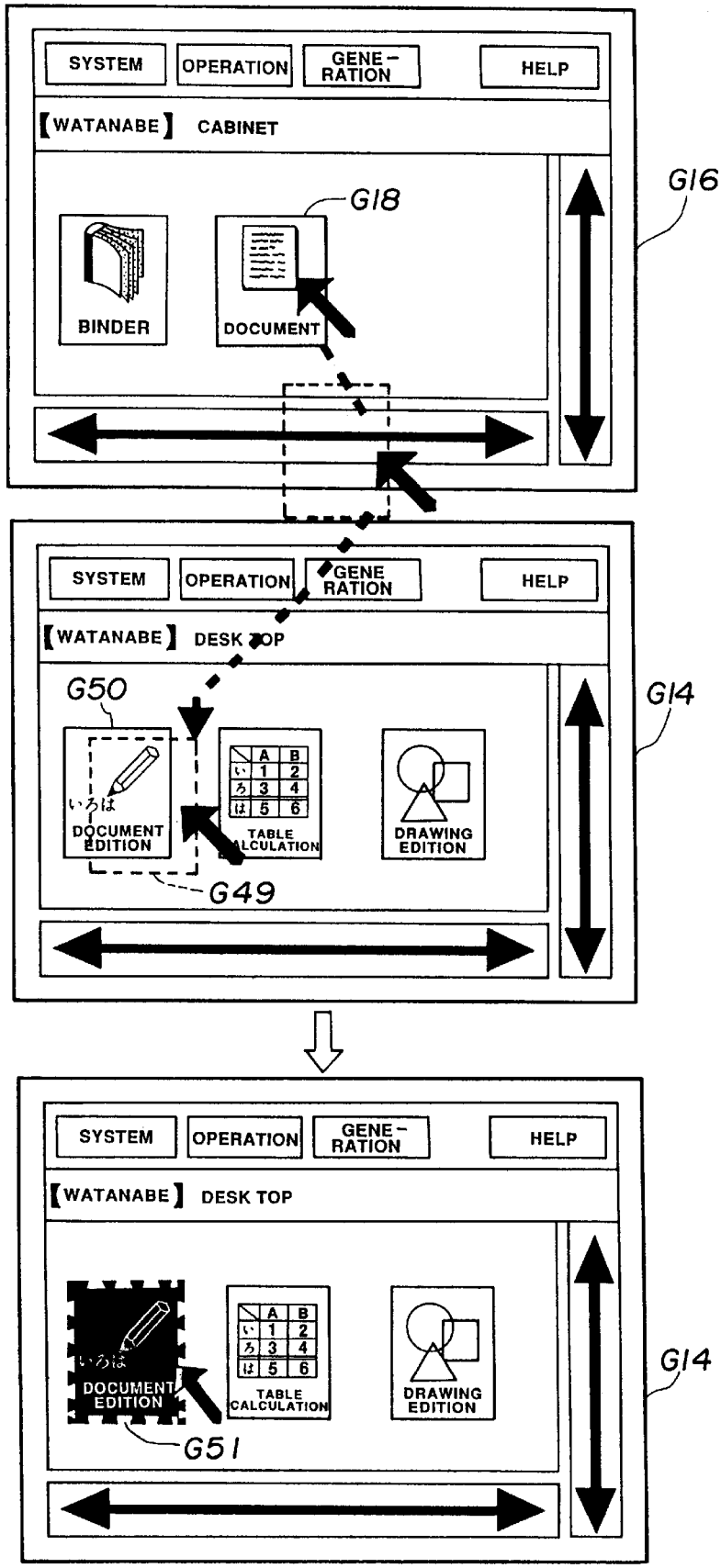
FIG. 43 is a diagram showing an example of display of guidance by attraction.
Figure 44:
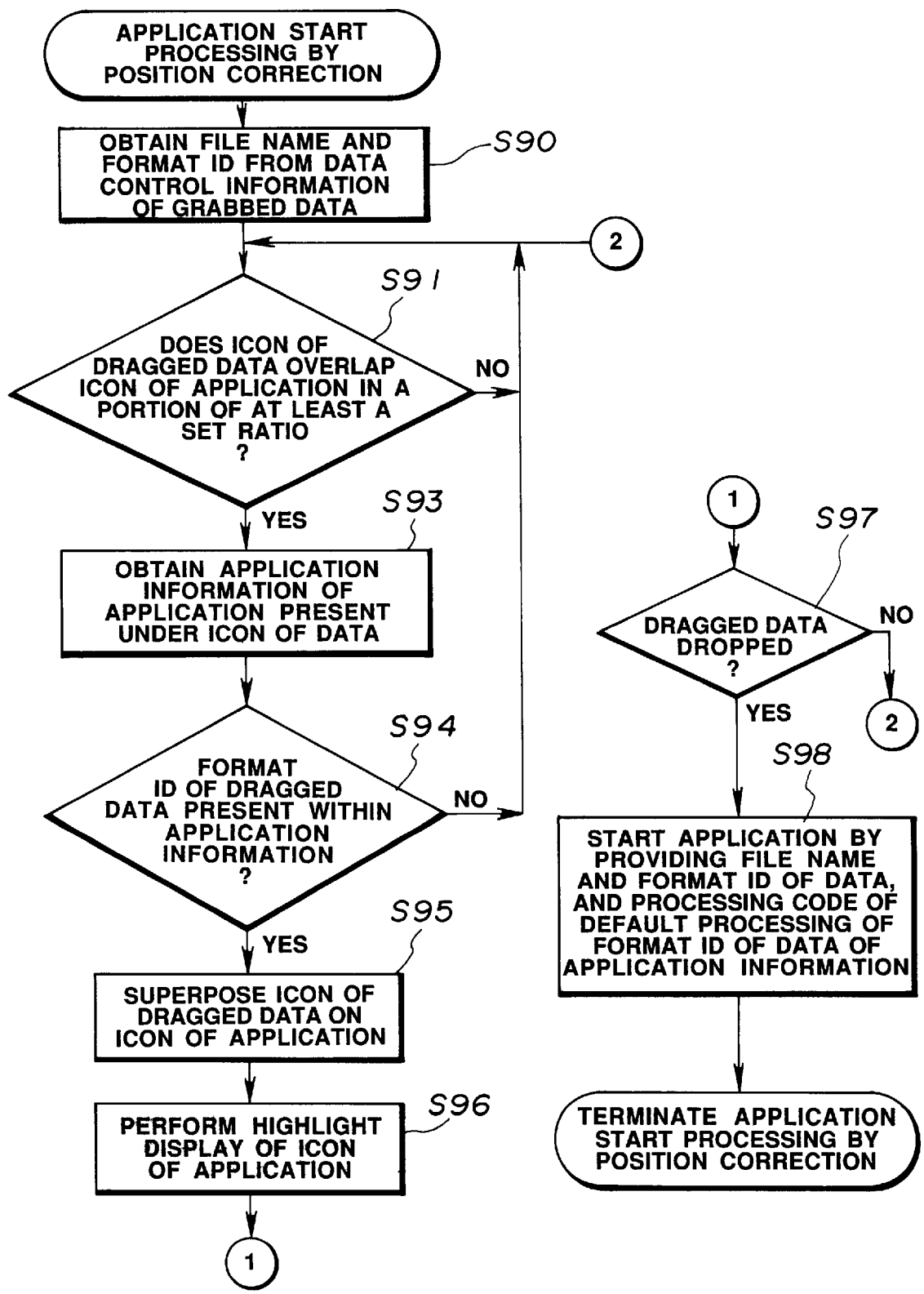
FIG. 44 is a flowchart of the processing of starting an application by guidance by attraction.

In FIG. 43, when one data object G18 within cabinet window G16 or binder window G39 has been moved while being dragged, the position of display of the dragged data object G18 is automatically corrected and presented by the desktop control system when the dragged data object G18 reaches a position at a predetermined distance from application object G15 which can process the dragged data object G18 within desktop window G14. This processing will be described with reference to FIG. 43 and the flowchart of FIG. 44.

When one data object G18 has been grabbed, in step S90, the file name 112 and the format ID 113 of the data 18 corresponding to the grabbed data object G18 are obtained from data control information 110. In step S91, it is determined whether or not the overlapped area of the icon of the dragged data object G49 and the icon of application object G50 reaches a predetermined ratio of the display area of the dragged data object G49. If the result of the determination is negative, the process returns to step S91.

If the result of the determination in step S91 is affirmative, application information 60 of the application 26 indicated by the application object G50 is obtained in step S93.

In step S94, it is checked whether or not the format ID of the data 18 indicated by the dragged data object G49 is present within application information 60 of the application 26 indicated by the application object G50. If the result of the check is affirmative, the data can be processed by the overlapped application. Then in step S95, the display position of the dragged data object G49 is corrected so that the data object G49 completely overlaps the application object G50 as indicated by G51. At the same time, in step S96, the application object G50 is subjected to highlight display. According to this processing, the user feels as if the dragged data object G49 were attracted to the application object G50 by attraction, and can determine that the application 26 indicated by that application object G50 can process the data 18 indicated by the dragged data object G49.

Subsequently, in step S97, it is determined whether or not the dragged data object G49 has been dropped on the application object G50. If the result of the determination is negative, the process returns to step S91. If the result of the determination is affirmative, in step S98, the processing code of default processing 66 of the format ID corresponding to application ID 61 from the application information 60 obtained in step S92, and the application 26 is started by providing the application 26 indicated by the application object with the format ID, the processing code, and the file name 112 of the data 18 indicated by the data object G18.

(6.4) Guidance by reaction

Figure 45:
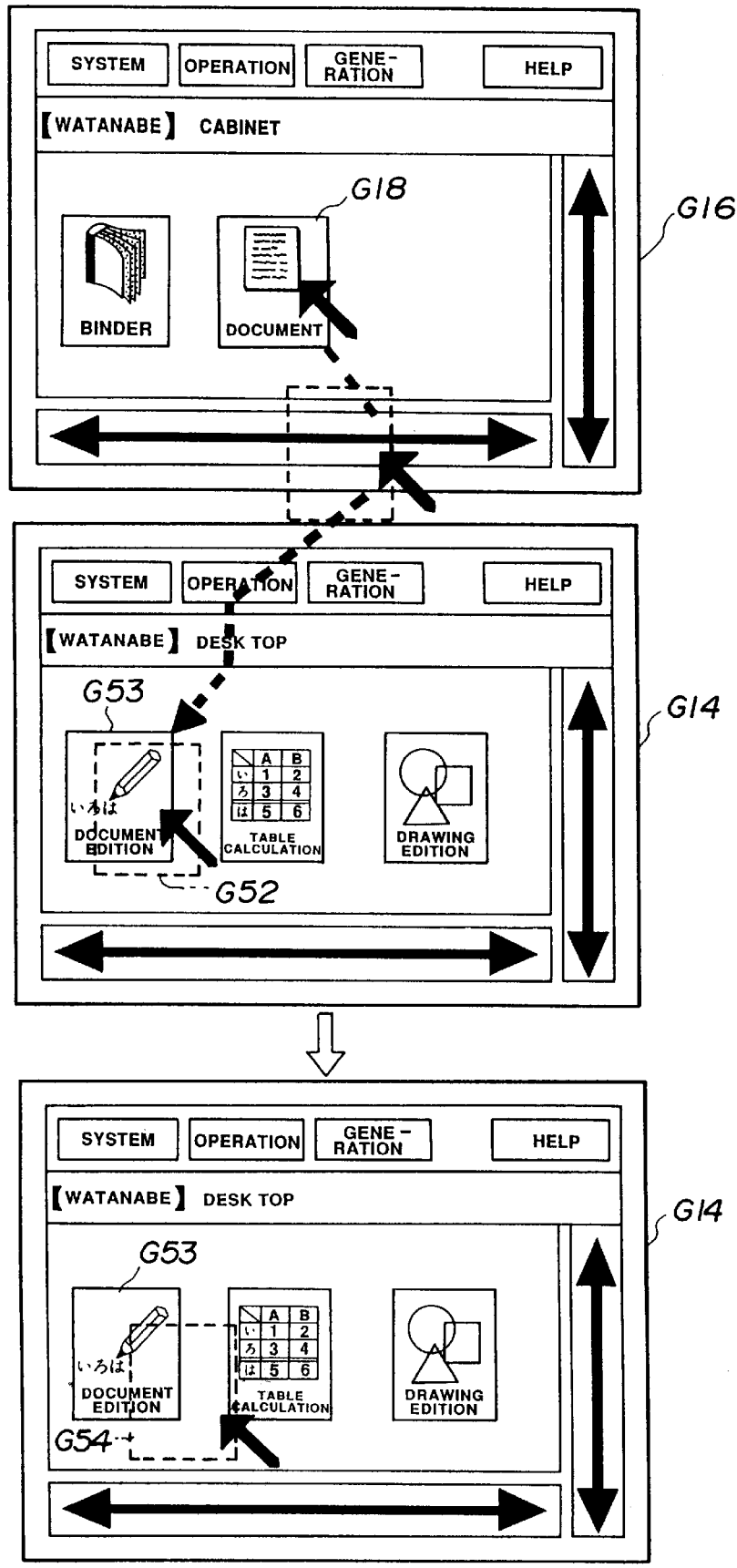
FIG. 45 is a diagram showing an example of display of guidance by reaction.
Figure 88:
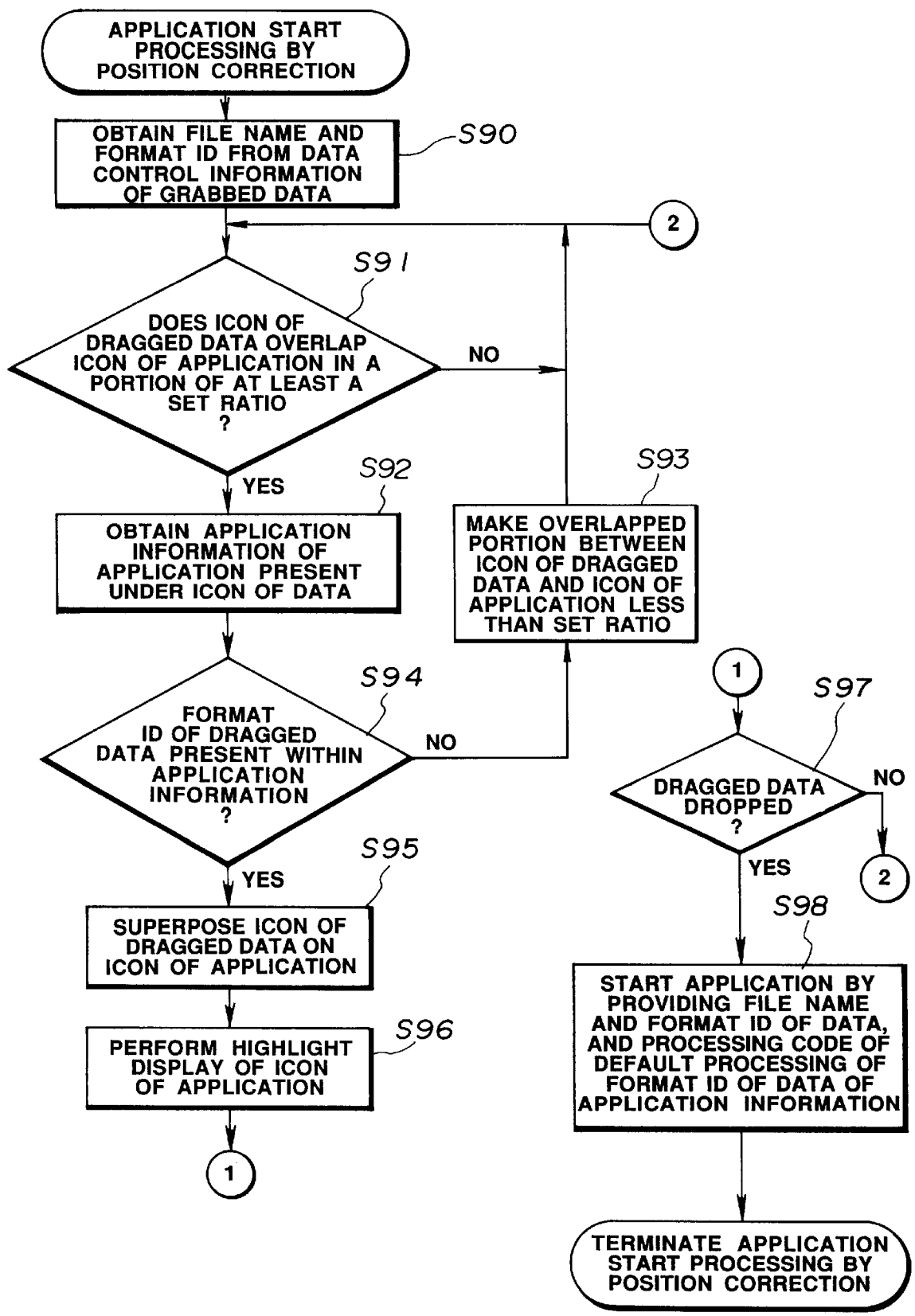
FIG. 88 is a flowchart of the processing of starting an application by guidance by reaction.

In FIG. 45, when one data object G18 within cabinet window G16 or binder window G39 has been moved while being dragged, the position of display of the dragged data object G18 is automatically corrected and presented by the desktop control system when the dragged data object G18 reaches a position at a predetermined distance from application object G15 which cannot process the dragged data object G18 within desktop window G14. This processing will be described with reference to FIG. 45 and the flowchart of FIG. 88.

When one data object G18 has been grabbed, in step S90, the file name 112 and the format ID 51 of the data 18 corresponding to the grabbed data object G18 are obtained from data control information 110. In step S91, it is determined whether or not the overlapped area of the icon of the dragged data object G52 and the icon of application object G53 reaches a predetermined ratio of the display area of the dragged data object G52.

If the result of the determination is negative, the process returns to step S91. If the result of the determination in step S91 is affirmative, application information 60 of the application 26 indicated by the application object G53 is obtained in step S92.

When it has been determined in step S94 that the format ID of the data 18 indicated by the dragged data object G52 is present in application information 60 of the application 26 indicated by the application object G53, and the data 18 can be processed, the process proceeds to the start of the application 26 in the same manner as in case (6.3). To the contrary, when it has been determined in step S94 that the application 26 indicated by the application object G53 cannot process the data 18 indicated by the dragged data object G52, in step S93, the display position of the dragged data object G52 is corrected so that the overlapped portion of the data object G52 and the application object G53 is reduced or erased. According to this processing, the user feels as if the dragged data object G52 were drawn from the application object G52 by reaction, and can determine that the application 26 indicated by that application object G53 cannot process the data 18 indicated by the dragged data object G52.

Figure 38:
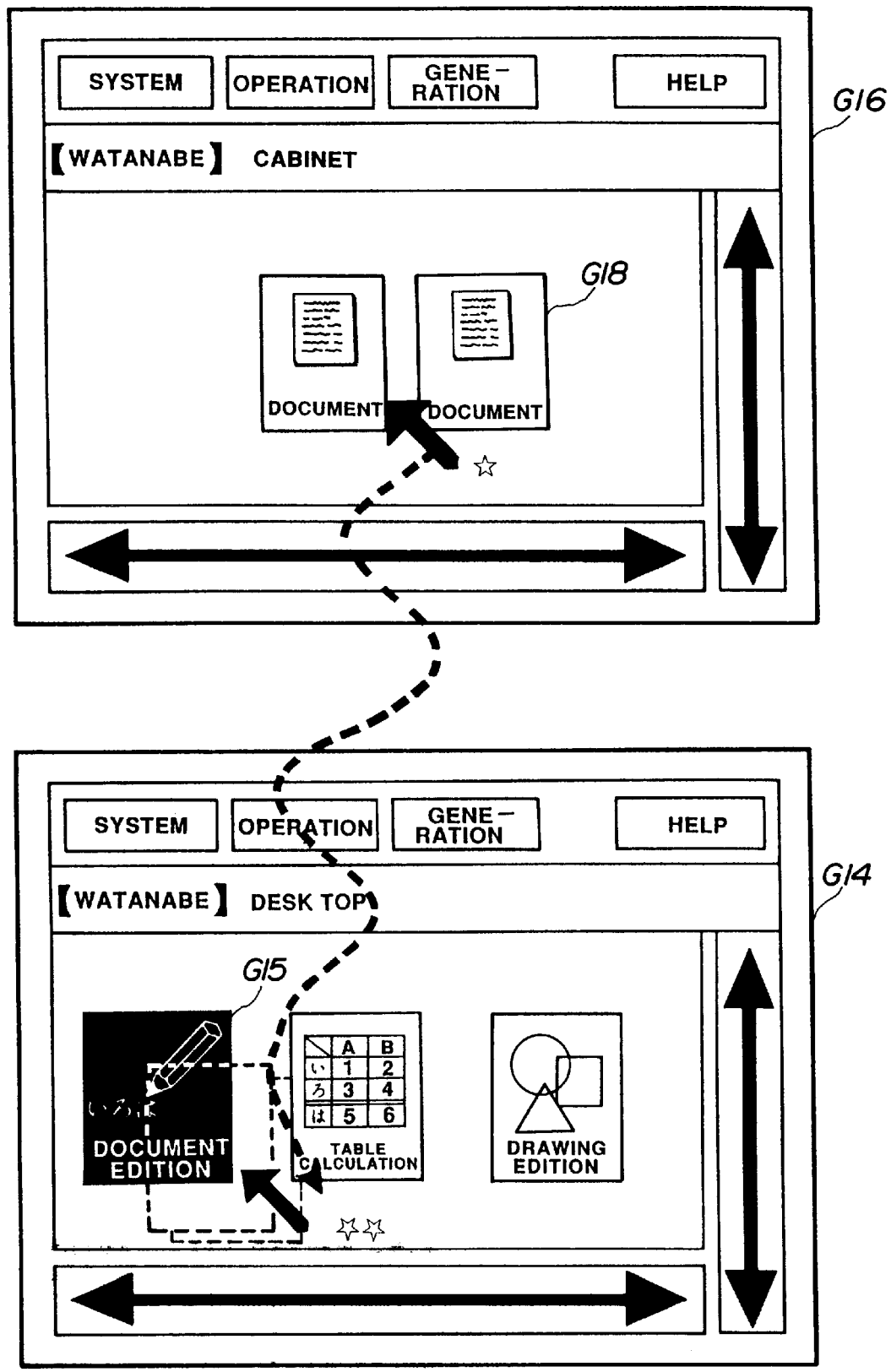
FIG. 38 is a diagram showing an example of the operation of dragging a data object from a cabinet to desktop.

(7) Start by dragging/dropping a plurality of data objects on an application object In FIG. 38, a plurality of data objects G18 within cabinet (binder) window G16 are dragged, and are dropped on application object G15 within desktop window G14. The format ID's 51 of the respective dragged data objects G18 are obtained in the same manner as in case (6). When the dragged data obejects G18 have been placed on application object G15 within desktop window G14, application information 60 is retrieved. If the format ID's of all the dragged data objects G18 are present in the application 26 indicated by the application object G15, the data can be processed. Then the user is notified that the application 26 can process the data 18 indicated by all the dragged data objects by changing the method of display, such as performing highlight display of the icon of the application object G15, or the like.

When the plurality of dragged data objects G18 have been dropped on the application object G15 subjected to highlight display, application information 60 is retrieved from the application ID 61 of the application indicated by the application object G15, and the format ID's 51 of the data 18 indicated by the data objects, the execution-module name 62 corresponding to the application ID 61 and the processing code of default processing 66 of the format ID's 51 are obtained, and the application 26 is started by providing the format ID's 51, the processing code and the file names 112 of the plurality of data 18.

Although not illustrated, contrary to the present embodiment, by dragging an application object, it is possible to connect a data object which can be processed by that application object with a line, to perform highlight display of the data object, or to perform display using reaction or attraction.

Although in the present embodiment, an application object is connected to a data object which can be processed by that application object with a line, the data object is subjected to highlight display, or display using reaction or attraction is performed, the same effect may, of course, be obtained by displaying data which can be processed differently from data which cannot be processed.

Disclosure Operation

Usually, other users are not permitted to refer to or update cabinet 16, binders 20 or data 18 within room 13 of a user. The operation that a user permits other users to refer to or update his own cabinet 16, binders 20 or data 18 is termed a "disclosure operation". Cabinet 16, binder 20 or data 18 to be subjected to a "disclosure operation" is termed open object 30. A description will now be provided of the processing for performing a "disclosure operation".

Figure 46:
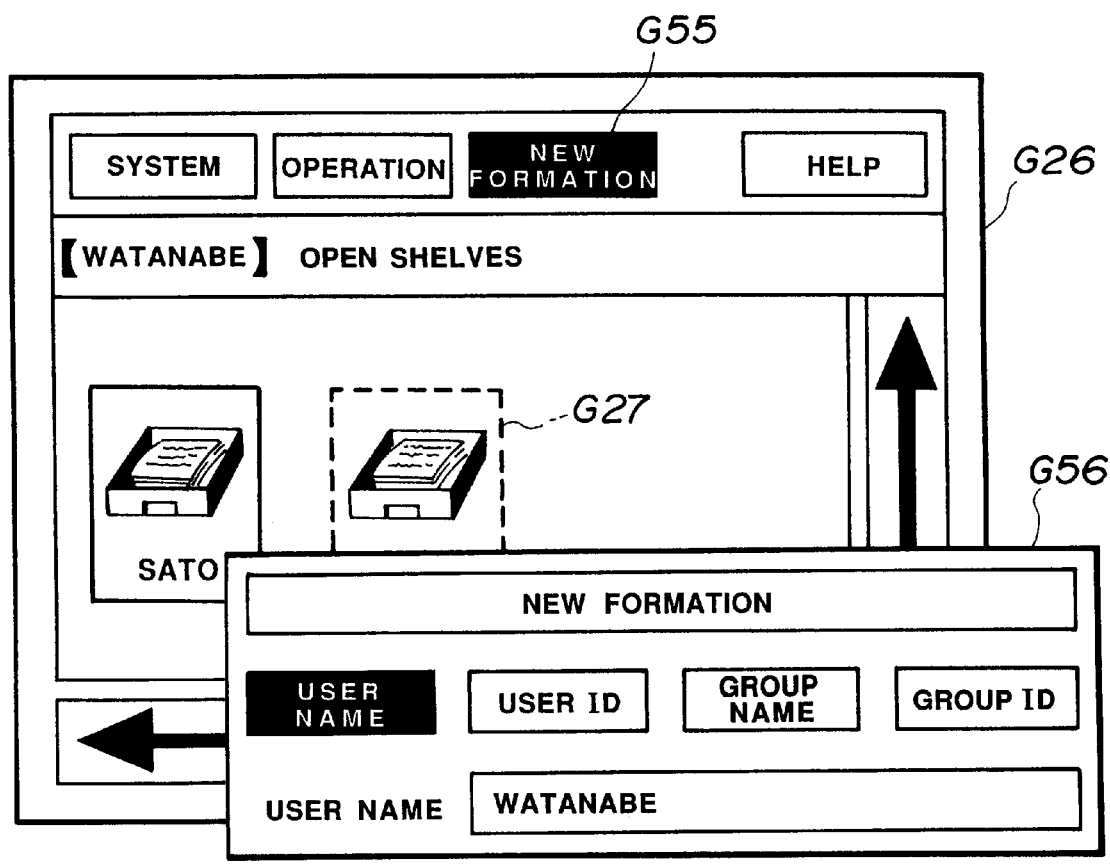
FIG. 46 is a diagram showing an example of the operation of forming an open tray.

First, open tray 29 is formed on open shelves 22 (FIG. 2) for each user or group which discloses data, as shown in FIG. 46. In FIG. 46, new-formation button G55 on open-shelf window G26 is selected, and the user name or the user ID 81, or the group name or the group ID 101 for which data are to be disclosed is input on inquiry input window G56. Then open-tray object G27 indicating new open tray 29 is formed and displayed on open-shelf window G26.

Subsequently, open-tray object G27 of the user or group which discloses data is opened, and open-tray window G28 is displayed. As in a copying operation of data 18 between binders 20, data object G18 or binder object G17 to be opened is dragged and dropped on open-tray window G28. According to this operation, the dropped open object G29 is displayed on open-tray window G28 to indicate that a disclosure operation has been performed. It is also possible to set limitation of a copying operation by other users for the opened object, or to set a deadline time limit of the disclosure operation.

Figure 47:
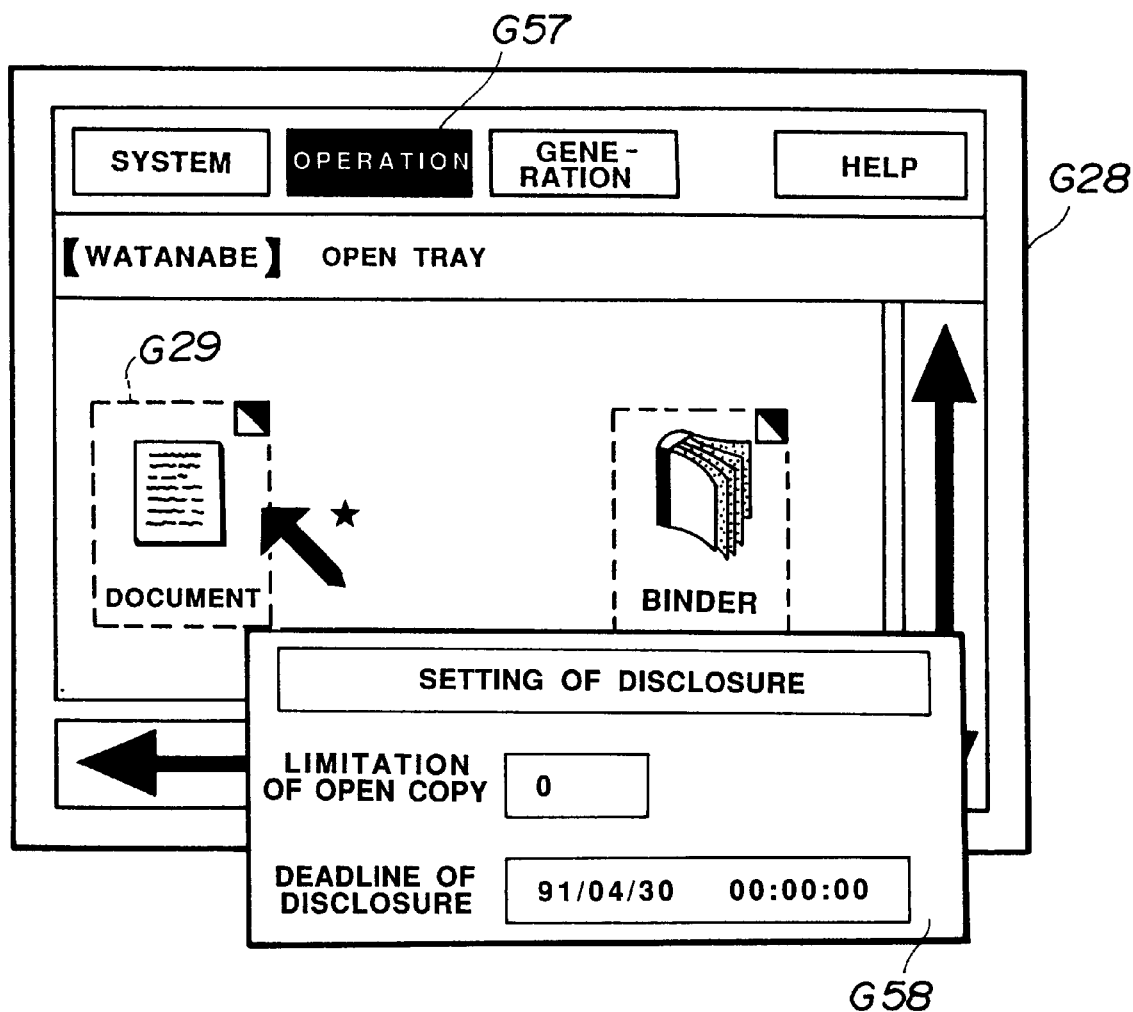
FIG. 47 is a diagram showing an example of the operation of setting a disclosure operation.
Figure 48:
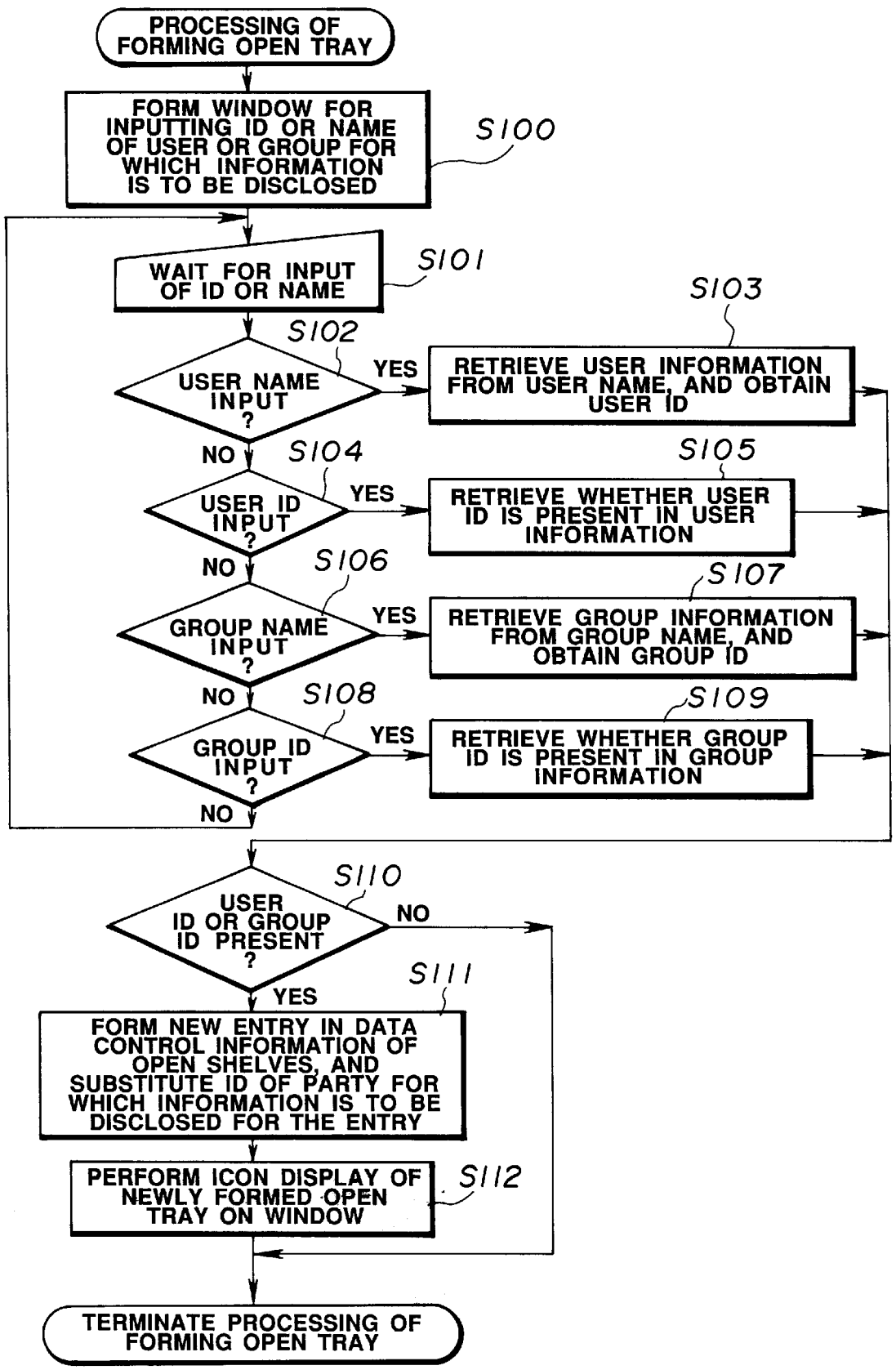
FIG. 48 is a flowchart of the processing of forming an open tray.

As shown in FIG. 47, such setting is completed by depressing operation button G57 on open-tray window G28 followed by performing a 1-click operation of open object G29 for which the setting must be performed to display inquiry input window G58, and inputting set items on the displayed inquiry input window G58. When the setting of the limitation of open copies and deadline of disclosure have been previously done, the set contents are displayed in the columns of set items when input window G58 is displayed. The processing of forming open tray 29 in the desktop control system will be described with reference to the flowchart of FIG. 48, and FIG. 46.

When new-formation button G55 on open-shelf window G26 has been selected, input window G56 for inputting a party which discloses data is formed in step S100. In step S101, an input from a user is awaited. When the user name has been input in step S102, user information 80 is retrieved and user ID 81 is obtained in step S103. When user ID 81 has been input in step S104, user information 80 is retrieved and whether the input user ID 81 is present is checked in step S105. When the group name has been input in step S106, group information 100 is retrieved and group ID 101 is obtained in step S107. When group ID 101 has been input in step S108, group information 100 is retrieved and whether the input group ID 101 is present is checked in step S109.

When user ID 81 or group ID 101 is present in step S110, in step S111, the entry of new open tray 29 is formed in object control information 110 of open shelves 22, and the previously obtained user ID 81 or group ID 101 is substituted for user ID 126 of a user for which data are to be disclosed or group ID 127 of a group for which data are to be disclosed. In step S112, the open-tray object G27 indicating the open tray 29 formed in step S112 is displayed within open-shelf window G26, and the process is terminated. If user ID 81 or group ID 101 cannot be obtained, the process is interrupted.

Figure 49:
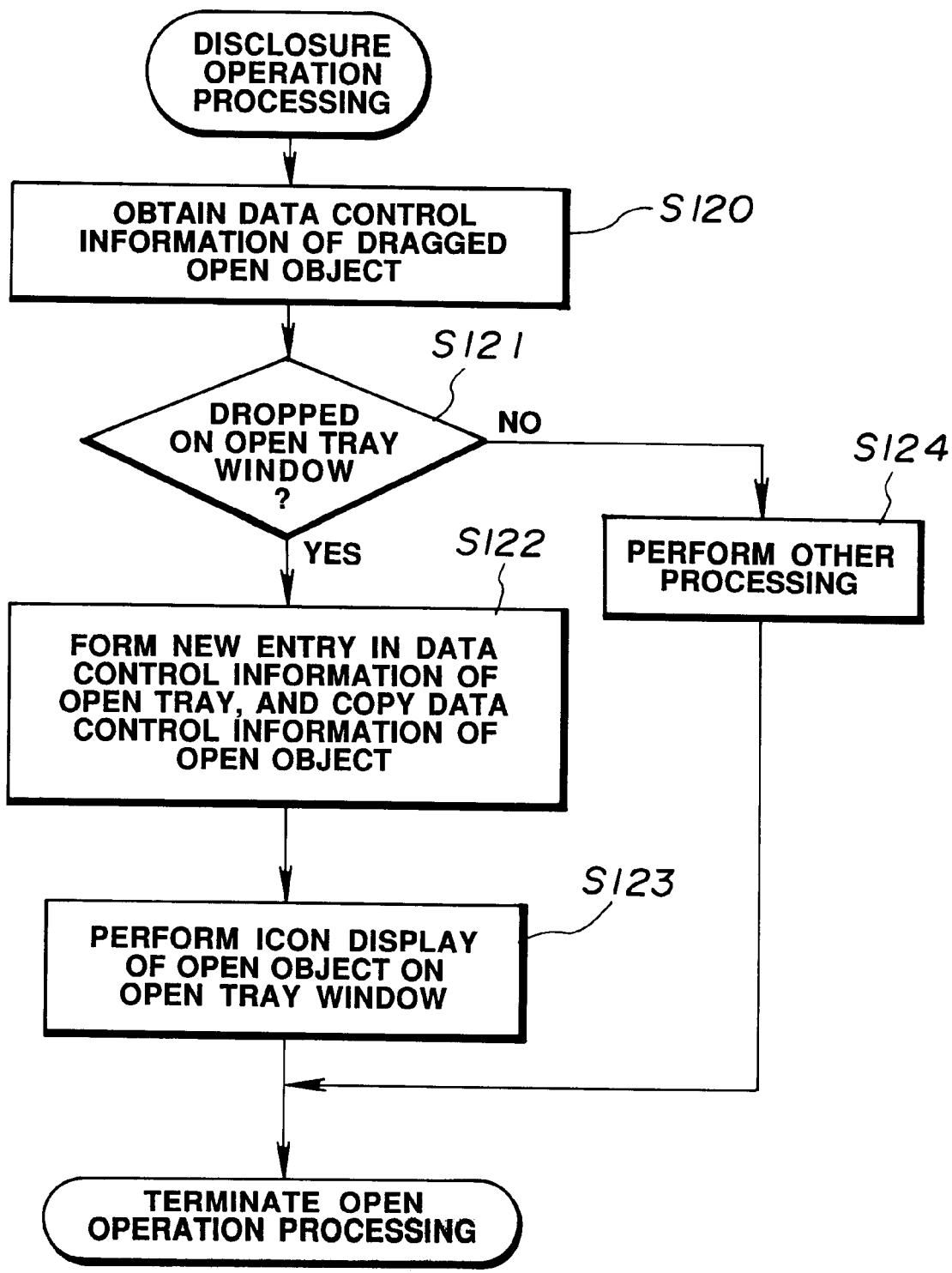
FIG. 49 is a flowchart of the processing of a disclosure operation.

Next, a description will be provided of a "disclosure operation" in the desktop control system with reference to the flowchart of FIG. 49, and FIG. 47.

When the object to be disclosed has been dragged, object control information 110 of the dragged object is obtained in step S120. When the dragged object has been dropped on open-tray window G28 in step S121, in step S122, the entry of new open object 30 is formed and the previously obtained object control information 110 is substituted for object control information 110 of the open tray 29 indicated by the open-tray window G28. In step S123, the dragged object is displayed on open-tray window G28 as open object G29, and the process is terminated.

Figure 50:
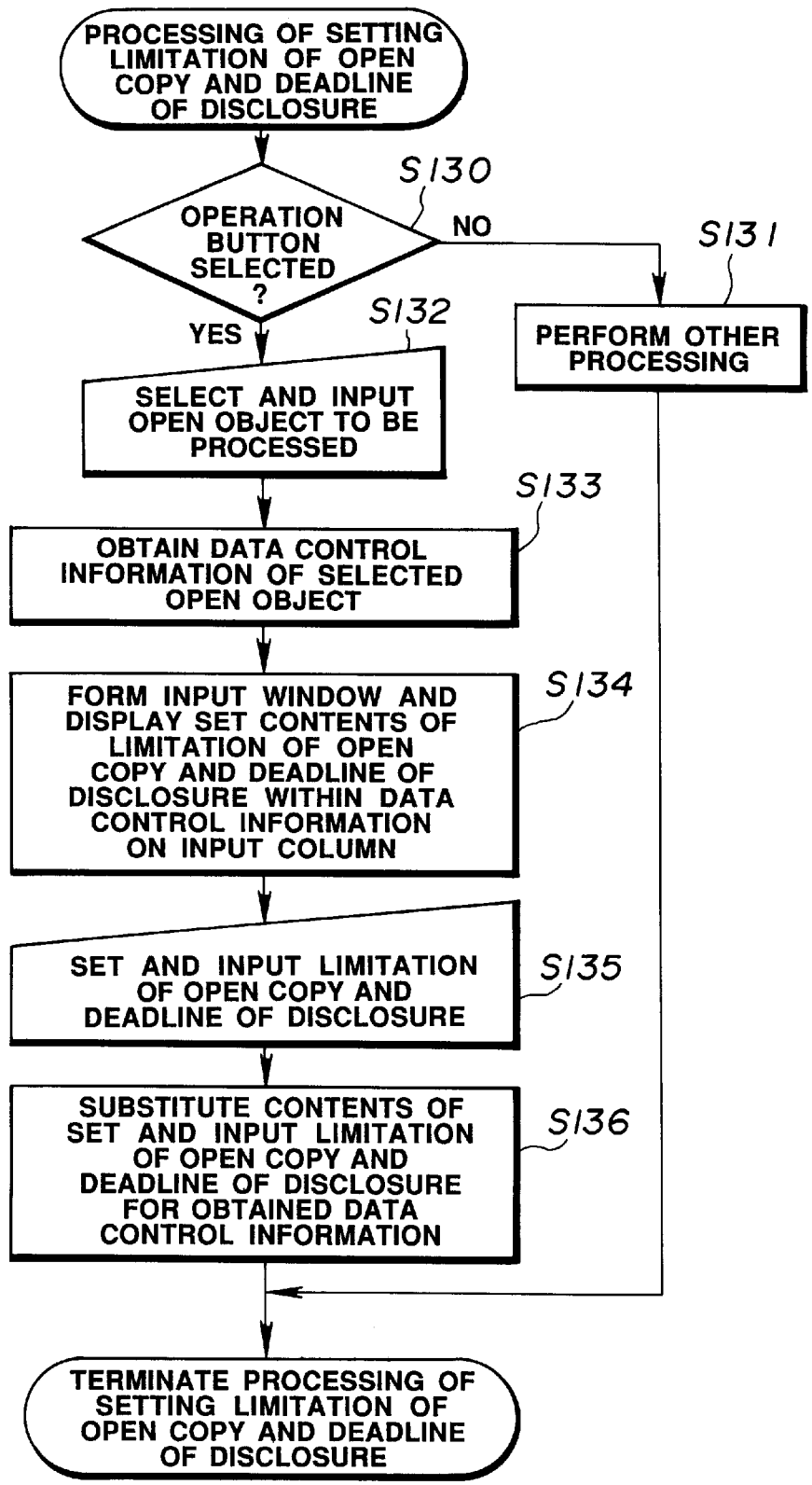
FIG. 50 is a flowchart of the processing of setting a disclosure operation.

Next, a description will be provided of the processing of setting limitation of open copy and the deadline of disclosure for open object 30 in the desktop control system with reference to FIG. 47 and the flowchart of FIG. 50.

First, when operation button G57 on open-tray window G28 has been selected in step S130, the selection and input of open object G29 is awaited in step S132. In step S133, object control information 110 of the selected open object G29 is obtained.

Next, in step S134, the inquired input window G28 is formed, and the contents of limitation of open copy 128 and the deadline of disclosure 129 are displayed on the input column using the previously obtained object control information 110. In step S135, an input is awaited. After setting and inputting the limitation of open copy and the deadline of disclosure, in step S136, the contents of the input limitation of open copy 128 and deadline of disclosure 129 are substituted for the previously obtained object control information 110, and the object control information 110 in which the setting has been completed is substituted for object control information 110 within open tray 29, and the process is terminated.

Access to Data of Other Users

The processing when a user accesses data of other user will be described with reference to FIG. 2.

First, when exit 25 within the user's own room 13 has been opened, doors 13 representing other users' rooms 13 within his own office 14, other offices 14, and library 17 controlled by his own office 14 are displayed. When one of the other offices 14 has been opened, doors 13 of users and library 17 of the opened office 14 are displayed again. When the door 31 of the desired user has been opened, the user of the opened room 13 performs a disclosure operation for himself, and an open object 30 is displayed. The same operation as for an operational object within the first user's own room 13 can be performed for this open object 30. However, if limitation of open copy is set for the open object 30, the operation of copying the contents of the open object 30 is prohibited. If the deadline of disclosure is set for the open object 30, open object 30 for which the deadline of disclosure has elapsed is not displayed on the window.

Figure 51:
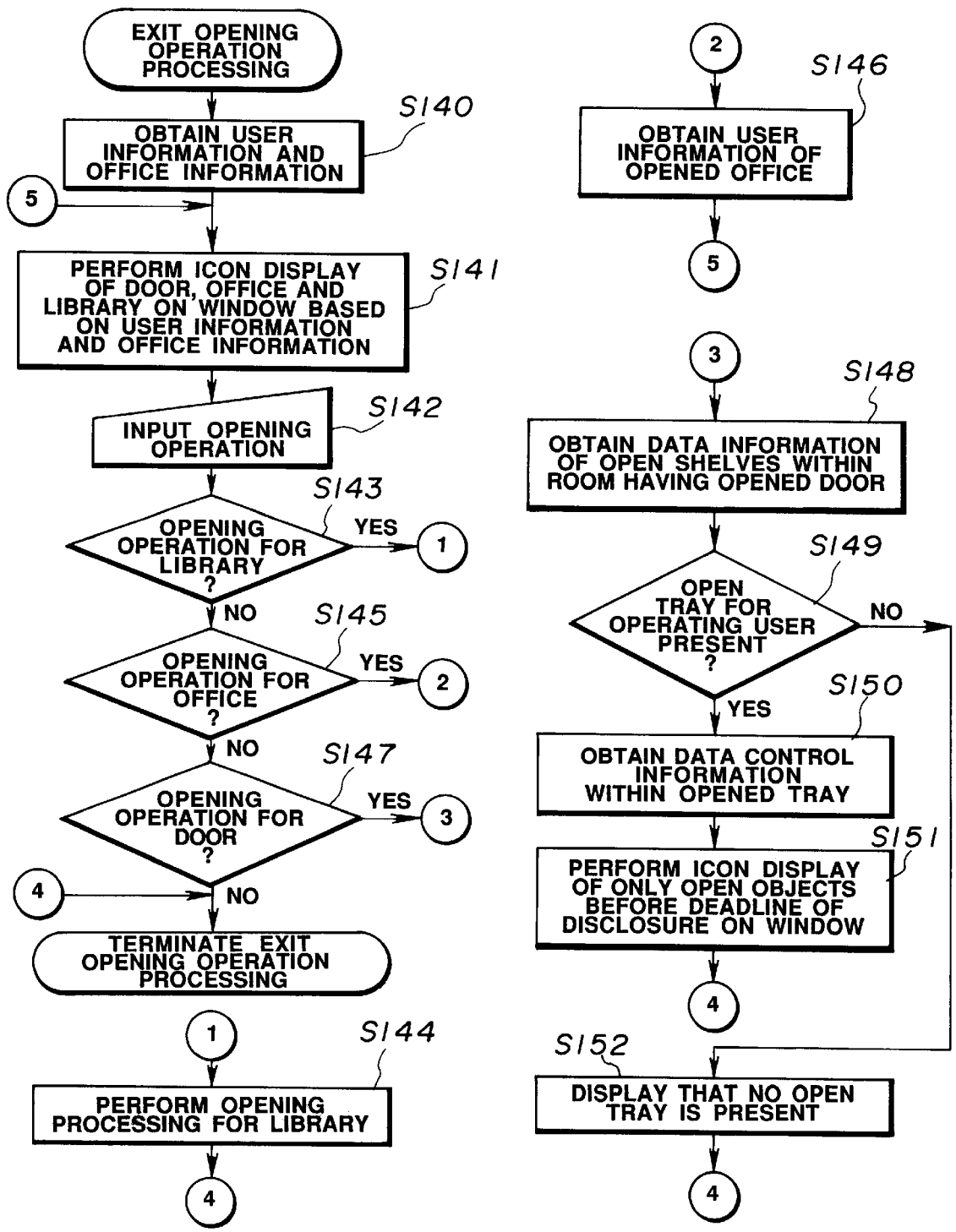
FIG. 51 is a flowchart of the processing of opening an exit.

The processing of opening exit 25 in the desktop control system will be described with reference to FIGS. 3, 11, 12 and 13, and the flowchart of FIG. 51.

When exit object G09 (FIG. 3) has been opened, exit window G30 (FIG. 11) is displayed. In step S140, the names of other users and offices 14 are obtained from user information 80 and office information 90, respectively. In step S141, door object G31 indicating door 31, office object G32 indicating office 14, and library object G33 indicating library 17 are displayed on exit window G30. In step S142, an input is awaited.

When it has been determined that an opening operation has been performed for library object G33 in step S143, the processing of opening library 17 (to be described later) is performed in step S144, and the process is terminated. When it has been determined that an opening operation has been performed for office object G32 in step S145, in step S146, host name 92 is obtained from office information 90, and user information 80 is obtained by requesting user information 80 to the opened host location, and the process returns to step S141, where door objects 30 of doors 31 indicating entry to the rooms of users included within that office are displayed on office window G35 shown in FIG. 12, and an input is awaited.

When it has been determined that an opening operation has been performed for door object G31 in step S147, object control information 110 of user open shelves 22 of the opened door 31 is obtained in step S148. In step S149, open trays 29 for the operating user are retrieved. If open tray 29 for the operating user is present, object control information 110 of that open tray 29 is obtained in step S150. In step S151, only open objects 30 for which the deadline of disclosure has not yet elapsed are displayed on room window G44 shown in FIG. 13. If open tray 29 is absent in step S149, the fact is displayed in step S125, and the process is terminated.

Tag

Tag 21 is an object with which, when operating binder 20 or data 18 belonging to a deep hierarchy, the target binder 20 or data 18 can be operated without performing a plurality of opening operations of binders 20 belonging to intermediate hierarchies.

A description will now be provided of the method of generating and processing tag 21.

Figure 52:
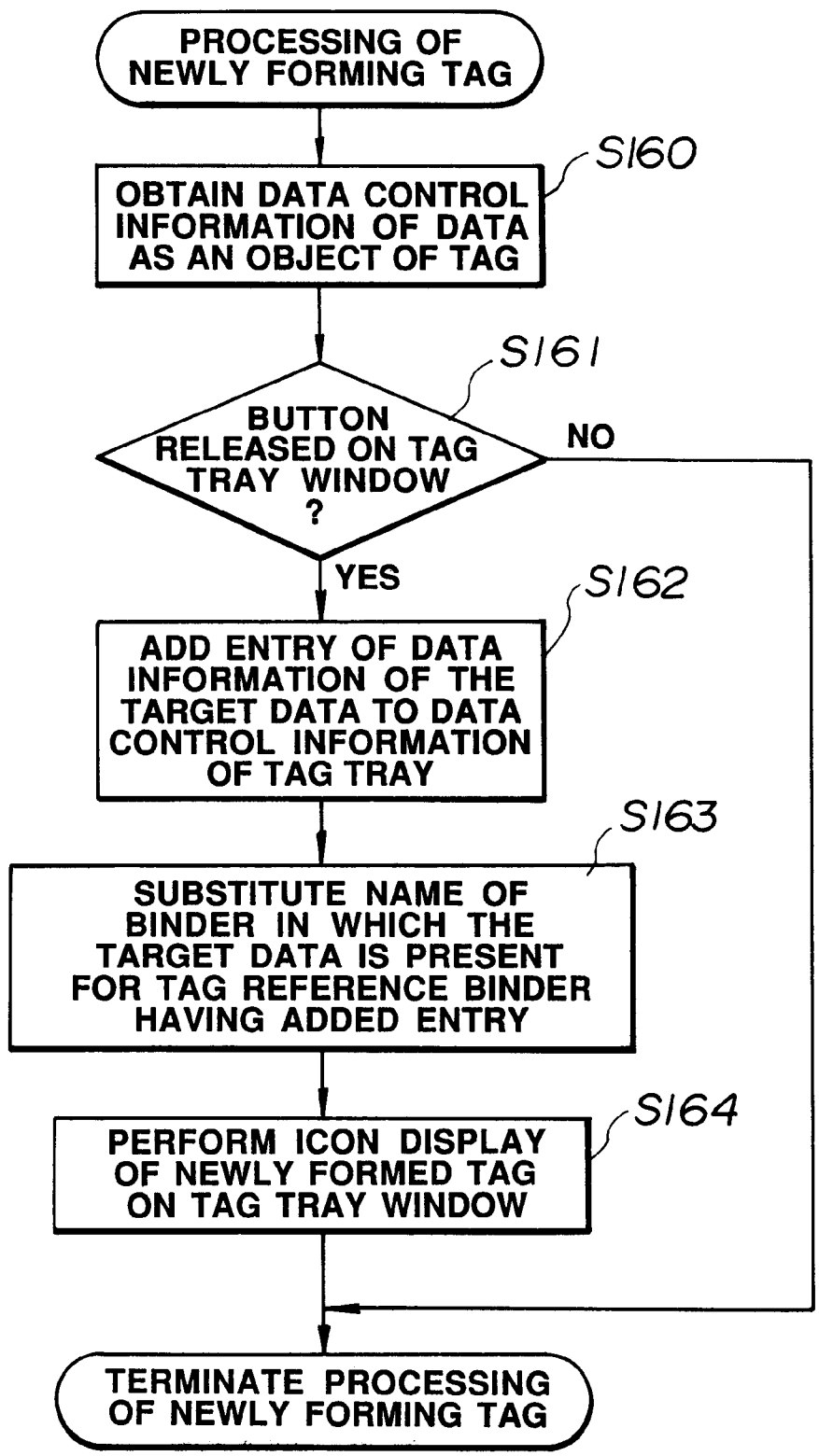
FIG. 52 is a flowchart of the processing of forming a tag.

When tag object G05 (FIG. 3) indicating tag tray 19 shown in FIG. 2 has been opened, tag-tray window G24 on which tag objects G25 are displayed is displayed, as shown in FIG. 8. The displayed tag objects G25 correspond to binder 20 and data 18 present under the "cabinet". The tag 21 indicated by the displayed tag object G25 is operated in the same manner as for the corresponding binder 20 or data 18. In a deleting operation, however, tag 21 itself is deleted, but the corresponding binder 20 or data 18 is not deleted. The method of newly forming tag 21 is completed by dragging binder object G17 of binder 20 or data object G18 of data 18 corresponding to the tag 21 to be formed and dropping the dragged object on tag-tray window G24, in the same manner as in the operation of copying data 18 between binders 20. According to this operation, tag object G25 which displays the icon data of the binder object G17 or data object G18 dragged on tag-tray window G24 is displayed to indicate that tag 21 has been newly formed. The processing of newly forming tag 21 will be described with reference to the flowchart of FIG. 52.

When binder object G17 or data object G18 has been dragged, in step S160, object control information 110 of binder 20 where binder 20 indicated by binder object G17 or data 18 indicated by data object G18 is present is obtained. When the button has been released on tag-tray window G24 in step S161, in step S162, the entry of the previously obtained object control information 110 is added to object control information 110 of the tag tray 19 indicated by the tag-tray window G24. In step S163, the name of binder 20 or binder 20 where data 18 is present is substituted for the name of tag reference binder 131 within object control information 110. In step S164, the formed tag object G25 is displayed on tag-tray window G24, and the process is terminated.

Figure 53:
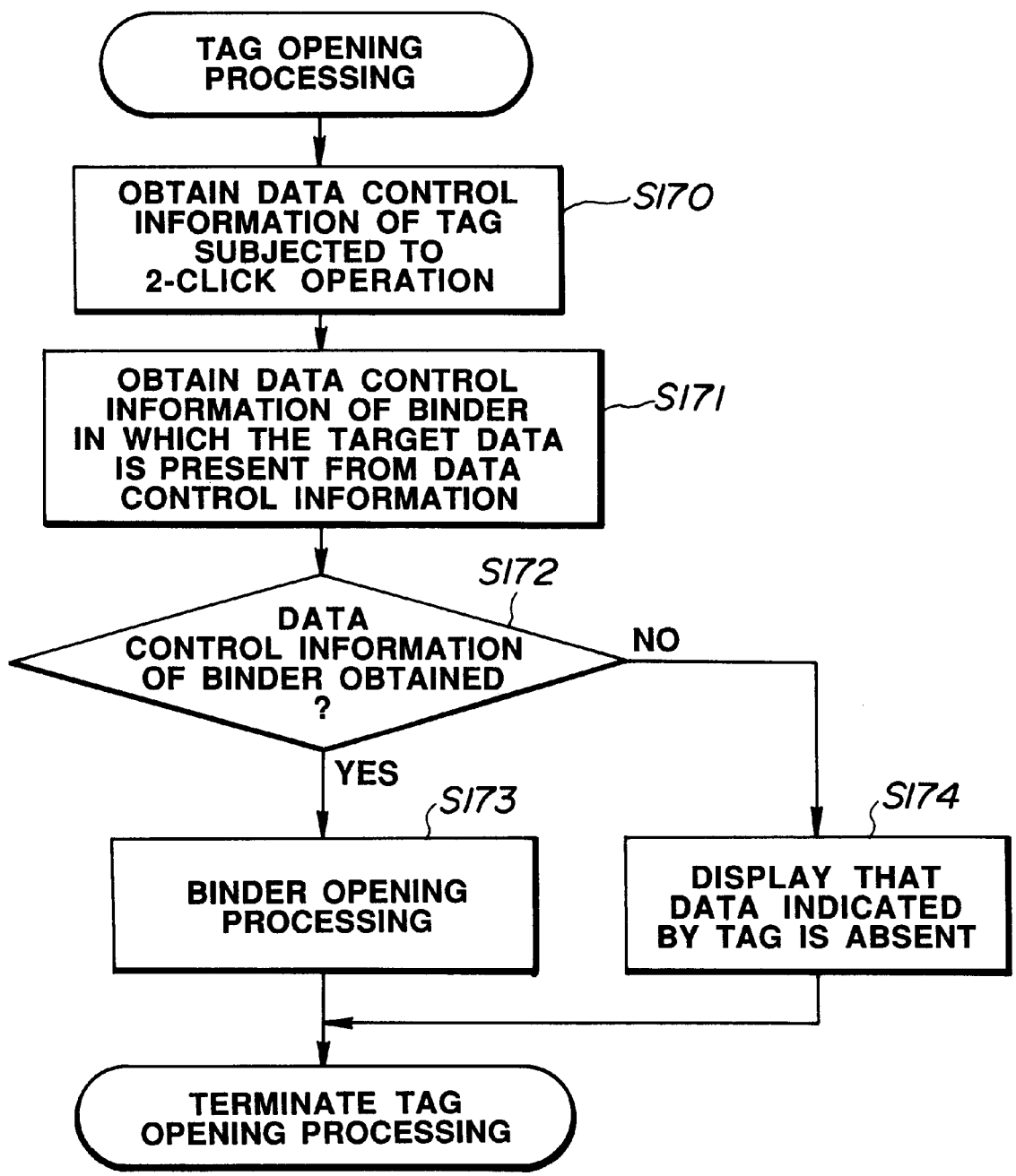
FIG. 53 is a flowchart of the processing of opening a tag.

Next, a description will be provided of the processing of opening tag object G25 with reference to the flowchart of FIG. 53.

When an opening operation has been performed for tag object G25, object control information 110 of the tag 21 indicated by the operated tag object G25 present within tag tray 19 is obtained in step S170. In step S171, the name of the binder 131 where the corresponding binder 20 or data 18 is present, and object control information 86 of the binder 20 or data 18 are obtained.

When the above-described object control information has been obtained in step S172, the same processing as the processing for binder 20 or data 18 is performed in step S173. If the object control information could be obtained in step S172, the fact that data or a binder indicated by the tag is absent is displayed, and the process is terminated.

Disposal of Data

Figure 54:
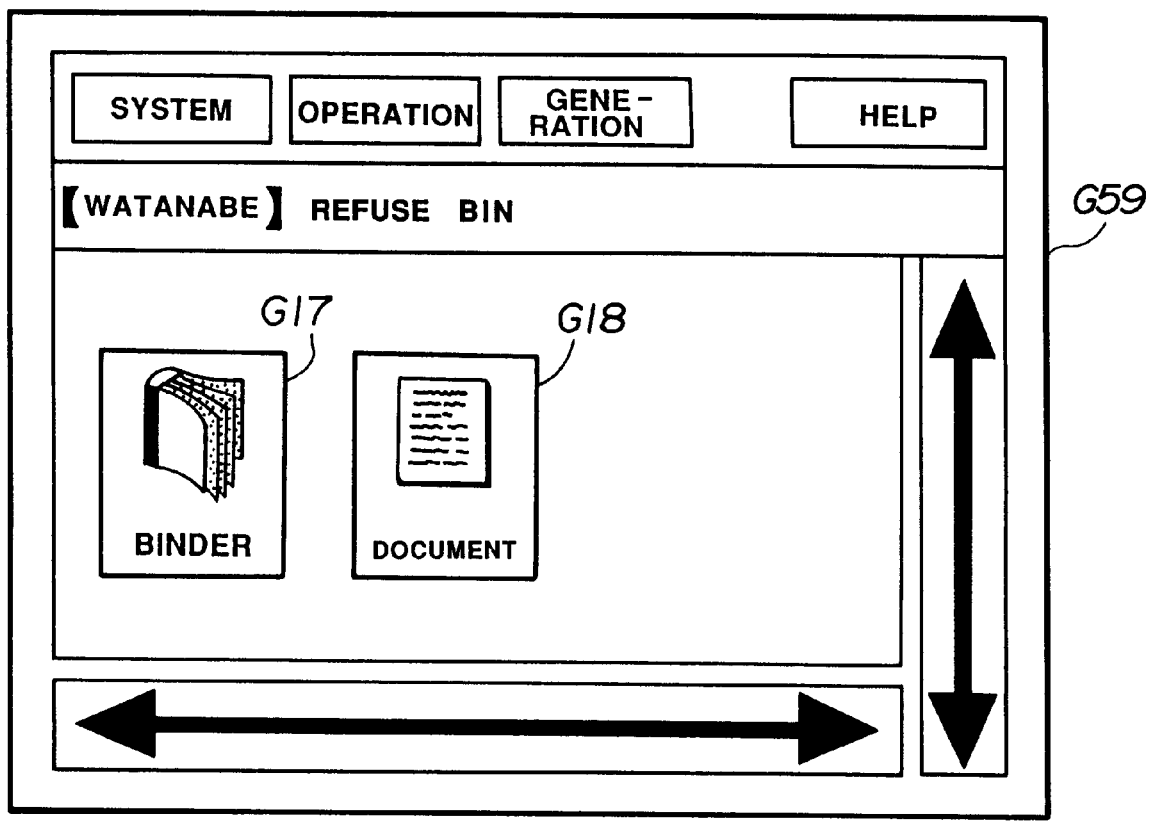
FIG. 54 is a diagram showing an example of the operation of disposing data.

In the processing of disposing of the formed binder 20 and data, as in the operation of copying data 18 between binders 20, by dropping binder object G17 of binder 20 and data object G18 of data 18 to be disposed within refuse-bin window G59 (FIG. 54) displayed by the operation of opening refuse-bin object G07 displayed on room window G01 shown in FIG. 3, binder object G17 and data object G18 move to the refuse-bin window. In the desktop control system, the process of monitoring data disposal is always operated, and the moved binder object G17 and binder 20 indicated thereby, and data object G18 and data 18 indicated thereby are erased after being preserved for a predetermined period.

Disposal of Data: 1

Figure 55:
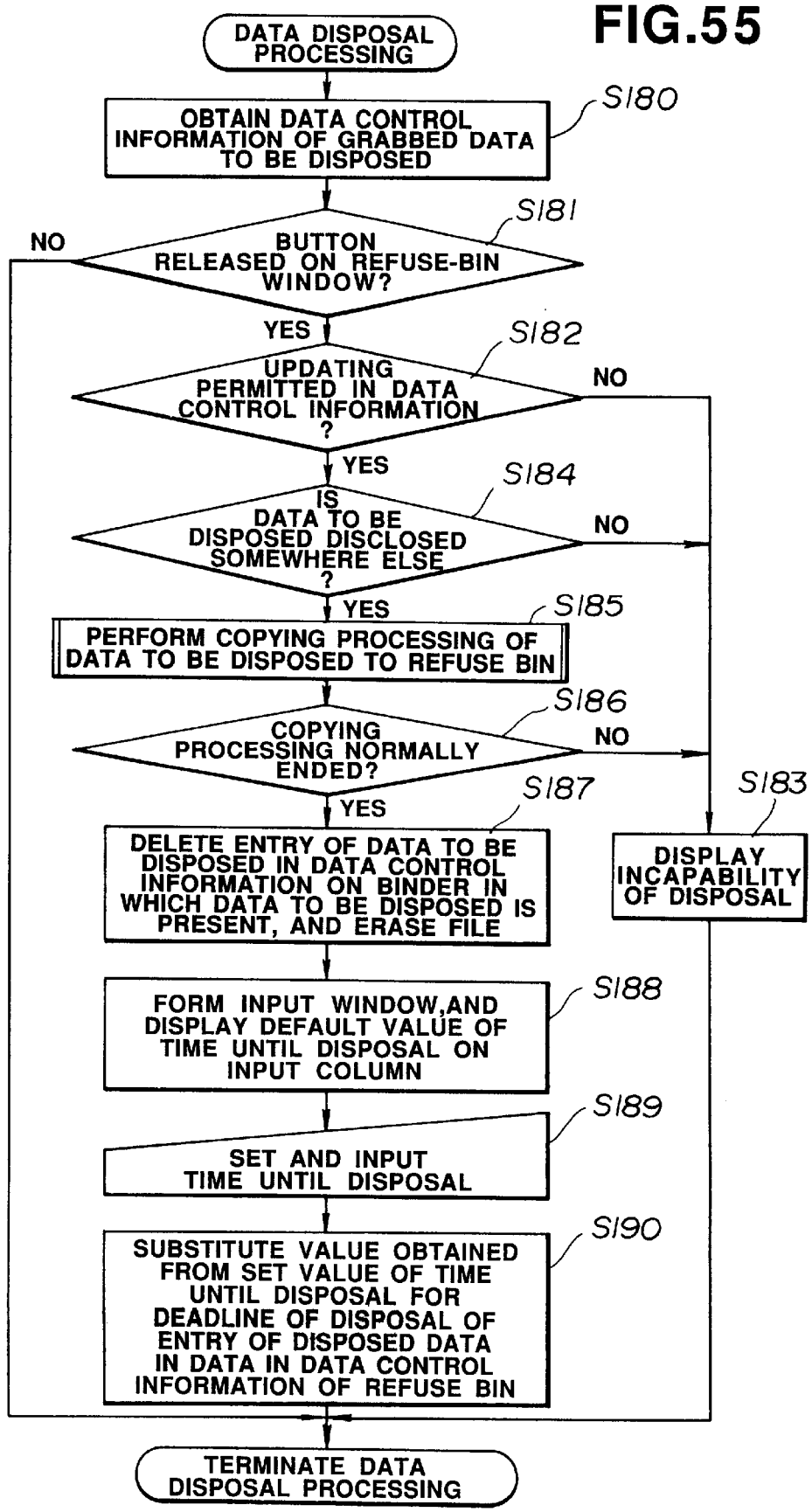
FIG. 55 is a flowchart of the processing of disposing data.
Figure 56:
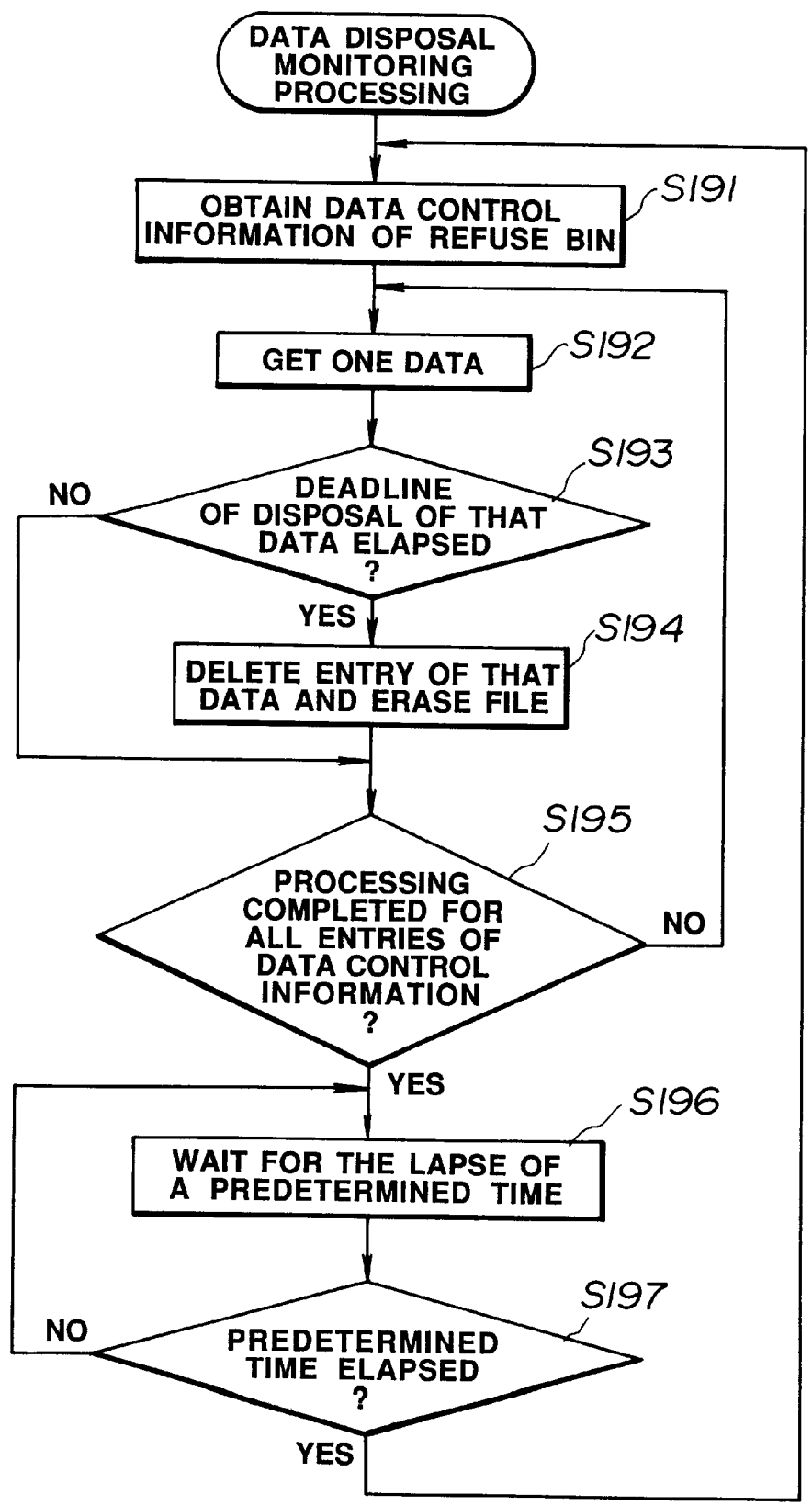
FIG. 56 is a flowchart of the processing of monitoring data disposal.
Figure 98:
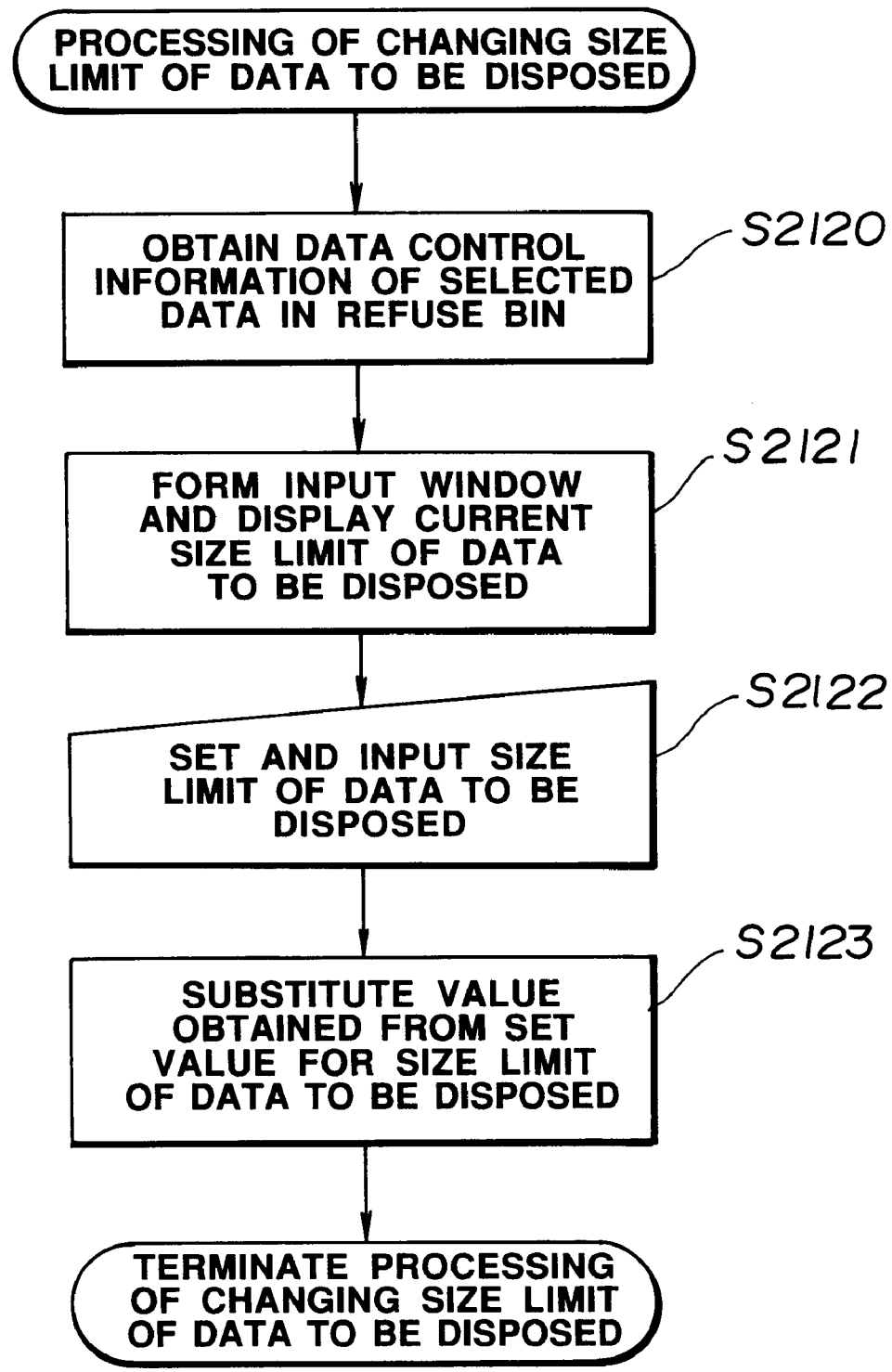
FIG. 98 is a flowchart showing the processing of changing the deadline of data disposal.

Next, a description will be provided of a case in which data is disposed with reference to FIGS. 55, 56 and 98. In the processing of disposing of the formed binder 20 or data 18, as in the operation of copying data between binders 20, by dropping the icon of binder 20 or data 18 to be disposed within the window of refuse bin 23, the icon of binder 20 or data 18 to be disposed is moved to the window of refuse bin 23. As shown in FIG. 56, in desktop 15, the process of monitoring data disposal is always operated, and the moved binder 20 or data 18 is erased after being preserved for a predetermined time period.

Such data disposal processing will be described with reference to FIG. 55. In step S180, data control information 110 of binder 20 in which data 18 is present is obtained when the icon of the data 18 has been grabbed. When the button has been released on the window of refuse bin 23 in step S181, the process proceeds to steps after step S182.

When the button has been released at a portion other than the window of refuse bin 23, the process is terminated. If prohibition of updating is set for the above-described data control information 110 in step S182, incapability of data disposal is displayed in step S183, and the process is terminated. If prohibition of updating is not set for the data control information 110 in step S182, open data control information is retrieved in step S184. Also when the data 18 is disclosed to any other party, incapability of data disposal is displayed, and the process is terminated. In other cases, the data 18 is copied to refuse bin 23 in step S185. When the copying processing has been normally completed, the process proceeds to steps after step S187. When the copying processing has not been normally completed, incapability of data disposal is displayed in step S183, and the process is terminated.

In step S187, the entry of the data 18 in data control information 68 of binder 20 in which the data 18 is present is deleted, and the file of the data 18 is erased. Next, in step S188, an input window is formed, and the default value of the time until data disposal is displayed on the input window. In step S189, the input of the set value of the time until data disposal is awaited. When the set value of the time until data disposal has been input, in the last step S190, the time obtained by adding the set value of the time until data disposal to the current time is substituted for the deadline of data disposal at the entry of the data 18 added to data control information 110 of refuse bin 23, and the process is terminated.

FIG. 98 illustrates the processing of changing the deadline of data disposal. In step S2120, data control information 110 of data 18 selected from refuse bin 23 is obtained. In step S2121, an input window is formed, and the scheduled deadline of data disposal and the default value of the time until data disposal obtained from data control information are displayed. If the set value of the time until data disposal has been input in step S2122, in step S2123, the time obtained by adding the set value of the time until data disposal to the current time is substituted for deadline of data disposal 130 at the entry of data control information 110 of refuse bin 23, and the process is terminated.

FIG. 56 illustrates the processing of monitoring data disposal. In step S191, data control information 110 of refuse bin 23 is obtained. In step S192, deadline of data disposal 130 for one data is taken out. In steps S193 and 194, the entry of the data is deleted and the file of the data is erased only when deadline of data disposal 130 has elapsed. In the loop of steps S192–S194, the deadline of data disposal for each data of refuse bin 23 is checked. When such processing has been completed for all entries of data control information 110 in step S195, in steps S196 and S197, the lapse of a predetermined time is awaited, and the process returns to step S191 after the lapse of the predetermined time, and the same processing is repeated.

According to the above-described embodiment, after setting and changing the time until disposal of data which can be disposed by the processing shown in FIGS. 55 and 98, the entry of each data for which the deadline of data disposal based on the set and changed time has elapsed is deleted and the file of the data is erased by the monitoring process shown in FIG. 56. Hence data which can be disposed is physically disposed when the deadline of disposal of each data arrives. As a result, it is possible to prevent wasteful occupation of data regions and the presence of data of low priority over a necessary time period, and thereby to efficiently utilize data preservation regions.

In the above-described embodiment, data is disposed by a monitoring process of data disposal in which disposal regions are periodically checked. However, in a system in which the process can be operated at an assigned time, such a function of the system may be used. Furthermore, the time of data disposal may be assigned as, for example, "data disposal at a certain hour and at a certain minute" in place of "data disposal after a certain hour and certain minute". In another approach, either one of the above-described assignments may be selected.

Data Disposal: 2

Figure 100:
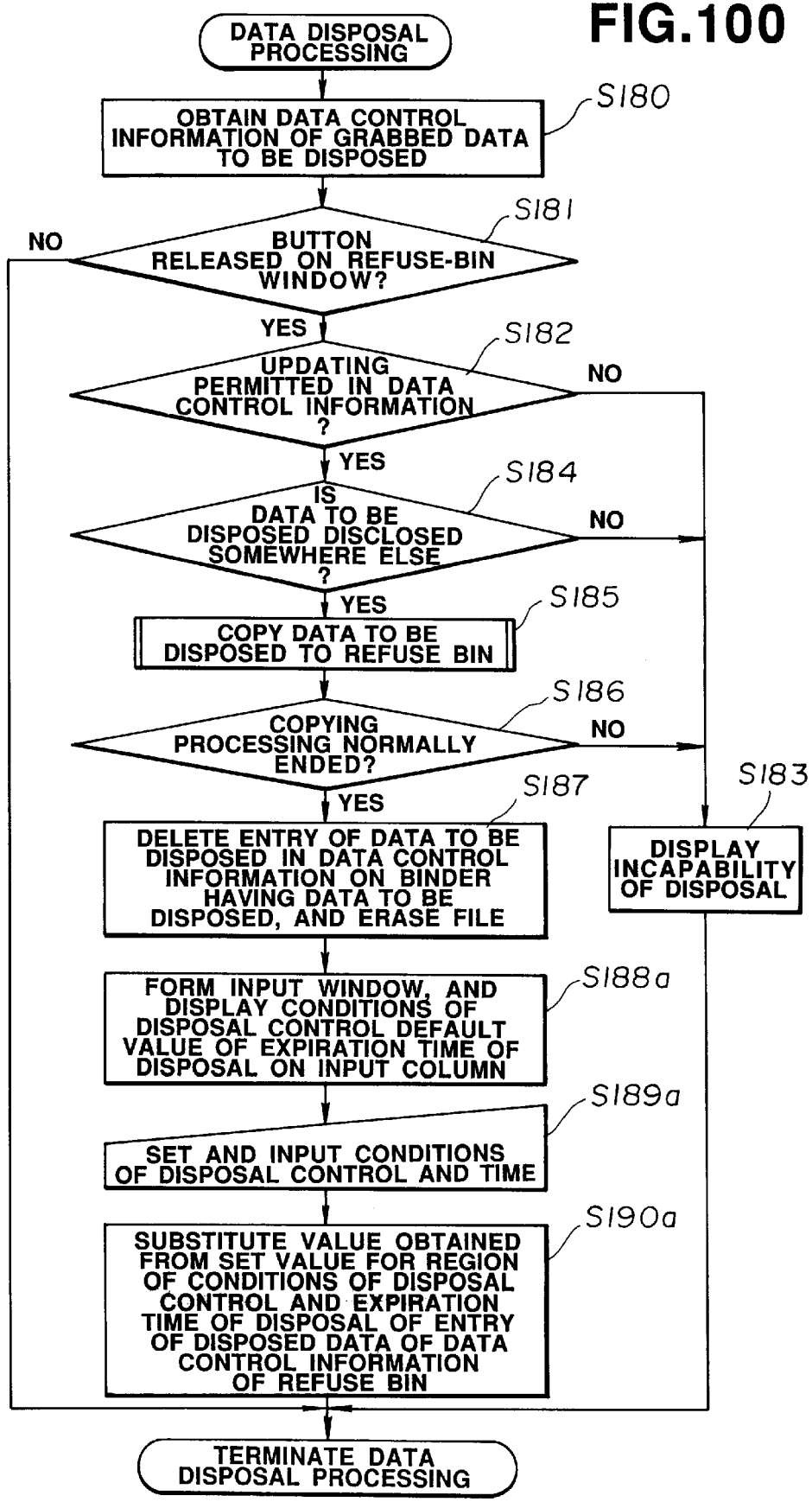
FIG. 100 is a flowchart illustrating data disposal processing in the second embodiment.
Figure 101:
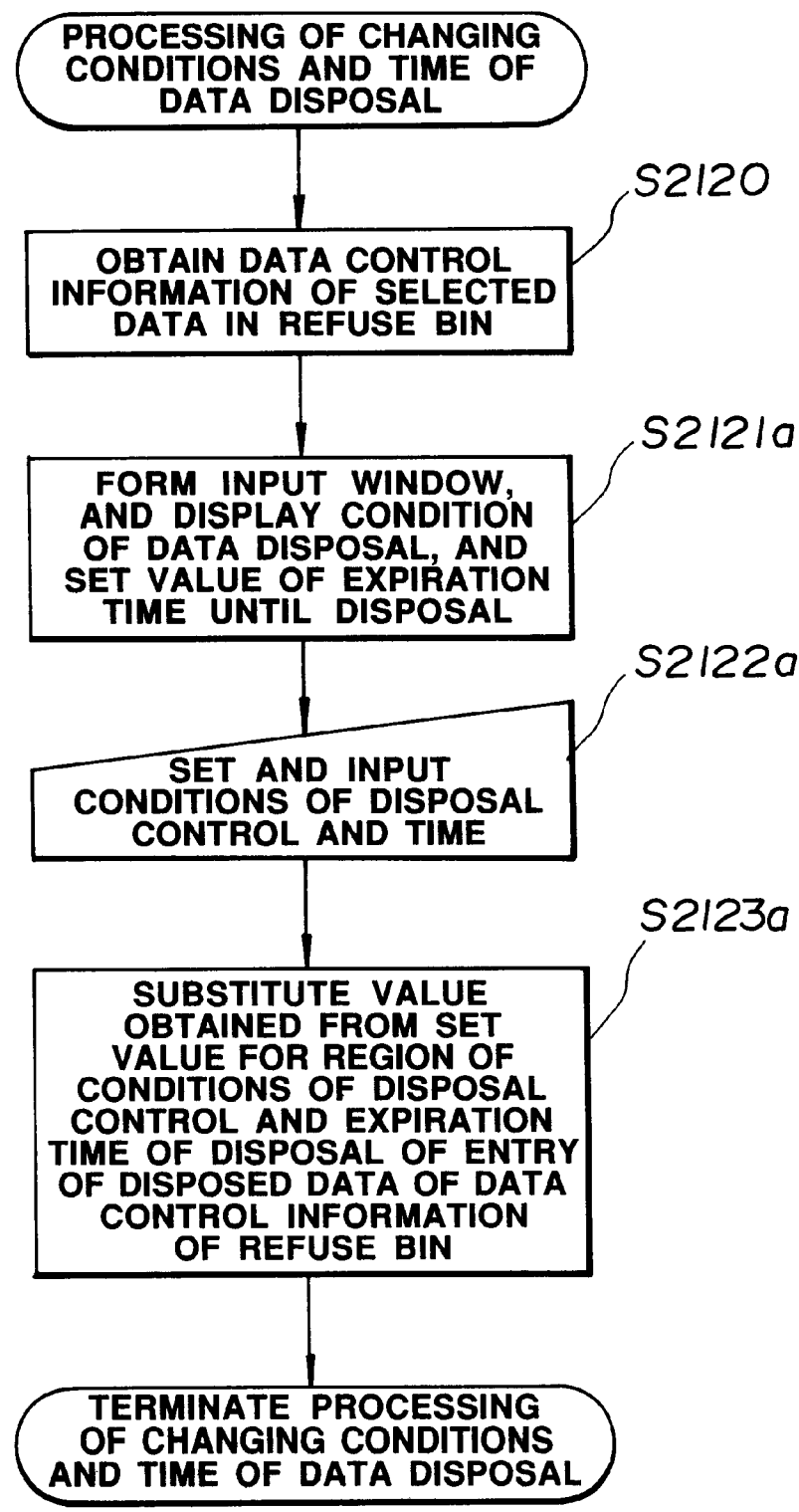
FIG. 101 is a flowchart illustrating the processing of changing the conditions and time of data disposal in the second embodiment.
Figure 102:
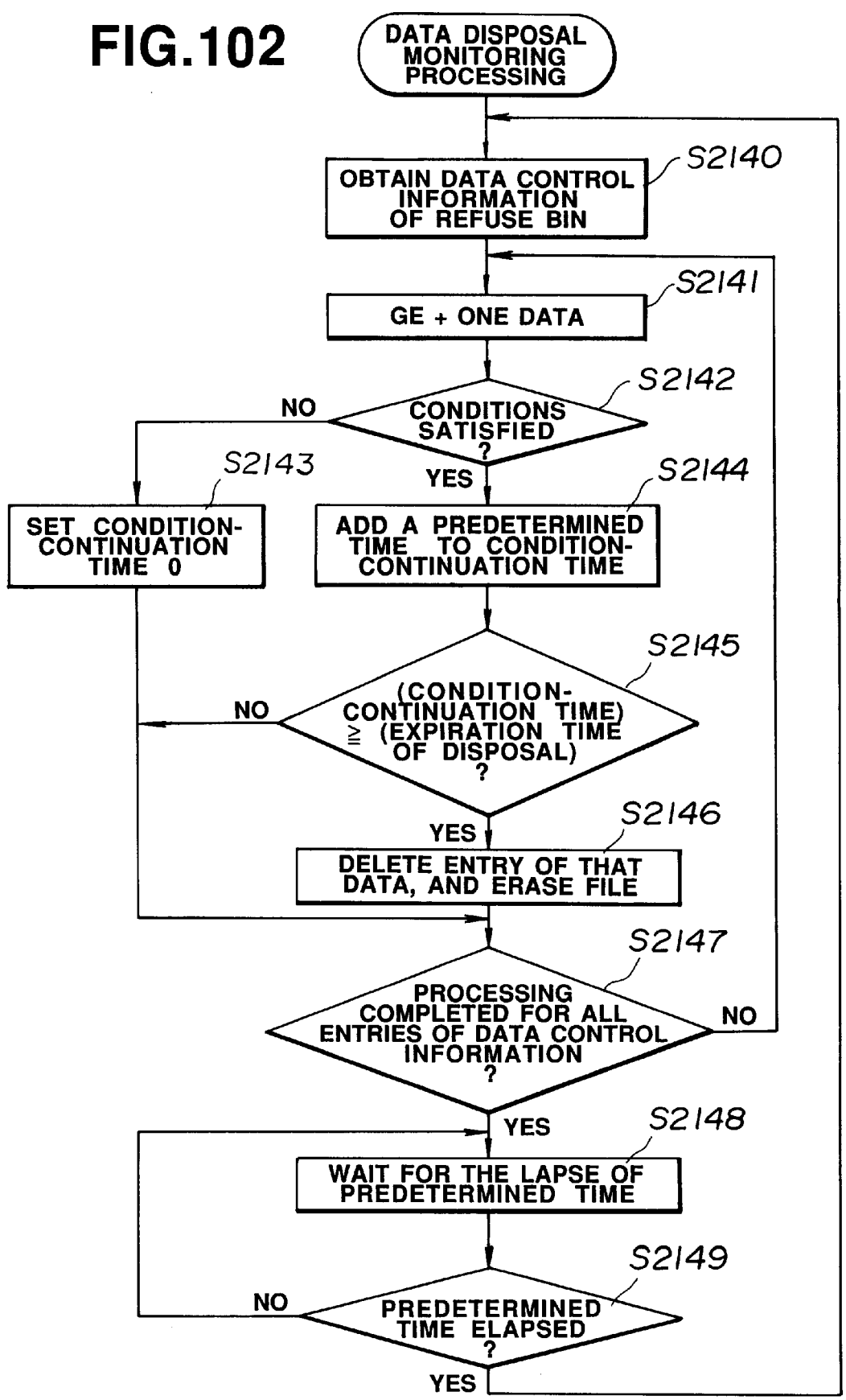
FIG. 102 is a flowchart illustrating the processing of monitoring data disposal in the second embodiment.

Next, a second embodiment of the present invention will be described with reference to FIGS. 99 through 102. FIG. 99 is a diagram illustrating data control information 110a in the second embodiment. FIG. 100 is a flowchart illustrating data disposal processing. FIG. 101 is a flowchart illustrating the processing of changing the conditions and the time of data disposal. FIG. 102 is a flowchart illustrating a data disposal monitoring process.

As shown in FIG. 99, data control information 110a of the present embodiment includes disposal control information 1300 in place of deadline of data disposal 130 (FIG. 20) in "disposal of data: 1". Disposal control information 1300 includes conditions (reference date) of disposal control 1301, expiration time of data disposal 1302, and time of continuation of conditions 1303. As described later, when conditions 1301 are continuously satisfied for expiration time of data disposal 1302, the data is disposed, and time of continuation of conditions 1303 is updated by the monitoring process when the conditions have been continuously satisfied until the present time.

The processing of FIG. 100 corresponds to the processing of FIG. 55 in the first embodiment. The processing of steps S180–S187 is the same as in the first embodiment. In steps S180–S187, data 18 to be disposed is copied to refuse bin 23, the entry of the data 18 in data control information 110 of binder 20 in which the data 18 is present is deleted, and the file of the data 18 is erased.

In the present embodiment, in step S188a, an input window is displayed, and the default values of disposal control conditions 1301 and expiration time of data disposal 1302 are displayed on the input column of the input window. In step S189a, the respective set values of disposal control conditions 1301 and expiration time of data disposal 1302 are input. In step S190a, the respective set values are substituted for disposal control conditions 1301 and expiration time of data disposal 1302 of the entry of data 18 added to data control information 110a of refuse bin 23, and "0" is substituted for time of continuation of conditions 1303.

The processing of FIG. 101 corresponds to the processing of FIG. 98 in the first embodiment. That is, in step S2120, data control information 110a of data 18 selected from refuse bin 23 is obtained. In step S2121a, an input window is formed, and disposal control conditions 1301 and expiration time of data disposal 1302 of the data 18 obtained from data control information 110a are displayed. In step S2122a, respective set values of disposal control conditions 1301 and expiration time of data disposal 1302 are input. In step S2123a, the respective set values are substituted for disposal control conditions 1301 and expiration time of data disposal 1302 of the entry of data control information 110a of refuse bin 23, and "0" is substituted for time of continuation of conditions 1303.

The processing of FIG. 102 corresponds to the monitoring processing of FIG. 56. In step S2140, data control information 110a of refuse bin 23 is obtained. In step S2141, disposal control conditions 1301 of one data are taken out. In step S2142, it is determined whether or not disposal control conditions 1301 of that data are satisfied. If the result of the determination is negative, the process branches to step S2143, where time of continuation of conditions 1303 is set to "0", and the process proceeds to step S2147.

If the result of the determination in step S2142 is affirmative, the process proceeds to step S2144, where a predetermined time is added to time of continuation of conditions 1303. If time of continuation of conditions 1303 equals at least expiration time of data disposal 1302 in step S2145, the entry of that data is deleted and the file of the data is erased in step S2146, and the process proceeds to step S2147. If time of continuation of conditions 1303 is less than expiration time of data disposal 1302 in step S2145, the process proceeds to step S2147 without performing the deletion and the like of the data. After performing such processing for all entries of the data control information in step S2147, in steps S2148 and S2149, the lapse of a predetermined time is awaited and the process returns to step S2140 after the lapse of the predetermined time, and the same processing is repeated.

Accordingly, also in the present embodiment, each data which can be disposed is physically disposed when the deadline of disposal for the data arrives. Hence, it is possible to prevent wasteful occupation of data regions and the presence of data of low priority over a necessary time period, and thereby to efficiently utilize data preservation regions.

Although in "disposal of data: 2", reference date is used as disposal control conditions 1301, various other conditions may be used, such as a predetermined time after reference or updating of data by a specific user, a predetermined time after no user who has disclosed data is present, a predetermined time after the lapse of the deadline of disclosure, and the like. Furthermore, time of continuation of conditions 1303 may be updated in any other process relating to the conditions in place of the disposal control process.

Disposal of Data: 3

Figure 104:
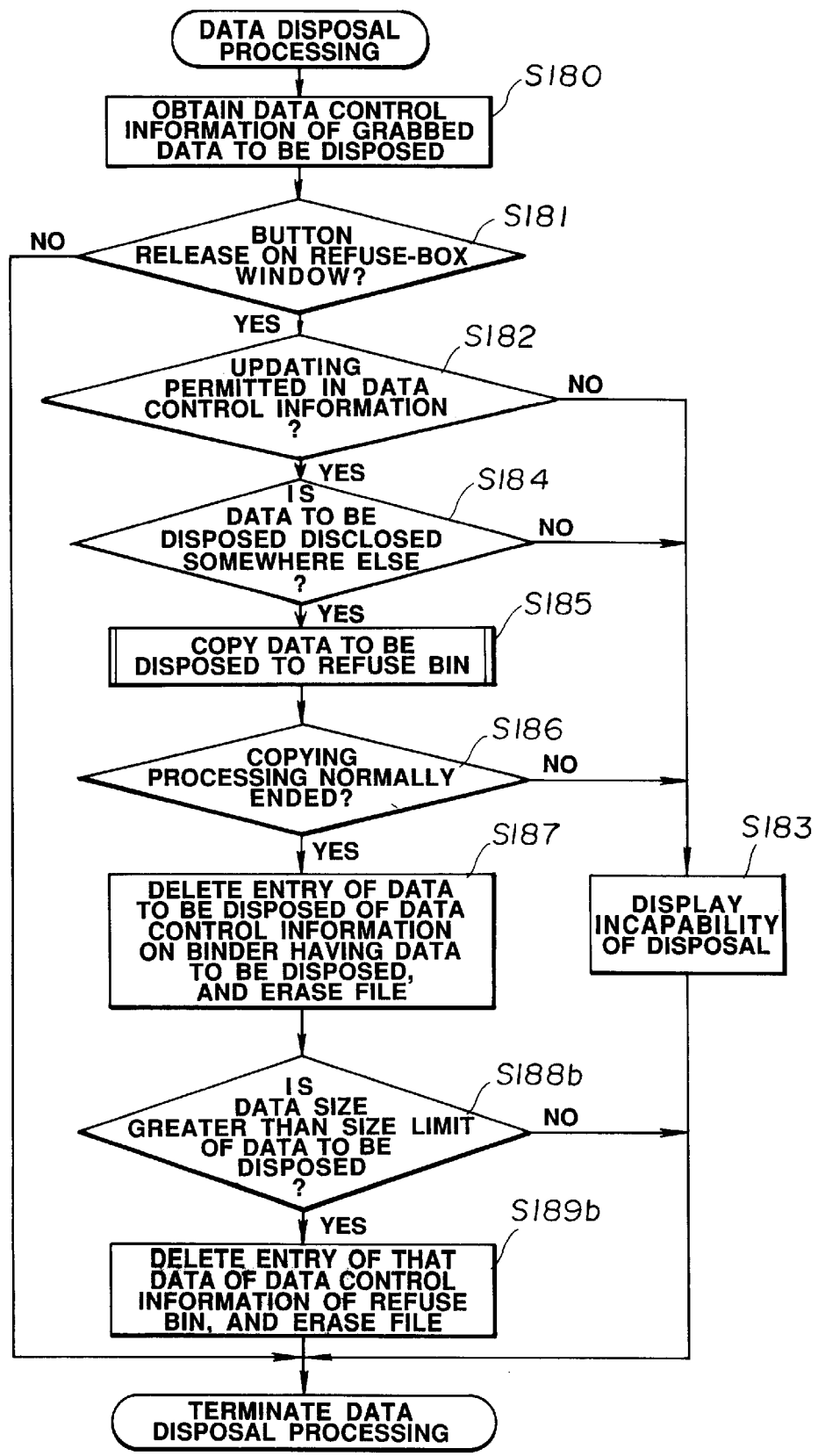
FIG. 104 is a flowchart illustrating data disposal processing in the third embodiment.
Figure 105:
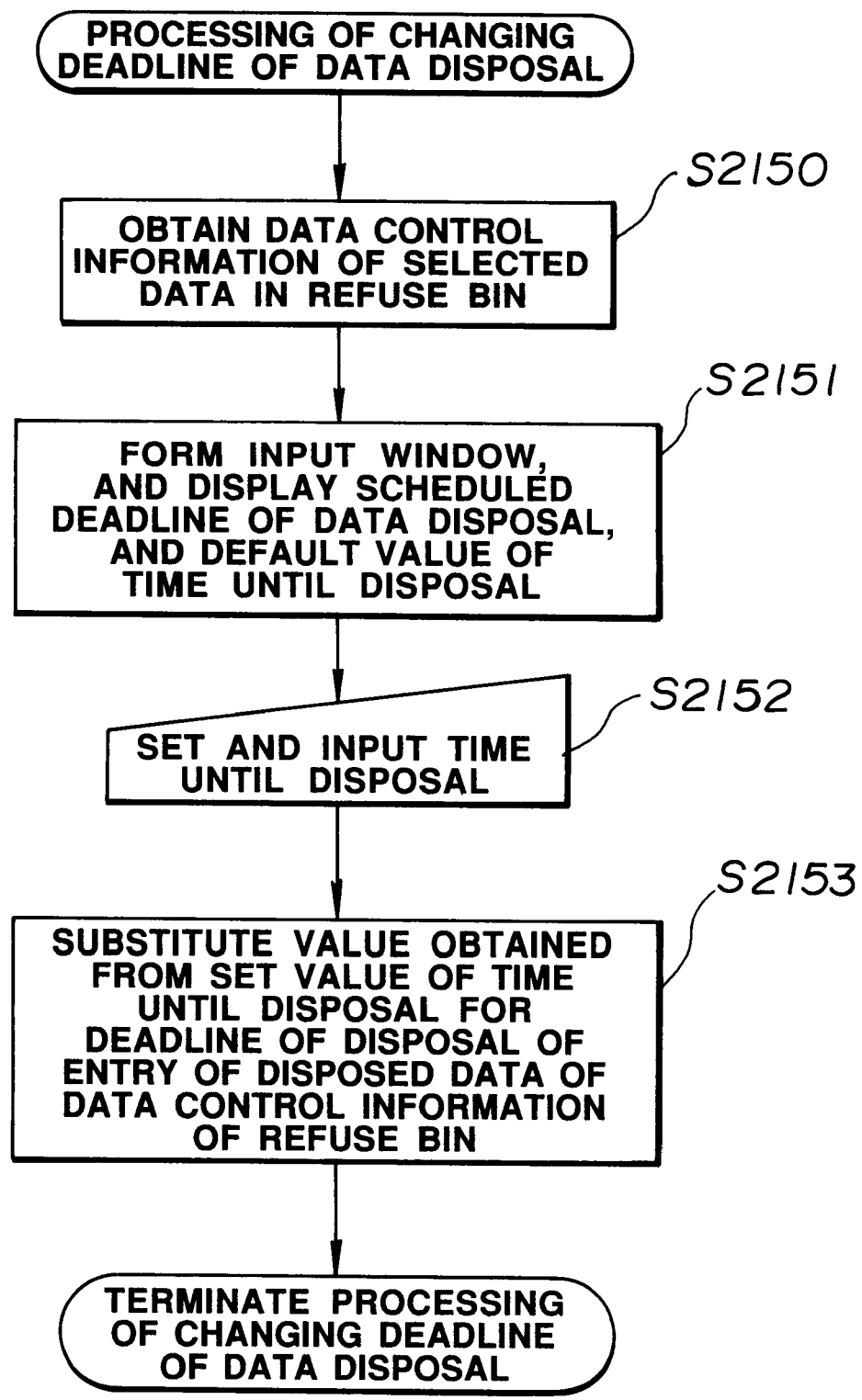
FIG. 105 is a flowchart illustrating the processing of changing the size limit of data to be disposed shown in FIG. 103.

Next, a description will be provided of "disposal of data: 3" according to a third embodiment of the present invention with reference to FIGS. 103 through 105. FIG. 103 is a diagram illustrating data control information 110*b* in the third embodiment. FIG. 104 is a flowchart illustrating data disposal processing. FIG. 105 is a flowchart illustrating the processing of changing the size limit of data to be disposed shown in FIG. 103. As shown in FIG. 103, in data control information 110*b* of the present embodiment, size of data to be disposed 130*a* is added to data control information 110 of the first embodiment. As described later, data having a size exceeding this size 130*a* is disposed without being preserved in refuse bin 23 irrespective of deadline of data disposal 130.

The processing of steps S180–S187 shown in FIG. 104 is the same as in the first embodiment. In steps S180–S187, data 18 to be disposed is copied to refuse bin 23, the entry of the data 18 in data control information 110 of binder 20 in which the data 18 is present is deleted, and the file of the data 18 is erased.

In the present embodiment, in steps S188*b* and S189*b*, when data size 116 of data control information 110*b* of refuse bin 23 exceeds the size of data to be disposed 130*a*, the entry of the data 18 in data control information 110 of refuse bin 23 is deleted, and the file of the data 18 is erased.

Although omitted in FIG. 104, the processing may be configured so that when the set value of the time until data disposal is input in step S99 in the first embodiment, in the last step S100, the time obtained by adding the set value of the time until data disposal to the current time is substituted for the deadline of data disposal of the entry of the data 18 added to data control information 110 of refuse bin 23.

In the processing of changing the size limit of data to be disposed shown in FIG. 105, in step S2150, data control information 110*b* of data 18 selected from refuse bin 23 is obtained. In step S2151, an input window is formed, and size of data to be disposed 130*a* obtained from data control information 110*b* is displayed. When size of data to be disposed 130*a* has been input in step S2152, in step S2153, the set value is substituted for size of data to be disposed 130*a* of data control information 110*b* of refuse bin 23, and the process is terminated.

Deadline of data disposal 130 can be changed by the processing of FIG. 98 in "disposal of data: 1", and data of refuse bin 23 less than size of data to be disposed 130*a* can be disposed by the processing of FIG. 56 in "disposal of data: 1". As a result, according to this "disposal of data: 3", data having a size of at least the set value is disposed immediately after being moved in disposal control. Hence, it is possible to prevent wasteful occupation of data regions, and thereby to efficiently utilize data preservation regions.

Although in "disposal of data: 3", size of data to be disposed 130*a* is set by a manual operation, the size may be automatically set. The automatic setting of the size can be performed, for example, by setting the size to 10% of the entire size of the disposal control region of refuse bin 23, or when the system is started. The size may also be set to 30% of the size of the current vacant region of the disposal control region. In such a case, since data to be disposed will be added to the disposal control region or actually disposed, the size of the current vacant region of the disposal control region changes, and therefore size of data to be disposed changes.

Furthermore, if size of data to be disposed 130*a* is set to a particular value, other processing may be performed. For example, if size of data to be disposed 130*a* is set to a minus value, data may not be physically disposed immediately after being moved to disposal control. Alternatively, if the size is set to "0", data may be always disposed after being moved to disposal control. If it is desired to restore data, the size may be set to a normal value.

Registration of a Floppy Disk

Figure 96:
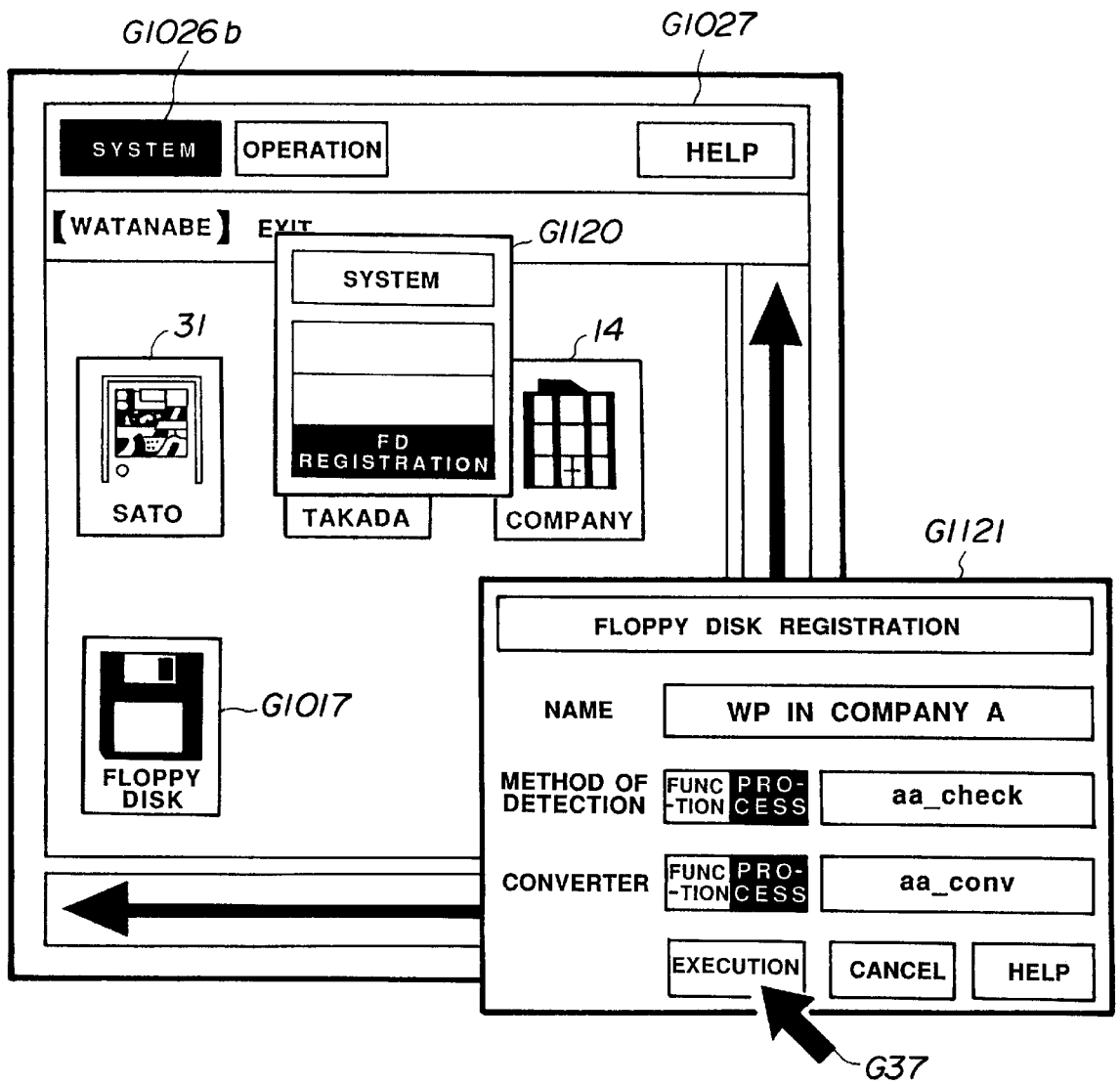
FIG. 96 is a diagram illustrating a picture frame when newly registering a floppy disk.
Figure 97:
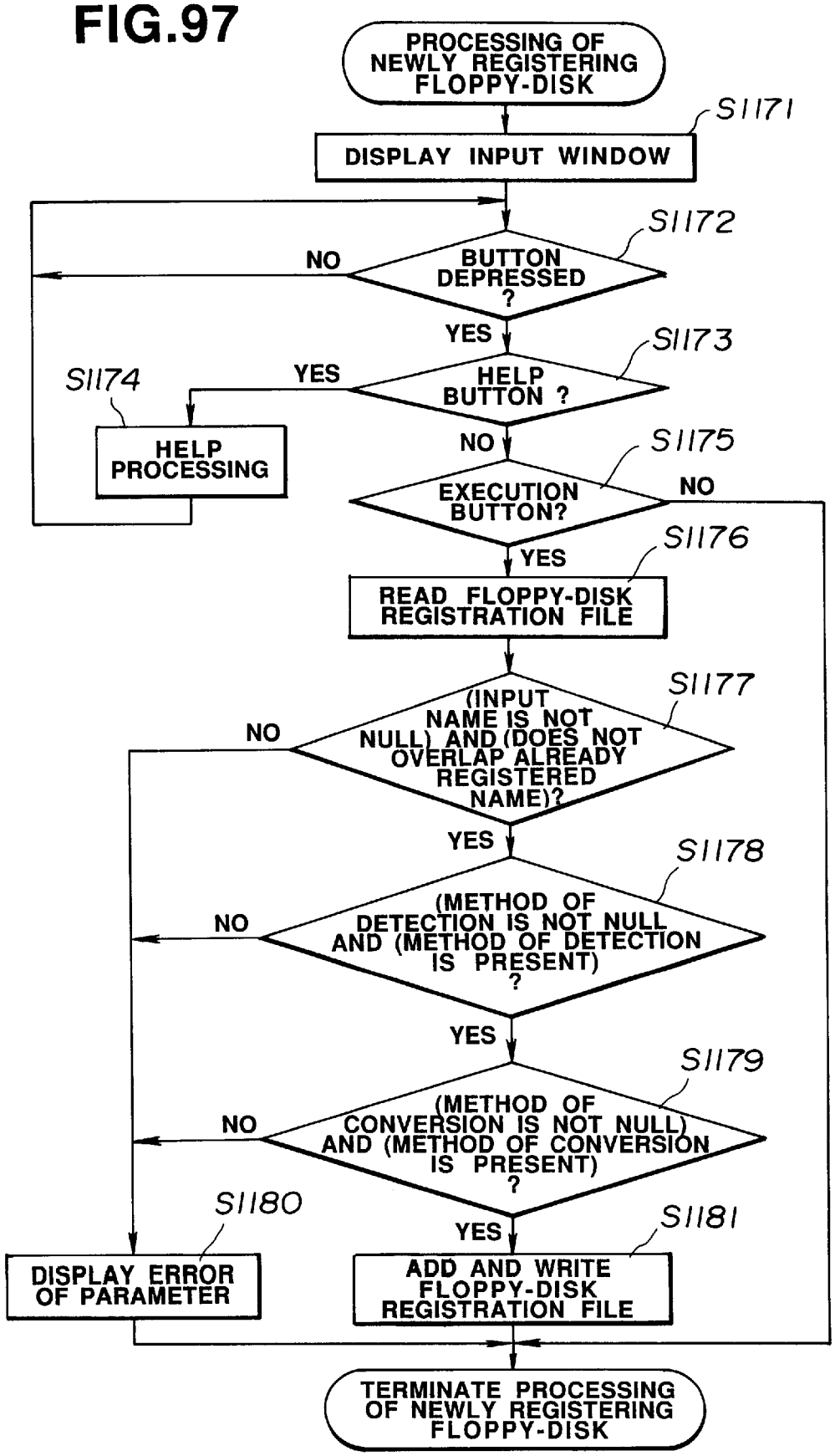
FIG. 97 is a flowchart showing newly registering processing in the picture frame shown in FIG. 96.

Next, a description will be provided of the operation when floppy disk 17 is registered, that is, when new floppy disk 17 is added to a floppy-disk registration file with reference to FIGS. 96 and 97. FIG. 96 illustrates the operational picture frame for the processing. FIG. 97 illustrates the processing. In FIG. 96, if operation button G1026*b* of the "system" is depressed, submenu G1120 is displayed. If the command of "FD registration" of submenu G1120 is selected, floppy-disk registration window G1121 is displayed.

In the state of displaying window G1121, if floppy-disk name 1101, method of detection 1102 and converter 1103 shown in FIG. 90 are input and cursor G37 is clicked on the "execution button" of window G1121, the input data are registered. As for method of detection 1102 and converter 1103, either one of the "function (function within desktop G14)" and the "process (a process different from desktop G14 is started)" is input and registered.

For further details, in step S1171 shown in FIG. 97, floppy-disk registration window G1121 is displayed. In step S1172, depression of the button is awaited. If the button has been depressed, in step S1173, it is determined whether or not the button is help button 27. If the result of the determination is affirmative, help processing is performed in step S1174, and the process returns to step S1172. When help button G1027 has not been depressed, but the execution button has been depressed, the process proceeds from step S1175 to steps after step S1176. When a button other than help button G1027 and the execution button has been depressed, the registration processing is terminated.

In step S1176, the floppy-disk registration file is read. When name 1101 has been input and the input name 1101 does not overlap any of already registered names in step S1177, and when method of detection 1102 has been input and the input method of detection 1102 is present in step S1178, and when converter 1103 has been input and the input converter 1103 is present in step S1179, respective input data are added and written in the floppy-disk registration file. When in steps S1177–S1179, each data has not yet been set, or the name of the disk overlaps, or the method of detection or the method of conversion is an unknown method which cannot be utilized, an error of the parameter is displayed in step S1150, and the regitration processing is terminated.

Library Control

Data controlled by a library correspond to auxiliary data to which an application program refers in common with other application in order to process data. Consider, for example, an application program for processing document data. Document data includes character data, and a command for shaping the corresponding document by the character data. Format data having information for shaping the document by interpreting the command, or font data for displaying the character data, serving as library data, is controlled as independent data. Thus, when an application program processes one document data, and displays the processed data on a CRT or prints the data, by switching, for example, font data, serving as library data used as auxiliary data, or format data, the style of the document can be easily changed without changing the document data. Even when one format data is commonly used for a plurality of document data, it becomes unnecessary to include format data within document data. Hence, it is possible to prevent an increase of document data. Such data in a state of being controlled by a library is grasped in the concept of library data 28.

Information for specifying necessary library data 28 is added to data 18. Necessary library data 28 is determined from application 26 and data 18 used by the application. Even when application 26 newly forms data 18, the existent library data can be utilized.

Next, a description will be provided of the control of a library with reference to the drawings.

As shown in FIG. 7, library data 28 indicated by library-data objects G23 which are displayed within library-binder window G22 have the same form of object control information 110 as data 18 controlled under cabinet 16. These data can also be controlled under cabinet 16 as ordinary data 18. In the desktop control system, when data 18 controlled under cabinet 16 is also controlled as library data 28, only the name (provided by the user) of the library data may be held, and the corresponding data 18 under cabinet 16 may be referred to using the name when library data 28 becomes necessary.

As shown in FIGS. 3 and 11, library 17 controlled by the desktop control system comprises a library displayed within room window G01 of the user, and a library displayed within exit window G30. The library indicated by library object G33 displayed on exit window G30 is a library which belongs to office 14 to which room 13 belongs. The library indicated by library object G04 displayed within room window G01 of the user is a library which belongs to that room 13. Thus, library 17 is classified into the following two types according to the form of control thereof.

(1) Library 17 which belongs to room 13

This is library 17 for an individual registered as an object of room 13. Its effective range corresponds to one user. By arranging so as to be accessible from other users by performing the same processing as the above-described disclosure operation of data 18, the effective range of library 17 can correspond to a set of a plurality of arbitrarily assigned users.

(2) Library 17 which belongs to office 14

This is library 17 registered as an object of office 14, and is accessible only from users of rooms 13 included within that office 17. Its effective range corresponds to a set of a plurality of users permanently assigned by the system. The effective range of library 17 can correspond to all users by performing the above-described disclosure operation.

Library 17 controls library binder 27 for each library information 70 (library data 28) shown in FIG. 16. When library 17 is opened, library window G19 is displayed as shown in FIG. 6. One library binder 27 stores only library data 28 having the same format ID 51. Library ID 71 which library binder 27 has as its attribute is the same as library ID 54 of data information 50 of the stored library data 30.

Formation of a Library Binder

Figure 57:
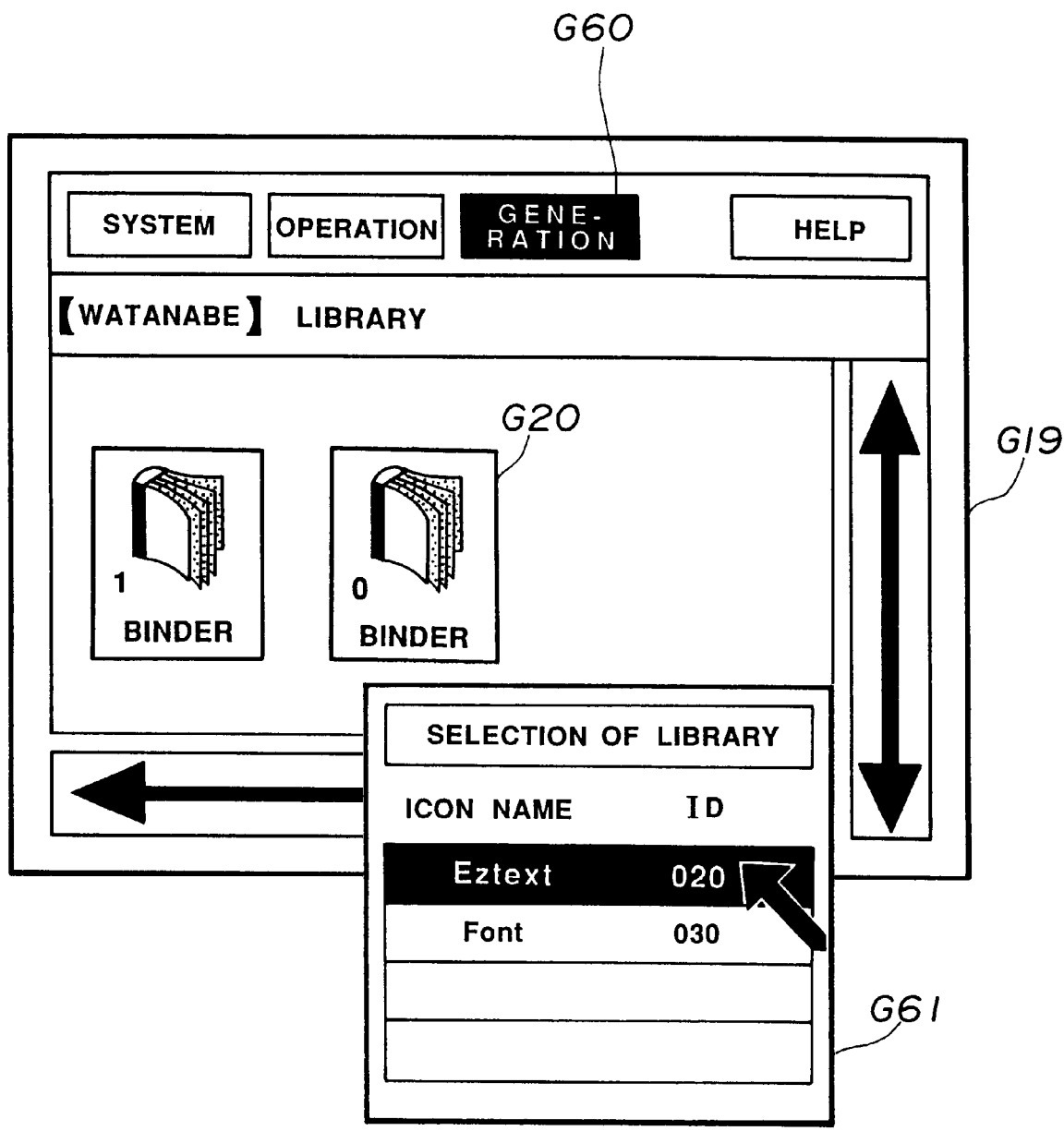
FIG. 57 is a diagram showing an example of the operation of forming a library binder.
Figure 58:
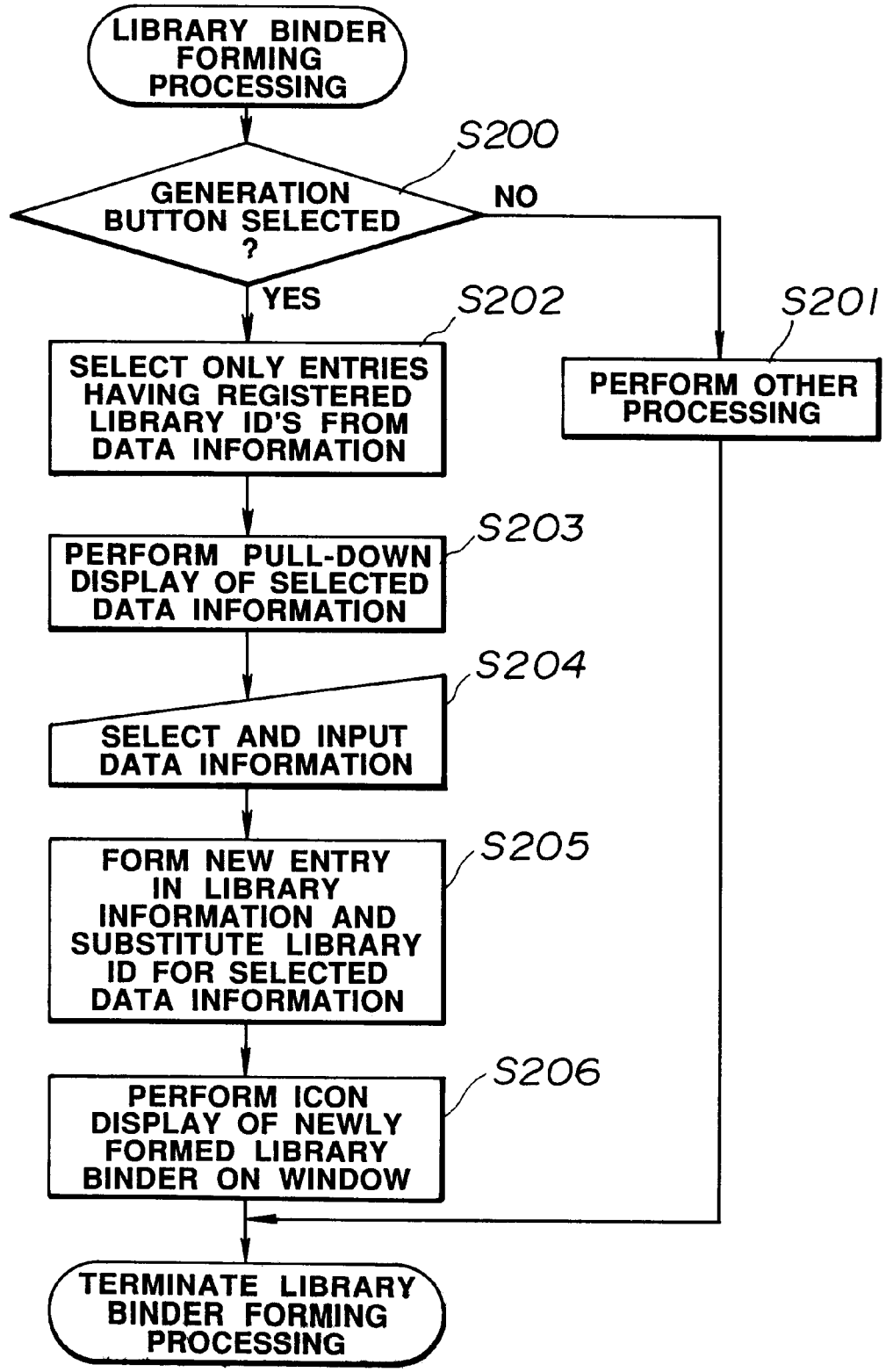
FIG. 58 is a flowchart of the processing of forming a library binder.

The procedure and processing for forming a new library binder 27 in library 17 within room 13 by the user will be described with reference to FIG. 57 and the flowchart of FIG. 58.

When the user forms a new library binder 27 in library 17 within room 13, library-binder generation button G60 on library window G19 is selected in step S200. In the desktop control system, in step S202, only entries having registered library ID's 54 are obtained from data information. In step S203, library-selection window G61 in which only the summary of the above-described data information 50 is displayed is displayed by library-section window 101. In step S204, the user selects one of the displayed information. In step S205, the entry of library information 70 within library 17 is newly formed, and the newly formed library ID 71 is substituted for the selected data information 50. In step S206, library-binder object G20 of library binder 27 is newly displayed on the window of library 17.

If a new library is necessary when newly registering application 26, library 27 of the necessary group (the kind of library data 31), and library data 28 may be registered. When registering application 26, library information 70 is registered in the desktop control system together with the group of the corresponding library 17. At that time, default data 18 provided by application 26 is registered as library which belongs to office 14. When the group of library 17 has been registered, library binder 27 is generated for the group, and the data of the group is stored, that is, registered and controlled as library data 28.

Registration of Data in a Library

Figure 59:
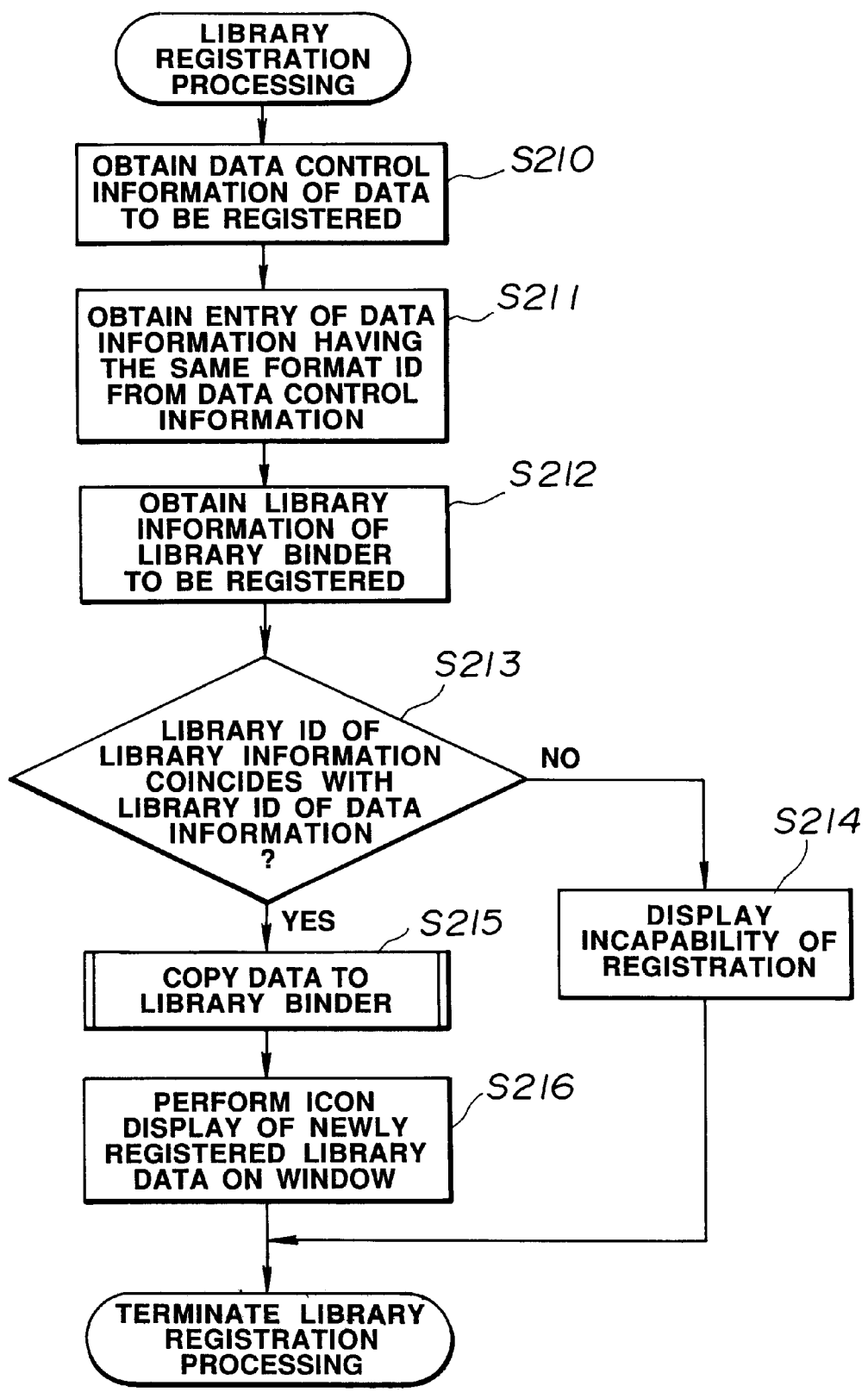
FIG. 59 is a flowchart of the processing of registering library data.

The operation and the procedure of registering data 18 under cabinet 16 as library data 28 will be described with reference to the flowchart of FIG. 59.

When registering data 18 under cabinet 16 as library data 28, the same operation as the ordinary copying (moving) operation of data 18 shown in FIG. 25 is performed. The user opens library-binder object G20 indicating library binder 27 of library 17 in which the data is to be registered, and displays library-binder window G22. Data object G18 indicating data 18 within binder 20 to be registered in the library is dragged, and is dropped within library-binder window G22.

In the desktop control system, in step S210, object control information 110 of binder 20 of the copy source is obtained. Next, in step S211, the entry of data information 50 having the same format ID 51 as the format ID 113 of the previously obtained object control information 110 is obtained. In step S212, library ID 71 of library binder 27 indicated by library-binder window G22 on which data object G18 has been dropped from library information 70 of library 17. In step S213, the library ID 51 of the data information 50 obtained in step S211 is compared with the library ID 71. If the two library ID's differ, incapability of registration is displayed in step S214, and the process is terminated.

If the library ID 54 coincides with the library ID 71 in step S213, the above-described operation of copying the data 18 from binder 20 of the copy source to library binder 27 is performed in step S215. In step S216, the data 18 is displayed within library-binder window G22 as library-data object G23.

Retrieval of Libraries

When application 26 uses library data 28 controlled by the desktop control system, a message is transmitted to the desktop control system using a known arbitrary communication means between programs. This message includes the command of "request of library data", and specifying information when library ID 71 and library data 28 to be requested can be specified, for example, the name of library data 28, and information for specifying data 18 which uses library data 28.

Figure 60:
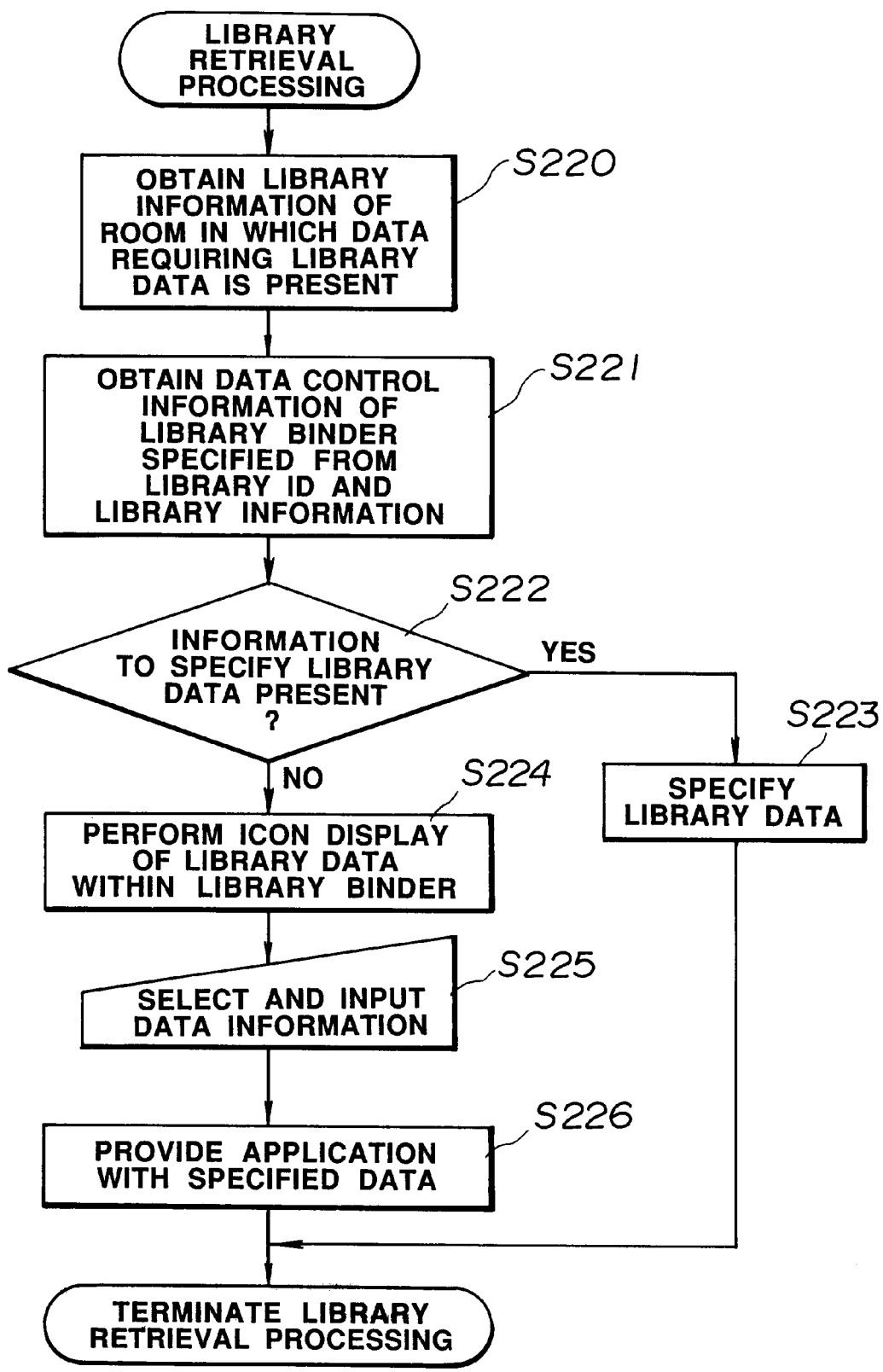
FIG. 60 is a flowchart of the processing of retrieving library data.

The processing of retrieving library data 28 will be described with reference to the flowchart of FIG. 60.

In the desktop control system which has received the message from application 26, in step S220, the message is analyzed to obtain library information 70 of room 13 to which the data belongs from the information for specifying the data 18 which uses the library data 28. In step S221, object control information 110 of the library binder which controls the library data 28 of the requested library ID 71 is obtained from the previously obtained library information 70.

In step S222, it is checked whether or not information for specifying the library data 28 has been set. If the result of the check is affirmative, library data 28 are retrieved from object control information 110 of the obtained library binder 27. In step S226, the obtained library data 28 is notified to application 26 using the above-described communication means.

The case of the negative result of the check in step S222 corresponds to a case in which application 26 requests a new library data 28 selected by the user. In such a case, in step S224, the window of the above-described library binder 27 obtained from object control information 110 of the obtained library binder 27 is opened, and library-object data G23 within the above-described library binder 27 is displayed. In step S225, a selective input to library data 28 by the user is awaited. In step S226, the selected library data 28 is notified to application 26 using the above-described communication means.

Retrieval of Libraries by Data Request

When application 26 which is processing data 18 has requested library data 28, the requested data is retrieved from library 17 of room 13 in which data 18 is present to be processed by application 26. If the requested data is not present in the retrieved library 17, the data is retrieved from library 17 of office 14 to which the room belongs. That is, when application 26 which is processing data 18 of another office 14 has requested library data 28, the requested data is retrieved first from library 17 of room 13 of the owner of data 18, and then from library 17 of office 14 to which room 13 of the owner belongs in office 14 in which data 18 is present. When application 26 has opened data 18 copied from room 13 of another user to room 13 of the user and has requested library data 28 of the opened data 18, the requested data is retrieved first from library 17 of room 13 of the user, and then from library 17 of office 14 to which the room belongs. When copying data from room 13 of another user to room 13 of the user, it is also possible to automatically copy library data 31 to be referred to to library 17 of room 13 of the user. In such a case, the data is copied within library binder 27 having the same library ID 71 as library data 28 to be copied. In determining the retrieval order of library data 28 of data 18, it is also possible to assign library 17 of a specific room 13 or library 17 of a specific office 14 by obtaining office ID 91 or user ID 81 from library-retrieval-order information 150 shown in FIG. 22. Library-retrieval-order information 150 is information for each room 13, and the retrieval order can be arbitrarily set by the user.

Although in the case of FIG. 22, the maximum number of retrieval orders is 2, an arbitrary number of retrieval orders can be set. If library-retrieval-order information 150 is not set, retrieval is performed according to the above-described order.

Updating of Library Data

Library data 28 can, for example, be formed, edited and deleted by application 26 entirely in the same manner as for ordinary data 18.

As shown in FIG. 16, library information 70 includes information on frequency of disclosures 74 indicating how many times library data 28 within library binder 27 has been opened. As shown FIGS. 17 and 18, user information 80 and office information 90 include information of library updating mode 84 and library updating mode 95 (hereinafter termed in common a "library updating mode") indicating whether libraries 17 of room 13 and office 14 are opened in an updating mode, respectively, so that updating of library data 28 can be controlled.

Only library 17 first opened in an updating mode in room 13 or office 14 can be opened in an updating mode. When library 17 has been opened, the "library updating mode" is set, and updating of library data 28 becomes possible.

When application 26 requests data 18, the data 18 can be opened even in a state in which the "library updating mode" is set in library 17 of room 13 in which the data 18 is present. However, the response to the request of library data 28 from application 26 is "incapability of reference". That is, data 18 in which only data 28 is absent is provided to application 26.

When application 26 which set the "library updating mode" has closed library data 28, the setting of the "library updating mode" is released, and reference to that library 17 becomes possible. Also for library data 28 of library binder 27 opened only in a reference mode, the updating operation of library data 28 of a plurality of simultaneously opened library binders 27 can be prohibited. Frequency of opening operations 74 with prohibiting an updating operation if a predetermined number of library data 28 have been opened can be arbitrarily set.

As indicated by G21 shown in FIG. 6, the desktop control system has the function of displaying frequency of opening operations 74 of library binder 27, and the user can know frequency of opening operations 74.

Clipping Board

In some cases, application 26 copies or moves data 18 or a part thereof within the application, or to one or a plurality of other applications. Data formed for that purpose, and a portion for temporarily storing that data are controlled under the concept of clipped data and a clipping board, respectively. Clipping board 24 includes a window for displaying stored clipped data 32. Clipped data 32 is controlled by the object control information shown in FIG. 20 in the same manner as an object within cabinet 16 or binder 20. In clipped data 32, format ID 113 indicating the kind of the data is set by application 26 which has formed that clipped data 32.

Application 26 which requests clipped data 32 specifies the kind of the data requested to the desktop control system by format ID 113.

As shown in FIGS. 3 and 11, clipping board 24 controlled by the desktop control system comprises a clipping board displayed within room window G01 of the user, and a clipping board displayed within exit window G30. The clipping board indicated by clipping-board object G34 displayed on exit window G30 is a clipping board which belongs to office 14 to which room 13 belongs. The clipping board indicated by clipping-board object G08 displayed within room window G01 of the user is a clipping board which belongs to that room 13. Thus, clipping board 24 is classified into the following two types according to the state of control thereof.

(1) Clipping board 24 which belongs to room 13

This is clipping board 24 for an individual registered as an object of room 13. Its effective range corresponds to one user. By making clipping board 24 be accessible by other users by performing the same processing as the above-described opening operation of data 18, the effective range of clipping board 24 can correspond to the set of a plurality of arbitrarily assigned users.

(2) Clipping board 214 which belongs to office 14

This is clipping board 24 registered as an object of office 14, and is a clipping board 24 which only users of room 13 included in that office 17 can access in common. Its effective range corresponds to the set of a plurality of permanently assigned users.

Redistration of Clipped Data in a Clipping Board

Figure 62:
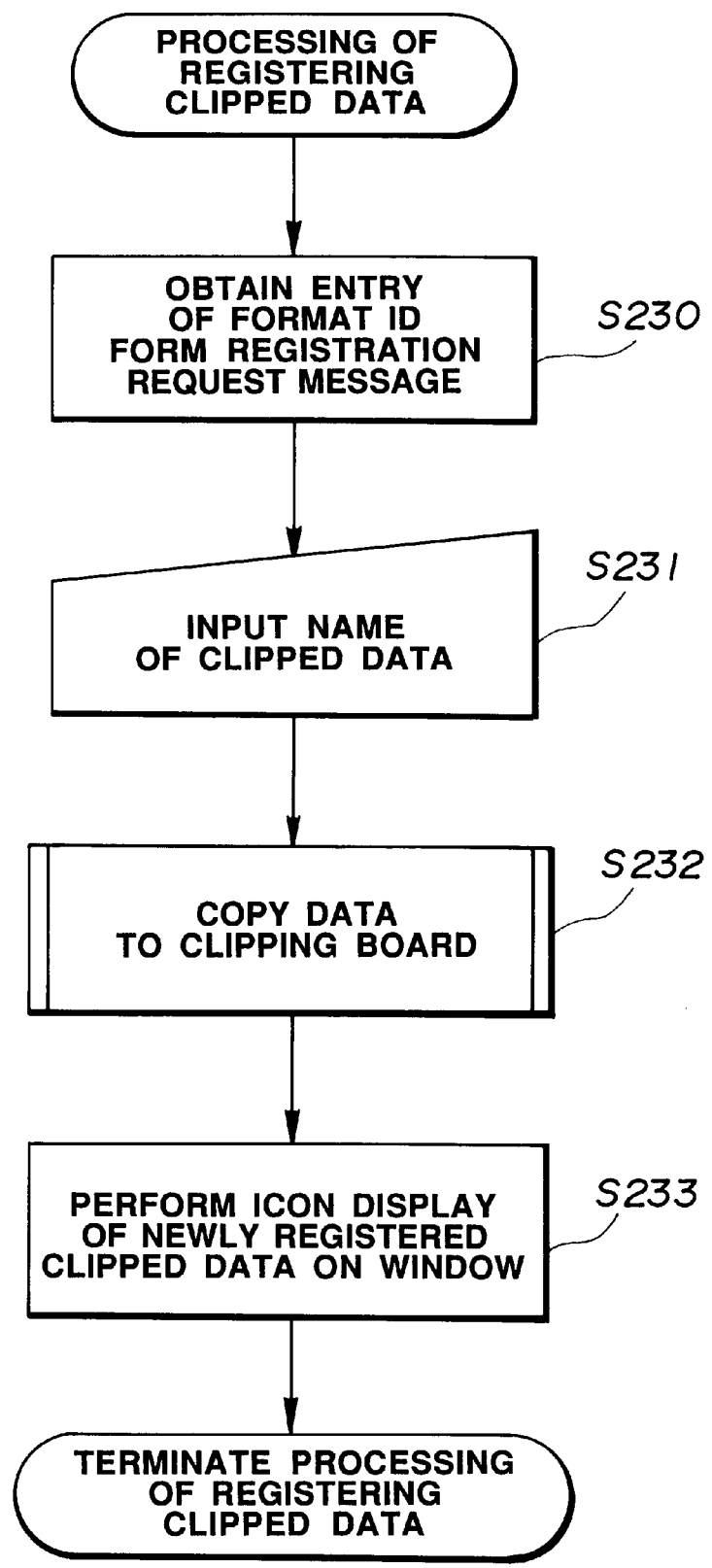
FIG. 62 is a flowchart of the processing of registering clipped data.

A description will be provided of the operation and procedure of registering clipped data 32 of the desktop control system by application 26 with reference to the flowchart of FIG. 62.

Application 26 transmits a message to the desktop control system using a known arbitrary communication means between programs. This message includes the command of "register clipped data 32", and format ID 113 of clipped data 32 to be registered. Upon reception of the message from application 26, in step S230, the desktop control system analyzes the message, and obtains the format ID 113 of the clipped data 32 assigned by the application.

Next, in step S231, a message to urge the user to provide the name of the clipped data 32 to be newly registered is displayed, and the name of the clipped data 32 is obtained.

Next, in step S232, the data is copied to the clipping board. In step S233, the clipped data 32 is registered in clipping board 24 together with the format ID 113 assigned by application 26, and the registered data is displayed within clipping-board window G62 shown in FIG. 61 as clipped-data object G63.

Selection of Clipped Data

Figure 63:
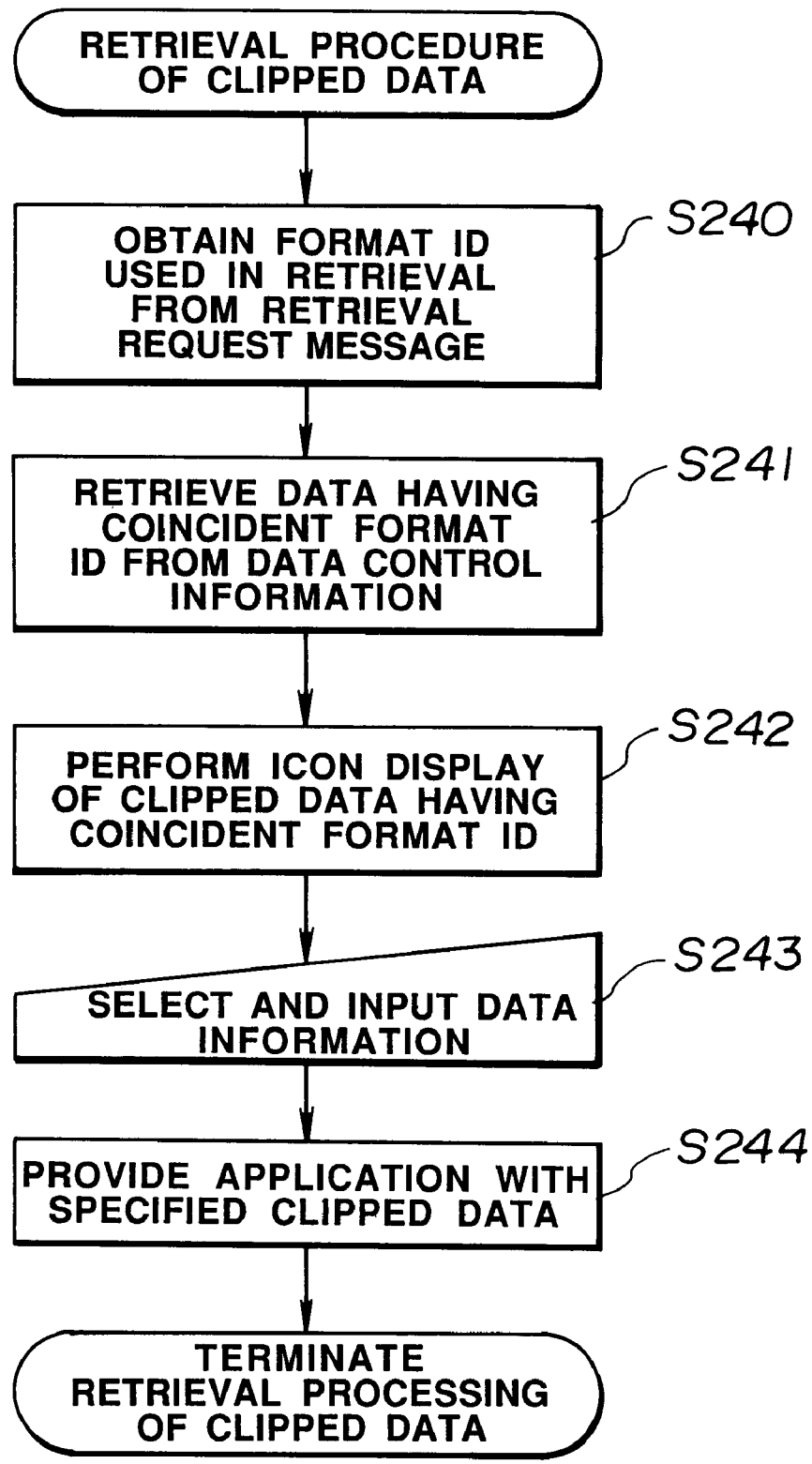
FIG. 63 is a flowchart of the processing of retrieving clipped data.

The procedure for utilizing clipped data 32 registered in clipping board 24 of the desktop control system by application 26 will be described with reference to FIG. 63.

When application 26 uses clipped data 32 registered in clipping board 24 of the desktop control system, a message is transmitted to the desktop control system using a known arbitrary communication means between programs. The message includes the command of "request of clipped data 32", and one or a plurality of format ID's 113 which can be utilized by application 26.

Upon reception of the message from application 26, in step S240, the desktop control system analyzes the message, and obtains the one or the plurality of requested format ID's 113.

Next, in step S241, one or a plurality of clipped data 32 having the format ID's coinciding with format ID's 113 assigned by application 26 are retrieved from among clipped data 32 registered on clipping board 24.

Next, in step S242, clipping-board window G62 is opened, and the one or the plurality of clipped data 32 having the format ID's coinciding with format ID's 113 assigned by application 26 retrieved from clipping board 24 are displayed as clipped-data objects G63.

When clipped data 32 have been selected by the user in step S243, in step S244, the desktop control system notifies application 26 of the selected clipped data 32 using the above-described communication means.

Cutting Buffer

Next, a description will be provided of the function of a cutting, copying and pasting buffer (hereinafter termed a "CCP buffer") possessed by the desktop control system.

In some cases, application 26 copies or moves data 18 or a part thereof within that application, or to one or a plurality of applications. Data formed for that purpose, and a portion for temporarily storing the data are controlled under the concept of "CCP data", and a "CCP buffer", respectively. The "CCP buffer" differs from the above-described clipping board 24 in not having a means for displaying stored "CCP data".

Figures 64, 65:
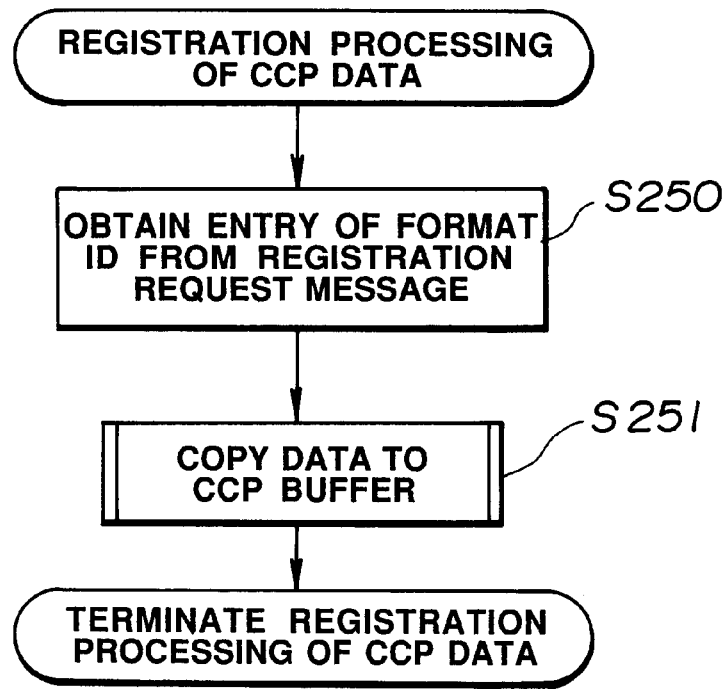
FIG. 64 is a diagram showing an example of CCP (cutting, copying and pasting)-data control information.
FIG. 65 is a flowchart of the processing of registering data in a CCP buffer.

FIG. 64 is a diagram illustrating CCP-data control information 160. CCP-data control information 160 is information for controlling "CCP data" by the desktop control system, and is present in each room 13.

CCP-data control information 160 includes the following items with respect to one "CCP data": file name 161 indicating the contents of CCP data, format ID 162 indicating the kind of CCP data, size 163 of CCP data, user ID 164 of the user who has formed the CCP data, and group ID 165 of the group which has formed the CCP data. One "CCP data" is stored in a "CCP buffer" for each format ID 162. When "CCP data" of the assigned format ID 162 is already registered in a "CCP buffer" when application 26 performs registration in the "CCP buffer" by assigning the format ID 162, only the latest registered data is stored as effective "CCP data".

By assigning format ID 162, application 26 can obtain "CCP data" of the assigned format ID 162 which is uniquely present within the CCP buffer". A plurality of clipped data 32 can be stored for each format ID 113 in the above-described clipping board 24. When application 26 requests clipped data 26 by assigning format ID 113, the user must select from among clipped-data objects G63 indicating clipped data 32 of that format ID 113 displayed on clipping-board window G62 which has been formed. However, the "CCP buffer" differs from the clipping board in that, since only one "CCP data" of the format ID assigned by the application is present at most, the user need not perform selection. "CCP data" stored in a "CCP buffer" are controlled by the desktop control system. However the user cannot see the stored data as ordinary data stored within cabinet 16. "CCP data" is formed by application 26, and format ID indicating the kind of the data is set by that application. The "CCP data" formed by application 26 is stored in the "CCP buffer" which belongs to the room of the user operating that application. Each "CCP data" within a "CCP buffer" has its peculiar format ID 162. By requesting "CCP data" having a specific format ID 162 to the desktop control system by application 26, the desktop control system can specify the "CCP data" having the format ID 162 within the "CCP buffer" which belongs to room 13 of the user, and provide the application with the specified data. Some operations relating to the "CCP buffer" and "CCP data" will be described with reference to the drawings.

Registration in a CCP Buffer

The procedure of registering "CCP data" in a "CCP buffer" controlled by the desktop control system by application 26 will be described with reference to FIG. 65.

Application 26 transmits a message to the desktop control system using a known arbitrary communication means between programs. This message includes the command of "register CCP data", and format ID 162 of "CCP data" assigned by the application to be registered.

Upon reception of the message from application 26, in step S250, the desktop control system analyzes the message, and obtains the format ID 162 of the "CCP data" assigned by application 26.

Next, in step S251, the "CCP data" is registered in the "CCP buffer" together with the format ID 162 assigned by application 26.

Acquisition of CCP Data

Figure 66:
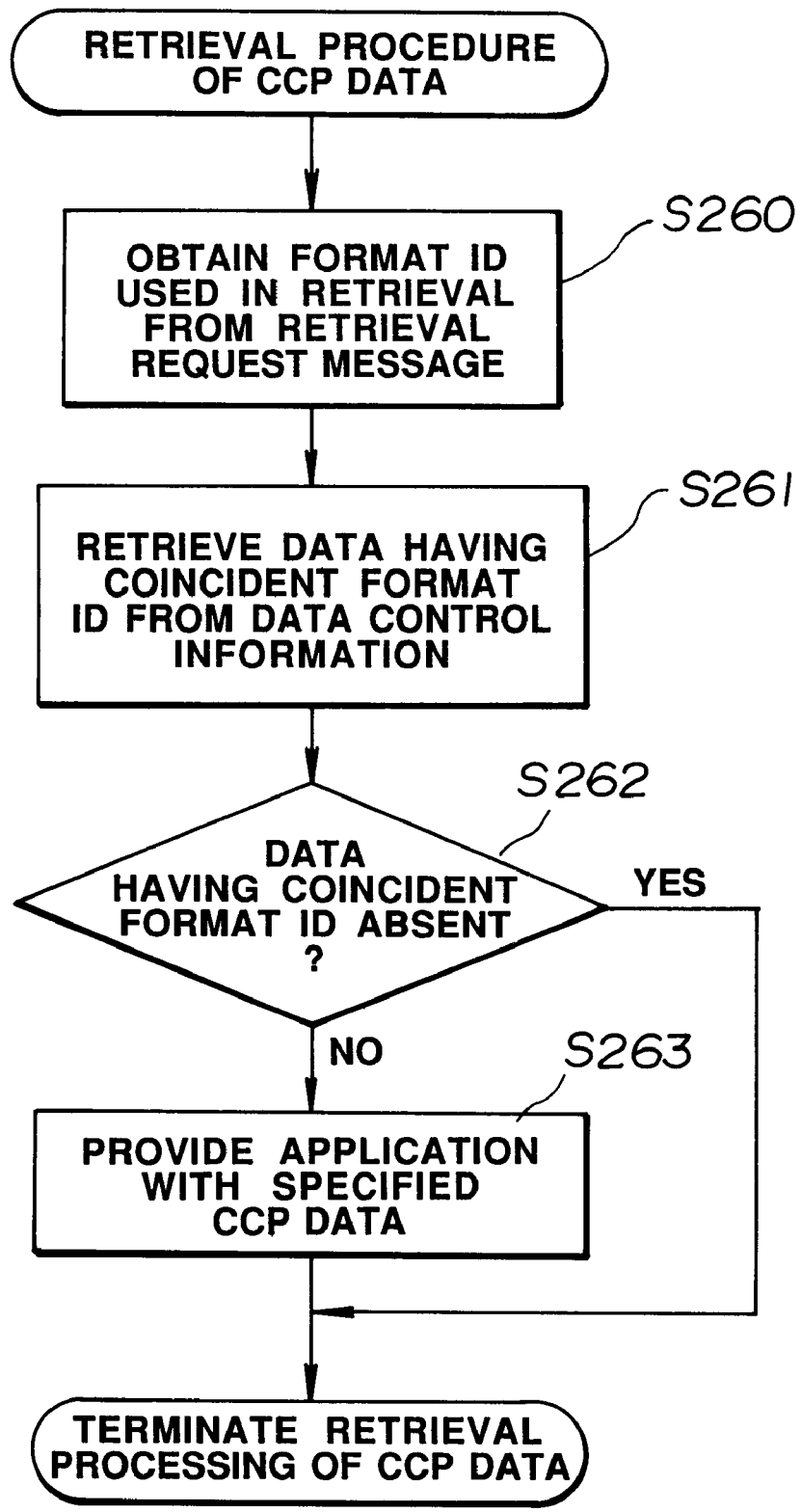
FIG. 66 is a flowchart of the processing of retrieving data registered in a CCP buffer.

The procedure for utilizing "CCP data" registered in a "CCP buffer" controlled by the desktop control system by application 26 will be described with reference to FIG. 66.

When application 26 uses "CCP data" registered in a "CCP buffer" of the desktop control system, application 26 transmits a message to the desktop control system using a known arbitrary communication means between programs. This message includes the command of "request of CCP data", and format ID 162 for specifying "CCP data". Upon reception of the message from application 26, in step S260, the desktop control system analizes the message, and obtains the requested format ID 162.

Next, in step S261, "CCP data" which coincides with the received format ID 162 is retrieved. In step S262, it is determined whether or not "CCP data" having the specific format ID 162 assigned by application 26 is present. When "CCP data" having the specific format ID 162 assigned by application 26 has not been found, the process is terminated.

When "CCP data" having the specific format ID assigned by application 26 has been obtained as a result of the determination in step S262, in step S263, the unique "CCP data" within the "CCP buffer" is notified to application 26 using the above-described communication means.

Retrieval

In a retrieval operation, for example, binders 20, library binders 27 and data 18 under cabinet 16 are made to be targets of retrieval. Retrieval conditions are set for these targets, and binder 20, library binder 27 and data 18 which coincide with the retrieval conditions are displayed on the window.

Retrieval conditions comprise, for example, information relating to binders 20, library binders 27 and data 18 as targets of retrieval. In the present embodiment, such information comprises items, such as data of registration 117, date of updating 118, name in Japanese 115, owner's user ID 120, owner's group ID 121, object type 111 and the like, of object control information 110 shown in FIG. 20, and logical combinations thereof. Retrieval conditions may be determined, for example, by presenting all potential retrieval conditions to the user as candidates so that the user can select some of them. Altenatively, the user may sequentially input retrieval conditions. The following methods of presenting the result of retrieval to the user, for example, can be considered.

(a) A method in which a specific region is used for displaying the result of retrieval for a specific period from the start to the end of retrieval processing, and no dedicated means for displaying the result of retrieval is provided.

(b) A method in which retrieval-result display means which newly generates a dedicated window for displaying only items coinciding with retrieval conditions is provided.

(c) A method in which the above-described methods (a) and (b) are combined whenever necessary.

Next, a description will be provided of embodiments of the present invention with respect to retrieval processing and the method of presenting the result of retrieval to the user.

First, retrieval processing of binder 20 present at a hierarchy immediately under cabinet 16 will be described for each of the above-described methods. In the present embodiments, a description will be provided of methods of utilizing object control information 110 of cabinet 16 in retrieval processing. However, a method of performing retrieval processing by forming a data structure for retrieval processing may also be considered. For the convenience of description, in the present embodiments, simple conditions, such as the contents of object type 111 of object control information 110 or the like, are set as retrieval information. However, as described above, various other retrieval conditions may be set.

An embodiment relating to the above-described method (a) will be described with reference to FIGS. 5, 67 and the flowchart of FIG. 68. It is assumed that the window for displaying the summary of objects within cabinet 16 is also used for displaying the result of retrieval.

First, as shown in FIG. 5, the summary of all objects within cabinet 16 is displayed within cabinet window G16. If retrieval processing is executed for these objects as "retrieve binders 20 within cabinet 16", it is checked whether or not object type 111 of object control information 110 of cabinet 16 is a binder as retrieval conditions (FIG. 68, step S300), and display of items which do not agree with the retrieval conditions are erased from cabinet window G16 (step S301). Such processing is performed for all entries (objects) of cabinet 16 (step S302), and the presentation of the result of retrieval to the user is terminated.

Figure 67:
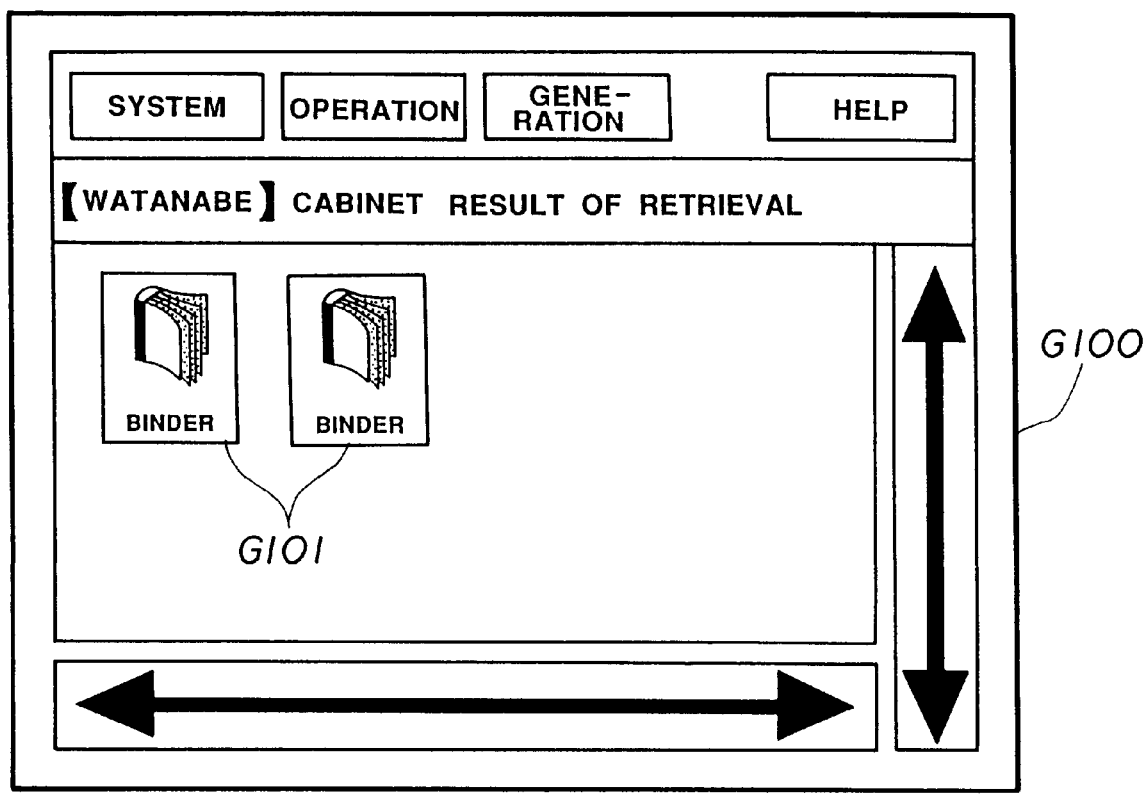
FIG. 67 is a diagram showing an example of display of a result of retrieval.
Figure 68:
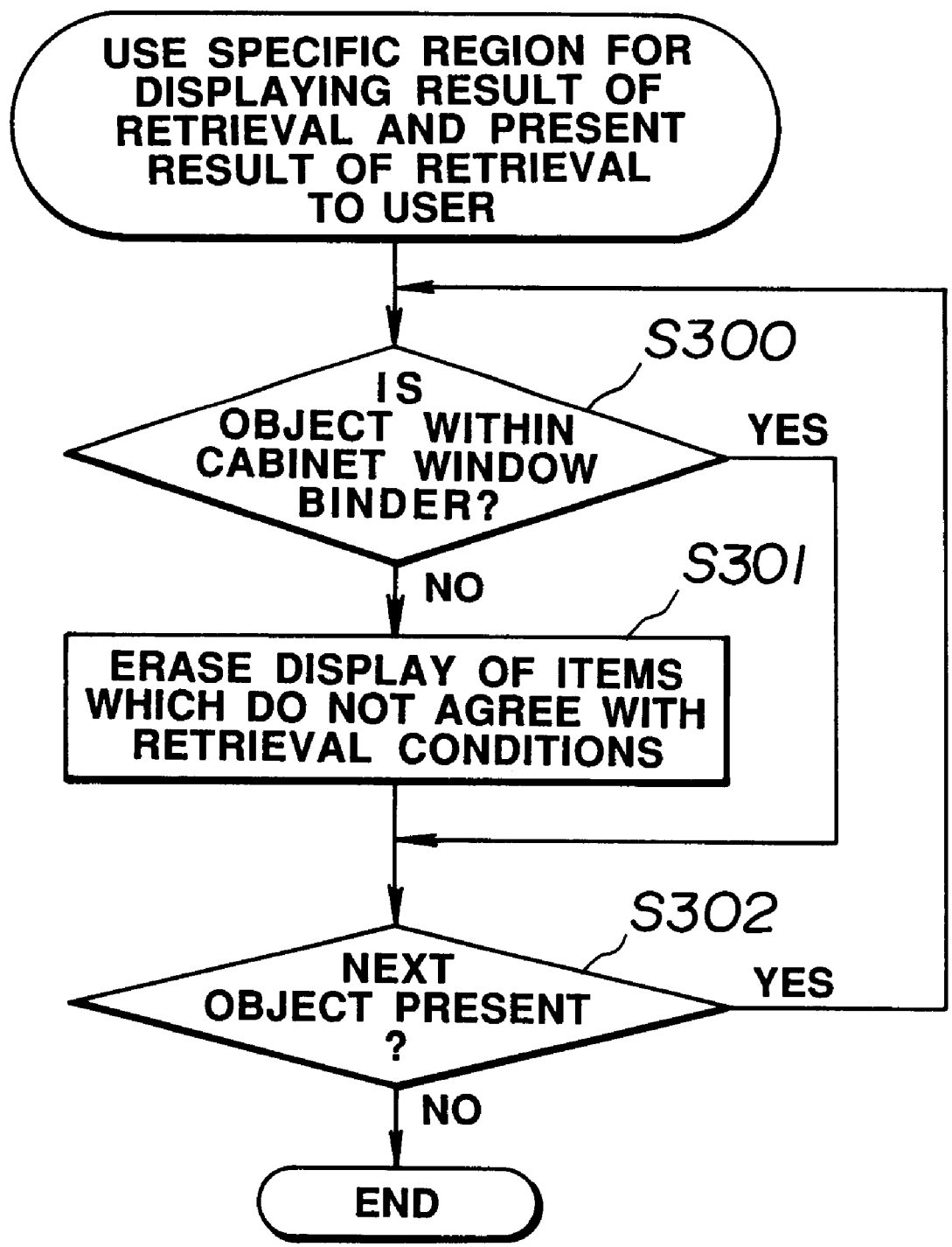
FIG. 68 is a flowchart of retrieval processing.

As a result, as shown in FIG. 67, only binder objects G101 indicating binders 20 which have agreed with the retrieval conditions remain within cabinet window G100, and an object which has not agreed with the retrieval conditions (that is, data 18) becomes in a non-displayed state.

Figure 69:
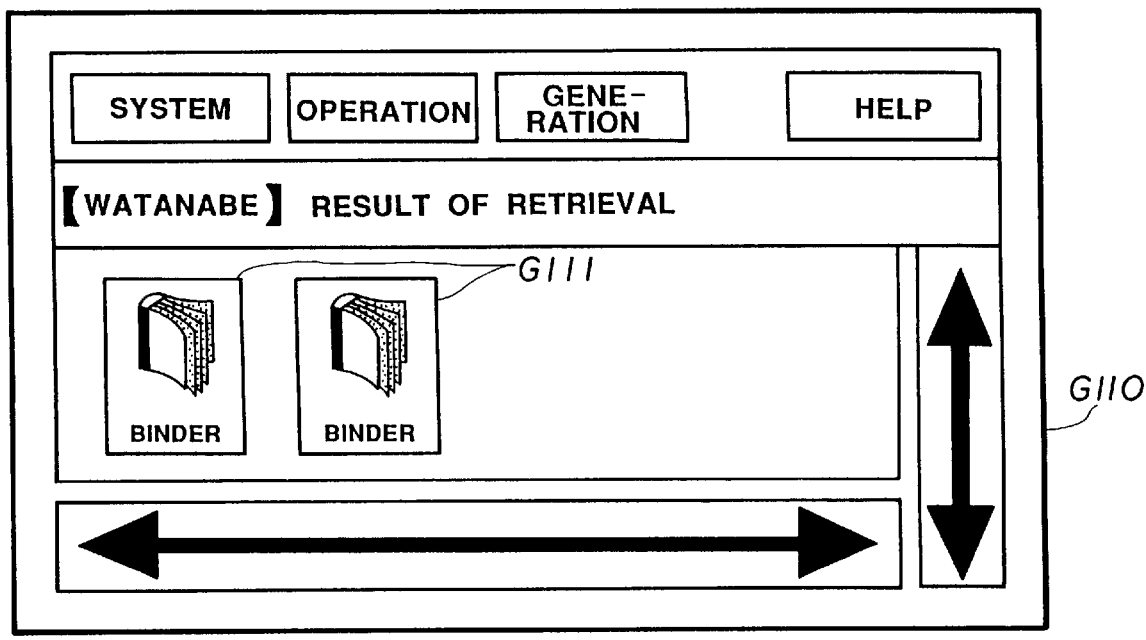
FIG. 69 is a diagram showing an example of display of a result of retrieval.
Figure 70:
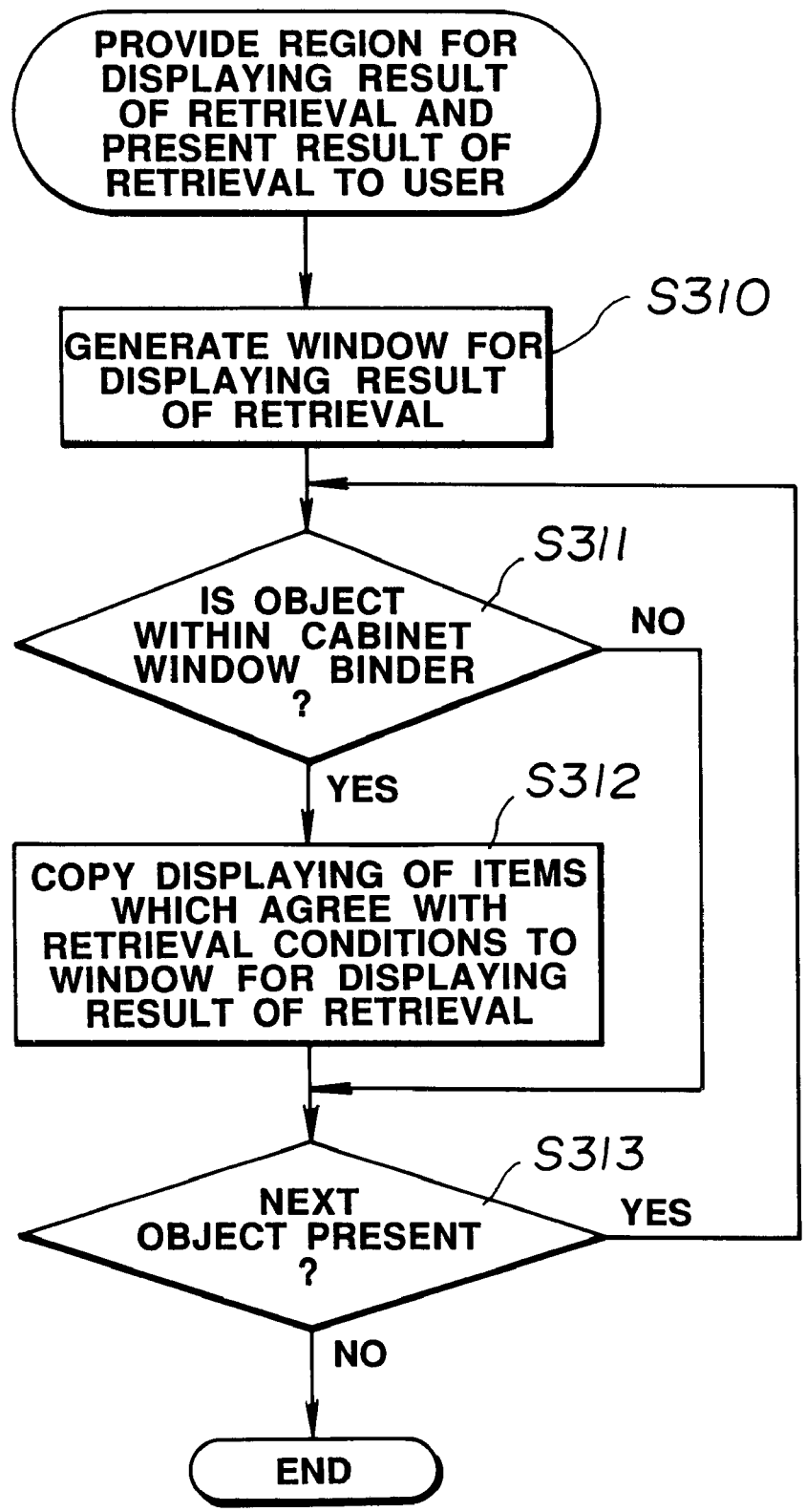
FIG. 70 is a flowchart of retrieval processing.

Next, an embodiment relating to the method (b) will be described with reference to FIGS. 5, 69 and the flowchart of FIG. 70. First, as shown in FIG. 5, the summary of all objects within cabinet 16 is displayed within cabinet window G16. If retrieval processing is executed for these objects as "retrieve binders 20 within cabinet 16", retrieval-result-display window G110 as shown in FIG. 69 is generated (FIG. 70, step S310), it is checked whether or not object type 111 of object control information 110 of cabinet 16 is a binder as retrieval conditions (step S311), and objects which have agreed with the retrieval conditions are displayed on retrieval-result-display window G110 as retrieval-result objects G111 (step S312). Such processing is performed for all entries (objects) of cabinet 16 (step S313), and the presentation of the result of retrieval to the user is terminated.

As a result, although the display on cabinet window G16 is invariable, as shown in FIG. 69, only binders 20 which have agreed with the retrieval conditions are newly diplayed on retrieval-result-display window G110 as retrieval-result objects G111.

Figure 73:
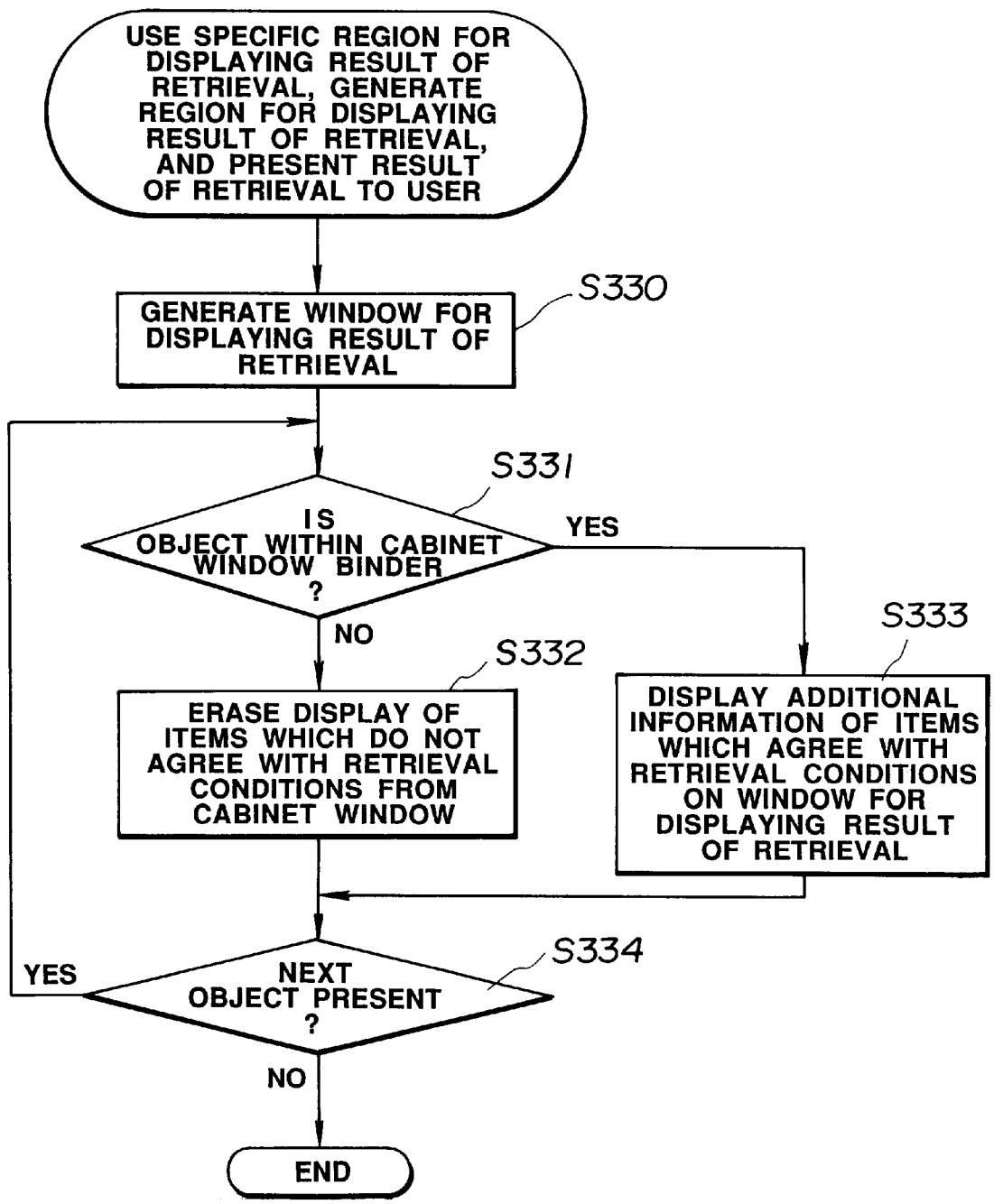

Next, an embodiment relating to the method (c) will be described with reference to FIGS. 5, 67, 71 and the flowchart of FIG. 73.

First, as shown in FIG. 5, the summary of all objects within cabinet 16 is displayed within cabinet window G16. If retrieval processing is executed for these objects as "retrieve binders 20 within cabinet 16", retrieval-result-details window G120 as shown in FIG. 71 is generated (FIG. 73, step S330), it is checked whether or not object type 111 of object control information 110 of cabinet 16 is a binder as retrieval conditions (step S331), and display of objects which have not agreed with the retrieval conditions are erased from cabinet window G16 (step S332). Additional information of the agreed objects is displayed on retrieval-result-details window G120 (step S333). Such processing is performed for all entries (objects) of cabinet 16 (step S334), and the presentation of the result of retrieval to the user is terminated.

As a result, as shown in FIG. 67, only the display of binder objects G17 indicating binders 20 which have agreed with the retrieval conditions remains within cabinet window G16, and an object which has not agreed with the retrieval conditions (that is, data 18) becomes in a non-displayed state. In addition, as shown in FIG. 71, detailed information relating to binders 20 whose display remains on cabinet window G16 is displayed on retrieval-result-details window G120.

According to substantially the same processing procedure as the above-described retrieval processing procedure of binders 20 present at a hieachy immediately under cabinet 16, retrieval of data 18 present at a hierachy immediately under cabinet 16, retrieval of library binders 27 present at a hierarchy immediately under cabinet 16, retrieval of library data 28 present at a hierarchy immediately under cabinet 16, retrieval of binders 20 present at a hierarchy immediately under binder 20, retrieval of data 18 present at a hierarchy immediately under binder 20, retrieval of library binders 27 present at a hierarchy immediately under library binder 27, retrieval of data 28 present at a hierarchy immediately under library binder 27, retrieval of open trays 29 present at a hierarchy immediately under open shelves 22, retrieval of data 18 and binders 20 present at a hierarchy immediately under tag tray 19, and the like can be performed by setting object type 111 as retrieval conditions.

In another approach, the user may select from among the three methods of displaying the result of retrieval (a), (b) and (c).

In the following embodiment of retrieval processing, for the convenience of description, a description will be provided illustrating the method (1) in which dedicated retrieval-result window G110 for displaying the result of retrieval is generated.

Figure 72:
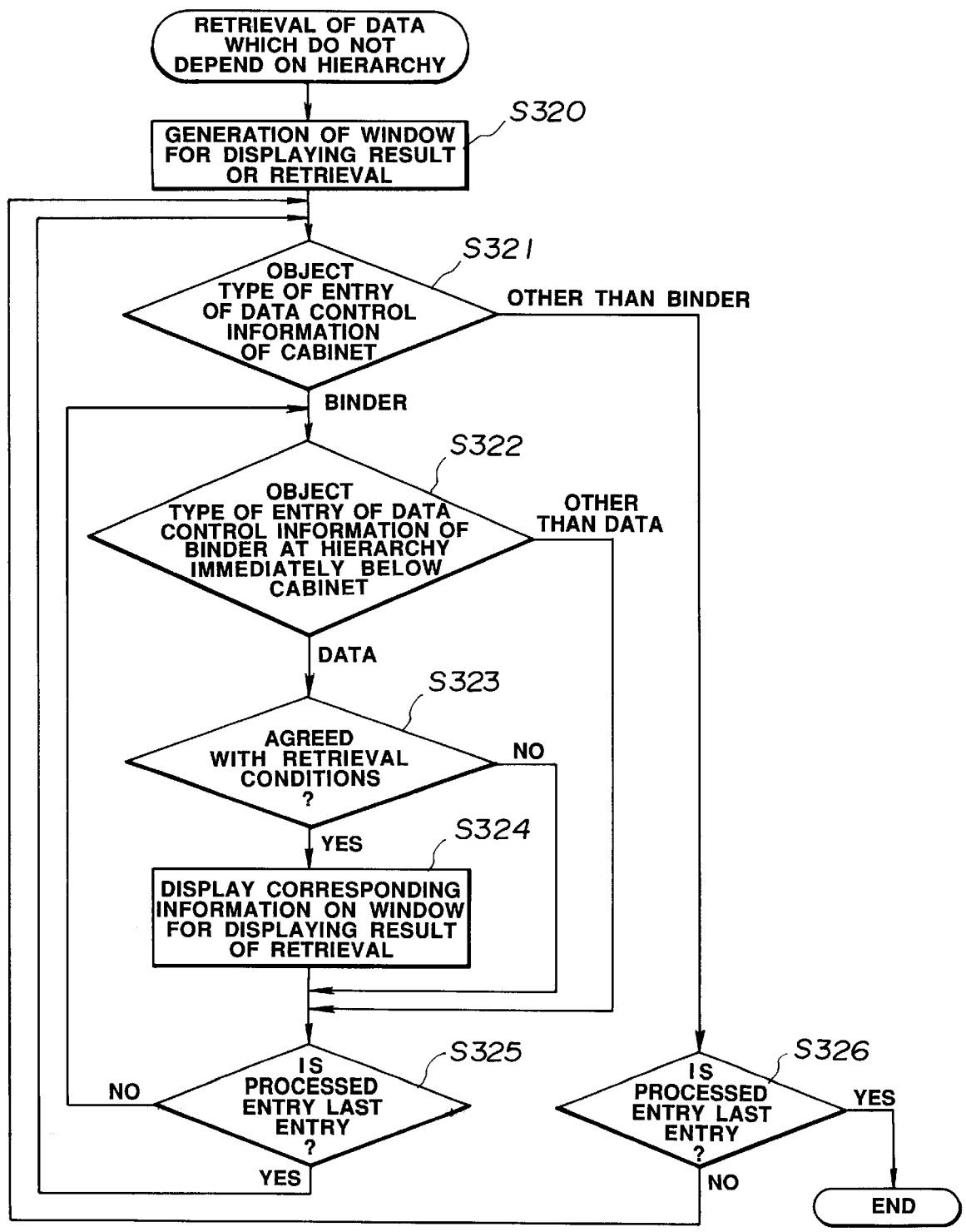
FIGS. 72 and 73 are flowcharts of retrieval processing.

A description will now be provided of the processing of retrieving objects present at the second hierarchy under cabinet 16 with reference to the flowchart of FIG. 72.

An object present at the second hierarchy under cabinet 16 is, for example, an object present at a hierarchy immediately under binder 20 which is present at a hierarchy immediately under cabinet 16. When "data present at the second hierarchy under cabinet 16" has been set as retrieval conditions and retrieval has been executed, retrieval-result window G110 for displaying the result of retrieval is generated (step S320). An entry whose object type 111 is a binder is selected from object control information 110 of cabinet 16 (step S321).

It is checked whether or not object type 111 is data 18 by reading object control information 110 based on the information of the entry (step S322), and the corresponding icon file is read from format ID 113 and data information 50 of a coincident entry, and is displayed on retrieval-result window G110 as retrieval-result object G111 (step S324). Such processing is performed for all entries of object control information 110 of the corresponding binder 20 (step S325), and the process returns to the processing of selecting an entry whose object type 111 is a binder 20 from object control information 110 of cabinet 16 (step S321).

Such a processing is performed for all entries of object control information 110 of cabinet 16 (step S326), and the retrieval processing is terminated.

By recurrently performing such processing, retrieval can be executed irrespective of the number or hierarchies. The execution of retrieval by setting retrieval conditions with making objects present at different hierarchies targets of retrieval can be realized by changing the number of executions of recurrent retrieval processing. This will be explained with reference to the flowchart of FIG. 74. In this case, it is assumed that objects present at hierarchies under cabinet 16 are made to be targets of retrieval irrespective of hierarchies, and retrieval is executed under the retrieval conditions of "object type 111 of object control information 110 is data, and creator ID 114 is 012". In addition, in the present embodiment, for the convenience of description, it is assumed that data 18 can be present only immediately under cabinet or immediately under binder 20.

When retrieval conditions have been set with making objects present at an arbitrary hierarchy under cabinet 16 the target of retrieval, and retrieval has been executed, retrieval-result window G110 for displaying the result of retrieval is generated (step S340). Next, cabinet 16 is made to be the target of retrieval, "processing" which is standard processing is performed with providing retrieval conditions (step S341), and the process is terminated.

Figure 74:
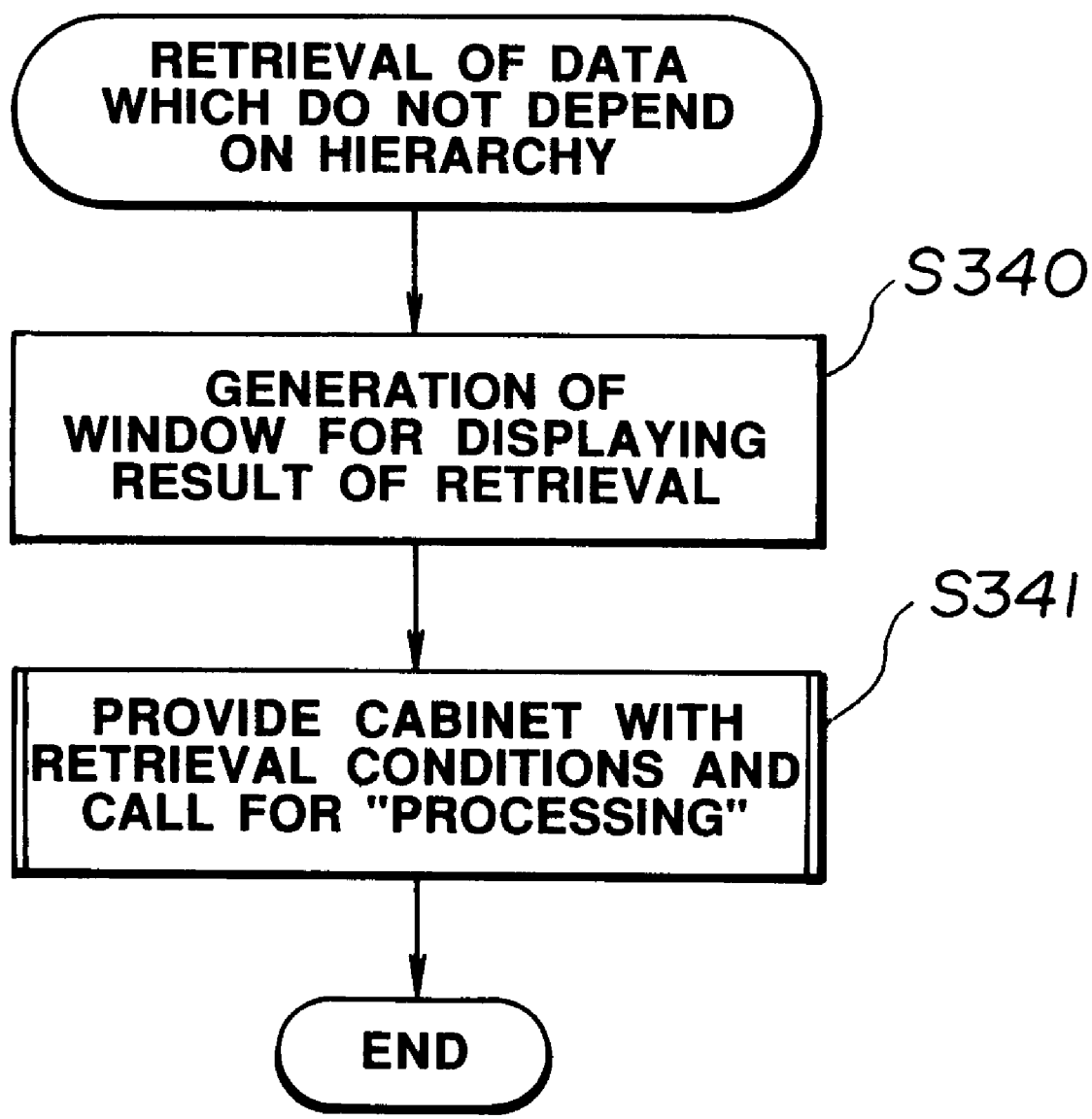
FIGS. 74 and 75 are flowcharts of retrieval processing which does not depend on hierarchy.
Figure 75:
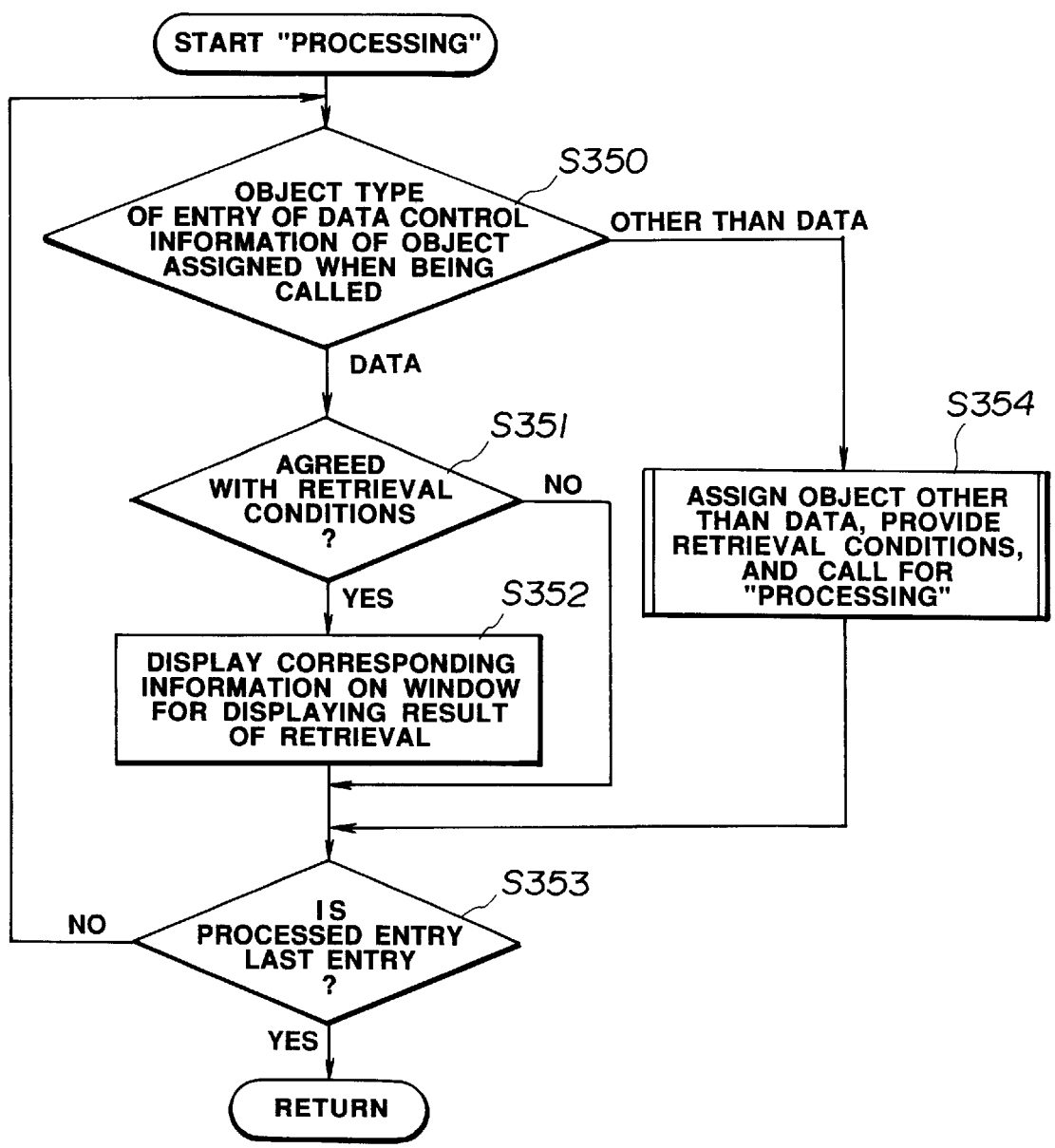
Figure 76:
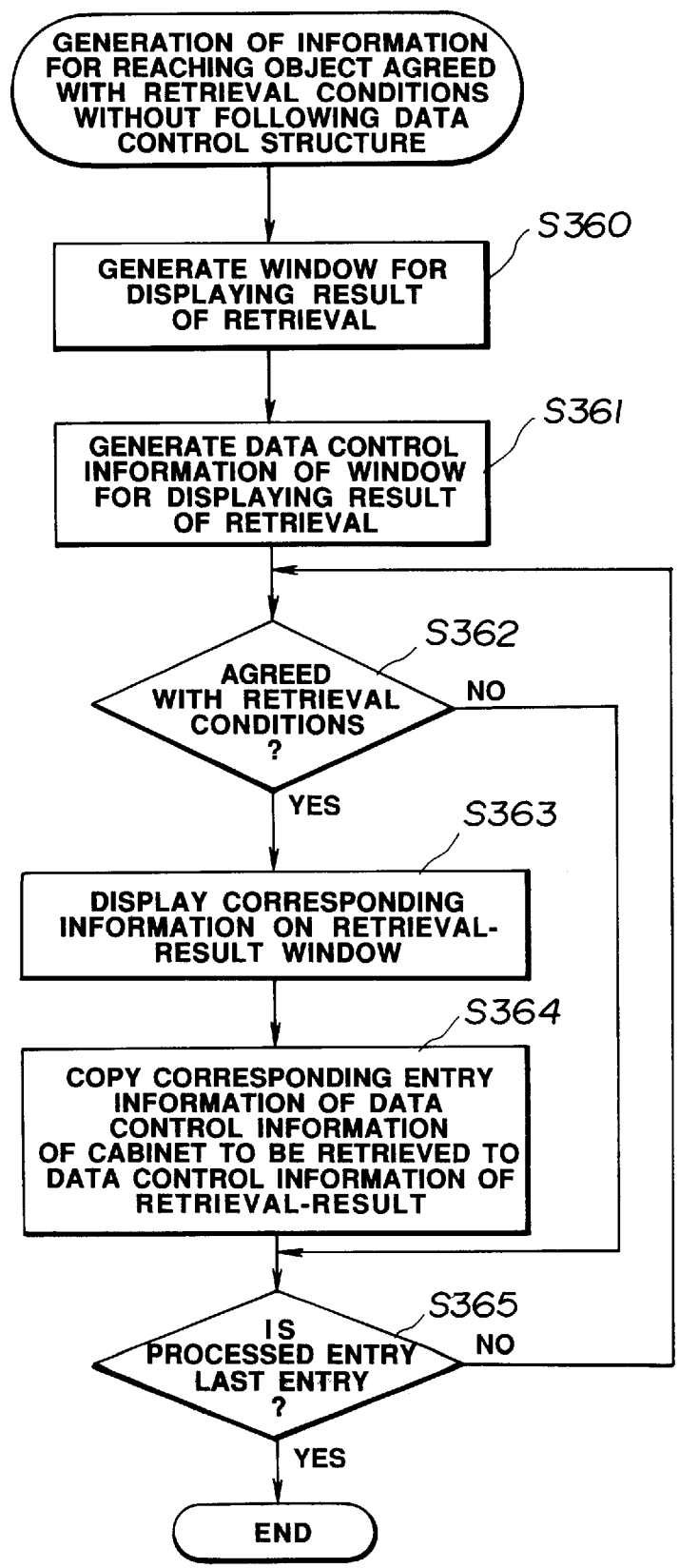
FIG. 76 is a flowchart of retrieval processing.

Next, the "processing" of step S341 shown in FIG. 74 will be described with reference to the flowchart of FIG. 75. The "processing" is a module for realizing the function of recurrently retrieving and extracting data 18 for an object which can have lower hierarchies, such as binder 20, library 27, open shelves 22, open tray 29, tag tray 19 or the like as well as cabinet 16, and of displaying information of data 18 which agree with retrieval conditions on retrieval-result window G110.

When the "processing" has been called for, an entry whose object type 111 is data 18 is selected from object control information 110 of the object assigned when the "processing" was called for (step S350), it is determined whether or not the entry agrees with the retrieval conditions of "object type 111 of object control information 110 is data, and creator ID 114 is 012" (step S351), and the corresponding icon file is read from format ID 113 and data information 50 of the coincident entry, and is displayed on retrieval-result window G110 together with necessary information as retrieval-result object G111 (step S352).

For an entry whose object type 111 is determined to be other than data from object control information 110 of the object assigned when the "processing" was called, "processing" is recurrently called for together with the retrieval conditions and the target of retrieval (step S354). Such processing is performed for all entries of object control information 110 of the object assigned when the "processing" was called for (step S353), and the process starts again from the "processing".

Arrival to the Result of Retrieval

Next, a description will be provided of the processing of reaching the object which has agreed with retrieval conditions based on the result of retrieval without following the control structure of data. In the present embodiment, it is assumed that the targets of retrieval is data 18 and binders 20 under cabinet 16. First, the processing of generating information for reaching the object which has agreed with the retrieval conditions based on the result of retrieval without following the data control structure will be described with reference to the flowchart of FIG. 79.

When retrieval processing has been executed, retrieval-result window G110 is generated (step S360). At the same time, this retrieval-result window G110 generates object control information 110 which stores information on retrieval-result objects within retrieval-result window G110 as objects having a hierarchical structure thereunder, such as cabinet 16, binder 20 and the like (step S361). In the course of the execution of the retrieval processing, objects which have agreed with the retrieval conditions (step S362) are displayed on retrieval-result window G110 (step S363). At the same time, the corresponding entry information of object control information 110 of cabinet 16 to be retrieved which has been used for determining agreement with the retrieval conditions is copied to the entry of the object control information of retrieval-result window G110 (step S364). Such processing is performed for all targets of retrieval (step S365).

Figure 77:
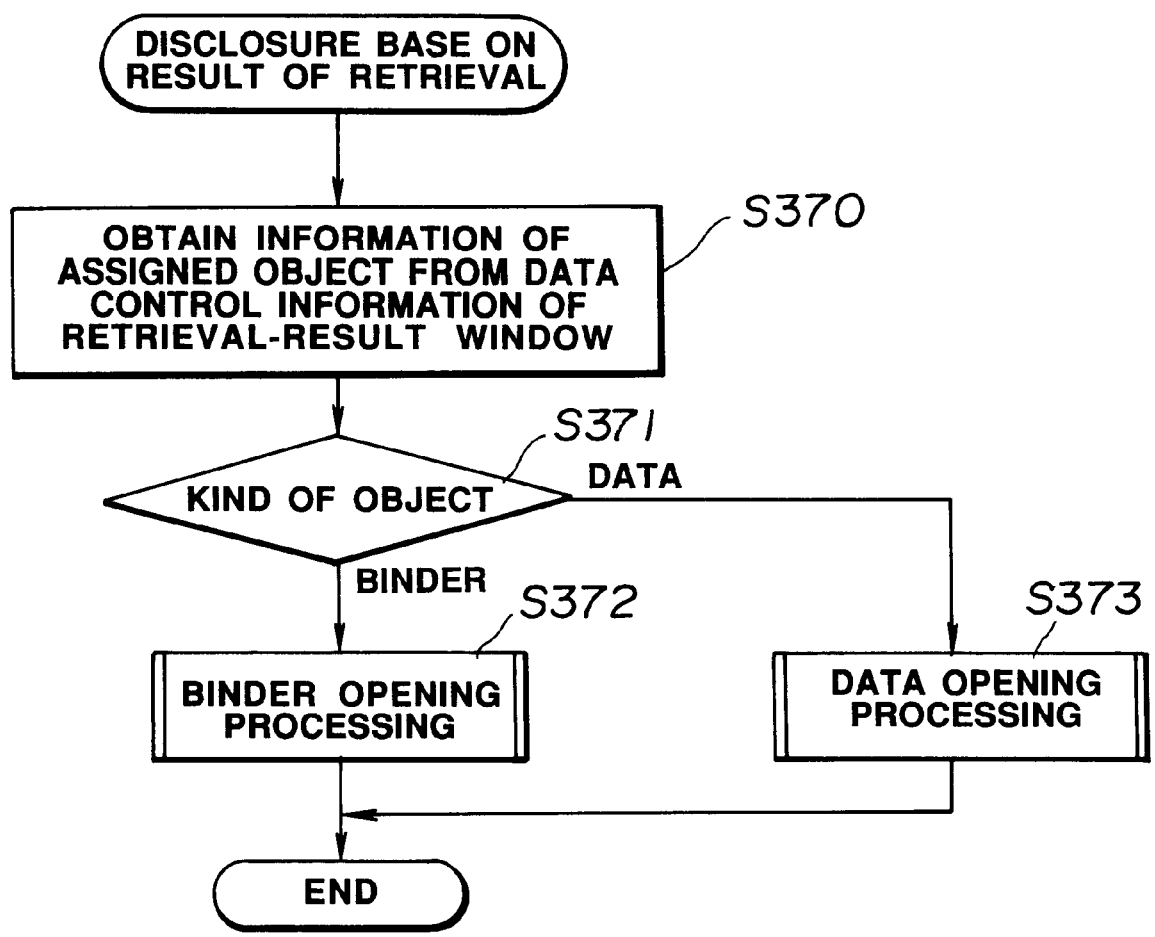
FIG. 77 is a flowchart of the processing of opening a retrieval-result window.
Figure 78:
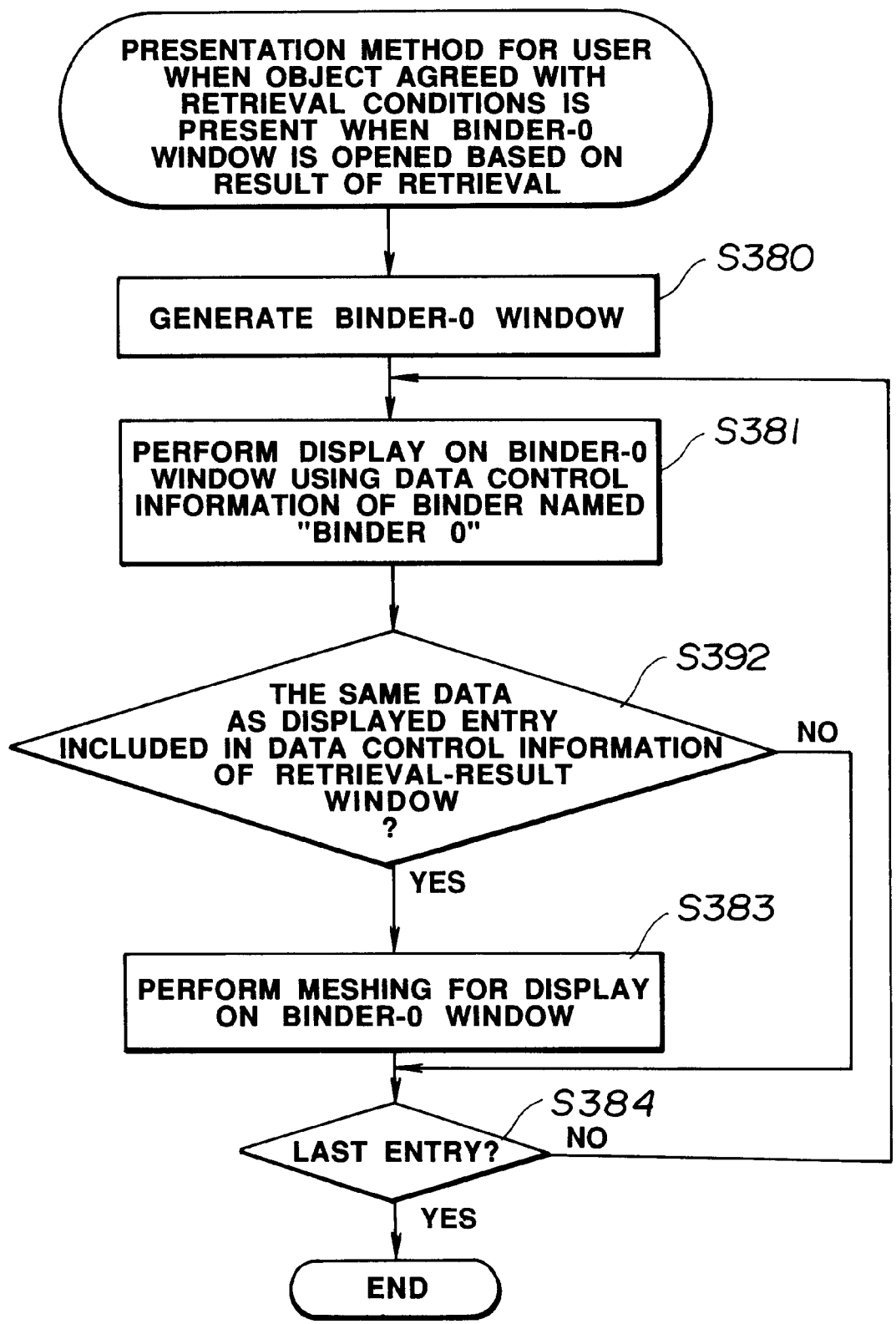
FIG. 78 is a flowchart of the processing of displaying a result of retrieval.

Next, a description will be provided of an opening operation for retrieval-result window G110 having such a configuration with reference to FIG. 77. Retrieval-result objects G111 indicating binder 20 and data 18 which have agreed with the retrieval conditions are displayed on retrieval-result window G110. The same processing as for binder object G17 and data object G18 indicating the corresponding binder 20 and data 18, respectively, is performed for retrieval-result objects G111 within retrieval-result window G110.

That is, when an opening operation has been performed for retrieval-result object G111 on retrieval-result window G110, information of the entry corresponding to the assigned object is obtained from data control information 110 of retrieval-result window G110 (step S370). In accordance with the kind of the assigned object (step S371), the processing of opening binder 22 or data 18 is performed (steps S372 and S373). As for an operation of deleting the result of retrieval, it is possible to prohibit the deletion, or to arrange so that only the arrival index to data 18 or binder 20 indicated by the retrieval-result object is deleted, and the corresponding binder 20 or data 18 is not deleted.

Figure 79A:
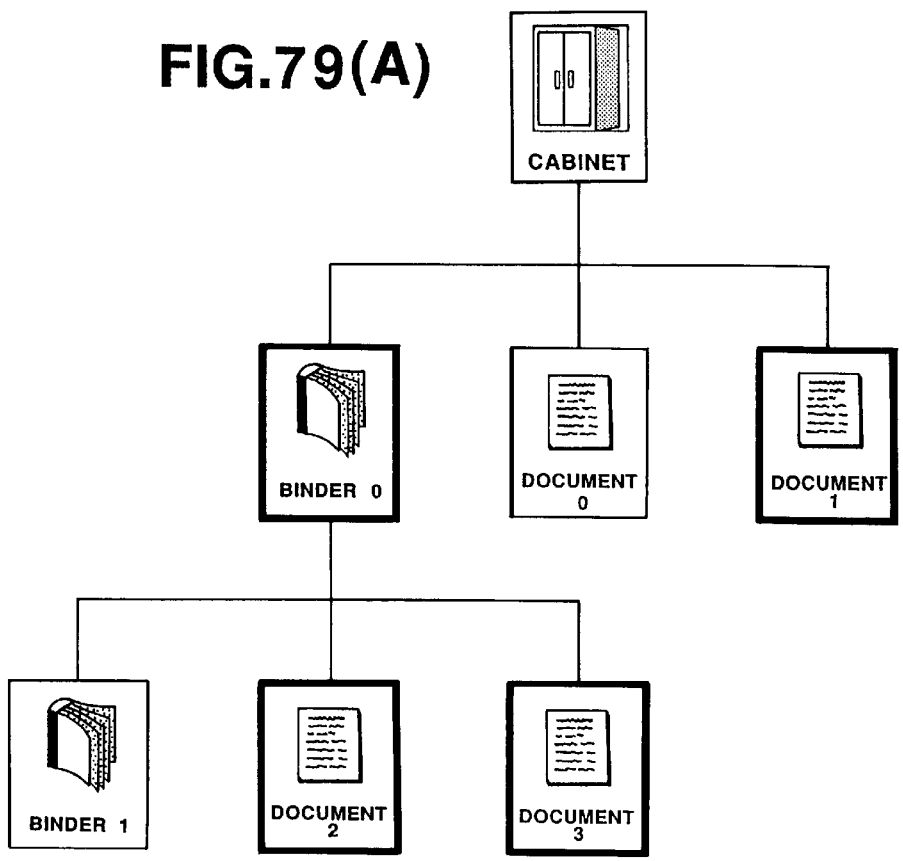
FIGS. 79(A) and 79(B) are diagrams showing examples of targets to be retrieved.
Figure 79B:
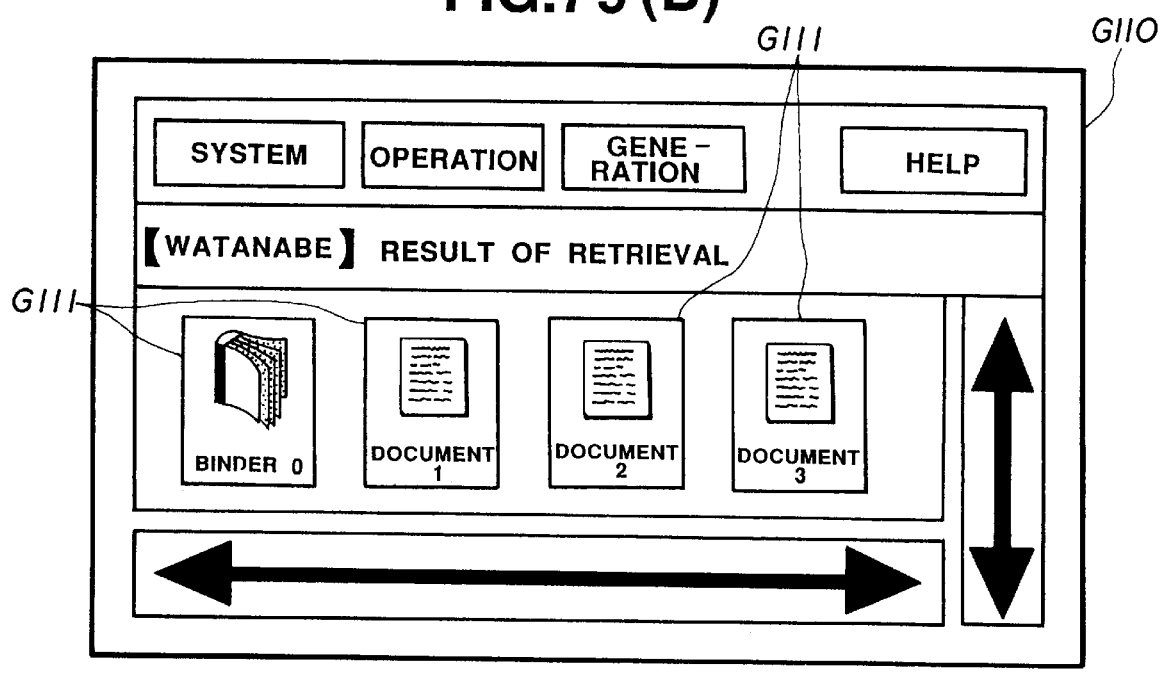

Presentation of the Result of Retrieval to the User in Consideration of the Hierarchical Structure Next, a description will be provided of an embodiment of presenting the result of retrieval to the user in consideration of the hierarchical structure when objects having a hierarchical structure, such as data 18 and binder 20, simultaneously agree with retrieval conditions with reference to the flowchart of FIG. 78, and FIGS. 2, 79(A), 79(B) and 80. In the present embodiment, it is assumed that retrieval conditions have been set with making data 18 and binders 20 present at arbitrary hierarchies under cabinet 16 the targets of retrieval, the above-described retrieval processing has been executed, and data 18 and binder 20 in the hierarchical structure indicated by thick frames shown in FIG. 79(A) have agreed with the retrieval conditions as a result of retrieval. It is also assumed that the result of retrieval is displayed an retrieval-result objects on retrieval-result window G110 as shown in FIG. 79(B) irrespective of the hierarchical structure of actual data.

Figure 80:
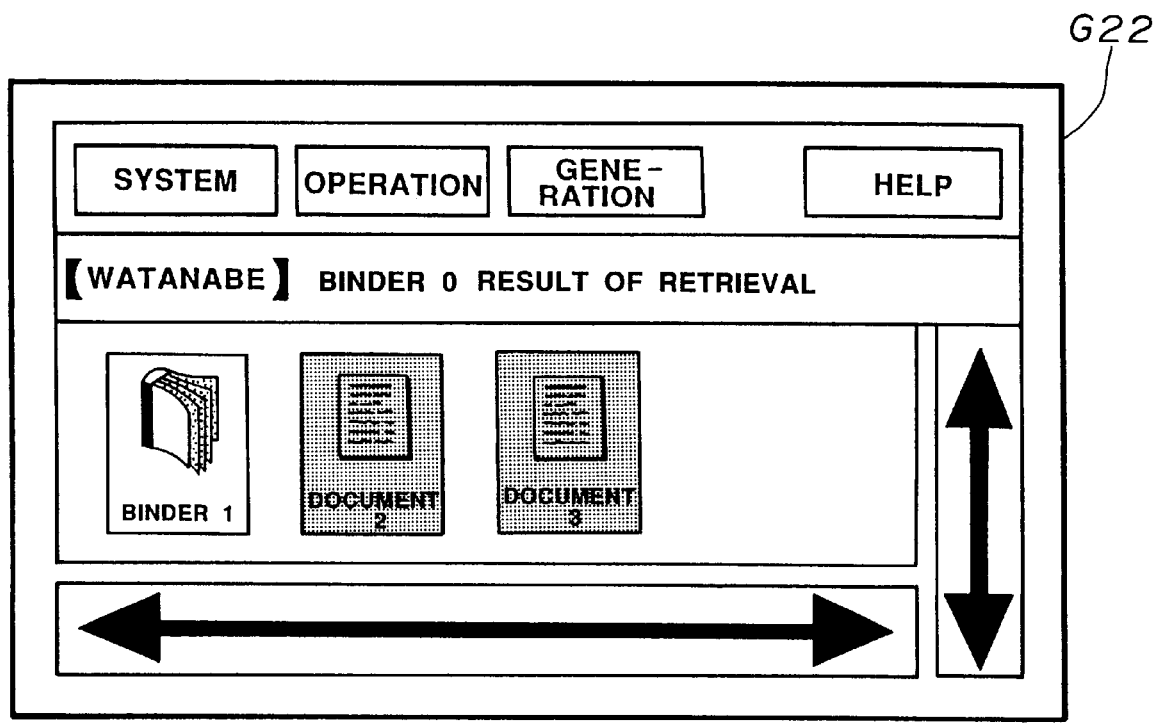
FIG. 80 is a diagram showing an example of display of a result of retrieval.

Suppose that a retrieval-result object indicating binder 20 having the name of "binder 0" has been opened from retrieval-result window G110. Then, as described above, binder 20 is opened and binder window G22 is displayed by the operation for binder 20 indicated by the retrieval-result object. In this binder window G22, the display of binder object G20 or data object G18 indicating binder 20 or data 18, respectively, indicated by retrieval-result object G111 displayed within retrieval-result window G110 is changed such that, for example, the corresponding icon is subjected to meshing processing as shown in FIG. 80, in order to clearly indicate that the corresponding object is an object which has agreed with the retrieval conditions in the retrieval operation. The processing of performing such display will be described with reference to the flowchart of FIG. 78.

When retrieval-result object G130 indicating binder 20 having the name of "binder 0" shown in FIGS. 79(A) and 79(B) has been opened by a 2-click operation, binder window G22 is generated (step S380), and the corresponding icon file is read from format ID 113 and data information 36 of each entry of object control information 110 of binder 20 of retrieval-result object G130, and the corresponding object is displayed together with the above-described information necessary for the window (step S381). Next, it is checked whether or not the same information as this entry is included in an entry of object control information 110 of retrieval-result window G110 (step S382). If the result of the check is affirmative, for example, meshing processing as shown in FIG. 80 is superposed on the icon display on the window so as to facilitate identification by the user (step S383). The above-described processing is performed for all entries of object control information 110 of binder 20 having the name of "binder 0" (step S384), and the process is terminated.

Figure 81:
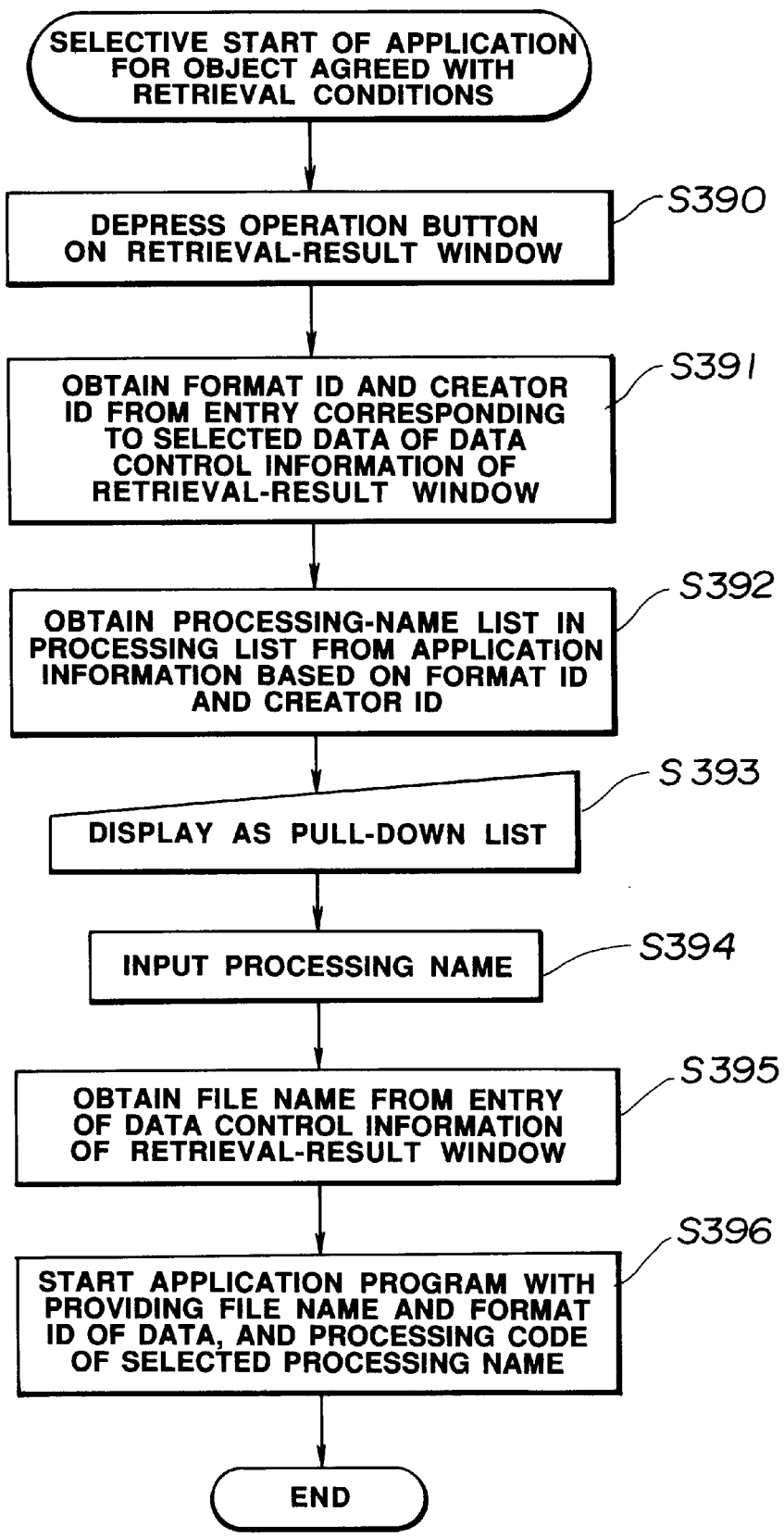
FIG. 81 is a flowchart of the processing of starting an application for a result of retrieval.
Figure 82:
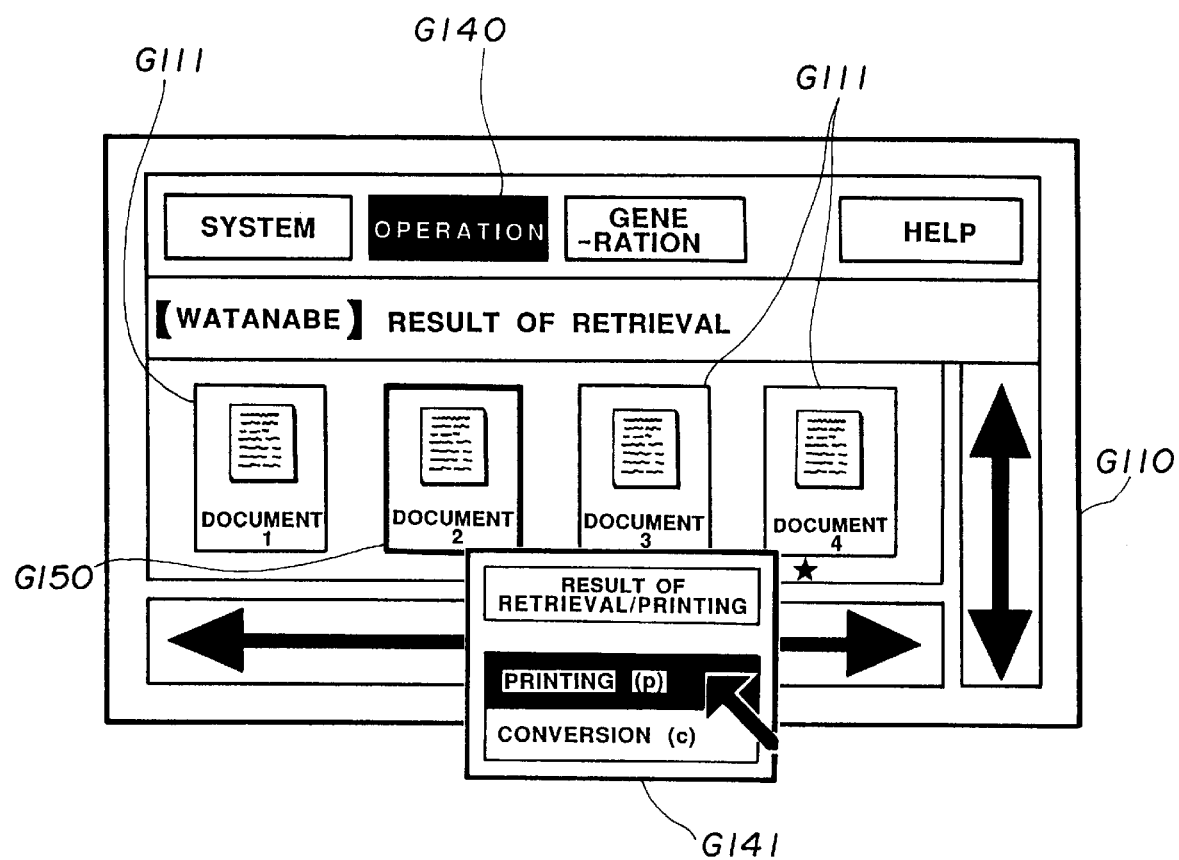
FIG. 82 is a diagram showing an example of the operation of starting an application for a result of retrieval.

Next, an embodiment of performing arbitrary processing by starting an application program for the result of retrieval will be described with reference to the flowchart of FIG. 81, and FIG. 82. FIG. 82 illustrates retrieval-result window G110, on which retrieval-result objects G111 indicating data 18 which have agreed with retrieval conditions are displayed. Various items, such as edition, printing and the like, may be considered as processing to be executed for the result of retrieval. In the present embodiment, however, it is assumed that printing processing is performed by starting an application program for starting printing. The application program to perform the processing is started, for example, by selecting the corresponding processing from a list.

When retrieval-result object G150 indicating data 18 has been selected, and operation button G140 on retrieval-result window G110 has been selected (step S390), the format ID 51 and the creator ID 114 of the selected data 18 are obtained from the entry of the data 18 corresponding to the selected retrieval-result object G150 (step S391). By comparing the obtained format ID 51 and creator ID 114 with application information 60, the processing name in processing list 65 corresponding to the format ID 51 in the entry having the same application ID 61 as the creater ID 114 is obtained (step S392), and is displayed as menu list G141 (step S393).

When one item in the list G141 has been selected by the user (step S394), the corresponding file name 112 is obtained from the entry of object control information 110 of retrieval-result window G110 (step S395). The application is started by execution-module name 62 corresponding to application ID 61 by providing the application program with the obtained format ID51 and the processing code corresponding to the item selected from the list G141 (step S396). When a plurality of data have been selected, the process can be executed by repeating a series of the above-described processing.

Execution of Retrieval Processing in Consideration of Disclosed Information

Figure 83:
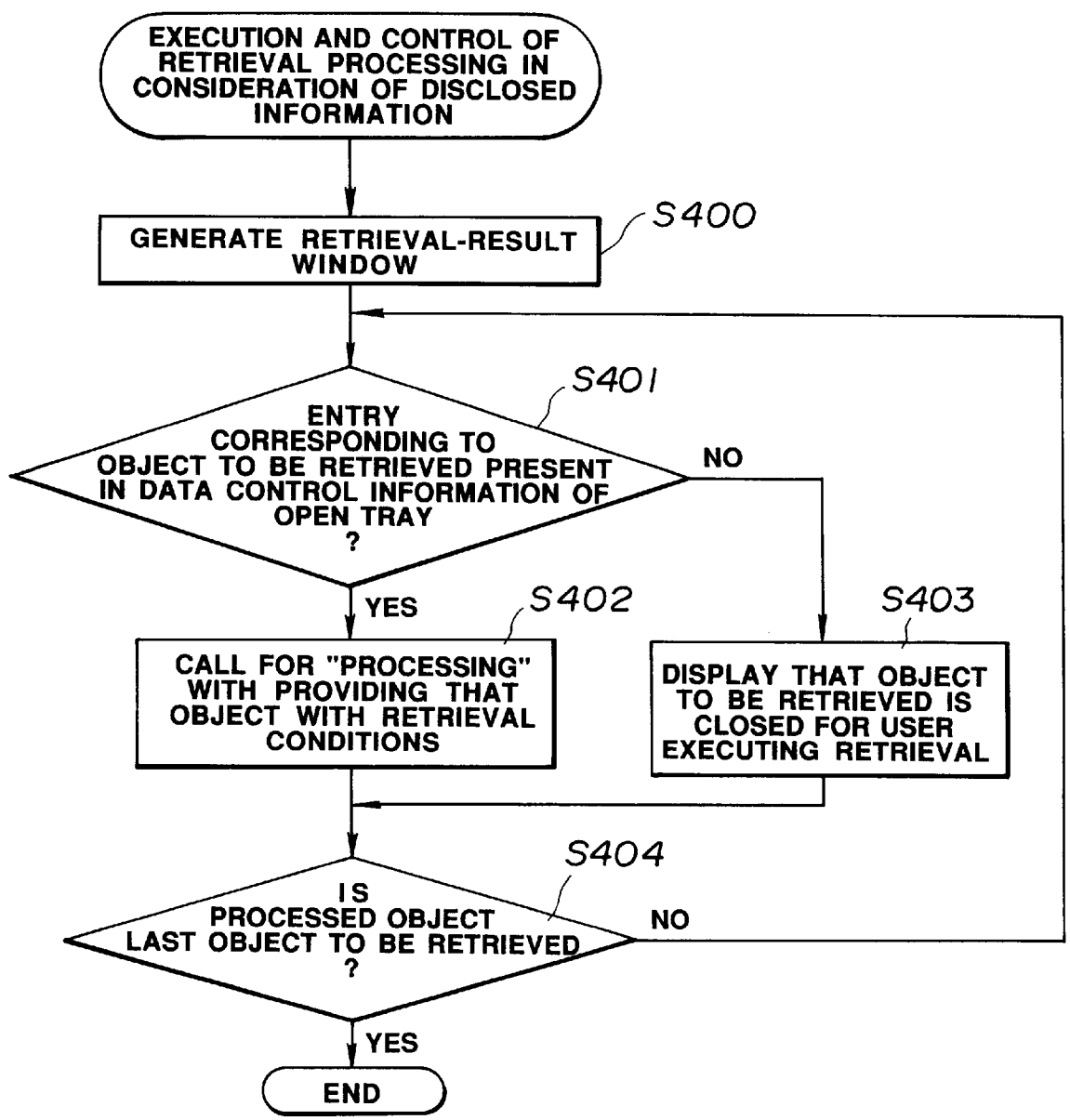
FIG. 83 is a flowchart of retrieval processing.

Next, a description will be provided of the processing of executing retrieval for an object possessed by other users with reference to the flowchart of FIG. 83. In the present embodiment, it is assumed that user A uses data 18 under cabinet 16 of user B, and data 18 under cabinet 16 of user C as targets of retrieval, and executes retrieval processing by setting retrieval conditions. It is also assumed that according to the above-described disclosure operation, cabinet 16 of user B is opened to user A executing the retrieval processing (this state is termed as "user A is a disclosed user of user B with respect to the object"), and cabinet 16 of user C is not opened to user A (this state is termed as "user A is a closed user of user C with respect to the object").

When user A has started the execution of retrieval processing by setting retrieval conditions by making cabinets 16 of user B and user C targets of retrieval, retrieval-result-display window G110 is generated (step S400). When retrieving, for example, cabinet 16 of another user, the entry corresponding to the cabinet 16 to be retrieved is searched for object control information 110 of open tray 29 (step S401). If the corresponding entry is present, the "processing" shown in the flowchart of FIG. 75 is called for the cabinet 16 together with the retrieval conditions (step S402). If the corresponding entry is absent, display that the object assigned by the user as the target of retrieval is closed to user A (step S403). Such processing is repeated for all objects possessed by the other user (step S404), and the retrieval processing for objects possessed by the other user is terminated.

Figure 84:
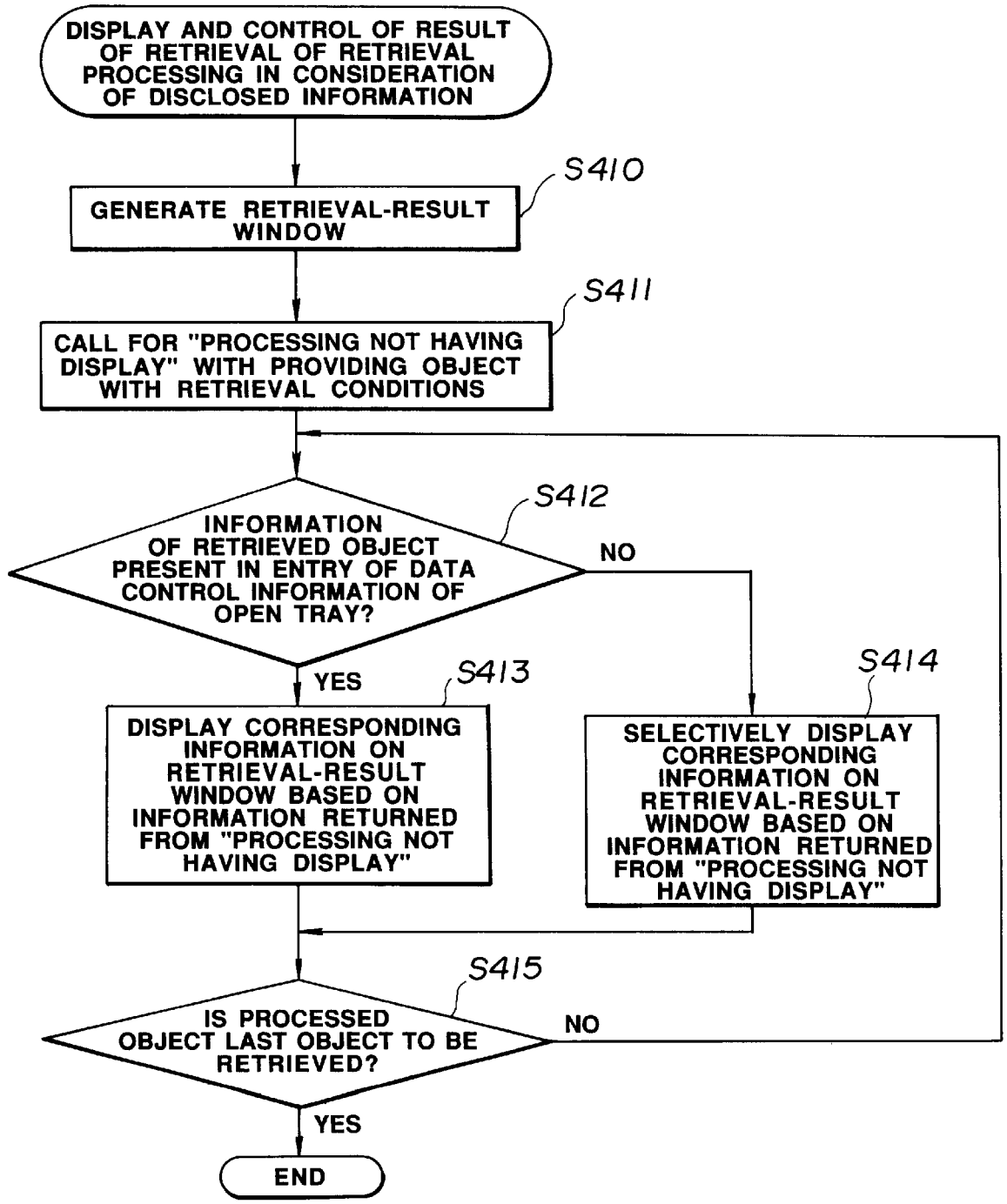
FIGS. 84 and 85 are flowcharts of the processing of displaying a result of retrieval in consideration of disclosed information.
Figure 85:
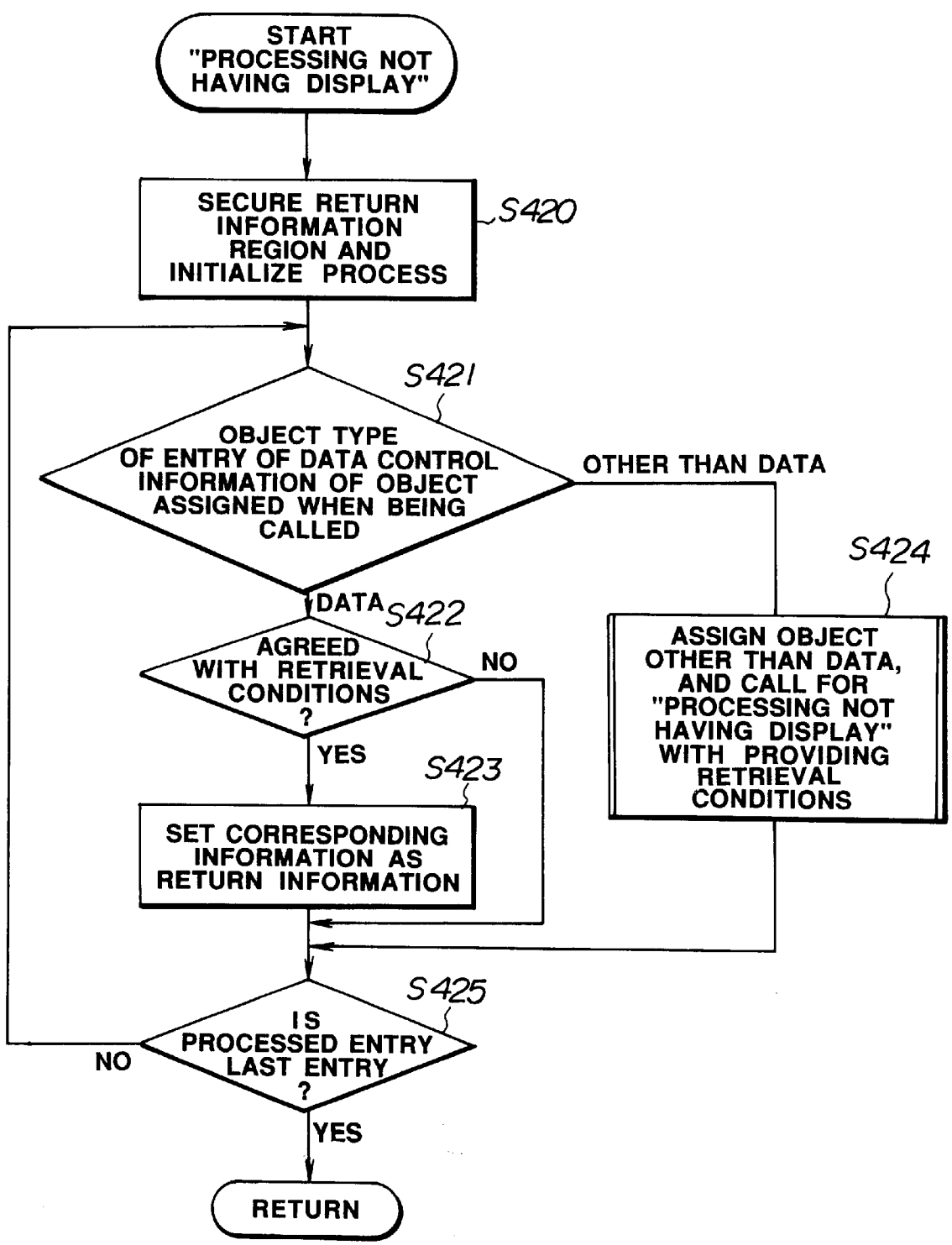

Next, a description will be provided of the processing of executing retrieval processing and suppressing the presentation of the result of retrieval to the user in accordance with disclosed information when retrieval for objects possessed by another user has been executed with reference to the flowcharts of FIGS. 84 and 85. In the present embodiment, it is assumed that user A uses data 18 under cabinet 16 of user B, and data 18 under cabinet 16 of user C as targets of retrieval, and executes retrieval processing with setting retrieval conditions. It is also assumed that according to an operation conforming to the "disclosure operation", cabinet 16 of user B is disclosed to user A executing the retrieval processing, and cabinet 16 of user C is closed to user A.

When user A has started the execution of retrieval processing with setting retrieval conditions with making cabinets 16 of users B and C targets of retrieval, retrieval-result-display window G110 is generated (step S410).

Next, "processing not having display" (to be described later) is called for the assigned cabinet 16 together with the retrieval conditions (step S411). Next, the entry corresponding to the retrieved cabinet 16 is searched for object control information 110 of open tray 29 (step S412). If the corresponding entry is present, the result of retrieval is displayed on retrieval-result-display window G110 based on information returned from the "processing not having display" (step S413). If the corresponding entry is absent, information causing no problem even if it is known by closed users, information which is permitted for closed users to know, for example, in order to control the system, and the like are selectively displayed on retrieval-result-display window G110 (step S414). Such processing is repeated for all objects possessed by other user assigned as targets of retrieval (step S415), and retrieval processing for objects possessed by the other user is terminated.

The above-described information causing no problem even if it is known by closed users comprises, for example, the presence/absence of an object which agrees with retrieval conditions.

The information which is permitted for closed users to know, for example, in order to control the system comprises, for example, the size, the date of registration, the date of updating, and the like of an object which are displayed without displaying information which can specify the object, such as the name of the object and the like.

Next, a description will be provided of the "processing not having display" shown in step S411 of FIG. 84 with reference to the flowchart of FIG. 85. The "processing not having display" is a module for realizing the function of recurrently retrieving and extracting data 18 for an object which can have lower hierarchies, such as binder 20, library binder 27, open shelves 22, open tray 29, tag tray 19 or the like as well as cabinet 16, and of displaying information of data 18 which agree with retrieval conditions on retrieval-result-display window G110.

When the "processing not having display" has been called for, a return information region is secured and the process is initialized (step S420), and an entry whose object type 111 is data 18 is selected from object control information 110 of the object assigned when the processing was called (step S421). Then it is determined whether or not the entry agrees with the retrieval conditions (step S422), and information of the agreed entry is set as return information (step S423). For an entry whose object type 111 is determined to be other than data 18 from object control information 110 of the object assigned when the processing was called for, the "processing not having display" is recurrently called for together with the retrieval conditions and targets of retrieval (step S424). Such processing is repeated for all entries of object control information 110 of the object assigned when the processing was called for (step S425), and return information is returned from the "processing not having display".

Figure 86:
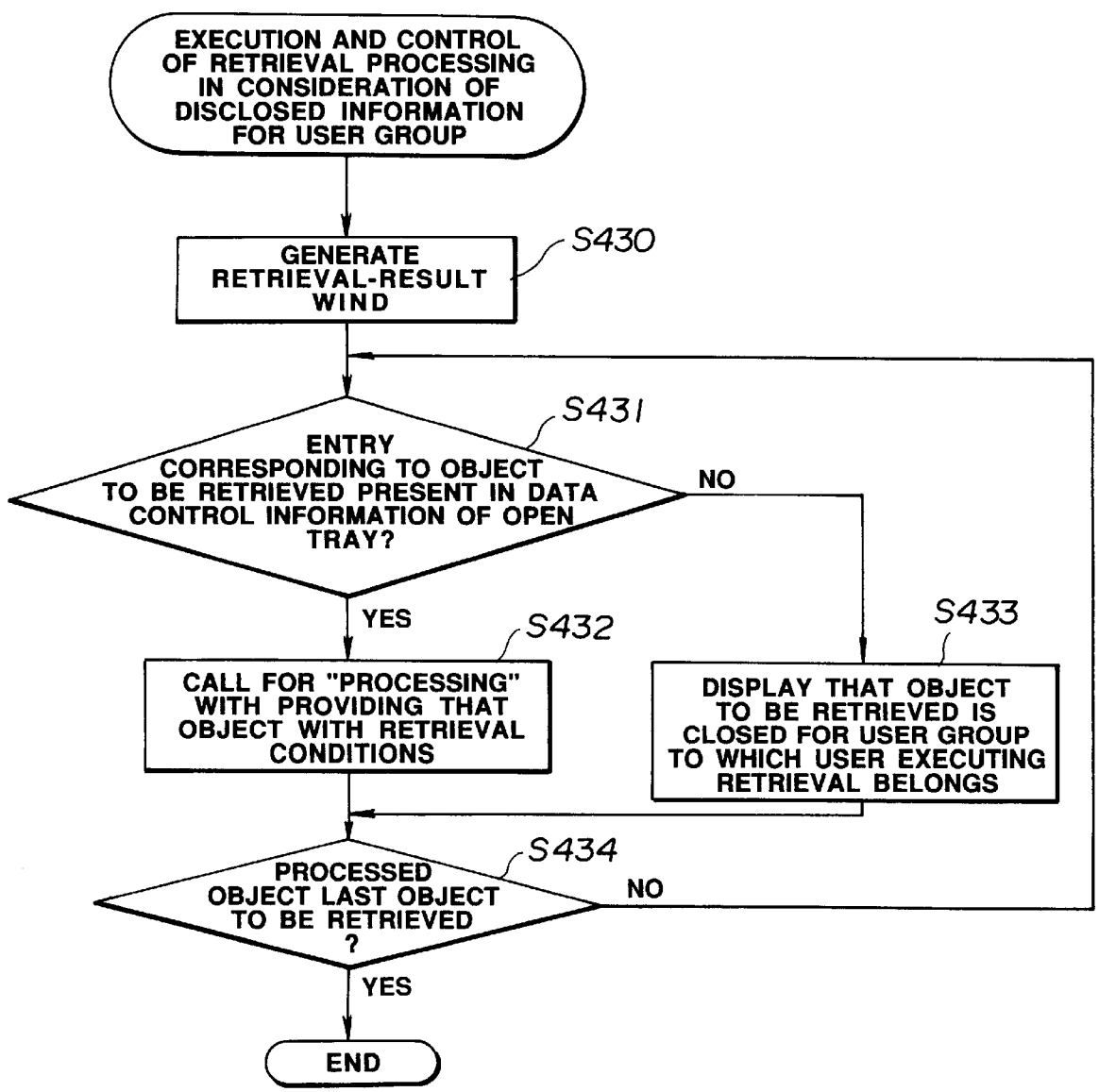
FIG. 86 is a flowchart of retrieval processing in consideration of disclosed information.

Execution of Retrieval Processing in Considertion of Disclosed Information for a User Group Next, a description will be provided of the processing of executing retrieval for objects possessed by other users with reference to the flowchart of FIG. 86. In the present embodiment, it is assumed that user A uses data 18 under cabinet 16 of user B, and data 18 under cabinet 16 of user C as targets of retrieval, and executes retrieval processing with setting retrieval conditions. It is also assumed that according to an operation conforming to the "disclosure operation", cabinet 16 of user B is disclosed to the user group to which user A executing the retrieval processing belongs (this state is termed as "user A is a user of a disclosed user group of user B" with respect to the object), and cabinet 16 of user C is closed to the user group to which user A belongs (this state is termed as "user A is a user of a closed user group of user C with respect to the object").

When user A has started the execution of retrieval processing with setting the retrieval conditions with making cabinet 16 of users B and C targets of retrieval, retrieval-result-display window G110 is generated (step S430). When retrieving cabinet 16 of other users, the entry corresponding to the cabinet 16 to be retrieved is searched for object control information 110 of open tray 29 (step S431). If the corresponding entry is present, the "processing" shown in the flowchart of FIG. 75 is called for the cabinet 16 together with the retrieval conditions (step S432). If the corresponding entry is absent, display that the object assigned by user A as the target of retrieval is closed to the user group to which user A belongs (step S433). Such processing is repeated for all objects possessed by the other user (step S434), and the retrieval processing for objects possessed by the other user is terminated.

Figure 87:
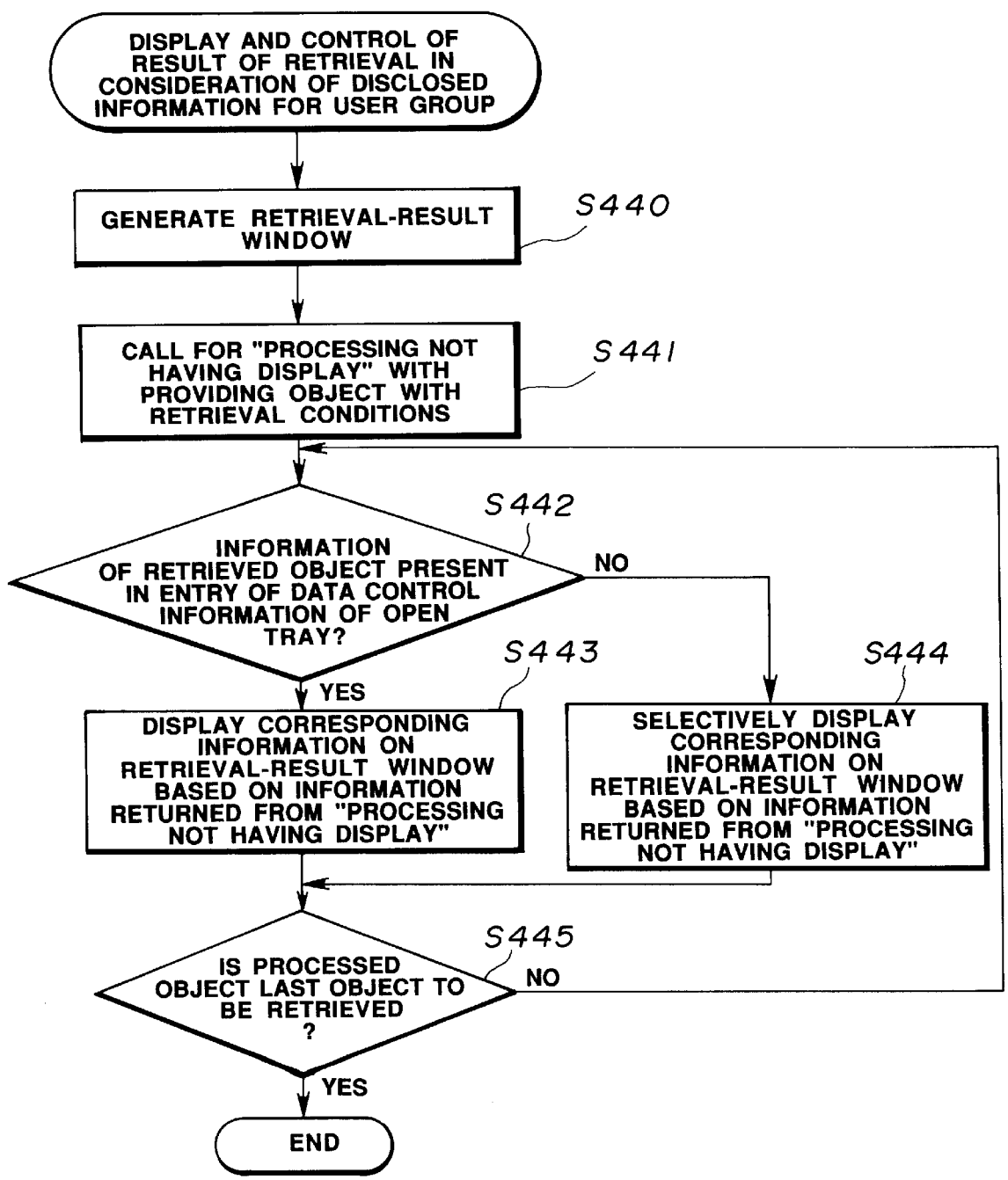
FIG. 87 is a flowchart of the processing of displaying a result of retrieval in consideration of disclosed information.

Next, a description will be provided of the processing of executing retrieval processing and suppressing the presentation of the result of retrieval to the user in accordance with disclosed information when executing retrieval for objects possessed by other user with reference to the flowchart of FIG. 87 and FIG. 2.

In the present embodiment, it is assumed that user A uses data 18 under cabinet 16 of user B, and data 18 under cabinet 16 of user C as targets of retrieval, and executes retrieval processing with setting retrieval conditions. It is also assumed that according to an operation conforming to the "disclosure operation", cabinet 16 of user B is disclosed to the user group to which user A executing the retrieval processing belongs, and cabinet 16 of user C is closed to the user group to which user A belongs.

When user A has started the execution of retrieval processing with setting retrieval conditions with making cabinets 16 of users B and C targets of retrieval, retrieval-result-display window G110 is generated (step S440). Next, the "processing not having display" shown in FIG. 85 which has been described in "execution of retrieval processing in consideration of disclosed information" is called for the assigned cabinet 16 together with the retrieval conditions (step S441). Next, the entry corresponding to the retrieved cabinet 16 is searched for object control information 110 of open tray 29 (step S442). If the corresponding entry is present, the result of retrieval is displayed on retrieval-result-display window G110 based on information returned from the "processing not having display" (step S443). If the corresponding entry is absent, information causing no problem even if it is known by closed users, information which is permitted for closed users to know, for example, in order to control the system, and the like are selectively displayed on retrieval-result-display window G110 (step S444). Such processing is repeated for all objects possessed by other user assigned as targets of retrieval (step S445), and retrieval processing for objects possessed by the other user is terminated.

As described above, by performing highlight display or display with connecting with a line of the icon indicating an application which can process data of the assigned user, or by easily presenting the correspondence between data of the user which can be referred to or updated by an application and the application to the user by performing processing of reducing or increasing the distance between two icons representing the data and the application, and thereby presenting an easy method of starting the application, the user can refer to or update the data without knowing the method of starting the application and without being aware of the correspondence between the data and the application.

Furthermore, an arbitrary user can easily retrieve arbitrary dispersed data in a plurality of computer systems having a plurality of users without being aware of the structure and the computer system for controlling data, and process the retrieved data.

It becomes also possible to execute retrieval processing of arbitrary dispersed data by an arbitrary user, or display of the result of the retrieval processing in a limited manner in a plurality of computer systems having a plurality of users.

Since name 1101 of a floppy disk, and the data form of the floppy disk for which the application differs in accordance with method of detection 1102 and converter 1103 are converted so as to be suitable for the user's own application, for example, data of other computer systems can be copied by a simple operation.

Although in the above-described embodiments, a description has been provided illustrating the case of converting data of floppy disk 17, data of a portable device, such as an optical disk, a magnetooptical disk, a CD-ROM or the like, can also be converted. Also in the case of using hard disks, data in other computer system can be converted via a network by providing a dedicated region for that purpose.

The present invention may be applied to a system comprising a plurality of apparatuses, or an apparatus comprising a single unit. The present invention can, of course, be applied also when the invention is achieved by supplying a system or an apparatus with programs.

As described above, according to the data processing apparatus of the present invention, the user can operate desired data without being aware of where the data is stored. The present invention also has the advantage that the user need not be aware of the correspondence between data and an application program which can process the data.

Since the apparatus of the present invention includes a plurality of data storage means for storing respective data utilized by a plurality of applications, determination means for determining the forms of respective data generated or edited by the plurality of applications, and conversion means for converting the data form of a first application determined by the determination means into a data form suitable for processing a second application when copying data generated or edited by the first application to the data storage means for the second application, the user need not perform an operation of converting the data form, and therefore data having different applications can be taken in and copied by a simple operation.

In the present invention, according to the above-described configuration, the time period until data is disposed, conditions and the time of data disposal, and the size of data to be disposed can be set and changed. Hence, when the set time period has elapsed, or the set conditions and time have been satisfied, or data has a size at least equal to the set size, the data is disposed. As a result, it is possible to prevent wasteful occupation of data regions, and the presence of data of lower priority for a time period more than necessary, and thereby to efficiently utilize the data regions.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and eqivalent structures and functions.

What is claimed is:

1. In an information processing system having a plurality of information processing apparatuses connected to a network, the combination of:

setting means for setting a period of accessibility to the data generated by each of said information processing apparatuses;

storage means for storing the data generated by each of said information processing apparatuses together with the period of accessibility set by said setting means; and control means for controlling the accessibility of the stored data to selected ones of said information processing apparatuses, said control means including means for limiting the duration of accessibility of said stored data to said selected ones of said information processing apparatuses according to a stored period of accessibility, and, when said duration of accessibility ends, for prohibiting the access to said stored data of said selected ones of said information processing apparatuses.

2. An information processing system according to claim 1, further comprising identifying means for identifying other data from the data stored in said storage means, and means for allowing access to said other data to other input processing apparatuses.

3. An information processing system according to claim 1, wherein said control means permits other information processing apparatuses to refer to or update the data.

4. An information processing system according to claim 1, wherein said information processing apparatus comprises specifying means for specifying the information processing apparatuses to which the data is disclosed.

5. An information processing system according to claim 1, wherein the disclosed data is limited to be copied.

6. An information processing system according to claim 1, wherein the data to be disclosed to other information processing apparatuses is displayed in a specific area.

7. An information processing system according to claim 6, wherein data is disclosed to other information processing apparatuses by transferring the data in the specific area.

8. A method of processing information in a system having a plurality of information processing apparatuses connected to a network, said method comprising the steps of:

setting a period of accessibility to the data generated by each of said information processing apparatuses;

storing data generated by each of said information processing apparatuses together with the period of accessibility set in said setting step;

controlling the duration of accessibility by selected ones of said information processing apparatuses according to the stored period of accessibility; and, when said duration of accessibility ends, prohibiting the access to said stored data of said selected ones of said information processing apparatuses.

9. A method according to claim 8, further comprising the steps of identifying other desired data from the stored data, and disclosing the identified data to other information processing apparatuses.

10. A method according to claim 8, wherein said step of controlling permits other information processing apparatuses to refer to or update the data.

11. A method according to claim 8, further comprising the step of specifying the information processing apparatuses to which the data is disclosed.

12. A method according to claim 8, wherein the disclosed data is limited to be copied.

13. A method according to claim 8, wherein the data to be disclosed to other information processing apparatuses is displayed in a specific area.

14. A method according to claim 13, wherein data is disclosed to other information processing apparatuses by transferring the data in a specific area.

15. An information storage medium in which is stored a machine readable program for carrying out a method of processing information in a system having a plurality of information processing apparatuses connected to a network, said method comprising the steps of:

setting a period of accessibility to the data generated by each of said information processing apparatuses;

storing data generated by each of said information processing apparatuses together with the period of accessibility set in said setting step;

controlling the duration of accessibility to selected ones of said information processing apparatuses according to the stored period of accessibility; and, when said duration of accessibility ends, prohibiting the access to said stored data of said selected ones of said information processing apparatuses.

16. An information storage medium according to claim 15, wherein said method further comprises the steps of identifying other desired data from the stored data, and disclosing the identified data to other information processing apparatuses.

17. An information storage medium according to claim 15, wherein said step of controlling permits other information processing apparatuses to refer to or update the data.

18. An information storage medium according to claim 15, wherein said method further comprises the step of specifying the information processing apparatuses to which the data is disclosed.

19. An information storage medium according to claim 15, wherein the disclosed data is limited to be copied.

20. An information storage medium according to claim 15, wherein the data to be disclosed to other information processing apparatuses is displayed in a specific area.

21. An information storage medium according to claim 20, wherein data is disclosed to other information processing apparatuses by transferring the data in a specific area.

* * * * *

UNITED STATES PATENT AND TRADEMARK OFFICE
CERTIFICATE OF CORRECTION

PATENT NO. : 6,151,019
DATED : November 21, 2000
INVENTOR(S) : Satoshi Watanabe et al.

Page 1 of 2

It is certified that error appears in the above-identified patent and that said Letters Patent is hereby corrected as shown below:

Title page,
Item [56] References Cited - U.S. PATENT DOCUMENTS
Insert: -- 5,018,083 5/199 Watanabe et al. 364/523 --.

Sheet 27 of 93 - FIG. 37,
"APPLICA" should read -- APPLICA --; and "-TION" should read -- TION --.

Column 1,
Line 59, "system," should read -- systems, --.

Column 12,
Line 59, "user." should read -- users. --.

Column 13,
Line 29, "and is" should read -- is --.

Column 29,
Line 8, "application" should read -- applications --.

Column 32,
Line 16, "shown" should read -- shown in --;
Line 33, "set" should read -- sets --.

Column 39,
Line 46, "cabinet 16" should read -- cabinet 16 as --;
Line 52, "an" should read -- as --.

Column 41,
Lines 8 and 37, "targets" should read -- as targets --;
Line 53, "other" should read -- another --.

Column 42,
Line 45, "targets" should read -- as targets --;
Line 63, "user" should read -- users --.

UNITED STATES PATENT AND TRADEMARK OFFICE
CERTIFICATE OF CORRECTION

PATENT NO. : 6,151,019
DATED : November 21, 2000
INVENTOR(S) : Satoshi Watanabe et al.

It is certified that error appears in the above-identified patent and that said Letters Patent is hereby corrected as shown below:

<u>Column 43,</u>
Line 8, "targets" should read -- as targets --;
Line 25, "user" should read -- users --;
Line 61, "system" should read -- systems --.

<u>Column 44,</u>
Line 36, "eqivalent" should read -- equivalent --.

Signed and Sealed this

Thirteenth Day of November, 2001

Attest:

*Nicholas P. Godici*

NICHOLAS P. GODICI
*Attesting Officer*     *Acting Director of the United States Patent and Trademark Office*